(12) United States Patent
Kimura et al.

(10) Patent No.: US 11,310,091 B2
(45) Date of Patent: Apr. 19, 2022

(54) TRANSMISSION DEVICE, METHOD, AND RECORDING MEDIUM

(71) Applicant: Sony Corporation, Tokyo (JP)

(72) Inventors: Ryota Kimura, Tokyo (JP); Hiroki Matsuda, Tokyo (JP); Yukitoshi Sanada, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 37 days.

(21) Appl. No.: 16/980,857

(22) PCT Filed: Jan. 30, 2019

(86) PCT No.: PCT/JP2019/003168
§ 371 (c)(1),
(2) Date: Sep. 15, 2020

(87) PCT Pub. No.: WO2019/181223
PCT Pub. Date: Sep. 26, 2019

(65) Prior Publication Data
US 2021/0119849 A1 Apr. 22, 2021

(30) Foreign Application Priority Data
Mar. 22, 2018 (JP) .............................. JP2018-054417
Jan. 10, 2019 (JP) .............................. JP2019-002853

(51) Int. Cl.
*H04L 27/30* (2006.01)
*H04L 27/02* (2006.01)
*H04L 27/20* (2006.01)

(52) U.S. Cl.
CPC .............. *H04L 27/30* (2013.01); *H04L 27/02* (2013.01); *H04L 27/2082* (2013.01)

(58) Field of Classification Search
CPC ...... H04L 27/30; H04L 27/02; H04L 27/2082
See application file for complete search history.

(56) References Cited

U.S. PATENT DOCUMENTS

2016/0105300 A1 4/2016 Wang et al.

OTHER PUBLICATIONS

International Search Report and Written Opinion dated Mar. 26, 2019 for PCT/JP2019/003168 filed on Jan. 30, 2019, 11 pages including English Translation of the International Search Report.
Frenger, P. K. and Svensson, N.A.B., "Parallel Combinatory OFDM Signaling," IEEE Transactions on Communications, vol. 47, No. 4, Apr. 1999, pp. 558-567.
ZTE, "Potential transmission schemes for MUST," 3GPP TSG RAN WG1 Meeting No. 81, R1-152974, Fukuoka, Japan, May 25-29, 2015, 6 pages.

*Primary Examiner* — Ronald B Abelson
(74) *Attorney, Agent, or Firm* — Xsensus, LLP

(57) ABSTRACT

A transmission device includes a transmitter having circuitry that converts a first-type bit sequence and a second-type bit sequence into a complex signal point sequence. Each of a plurality of complex signal points included in the complex signal point sequence represents an element of one of a plurality of complex signal point sets. In the complex signal point sequence, the applicable patterns of the plurality of complex signal point sets correspond to the first-type bit sequence in a plurality of predetermined combinations of candidates for the first-type bit sequence and the applicable patterns. Each complex signal point included in the complex signal point sequence corresponds to the second-type bit sequence.

26 Claims, 51 Drawing Sheets m=1 m=2 m=1 m=2 m=8

FIG.22
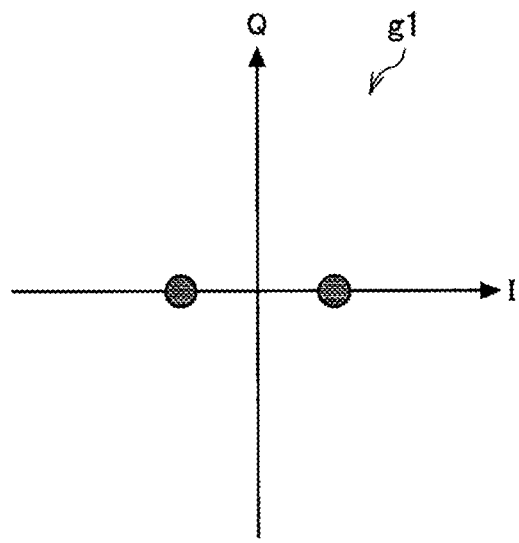
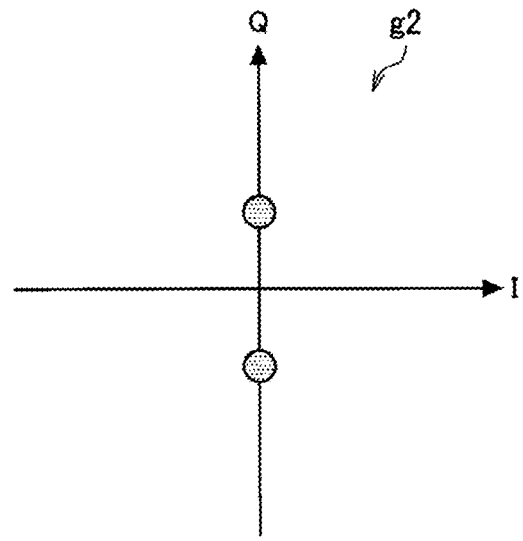
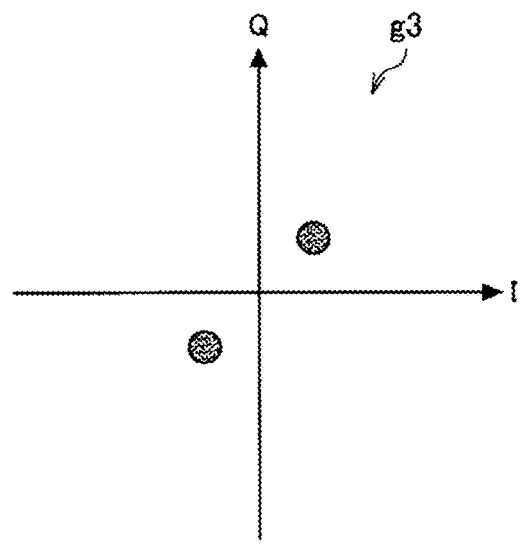
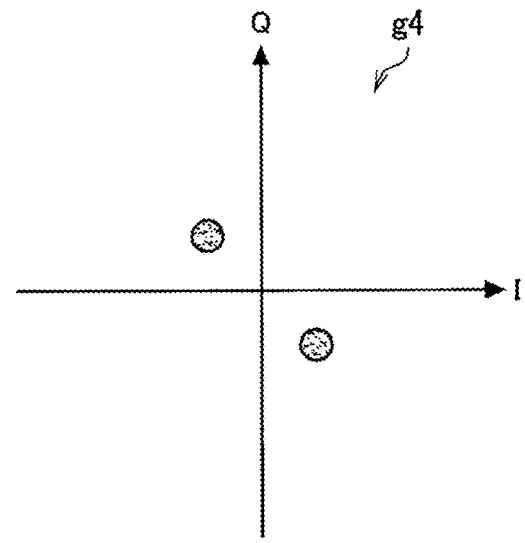

FIG.23
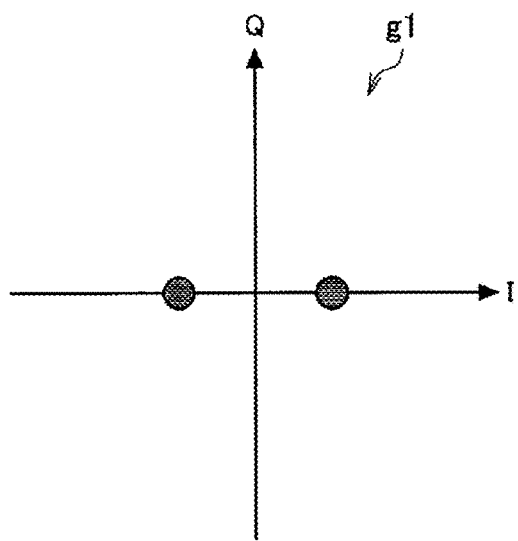
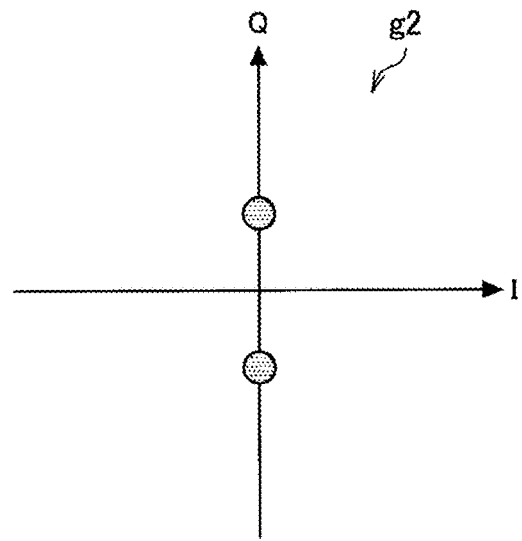
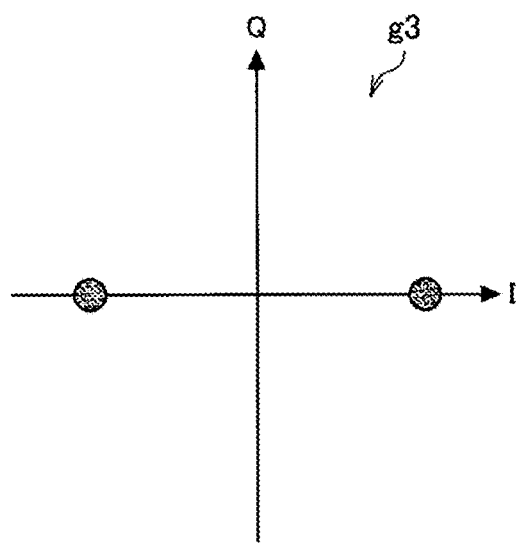
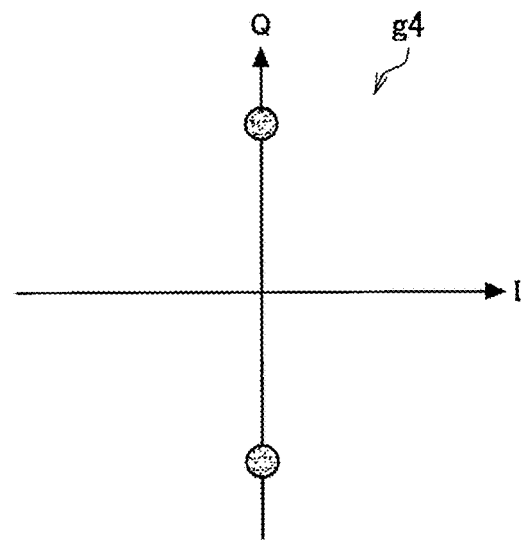

FIG.24
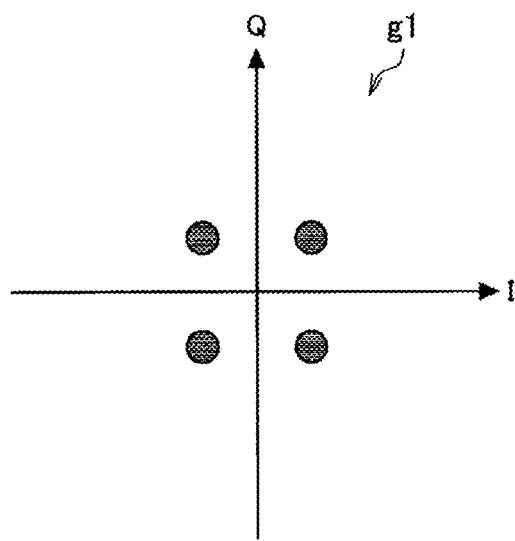
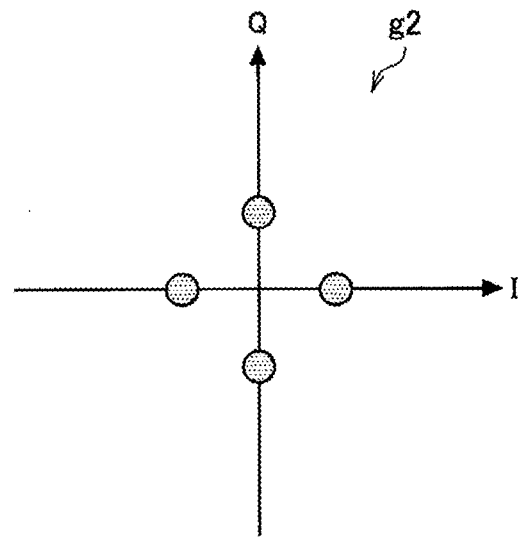
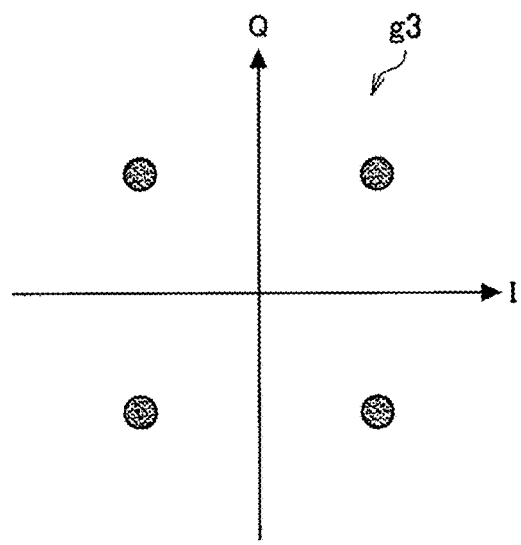
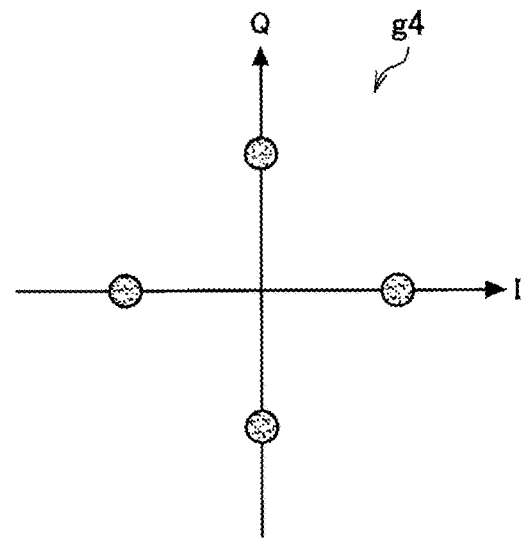

FIG.25
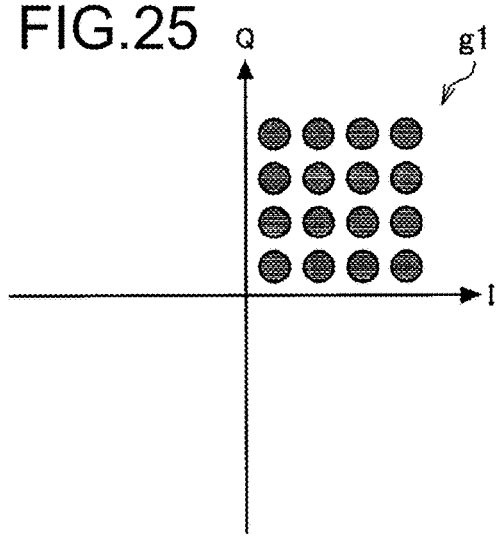
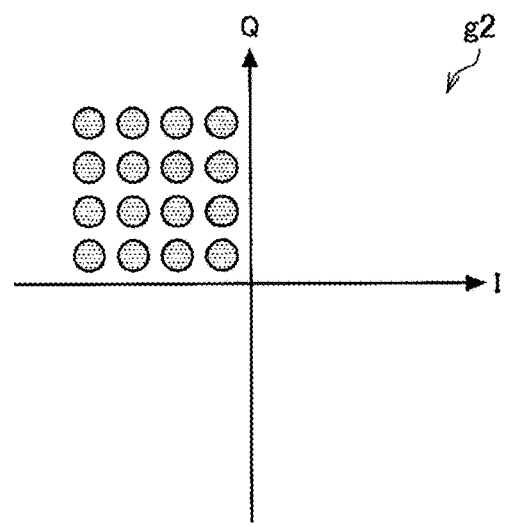
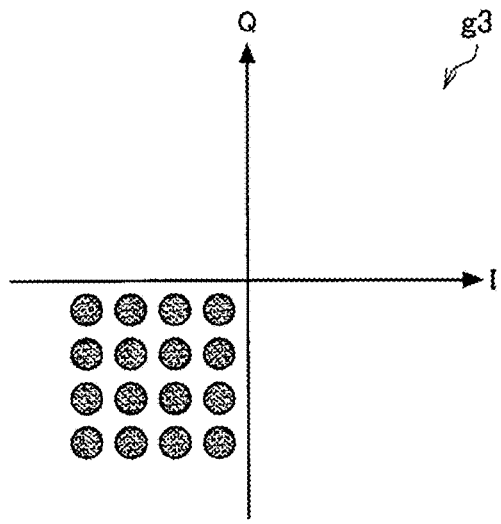
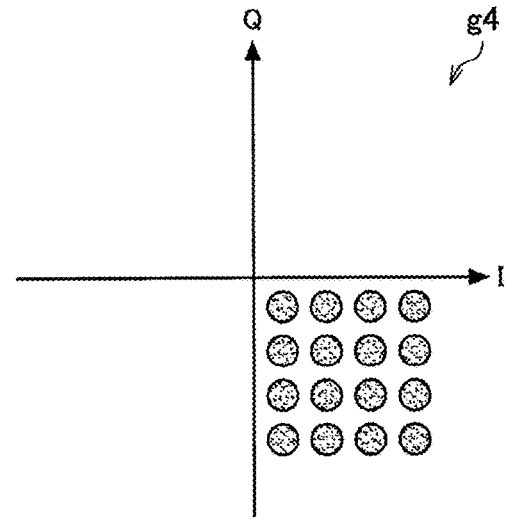
FIG.26
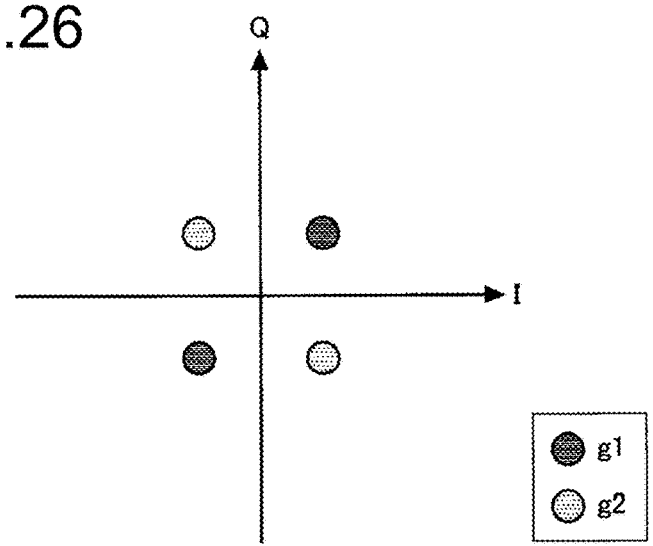

TRANSMISSION DEVICE, METHOD, AND RECORDING MEDIUM

CROSS-REFERENCE TO RELATED APPLICATIONS

The present application is based on PCT filing PCT/JP2019/003168, filed Jan. 30, 2019, which claims priority to JP 2018-054417, filed Mar. 22, 2018, and JP 2019-002853, filed Jan. 10, 2019, the entire contents of each are incorporated herein by reference.

FIELD

The application concerned is related to a transmission device, a method, and a recording medium.

BACKGROUND

In recent years, the wireless communication environment has been facing the issue of an exponential rise in the data traffic. In that regard, various technologies have been proposed with the aim of enhancing the resource efficiency. For example, in Patent Literature 1 mentioned below, a modulation method called IM (Index Modulation, or Parallel Combinatory Modulation) has been proposed. In the typical modulation method of the past, the input information sequence is modulated into complex signal points (real signal points and/or complex signal points); and the complex signal points are placed in all available resource elements. In contrast, in the IM, instead of placing them in all available resource elements, the complex signal points are placed only at particular positions. In the IM, a portion of the input information sequence is modulated into complex signal points, and the post-modulation complex signal points are placed at such positions among the available resource elements which correspond to the concerned portion of the input information sequence. In the IM, since the information can be expressed using the positions at which the complex signal points are placed, it is expected to achieve enhancement in the resource efficiency.

CITATION LIST

Patent Literature

Patent Literature 1: U.S. Unexamined Patent Application Publication No. 2016/0105300

SUMMARY

Technical Problem

Regarding the IM technology proposed in Patent Literature 1 mentioned above, it is hard to say that the resource efficiency can be enhanced to a satisfactory extent. That is because the available resource elements do not get sufficiently utilized.

In that regard, in the application concerned, a modulation mechanism is proposed for enabling achieving further enhancement in the resource efficiency.

Solution to Problem

According to the present disclosure, a transmission device is provided that includes a converting unit that converts a first-type bit sequence and a second-type bit sequence into a complex signal point sequence, wherein each of a plurality of complex signal points included in the complex signal point sequence represents an element of one of a plurality of complex signal point sets, in the complex signal point sequence, applicable pattern of the plurality of complex signal point sets corresponds to the first-type bit sequence in a plurality of predetermined combinations of candidates for the first-type bit sequence and the applicable pattern, and each complex signal point included in the complex signal point sequence corresponds to the second-type bit sequence.

Moreover, according to the present disclosure, a method implemented in a processor is provided that includes: converting a first-type bit sequence and a second-type bit sequence into a complex signal point sequence, wherein each of a plurality of complex signal points included in the complex signal point sequence represents an element of one of a plurality of complex signal point sets, in the complex signal point sequence, applicable pattern of the plurality of complex signal point sets corresponds to the first-type bit sequence in a plurality of predetermined combinations of candidates for the first-type bit sequence and the applicable pattern, and each complex signal point included in the complex signal point sequence corresponds to the second-type bit sequence.

Moreover, according to the present disclosure, a recording medium is provided that includes a program recorded therein for causing a computer to function as a converting unit that converts a first-type bit sequence and a second-type bit sequence into a complex signal point sequence, wherein each of a plurality of complex signal points included in the complex signal point sequence represents an element of one of a plurality of complex signal point sets, in the complex signal point sequence, applicable pattern of the plurality of complex signal point sets corresponds to the first-type bit sequence in a plurality of predetermined combinations of candidates for the first-type bit sequence and the applicable pattern, and each complex signal point included in the complex signal point sequence corresponds to the second-type bit sequence.

Advantageous Effects of Invention

As described above, according to the application concerned, a modulation mechanism is proposed that enables achieving further enhancement in the resource efficiency. Meanwhile, the abovementioned effect is not necessarily limited in scope and, in place of or in addition to the abovementioned effect, any other effect indicated in the present written description or any other effect that may occur from the present written description can also be achieved.

BRIEF DESCRIPTION OF DRAWINGS

FIG. 22 is a diagram illustrating an example of a plurality of complex signal point sets used in the new IM.

FIG. 23 is a diagram illustrating an example of the characterization of a plurality of complex signal point sets used in the new IM.

FIG. 24 is a diagram illustrating an example of the characterization of a plurality of complex signal point sets used in the new IM.

FIG. 25 is a diagram illustrating an example of the characterization of a plurality of complex signal point sets used in the new IM.

FIG. 26 is a diagram illustrating another example of the characterization of a plurality of complex signal point sets used in the new IM.

DESCRIPTION OF EMBODIMENTS

Figure 1:
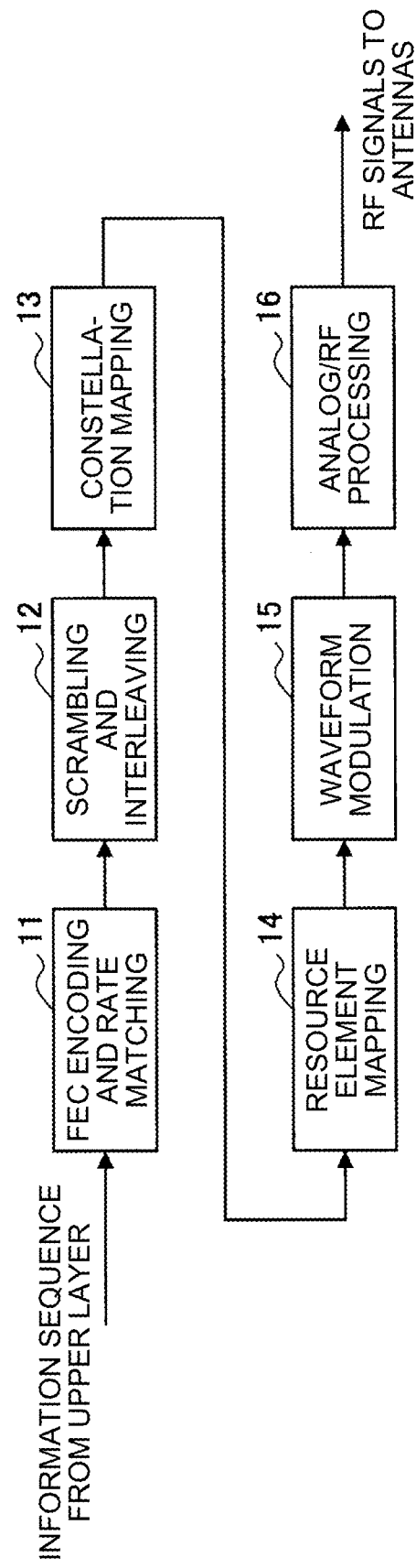
FIG. 1 is a block diagram that schematically illustrates an example of the signal processing performed in a transmission device according to an embodiment of the application concerned.

A preferred embodiment of the application concerned is described below in detail with reference to the accompanying drawings. In the present written description and the drawings, the constituent elements having practically identical functional configuration are referred to by the same reference numerals, and the explanation is not given repeatedly.

The explanation is given in the following sequence.
1. To begin with
1.1. Overview of transmission operation
1.2. Conventional modulation method
1.3. Technical problem
1.4. Overview of proposed technology
2. Configuration example
2.1. Exemplary system configuration
2.2. Exemplary configuration of transmission device
2.3. Exemplary configuration of receiving device
3. Technical features
3.1. Applicable patterns of complex signal point set
3.2. Complex signal point set
3.3. Specific signal processing
　3.3.1. First example
　3.3.2. Second example
　3.3.3. Third example
3.4. Combinations with various types of waveforms
3.5. Reception operation
3.6. Modification examples
　3.6.1. First modification example
　3.6.2. Second modification example
4. Application examples
5. Summary 1. To Begin With 1.1. Overview of Transmission Operation FIG. 1 is a block diagram that schematically illustrates an example of the signal processing performed in a transmission device according to the embodiment of the application concerned. As illustrated in FIG. 1, the signal processing performed in the transmission device according to the present embodiment includes an FEC (Forward Error Correction) encoding and rate matching block 11; a scrambling and interleaving block 12; a constellation mapping block 13; a resource element mapping block 14; a waveform modulation block 15; and an analog/RF processing block 16. With reference to FIG. 1, an input information sequence (for example, a bit sequence) from the upper layer is processed, and RF (radio frequency) signals are output.

The FEC encoding and rate matching block 11 performs FEC encoding (implements convolutional encoding, block encoding, turbo encoding, LDPC encoding and/or polar encoding) and performs rate matching (such as bit repetition and/or bit puncturing) with respect to the input information sequence. The scrambling and interleaving block 12 performs scrambling and interleaving with respect to the input information sequence that is output from the FEC encoding and rate matching block 11. The constellation mapping block 13 converts the input information sequence, which is output from the scrambling and interleaving block 12, into a complex signal point sequence based on predetermined constellations (complex signal point sets). In the mapping from a bit sequence onto complex signal points, it is possible to use a variety of constellations of $2^m$ FSK (Frequency Shift Keying), $2^m$ ASK (Amplitude Shift Keying), $2^m$ PSK (Phase Shift Keying), and $2^m$ QAM (Quadrature Amplitude Modulation). The resource element mapping block 14 maps each complex signal point, which is included in the complex signal point sequence output from the constellation mapping block 13, onto a resource element. The waveform modulation block 15 performs waveform modulation with respect to each complex signal point that has been placed in a resource element by the resource element mapping block 14. The analog/RF processing block performs analog processing and RF processing.

A resource element represents a single unit of resource (i.e., a unit resource) identified by at least one of the following: frequency resources (subcarriers, sub-channels, and resource blocks), temporal resources (symbols, slots, and frames), spatial resources (antennas, antenna ports, spatial layers, and spatial streams), and encoding patterns (a spread encoding pattern, an interleaving pattern, and a scrambling pattern).

1.2. Conventional Modulation Method

Figure 2:
FIG. 2 is a diagram for explaining an example of resource element mapping in the typical modulation method of the past.

Typical Modulation Method of Past
FIG. 2 is a diagram for explaining an example of resource element mapping in the typical modulation method of the past. As illustrated in FIG. 2, in the typical modulation method of the past, complex signal points s1 to s4 are placed at all available resource elements #1 to #4, respectively. The horizontal axis represents arbitrary resource elements. Herein, a complex signal point si represents the complex signal point placed in the i-th resource element.

Meanwhile, the information expressed using the complex signal points is also called the information loaded on the complex signal points. Moreover, expressing information using the complex signal points is also called loading information on the complex signal points.

Conventional IM
In the conventional IM, instead of placing them in all available resource elements, the complex signal points are placed only at particular positions. In the IM, a portion of the input information sequence is modulated into complex signal points, and the post-modulation complex signal points are placed at such positions among the available resource elements which correspond to the concerned portion of the input information sequence. That is, in the IM, information is expressed not only using the complex signal points but also using the positions at which the complex signal points are placed. Sometimes the arrangement of the complex signal points is treated as the ON/OFF states of the resource elements.

Figure 3:
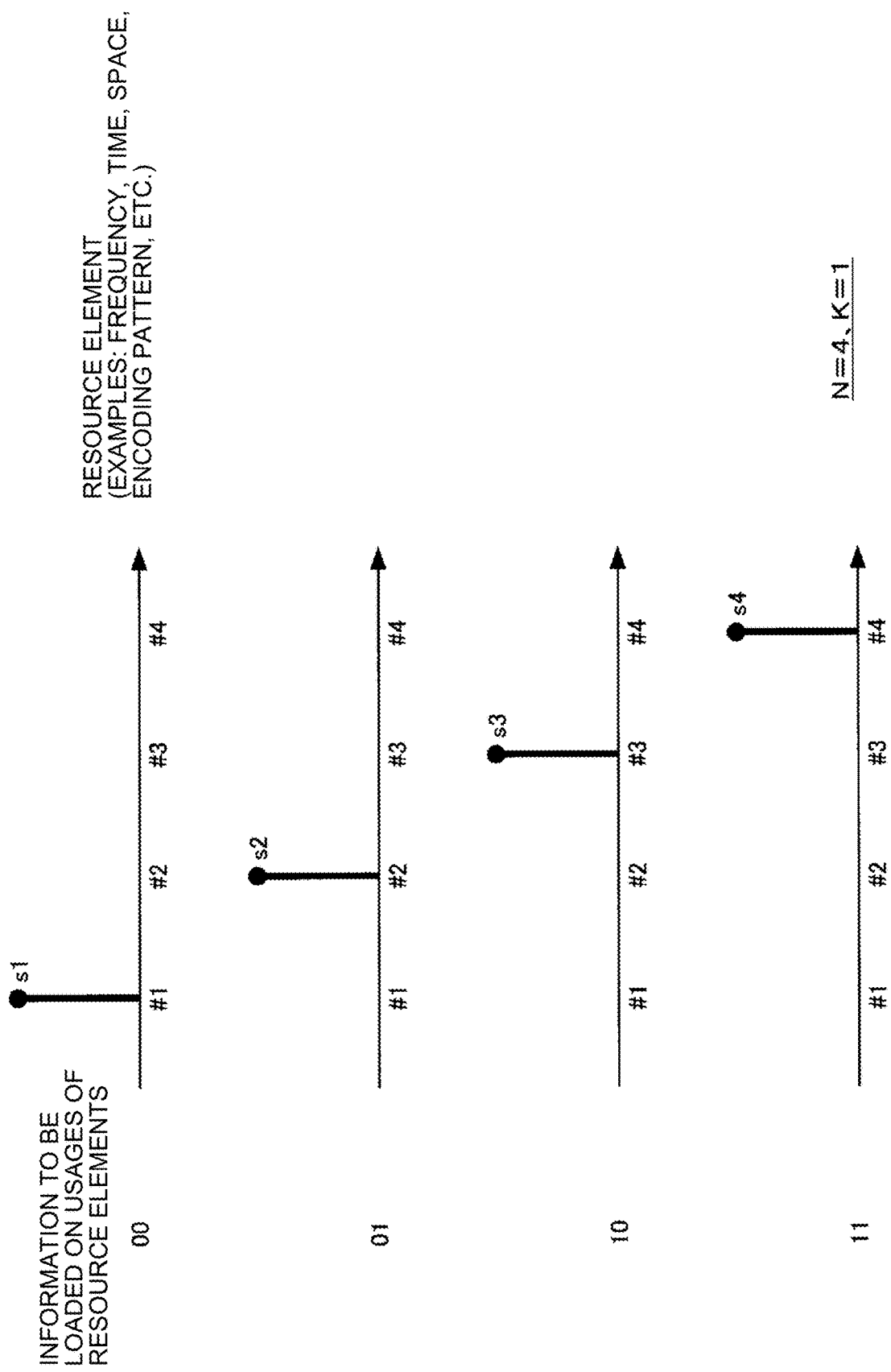
FIG. 3 is a diagram for explaining an example of the modulation performed in the conventional IM.

FIG. 3 is a diagram for explaining an example of the modulation performed in the conventional IM. The horizontal axis represents arbitrary resource elements. A complex signal point si represents the complex signal point placed in the i-th resource element. Thus, in a resource element in which the complex signal point si is not illustrated, it implies that the complex signal point si is not placed. As illustrated in FIG. 3, the complex signal point is placed in one of the four available resource elements #1 to #4. As a result of placing the complex signal point s1 in the resource element #1, information "00" is expressed. Moreover, as a result of placing the complex signal point s2 in the resource element #2, information "01" is expressed. Furthermore, as a result of placing the complex signal point s3 in the resource element #3, information "10" is expressed. Moreover, as a result of placing the complex signal point s4 in the resource element #4, information "11" is expressed. In this way, in the example illustrated in FIG. 3, 2-bit information is expressed according to the position of the resource element in which the complex signal point is placed.

Figure 4:
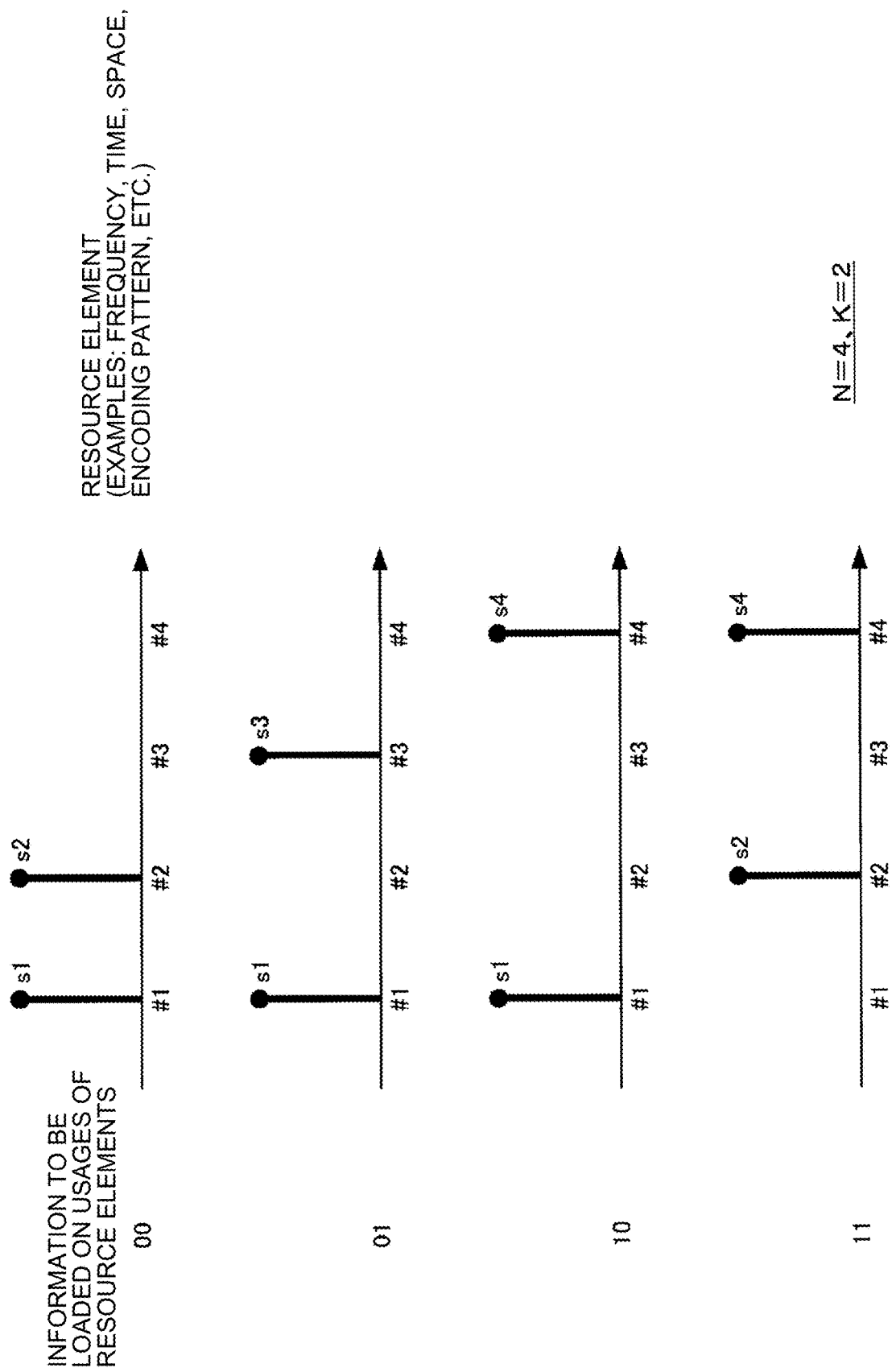
FIG. 4 is a diagram for explaining another example of the modulation performed in the conventional IM.

FIG. 4 is a diagram for explaining another example of the modulation performed in the conventional IM. The horizontal axis represents arbitrary resource elements. A complex signal point si represents the complex signal point placed in the i-th resource element. Thus, In a resource element in which the complex signal point si is not illustrated, it implies that the complex signal point si is not placed. As illustrated in FIG. 4, the complex signal points are placed in two of the four available resource elements #1 to #4 (i.e., N=4 and K=2 holds true). As a result of placing the complex signal points s1 and s2 in the resource elements #1 and #2, respectively; information "00" is expressed. Moreover, as a result of placing the complex signal points s1 and s4 in the resource elements #1 and #3, respectively; information "01" is expressed. Furthermore, as a result of placing the complex signal points s1 and s4 in the resource elements #1 and #4, respectively; information "10" is expressed. Moreover, as a result of placing the complex signal points s2 and s4 in the resource elements #2 and #4, respectively; information "11" is expressed. In this way, in the example illustrated in FIG. 4, 2-bit information is expressed according to the positions of the resource elements in which the complex signal points are placed.

The information expressed using the positions of the resource elements in which the complex signal points are placed can also be called the information loaded on the usages of the resource elements. Moreover, expressing information using the positions of the resource elements is also called loading information on the usages of the resource elements.

Assume that N represents the number of resource elements required to carry the complex signal point sequence that has been modulated in a single instance of the IM. In other words, assume that N represents the number of resource elements required to carry the complex signal point sequence that has been modulated from the input information sequence having a predetermined bit length. The predetermined bit length represents the sum of the bit length of the information loaded on the usages of the resource elements and the bit length of the information loaded on the usages of the resource elements.

In the following explanation, the N number of resource elements are also called a resource element block. Thus, N represents the number of resource elements in each resource element block. Moreover, assume that K represents the number of such resource elements in a resource element block in which complex signal points are placed. With reference to FIG. 3, N=4 and K=1 holds true. With reference to FIG. 4, N=4 and K=2 holds true. In the conventional IM, the count K has the minimum value of one.

1.3. Technical Problem

In the conventional modulation method of the past, during constellation mapping, when $2^m$ FSK, $2^m$ ASK, $2^m$ PSK, and $2^m$ QAM are used; the loadable bit count per resource element is expressed using the following equation.

$$S_{eff} = m \quad (1)$$

Herein, m represents the modulation level of complex signal points. Thus, m can be regarded as the carriable bit count per complex signal point, or can be regarded as the bit count expressed using a complex signal point.

A bit count $S_{eff}$ that represents the loadable bit count per resource element is hereinafter also called resource efficiency. The unit of resource efficiency is bit count per unit time and per unit frequency bandwidth [bit/sec/Hz]. Thus, the resource efficiency can also be called spectral efficiency.

Meanwhile, in the conventional IM, when K number of resource elements are used from among N number of resource elements, the resource efficiency is expressed using the following equation.

$$S_{eff} = \frac{K}{N}m + \frac{1}{N}\text{floor}\left[\log_2\left\{\binom{N}{K}\right\}\right] \quad (2)$$

Regarding the resource efficiency in the conventional modulation method of the past and the resource efficiency in the conventional IM, the explanation is given below with reference to FIGS. 5 to 9.

Figure 5:
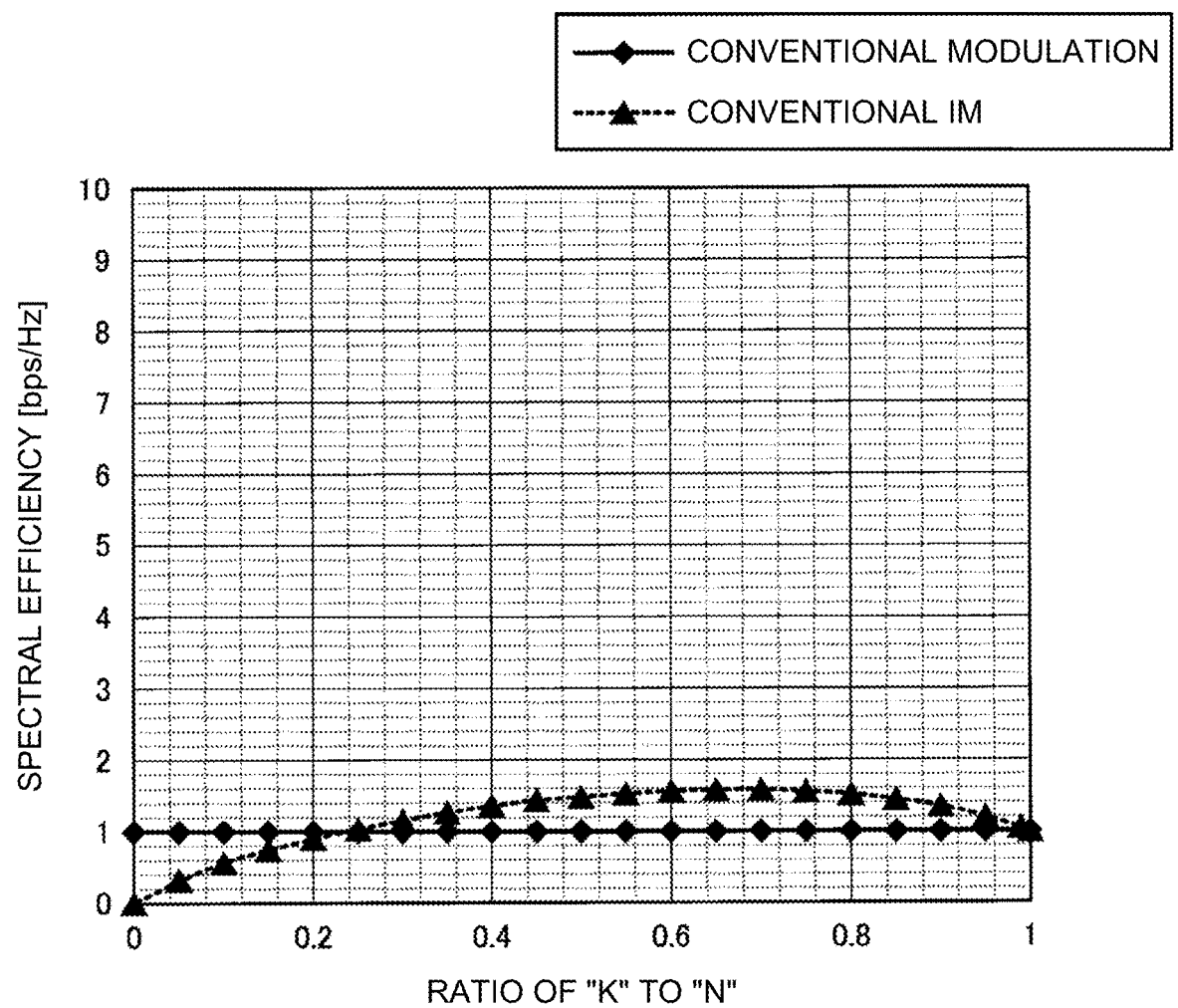
FIG. 5 is a graph illustrating an example of the resource efficiency achieved according to the existing modulation methods when m=1 holds true.
Figure 6:
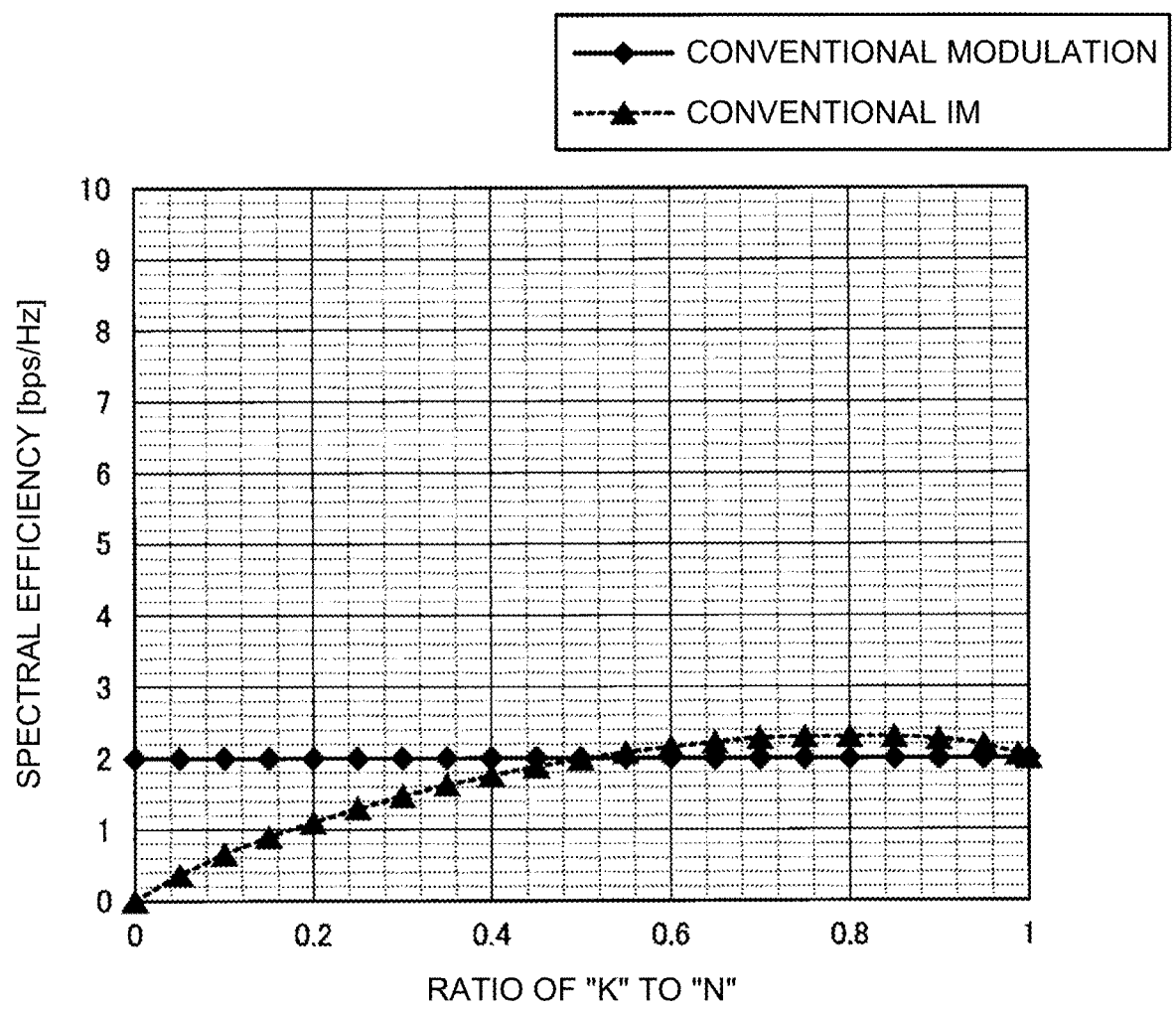
FIG. 6 is a graph illustrating an example of the resource efficiency achieved according to the existing modulation methods when m=2 holds true.
Figure 7:
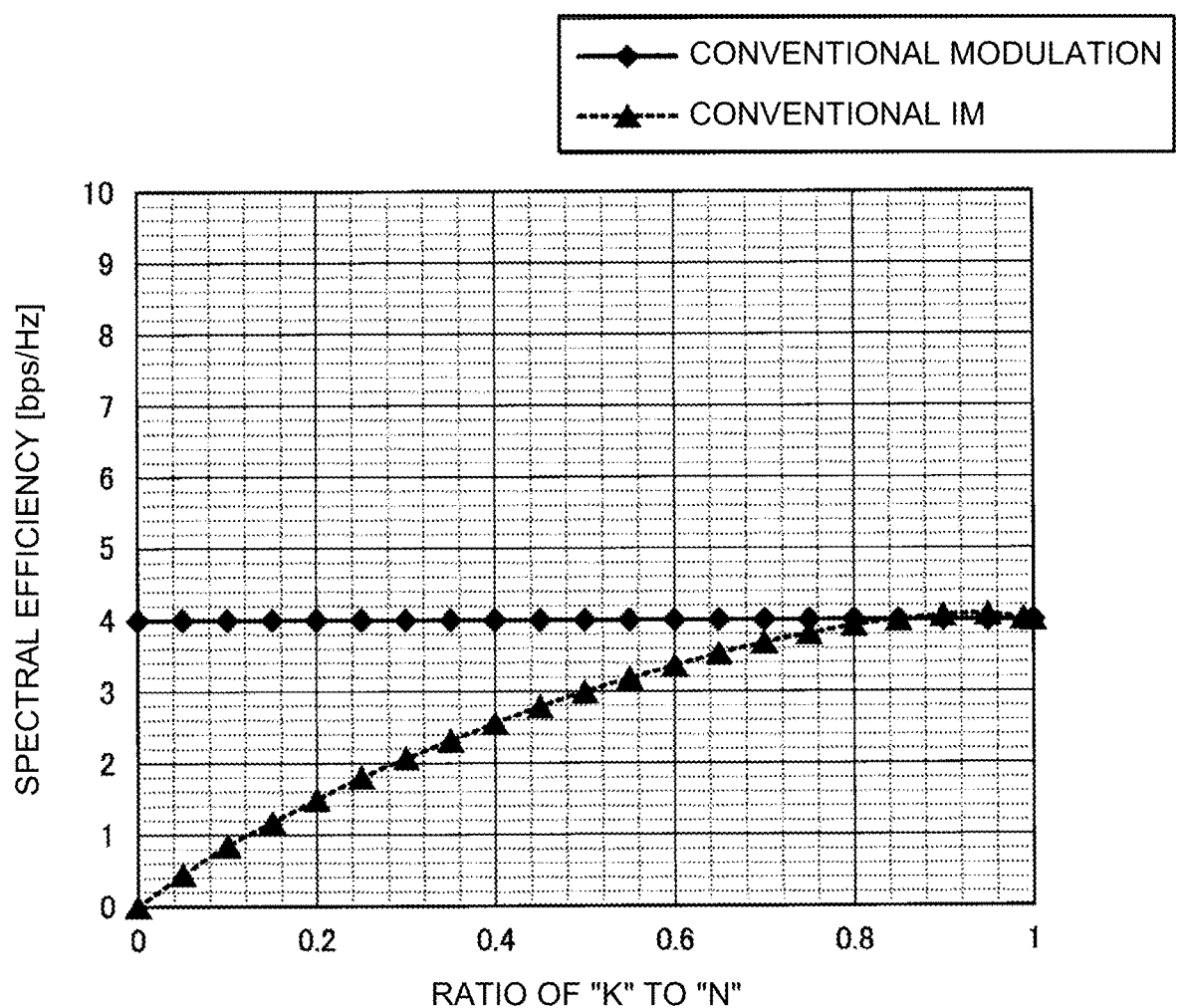
FIG. 7 is a graph illustrating an example of the resource efficiency achieved according to the existing modulation methods when m=4 holds true.
Figure 8:
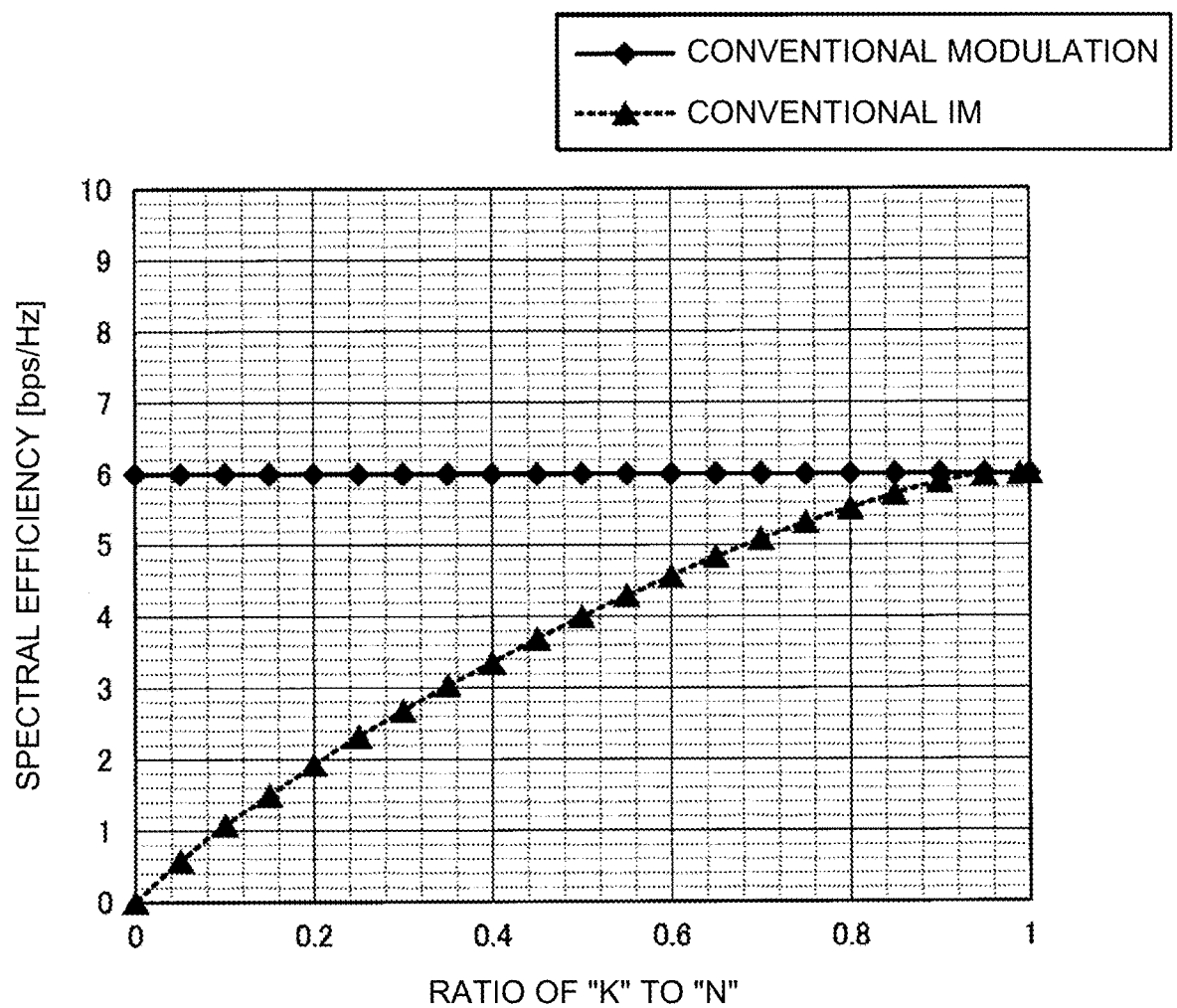
FIG. 8 is a graph illustrating an example of the resource efficiency achieved according to the existing modulation methods when m=6 holds true.
Figure 9:
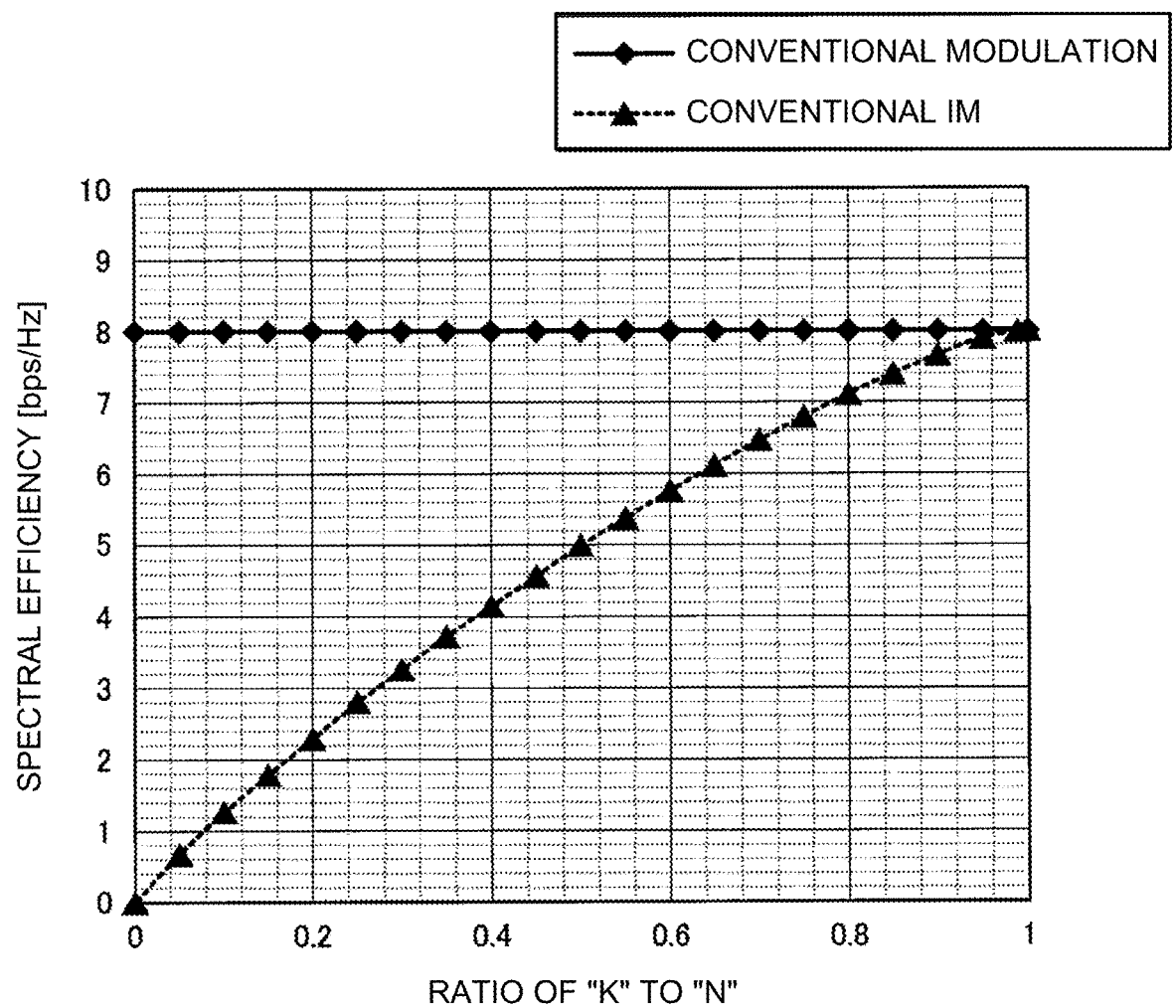
FIG. 9 is a graph illustrating an example of the resource efficiency achieved according to the existing modulation methods when m=8 holds true.

FIG. 5 is a graph illustrating an example of the resource efficiency achieved according to the existing modulation methods when m=1 holds true. FIG. 6 is a graph illustrating an example of the resource efficiency achieved according to the existing modulation methods when m=2 holds true. FIG. 7 is a graph illustrating an example of the resource efficiency achieved according to the existing modulation methods when m=4 holds true. FIG. 8 is a graph illustrating an example of the resource efficiency achieved according to the existing modulation methods when m=6 holds true. FIG. 9 is a graph illustrating an example of the resource efficiency achieved according to the existing modulation methods when m=8 holds true. In these graphs, the resource efficiency in the typical modulation method of the past is illustrated as "conventional modulation", and the resource efficiency in the conventional IM of the past is illustrated as "conventional IM". The horizontal axis represents the ratio of K to N (K/N), and the vertical axis represents the resource efficiency (the spectral efficiency).

With reference to FIGS. 5 and 6, when m=1 and m=2 holds true, it can be seen that, as a result of properly setting the ratio of K to N, the conventional IM achieves higher resource efficiency than the typical modulation method of the past. On the other, with reference to FIGS. 7 to 9, when the modulation level m is equal to or greater than four, the conventional IM barely achieves higher resource efficiency than the typical modulation method of the past. That is because, as illustrated in the first term on the right-hand side of Equation (2) given earlier, in the conventional IM, the OFF resource elements (i.e., the unused resource elements) do not contribute in the enhancement of the resource efficiency, and the loss attributed to such OFF resource elements increases in direct proportion to the value of the modulation level m. Thus, it can be said that the conventional IM is not suitable for achieving high resource efficiency. In other words, it can be said that the conventional IM is not suitable in a communication system requiring a high data rate or a high throughput.

1.4. Overview of Proposed Technology

In the proposed technology, the elements of two or more complex signal point sets having mutually different features are placed in N number of resource elements. Then, information is loaded on the fact indicating which positions in the N number of resource elements are used to place the elements of which complex signal point sets.

Although the detailed explanation is given later, the proposed technology can be regarded as a new form of IM in which complex signal points are placed in the OFF resource elements according to the conventional IM. Thus, the new IM enables placing complex signal points in such resource elements in which complex signal points do not get placed in the conventional IM. Hence, as compared to the conventional IM, the new IM enables achieving an increase in the number of complex signal points placed in each resource element block, and thus enables achieving enhancement in the resource efficiency.

Moreover, in the new IM, since a plurality of complex signal point sets is used, there is an increase in the types of usages (equivalent to applicable patterns (described later)) of the resource elements as compared to the conventional IM in which only a single complex signal point set is used. Hence, as compared to the conventional IM, the new IM enables achieving an increase in the volume of information loadable on the usages of the resource elements, thereby enabling achieving enhancement in the resource efficiency.

2. Configuration Example

2.1. Exemplary System Configuration

Figure 10:
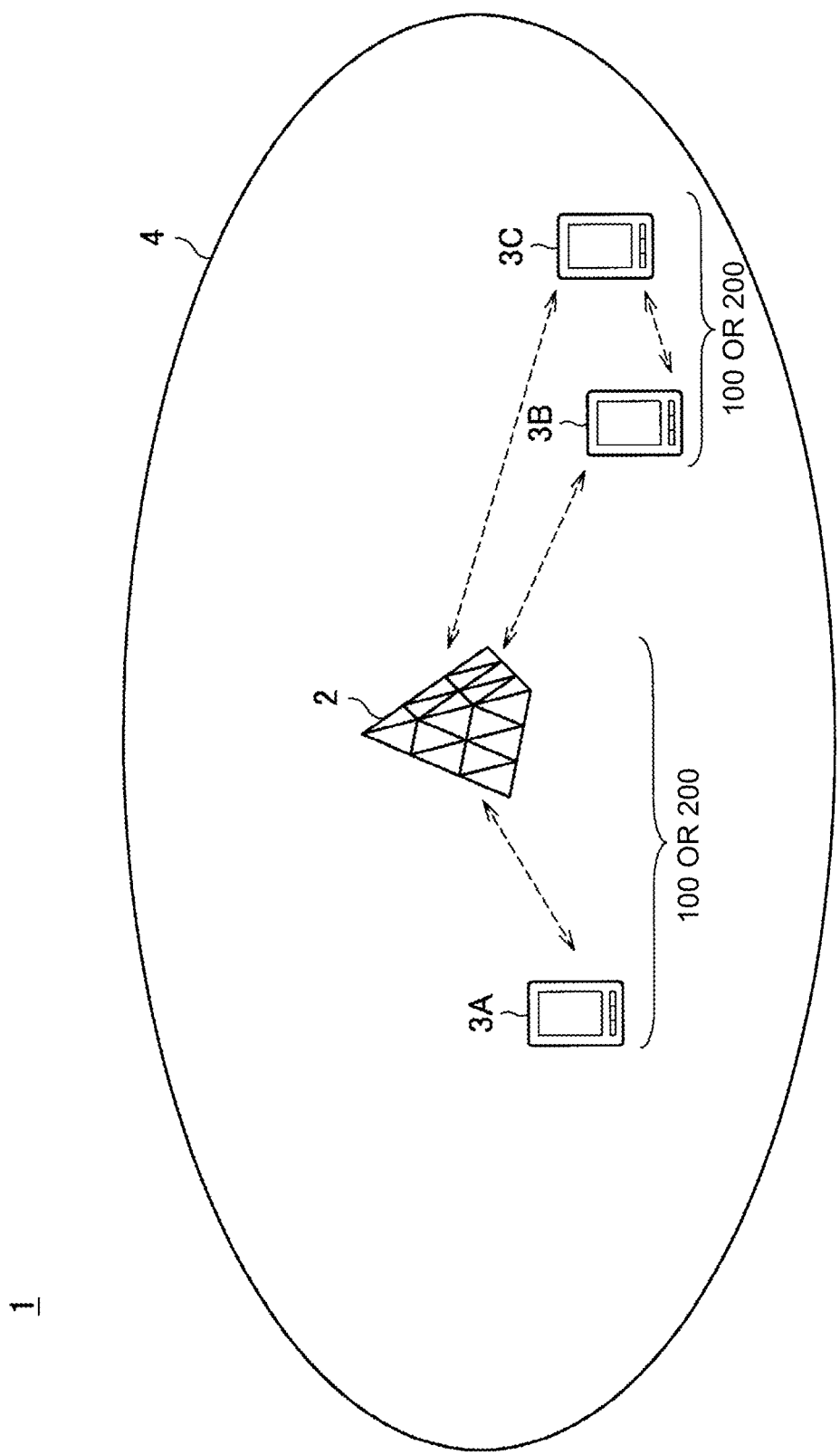
FIG. 10 is a diagram that schematically illustrates an exemplary overall configuration of a system according to the present embodiment.

FIG. 10 is a diagram that schematically illustrates an exemplary overall configuration of a system 1 according to the present embodiment. As illustrated in FIG. 10, the system 1 includes a base station 2 and terminal devices 3 (3A, 3B, and 3C).

The base station 2 operates a cell 4, and provides wireless services to one or more terminal devices positioned in the cell 4. For example, the base station provides wireless services to the terminal devices 3A to 3C. The cell 4 can be operated according to an arbitrary wireless communication method such as LTE or NR (New Radio). The base station 2 is connected to a core network (not illustrated). The core network is further connected to a PDN (Packet Data Network).

The terminal devices 3 perform wireless communication based on the control performed by the base station 2. For example, the terminal device 3A transmits uplink signals to the base station 2, and receives downlink signals from the base station 2. Moreover, the terminal devices 3B and 3C transmit and receive sidelink signals using available wireless resources set in the base station 2. Herein, the terminal devices 3 can represent, what is termed, user equipment (UE). Moreover, the terminal devices 3 can also be called users.

In the present embodiment, the base station 2 and the terminal devices 3 can function as transmission devices 100 or receiving devices 200. For example, the terminal device 3A functions as the transmission device 100 in regard to the transmission of uplink signals, and functions as the receiving device 200 in regard to the reception of downlink signals. On the other hand, the base station 2 functions as the transmission device 100 in regard to the transmission of downlink signals, and functions as the receiving device 200 in regard to the reception of uplink signals. The terminal devices 3B and 3C function as the transmission devices 100 in regard to the transmission of sidelink signals, and function as the receiving devices 200 in regard to the reception of sidelink signals.

2.2. Exemplary Configuration of Transmission Device

Figure 11:
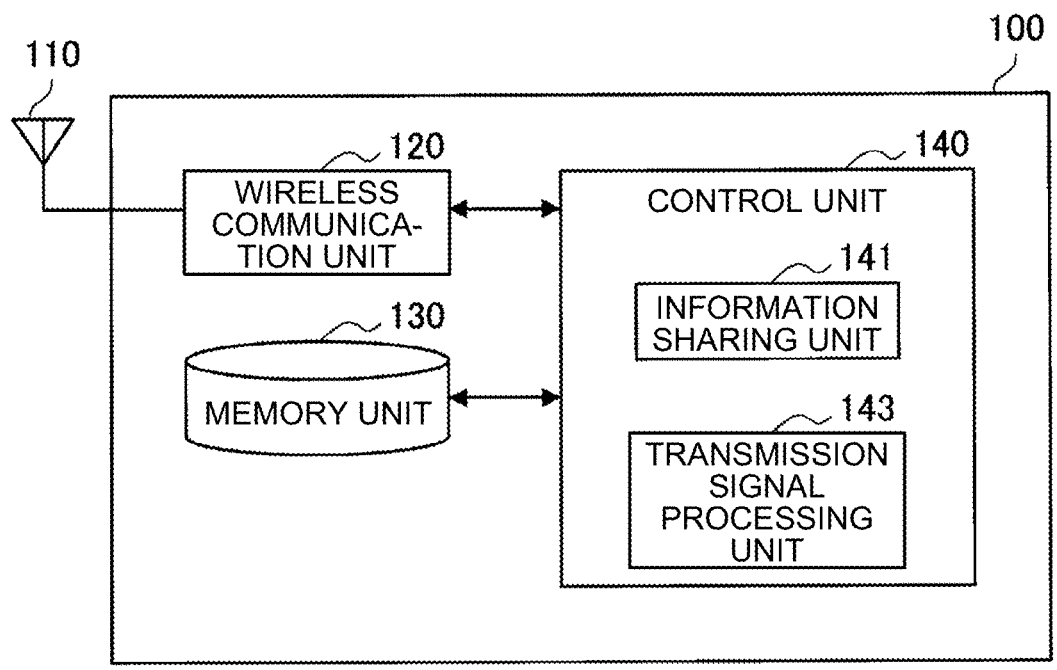
FIG. 11 is a block diagram illustrating an exemplary configuration of a transmission device according to the present embodiment.

FIG. 11 is a block diagram illustrating an exemplary configuration of the transmission device 100 according to the present embodiment. With reference to FIG. 11, the transmission device 100 includes an antenna unit 110, a wireless communication unit 120, a memory unit 130, and a control unit 140.

(1) Antenna Unit 110

The antenna unit 110 emits, as radio waves into the space, the signals output by the wireless communication unit 120. Moreover, the antenna unit 110 converts the radio waves present in the space into signals, and outputs the signals to the wireless communication unit 120.

(2) Wireless Communication Unit 120

The wireless communication unit 120 transmits signals. For example, the wireless communication unit 120 transmits uplink signals, downlink signals, or sidelink signals to the receiving device 200.

(3) Memory Unit 130

The memory unit 130 is used to store, temporarily or permanently, programs and a variety of data to be used in the operations of the transmission device 100.

(4) Control Unit 140

The control unit 140 provides various functions of the transmission device 100. The control unit 140 includes an information sharing unit 141 and a transmission signal processing unit 143. The information sharing unit 141 has the function of sharing, with the receiving device 200, the parameters used in the transmission operation performed by the transmission device 100. The transmission signal processing unit 143 has the function of performing signal processing of the signals to be transmitted to the receiving device 200. The contents of signal processing are, for example, same as schematically explained earlier with reference to FIG. 1. Moreover, regarding the contents of signal processing, the detailed explanation is given later. Meanwhile, the control unit 140 can also include other constituent elements other than the abovementioned constituent elements. That is, the control unit 140 can also perform operations other than the operations of the abovementioned constituent elements.

2.3. Exemplary Configuration of Receiving Device

Figure 12:
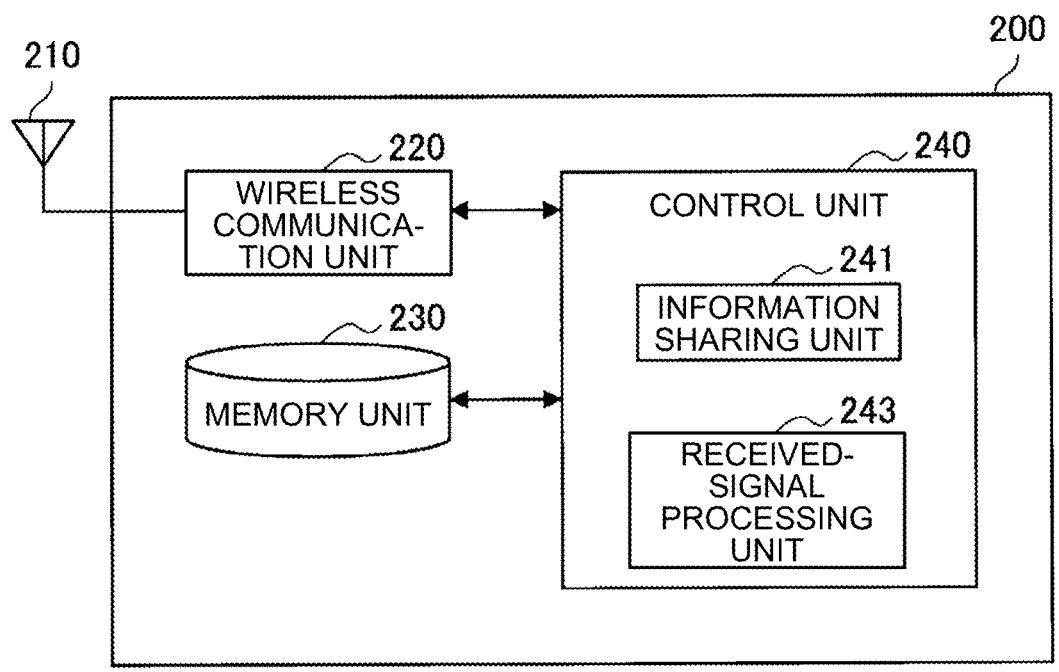
FIG. 12 is a block diagram illustrating an exemplary configuration of a receiving device according to the present embodiment.

FIG. 12 is a block diagram illustrating an exemplary configuration of the receiving device 200 according to the present embodiment. With reference to FIG. 12, the receiving device 200 includes an antenna unit 210, a wireless communication unit 220, a memory unit 230, and a control unit 240.

(1) Antenna Unit 210

The antenna unit 210 emits, as radio waves into the space, the signals output by the wireless communication unit 220. Moreover, the antenna unit 210 converts the radio waves present in the space into signals, and outputs the signals to the wireless communication unit 220.

(2) Wireless Communication Unit 220

The wireless communication unit 220 receives signals. For example, the wireless communication unit 220 receives uplink signals, downlink signals, or sidelink signals from the transmission device 100.

(3) Memory Unit 230

The memory unit 230 is used to store, temporarily or permanently, programs and a variety of data to be used in the operations of the receiving device 200.

(4) Control Unit 240

The control unit 240 provides various functions of the receiving device 200. The control unit 240 includes an information sharing unit 241 and a received-signal processing unit 243. The information sharing unit 241 has the function of sharing, with the transmission device 100, the parameters to be used in the transmission operation performed by the transmission device 100. The received-signal processing unit 243 has the function of performing signal processing of the signals received from the transmission device 100. Regarding the contents of signal processing, the detailed explanation is given later. Meanwhile, the control unit 240 can also include other constituent elements other than the abovementioned constituent elements. That is, the control unit 240 can also perform operations other than the operations of the abovementioned constituent elements.

3. Technical Features 3.1. Applicable Patterns of Complex Signal Point Set

The transmission device 100 converts (i.e., modulates) a first-type bit sequence and a second-type bit sequence into a complex signal point sequence. The first-type bit sequence represents information to be loaded on the usage of the resource elements. The second-type bit sequence represents information to be loaded on the complex signal points.

In the conventional IM, each of a plurality of complex signal points included in a complex signal point sequence is an element of a single complex signal point set. In contrast, in the proposed technology, each of a plurality of complex signal points included in a complex signal point sequence is an element of one of a plurality of complex signal point sets. That is, in the conventional IM, a single complex signal point set is used in the modulation. In contrast, in the proposed technology, two or more complex signal point sets are used in the modulation.

Regarding a plurality of complex signal point sets having, as elements, a plurality of complex signal points included in a complex signal point sequence; an applicable pattern in the complex signal point sequence corresponds to a first-type bit sequence present among a plurality of predetermined combinations of the candidates for the first-type bit sequence and the applicable patterns. An applicable pattern in a complex signal point sequence of a plurality of complex signal point sets represents the sequence or the placement of the complex signal point sets, to which the complex signal points included in the complex signal point sequence belong, in the complex signal point sequence. In the complex signal point sequence, information about which element of which complex signal point set from among a plurality of complex signal point sets is placed at which position corresponds to a first-type bit sequence present among a plurality of predetermined combinations of the candidates for the first-type bit sequence and the applicable patterns.

An applicable pattern in a complex signal point sequence of a plurality of complex signal point sets has the same meaning as an applicable pattern in the resource elements of a plurality of complex signal point sets. That is, information about which element of which complex signal point set from among a plurality of complex signal point sets is placed at which position in a resource element block corresponds to a first-type bit sequence present among a plurality of predetermined combinations of the candidates for the first-type bit sequence and the applicable patterns. In a complex signal point sequence of a plurality of complex signal point sets, the applicable patterns are equivalent to the usages of the resource elements explained earlier.

On the other hand, each complex signal point included in a complex signal point sequence corresponds to a second-type bit sequence.

The modulation method according to the present embodiment can be regarded as a new form of IM. More specifically, based on the conventional IM, the transmission device 100 places the elements of a first-type complex signal point set in some of the resource elements of a resource element block. Besides, in the resource elements in which the elements of the first-type complex signal point set are not placed (i.e., in the resource elements in the null state, the zero state, or the OFF state), the transmission device 100 places the elements of a second-type complex signal point set having different features than the first-type complex signal point set.

In the new IM, complex signal points can be placed in such resource elements in which complex signal points do not get placed according to the conventional IM. Thus, as compared to the conventional IM, the new IM enables achieving an increase in the number of complex signal points placed in each resource element block, thereby enabling achieving enhancement in the resource efficiency.

In the conventional IM, in a resource element block, the complex signal points that are placed are the elements of a single complex signal point set. Then, information is loaded at the positions at which the complex signal points are placed. In contrast, in the new IM, in a resource element block, the complex signal points that are placed are elements of one of a plurality of complex signal point sets. Then, information is loaded at the positions at which the complex signal points are placed, and is loaded on the pattern of the complex signal point sets to which those complex signal points belong. In the new IM, since a plurality of complex signal point sets is used, there is an increase in the types of usages of the resource elements as compared to the conventional IM in which only a single complex signal point set is used. Hence, as compared to the conventional IM, the new IM enables achieving an increase in the volume of information loadable on the usages of the resource elements, thereby enabling achieving enhancement in the resource efficiency.

The transmission device 100 converts L number of bit sequences into a complex signal point sequence that includes N number of complex signal points (where zero is also counted as one complex signal point). The complex signal point sequence includes the elements of a plurality of complex signal point sets. The first-type bit sequence and the second-type bit sequence represent partial sequences of the L number of bit sequences.

Herein, N represents the number of complex signal points included in the complex signal point sequence. Thus, N can also be regarded as the number of resource elements included in a resource element block. Regarding a single complex signal point set g from among a plurality of complex signal point sets, assume that $K_g$ represents the number of such elements of the complex signal point set g which are included in the complex signal point sequence. In that case, Kg can also be regarded as the number of such resource elements in which the complex signal points belonging to the complex signal point set g are placed. Meanwhile, assume that G represents the number of complex signal point sets used in the complex signal point sequence.

Regarding the resource elements in which complex signal points belonging to a plurality of complex signal point sets used in the modulation are placed, it is desirable that there is no mutual overlapping of those resource elements. Hence, it is desirable that the sum of the counts $K_g$ is equal to or smaller than the count N. That is, it is desirable that the relationship given in the following equation is established between N and $K_g$.

$$\sum_g K_g \leq N \quad (3)$$

Herein, floor( ) implies truncating the decimal places.

In the new IM, since two or more complex signal point sets are used in the modulation, the count K has the minimum value of two. Accordingly, there are two or more complex signal points included in the complex signal point sequence, and the transmission device 100 maps the complex signal points onto two or more resource elements in the resource element block.

A total sequence length L of the first-type bit sequence and the second-type bit sequence is greater than the product of the count N of the complex signal points included in the complex signal point sequence and the bit count m that is expressed using the complex signal points of a plurality of complex signal point sets used in the modulation. That is because the information is loaded on the usages of the resource elements. That is, the relationship given in the following equation is established among L, N, and m.

$$L \geq N*m \quad (4)$$

Meanwhile, the count N may or may not include the complex signal point of zero (0+0j). When the count N does not include the complex signal point of zero (0+0j), as long as at least the relationship given in Equation (4) is established, it serves the purpose. That is because the relationship given in Equation (4) is established even if the count N includes the complex signal point of zero (0+0j).

First Example

Figure 13:
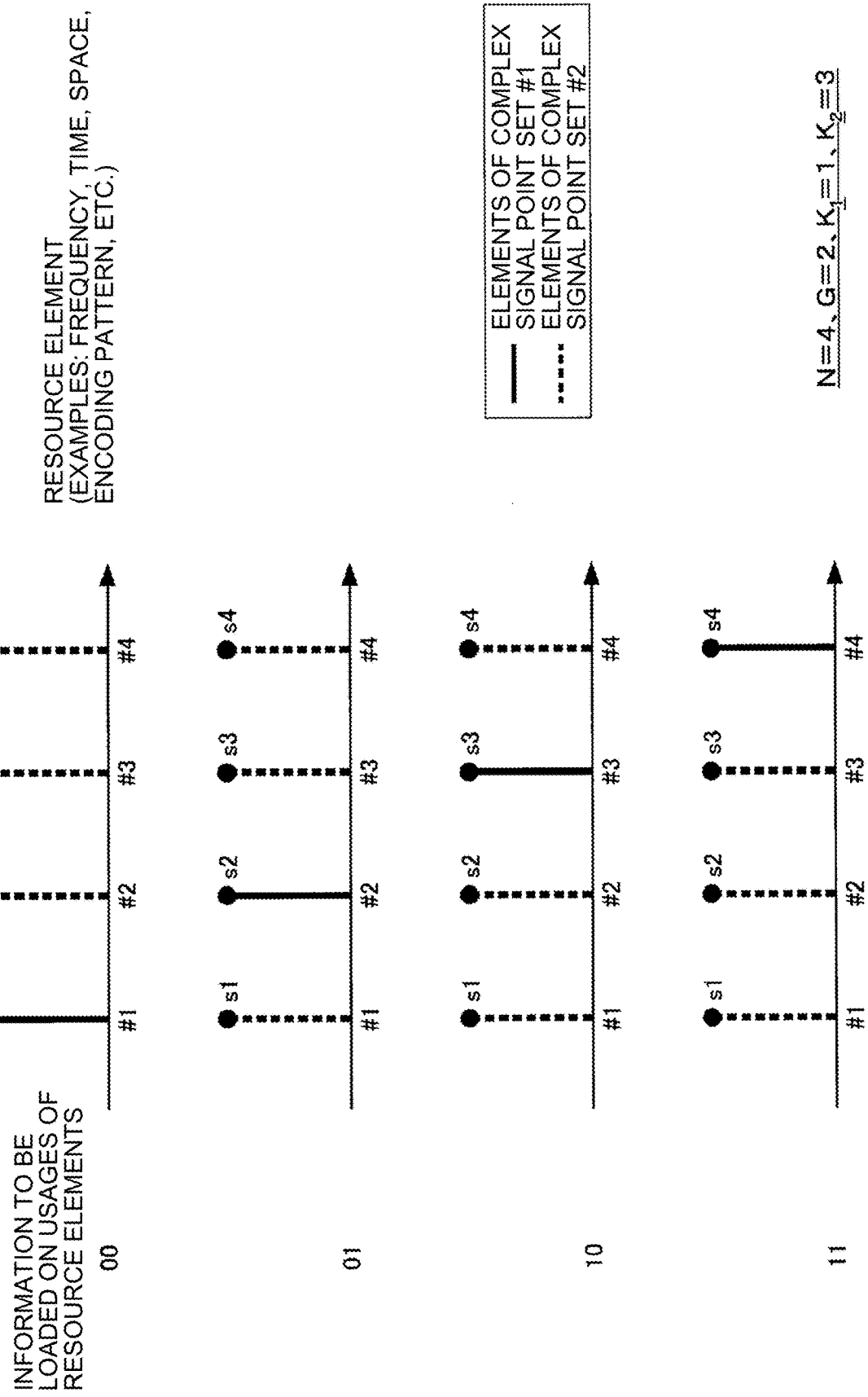
FIG. 13 is a diagram illustrating an example of the combinations of the candidates for a first-type bit sequence and applicable patterns according to the present embodiment.

Explained below with reference to FIG. 13 is a first example of modulation performed using the new IM.

FIG. 13 is a diagram illustrating an example of the combinations of the candidates for the first-type bit sequence and the applicable patterns according to the present embodiment. The horizontal axis represents arbitrary resource elements. A complex signal point si represents the complex signal point placed in the i-th resource element. The difference in the line styles of the complex signal point si indicates the difference in the complex signal point sets to which the complex signal point si belongs. In the example illustrated in FIG. 13, from among the four resource elements #1 to #4 constituting a resource element block, one resource element has a complex signal point belonging to a complex signal point set g1 placed therein, and three resource elements have the complex signal points belonging to a complex signal point set g2 placed therein (i.e., N=4, G=2, $K_1$=1, and $K_2$=3 holds true). As a result of placing a complex signal point belonging to the complex signal point set g1 in the resource element #1 and placing the complex signal points belonging to the complex signal point set g2 in the resource elements #2 to #4; information "00" is expressed. Moreover, as a result of placing a complex signal point belonging to the complex signal point set g1 in the resource element #2 and placing the complex signal points belonging to the complex signal point set g2 in the resource elements #1, #3, and #4; information "01" is expressed. Furthermore, as a result of placing a complex signal point belonging to the complex signal point set g1 in the resource element #3 and placing the complex signal points belonging to the complex signal point set g2 in the resource elements #1, #2, and #4; information "10" is expressed. Moreover, as a result of placing a complex signal point belonging to the complex signal point set g1 in the resource element #4 and placing the complex signal points belonging to the complex signal point set g2 in the resource elements #1 to #3; information "11" is expressed.

As illustrated in the example in FIG. 13, in the new IM, information can be loaded on the usages of the resource elements in an identical manner to the conventional IM. Moreover, if FIG. 3 is compared with FIG. 13, the new IM enables placing the complex signal points in such resource elements in which complex signal points do not get placed in the conventional IM. Thus, as compared to the conventional IM, the new IM enables achieving an increase in the number of complex signal points placed in each resource element block, thereby enabling achieving enhancement in the resource efficiency.

The resource efficiency in the example illustrated in FIG. 13 is calculated according to the following equation.

$$S_{eff} = \frac{K_1}{N}m_1 + \frac{K_2}{N}m_2 + \frac{1}{N}\text{floor}\left[\log_2\left\{\binom{N}{K_1}\right\}\right] \quad (5)$$

$$= \frac{1}{4}m_1 + \frac{3}{4}m_2 + \frac{2}{4}$$

Herein, $m_g$ represents the carriable bit count per complex signal point belonging to the complex signal point set g. Thus, $m_1$ and $m_2$ represent the carriable bit counts per complex signal point belonging to the complex signal point sets $g_1$ and $g_2$, respectively.

In Equation (5), the second term on the right-hand side is absent in Equation (2). That is, the second term on the right-hand side in Equation (5) represents the extent of enhancement in the resource efficiency achieved according to the new IM in comparison to the conventional IM.

In Equation (5), the third term on the right-hand side corresponds to the bit count of the information that is loadable on the usages of the resource elements. In the present example, as illustrated in FIG. 13, 2-bit information is loadable on the usages of the resource elements.

Second Example

Figure 14:
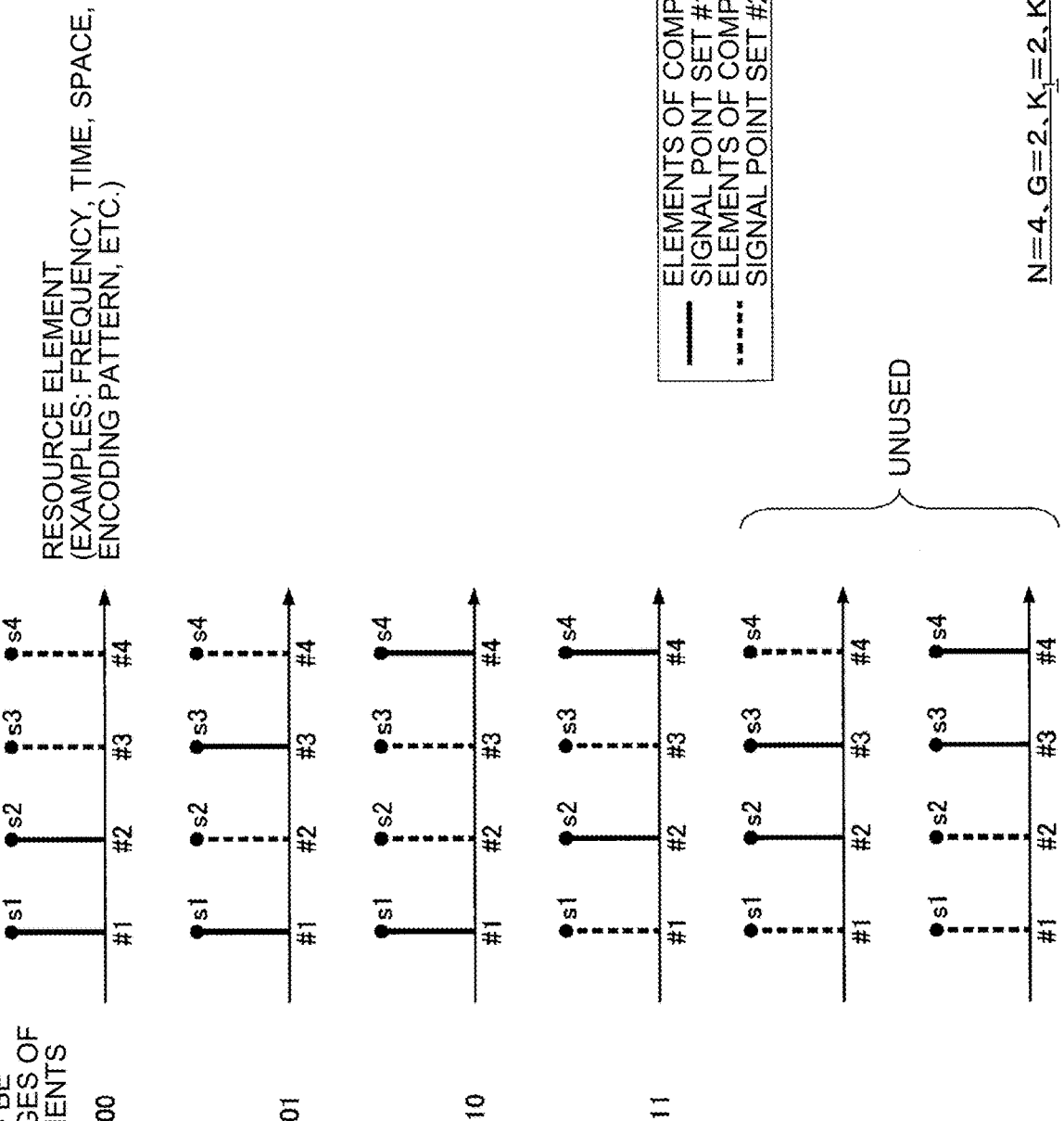
FIG. 14 is a diagram illustrating an example of the combinations of the candidates for the first-type bit sequence and the applicable patterns according to the present embodiment.

Explained below with reference to FIG. 14 is a second example of the modulation performed using the new IM.

FIG. 14 is a diagram illustrating an example of the combinations of the candidates for the first-type bit sequence and the applicable patterns according to the present embodiment. The horizontal axis represents arbitrary resource elements. A complex signal point si represents the complex signal point placed in the i-th resource element. The difference in the line styles of the complex signal point si indicates the difference in the complex signal point sets to which the complex signal point si belongs. In the example illustrated in FIG. 14, from among the four resource elements #1 to #4 constituting a resource element block, two resource elements have the complex signal points belonging to the complex signal point set g1 placed therein, and two resource elements have the complex signal points belonging to a complex signal point set g2 placed therein (i.e., $N=4$, $G=2$, $K_1=2$, and $K_2=2$ holds true). As a result of placing the complex signal points belonging to the complex signal point set g1 in the resource elements #1 and #2 and placing the complex signal points belonging to the complex signal point set g2 in the resource elements #3 and #4; information "00" is expressed. Moreover, as a result of placing the complex signal points belonging to the complex signal point set g1 in the resource elements #1 and #3 and placing the complex signal points belonging to the complex signal point set g2 in the resource elements #2 and #4; information "01" is expressed. Furthermore, as a result of placing the complex signal points belonging to the complex signal point set g1 in the resource elements #1 and #4 and placing the complex signal points belonging to the complex signal point set g2 in the resource elements #2 and #3; information "10" is expressed. Moreover, as a result of placing the complex signal points belonging to the complex signal point set g1 in the resource elements #2 and #4 and placing the complex signal points belonging to the complex signal point set g2 in the resource elements #1 and #3; information "11" is expressed.

Meanwhile, with reference to FIG. 14, the lower two applicable patterns are not associated to any candidates for the first-type bit sequence, and are not used. Regarding which of the applicable patterns are to be used or are not to be used, it is desirable that the decision is made in advance. As a result, not only the computational load in the receiving device 200 can be lowered, but it also enables achieving improvement in the error rate on account of elimination of unused applicable patterns.

In the example illustrated in FIG. 14, in the new IM, information can be loaded on the usages of the resource elements in an identical manner to the conventional IM. Moreover, if FIG. 4 is compared with FIG. 14, the new IM enables placing complex signal points in such resource elements in which complex signal points do not get placed in the conventional IM. Thus, as compared to the conventional IM, the new IM enables achieving an increase in the number of complex signal points placed in each resource element block, thereby enabling achieving enhancement in the resource efficiency.

The resource efficiency in the example illustrated in FIG. 14 is calculated according to the following equation.

$$S_{eff} = 2/4\,m_1 + 2/4\,m_2 + 2/4 \qquad (6)$$

In Equation (6), the second term on the right-hand side represents the extent of enhancement in the resource efficiency achieved according to the new IM in comparison to the conventional IM.

In Equation (6), the third term on the right-hand side corresponds to the bit count of the information that is loadable on the usages of the resource elements. In the present example, as illustrated in FIG. 14, 2-bit information is loadable on the usages of the resource elements.

If the example illustrated in FIG. 13 is compared with the example illustrated in FIG. 14, although the number of applicable patterns is different (four applicable patterns in FIG. 13, and six applicable patterns in FIG. 14), the number of used applicable patterns is equal to four. It corresponds to the fact that, in Equation (5) and Equation (6), the third term on the right-hand side (i.e., the result of log 2 and floor (truncate)) is equal.

Third Example

Figure 15:
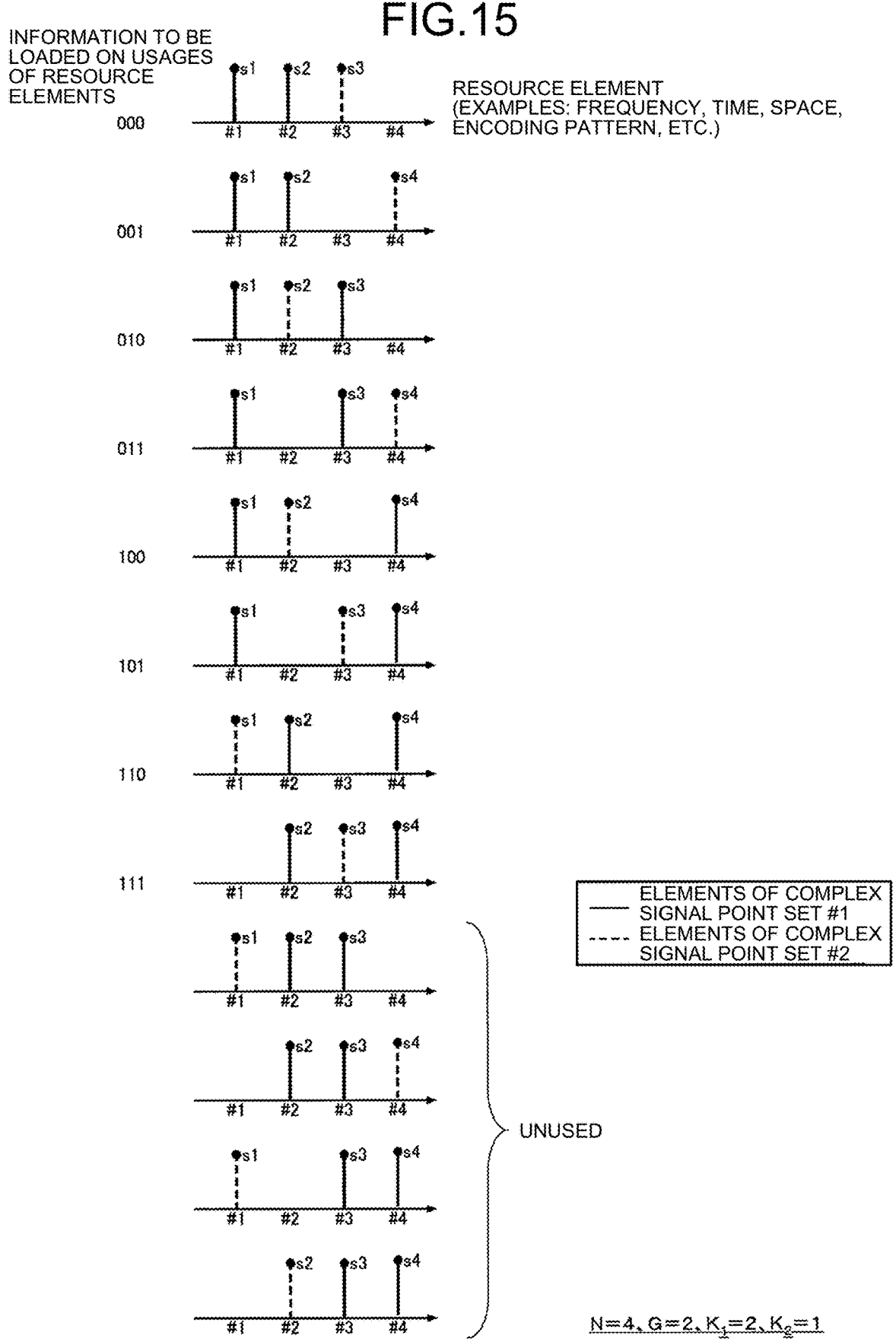
FIG. 15 is a diagram illustrating an example of the combinations of the candidates for the first-type bit sequence and the applicable patterns according to the present embodiment.

Explained below with reference to FIG. 15 is a third example of modulation performed using the new IM.

FIG. 15 is a diagram illustrating an example of the combinations of the candidates for the first-type bit sequence and the applicable patterns according to the present embodiment. The horizontal axis represents arbitrary resource elements. A complex signal point si represents the complex signal point placed in the i-th resource element. In a resource element in which the complex signal point si is not illustrated, it implies that the complex signal point si is not placed. The difference in the line styles of the complex signal point si indicates the difference in the complex signal point sets to which the complex signal point si belongs. In the example illustrated in FIG. 15, from among the four resource elements #1 to #4 constituting a resource element block, two resource elements have the complex signal points belonging to the complex signal point set g1 placed therein, and one resource element has a complex signal point belonging to the complex signal point set g2 placed therein (i.e., $N=4$, $G=2$, $K_1=2$, and $K_2=1$ holds true). As a result of placing the complex signal points belonging to the complex signal point set g1 in the resource elements #1 and #2 and placing a complex signal point belonging to the complex signal point set g2 in the resource element #3; information "000" is expressed. Moreover, as a result of placing the complex signal points belonging to the complex signal point set g1 in the resource elements #1 and #2 and placing a complex signal point belonging to the complex signal point set g2 in the resource element #4; information "001" is expressed. Furthermore, as a result of placing the complex signal points belonging to the complex signal point set g1 in the resource elements #1 and #3 and placing a complex signal point belonging to the complex signal point set g2 in the resource element #2; information "010" is expressed. Moreover, as a result of placing the complex signal points belonging to the complex signal point set g1 in the resource elements #1 and #3 and placing a complex signal point belonging to the complex signal point set g2 in the resource element #4; information "011" is expressed. Furthermore, as a result of placing the complex signal points belonging to the complex signal point set g1 in the resource elements #1 and #4 and placing a complex signal point belonging to the complex signal point set g2 in the resource element #2; information "100" is expressed. Moreover, as a result of placing the complex signal points belonging to the complex signal point set g1 in the resource elements #1 and #4 and placing a complex signal point belonging to the complex signal point set g2 in the resource element #3; information "101" is expressed. Furthermore, as a result of placing the complex signal points belonging to the complex signal point set g1 in the resource elements #2 and #4 and placing a complex signal point belonging to the complex signal point set g2 in the resource element #1; information "110" is expressed. Moreover, as a result of placing the complex signal points belonging to the complex signal point set g1 in the resource elements #2 and #4 and placing a complex signal point belonging to the complex signal point set g2 in the resource element #3; information "111" is expressed.

Meanwhile, with reference to FIG. 15, the lower four applicable patterns are not associated to any candidates for the first-type bit sequence, and are not used. Regarding which of the applicable patterns are to be used or are not to be used, it is desirable that the decision is made in advance. As a result, not only the computational load in the receiving device 200 can be lowered, but it also enables achieving improvement in the error rate on account of elimination of unused applicable patterns.

The resource efficiency in the example illustrated in FIG. 15 is calculated according to the following equation.

$$S_{\mathit{eff}} = \frac{K_1}{N}m_1 + \frac{K_2}{N}m_2 + \frac{1}{N}\mathrm{floor}\left[\log_2\left\{\binom{N}{K_1}\binom{N-K_1}{K_2}\right\}\right] \quad (7)$$
$$= \frac{2}{4}m_1 + \frac{1}{4}m_2 + \frac{3}{4}$$

In Equation (7), the second term on the right-hand side represents the extent of enhancement in the resource efficiency achieved according to the new IM in comparison to the conventional IM.

In Equation (7), the third term on the right-hand side corresponds to the bit count of the information that is loadable on the usages of the resource elements. In the present example, as illustrated in FIG. 15, 3-bit information is loadable on the usages of the resource elements.

If the example illustrated in FIG. 14 is compared with the example illustrated in FIG. 15, it can be seen that the information loadable on the usages of the resource elements has a greater bit-count in the example illustrated in FIG. 15. It corresponds to the fact that the third term on the right-hand side in Equation (7) is greater than the third term on the right-hand side in Equation (6).

As illustrated in FIG. 15, when the OFF resource elements (i.e., the resource elements in which complex signal points are not placed) are to be used, it is desirable to vary the power distribution (power allocation, power control) per resource element as described later. For example, by taking into account the proportion of the number of OFF resource elements, it is desirable to allocate more electrical power to the ON resource elements (i.e., the resource elements in which complex signal points are placed). As a result, in the case in which the OFF resource elements are included as well as in the case in which all resource elements are ON resource elements, it becomes possible to have uniform overall electrical power and uniform average electrical power in the entire resource element block. That enables achieving improvement in the error rate per resource element.

Fourth Example

Figure 16:
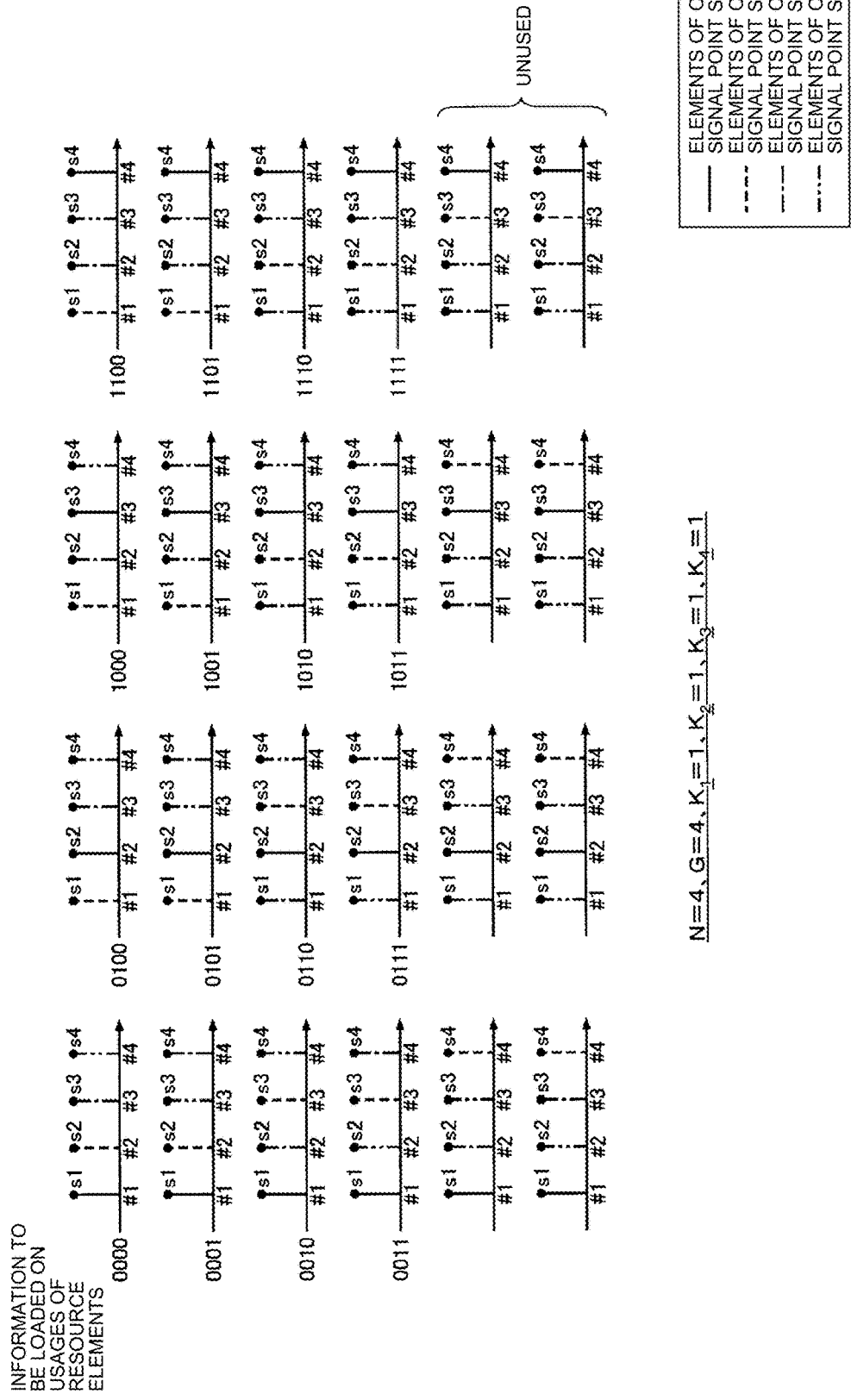
FIG. 16 is a diagram illustrating an example of the combinations of the candidates for the first-type bit sequence and the applicable patterns according to the present embodiment.

Explained below with reference to FIG. 16 is a fourth example of modulation performed using the new IM.

FIG. 16 is a diagram illustrating an example of the combinations of the candidates for the first-type bit sequence and the applicable patterns according to the present embodiment. The horizontal axis represents arbitrary resource elements. A complex signal point si represents the complex signal point placed in the i-th resource element. The difference in the line styles of the complex signal point si indicates the difference in the complex signal point sets to which the complex signal point si belongs. In the example illustrated in FIG. 16, in the four resource elements #1 to #4 constituting a resource element block, single complex signal points belonging to complex signal point sets g1 to #4, respectively, are placed (i.e., N=4, G=4, $K_1$=1, $K_2$=1, $K_3$=1, and $K_4$=1 holds true). For example, as a result of placing a complex signal point belonging to the complex signal point set g1 in the resource element #1, placing a complex signal point belonging to the complex signal point set g2 in the resource element #2, placing a complex signal point belonging to the complex signal point set g3 in the resource element #3, and placing a complex signal point belonging to the complex signal point set g4 in the resource element #4; information "0000" is expressed.

Meanwhile, with reference to FIG. 16, the lower two applicable patterns on the extreme right are not associated to any candidates for the first-type bit sequence, and are not used. Regarding which of the applicable patterns are to be used or are not to be used, it is desirable that the decision is made in advance. As a result, not only the computational load in the receiving device 200 can be lowered, but it also enables achieving improvement in the error rate on account of elimination of unused applicable patterns.

In the present example, as illustrated in FIG. 16, 4-bit information is loadable on the usages of the resource elements.

Generalization

Regarding the calculation of the resource efficiency as explained above, generalization is done as follows. Herein, it is assumed that: N number of resource elements are included in a resource element block; G number of complex signal point sets are used in the modulation; and the complex signal points belonging to the g-th complex signal point set are individually capable of carrying $m_g$-bit information and are placed in $K_g$ number of resource elements. In that case, the resource efficiency is calculated according to the following equation.

$$S_{\mathit{eff}} = \frac{1}{N}\left(\sum_{g=1}^{G} K_g m_g + \mathrm{floor}\left[\log_2\left\{\prod_{g=1}^{G}\binom{N-\sum_{g'=0}^{g-1}K_{g'}}{K_g}\right\}\right]\right) \quad (8)$$

Alternatively, the resource efficiency can be calculated according to any one of the following equations.

$$S_{\mathit{eff}} = \frac{1}{N}\left\{\sum_{g=1}^{G}\left(K_g m_g + \mathrm{floor}\left[\log_2\left\{\binom{N-\sum_{g'=0}^{g-1}K_{g'}}{K_g}\right\}\right]\right)\right\} \quad (9)$$

$$S_{\mathit{eff}} = \frac{1}{N}\left\{\sum_{g=1}^{G} K_g m_g + \mathrm{floor}\left[\sum_{G=1}^{G}\log_2\left\{\binom{N-\sum_{g'=0}^{g-1}K_{g'}}{K_g}\right\}\right]\right\}$$

Herein, $k_0=0$ holds true, and Equation (3) given earlier is assumed to be satisfied.

Improvement in Resource Efficiency Using New IM

Figure 17:
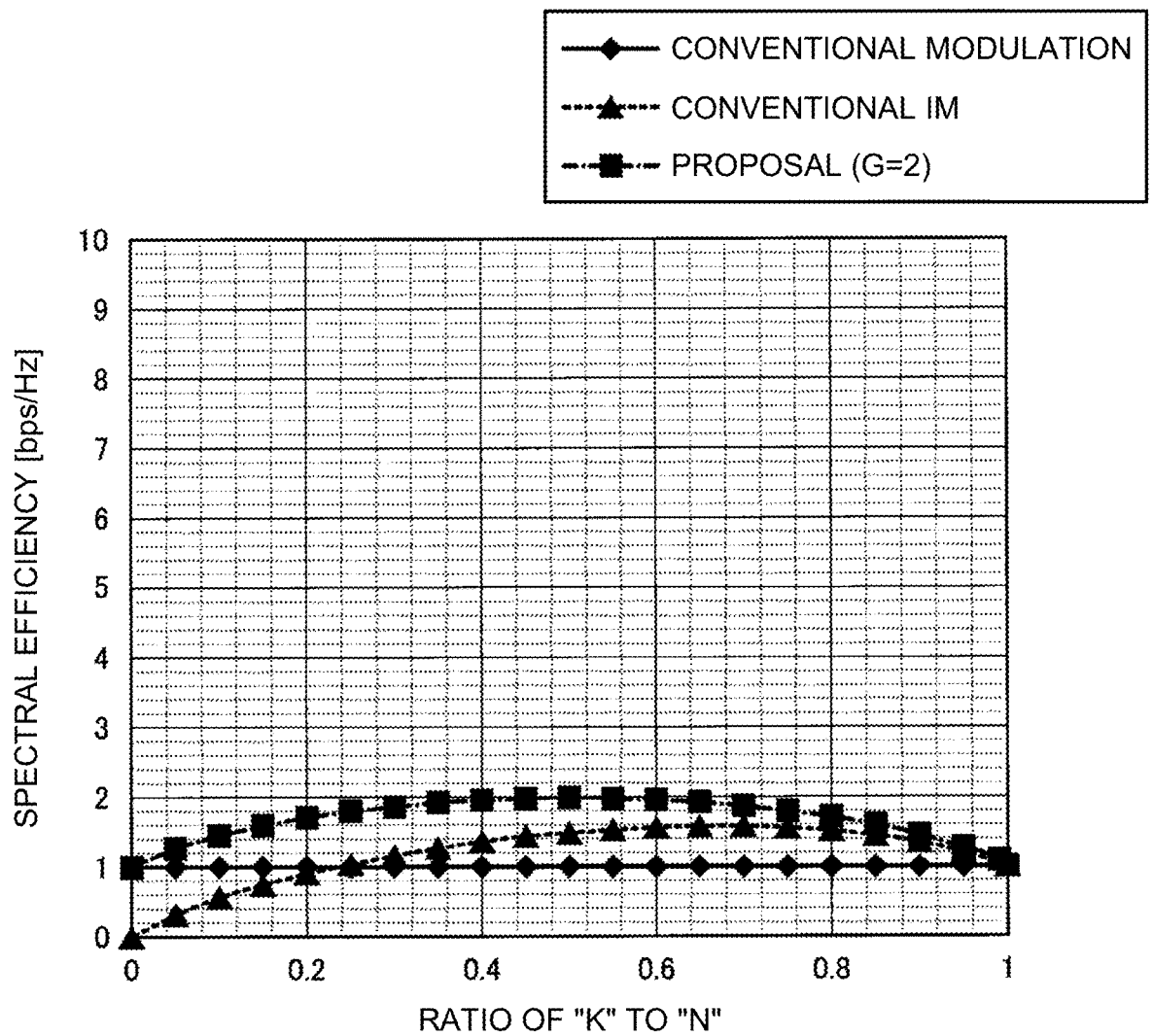
FIG. 17 is a graph illustrating an example of the resource efficiency achieved according to a new IM and the existing modulation methods when m=1 holds true.
Figure 18:
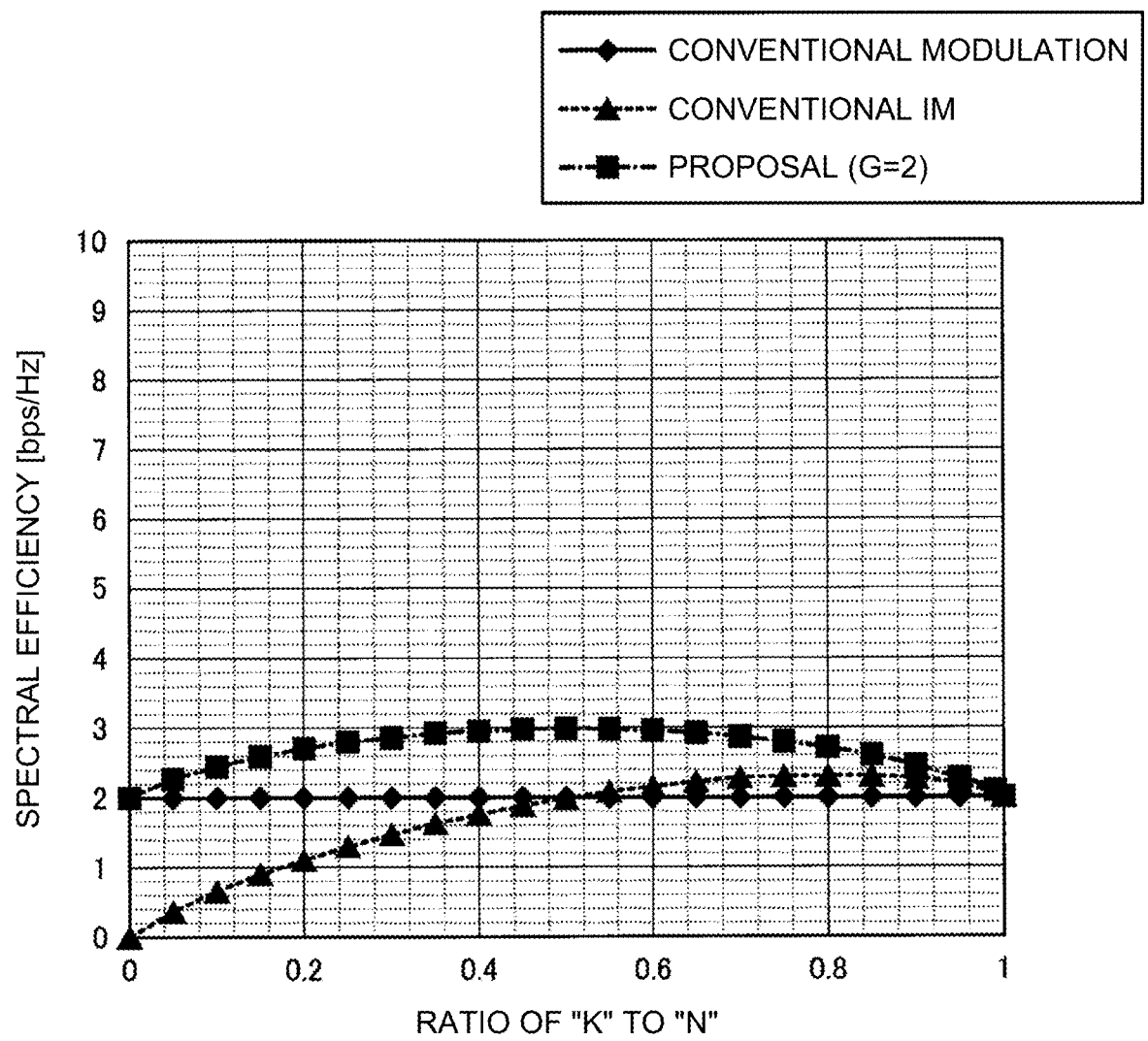
FIG. 18 is a graph illustrating an example of the resource efficiency achieved according to the new IM and the existing modulation methods when m=2 holds true.
Figure 19:
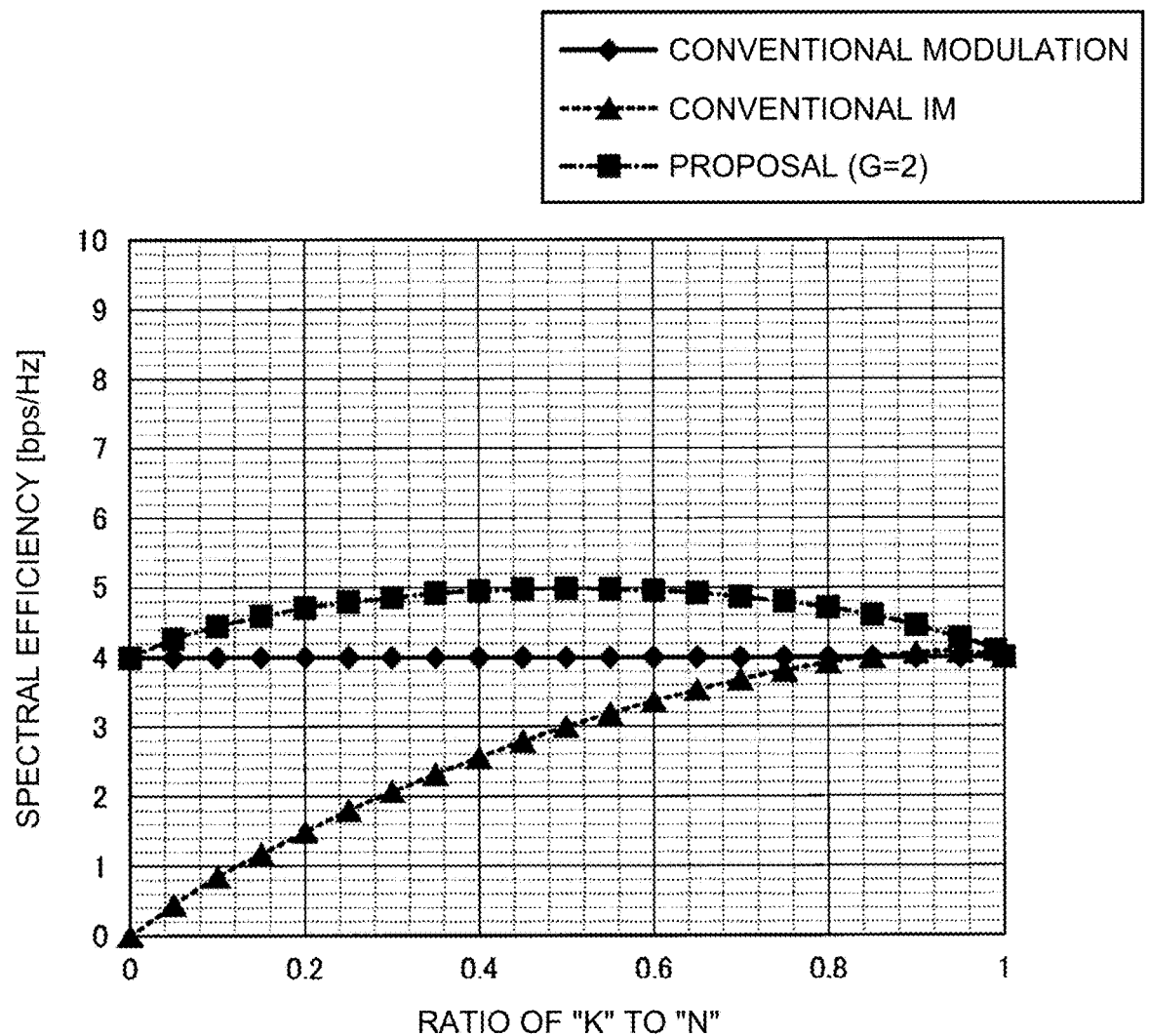
FIG. 19 is a graph illustrating an example of the resource efficiency achieved according to the new IM and the existing modulation methods when m=4 holds true.
Figure 20:
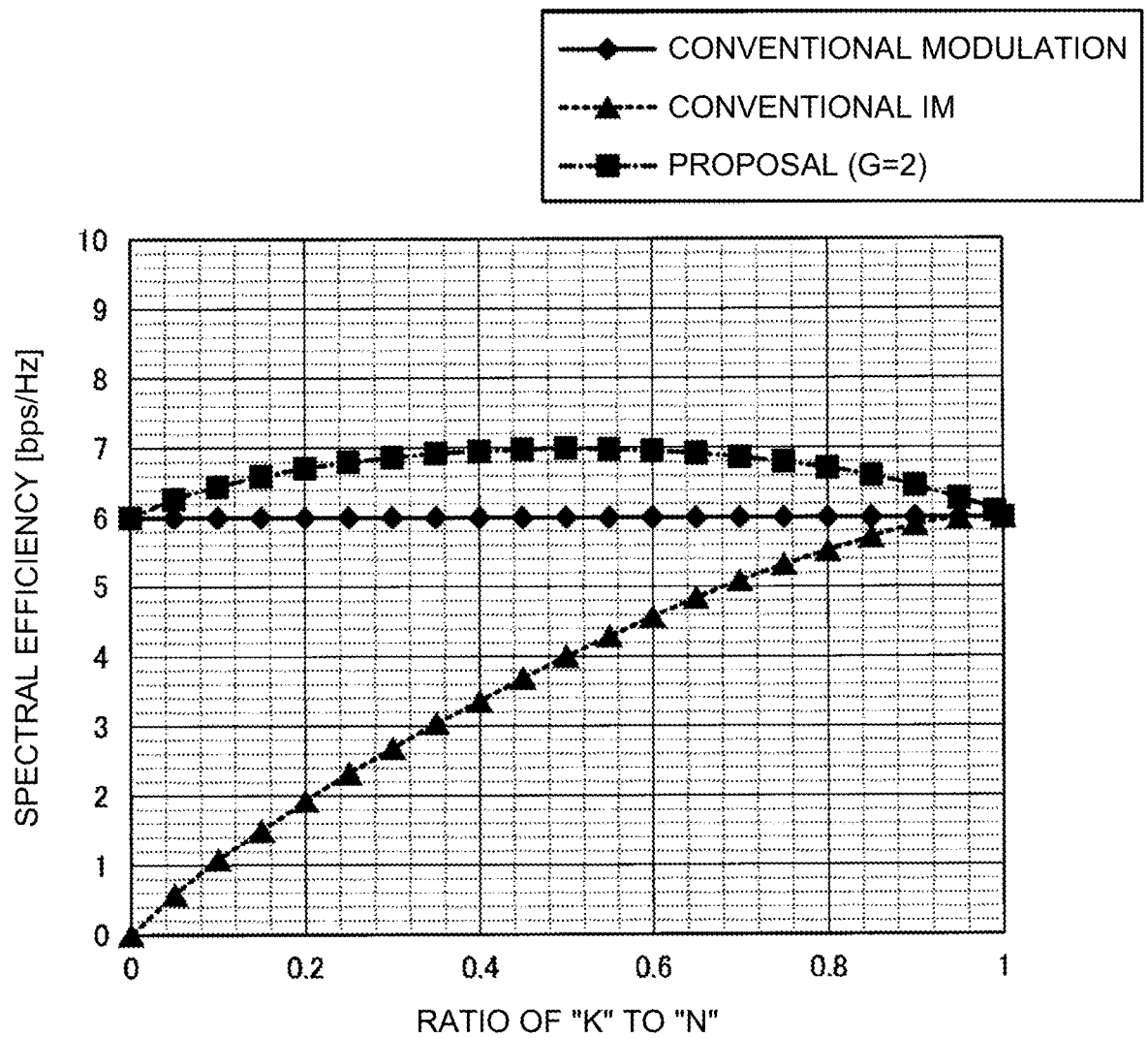
FIG. 20 is a graph illustrating an example of the resource efficiency achieved according to the new IM and the existing modulation methods when m=6 holds true.
Figure 21:
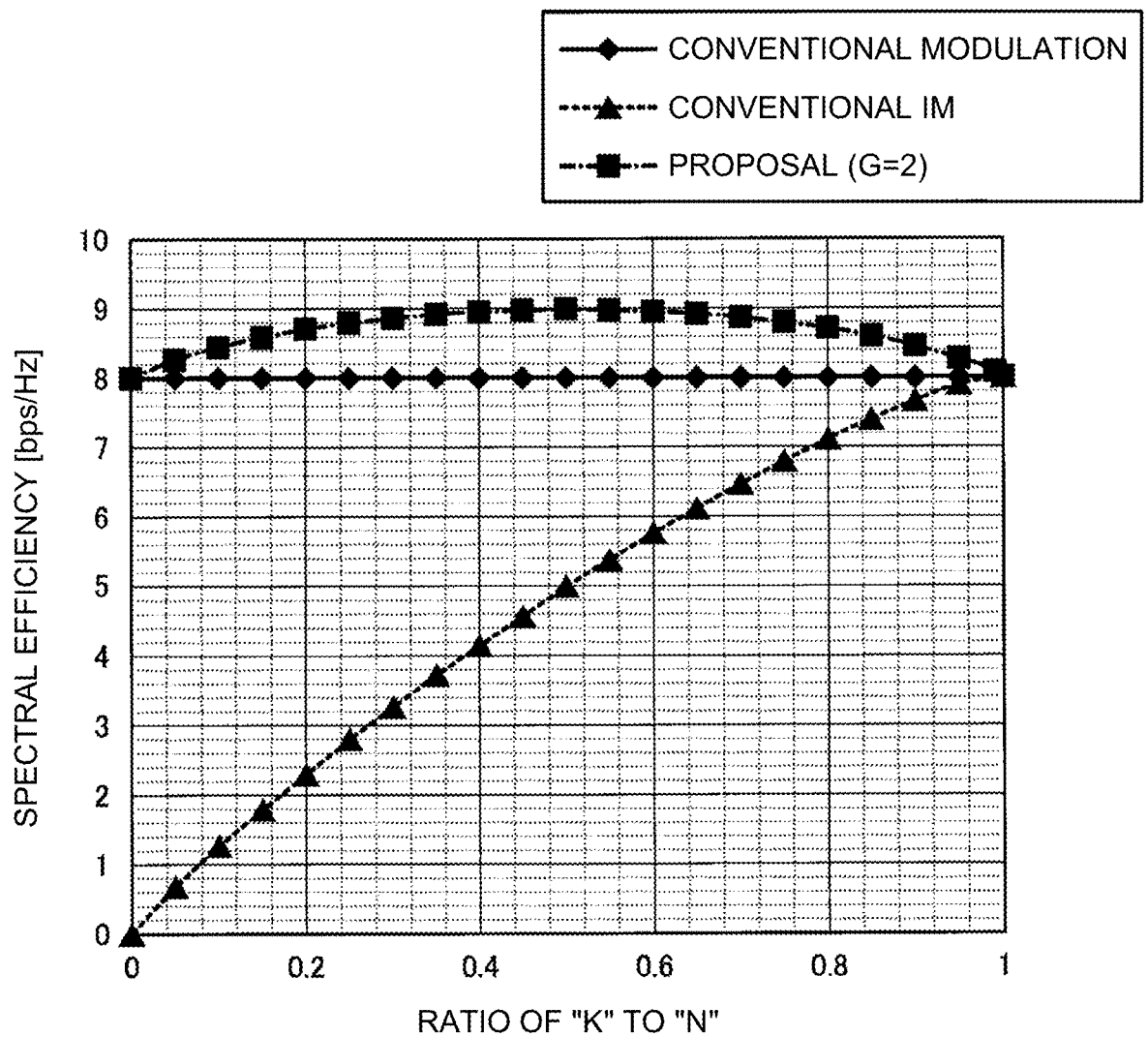
FIG. 21 is a graph illustrating an example of the resource efficiency achieved according to the new IM and the existing modulation methods when m=8 holds true.

Explained below with reference to FIGS. 17 to 21 is the improvement achieved in the resource efficiency as a result of using the new IM. FIG. 17 is a graph illustrating an example of the resource efficiency achieved according to the new IM and the existing modulation methods when m=1 holds true. FIG. 18 is a graph illustrating an example of the resource efficiency achieved according to the new IM and the existing modulation methods when m=2 holds true. FIG. 19 is a graph illustrating an example of the resource efficiency achieved according to the new IM and the existing modulation methods when m=4 holds true. FIG. 20 is a graph illustrating an example of the resource efficiency achieved according to the new IM and the existing modulation methods when m=6 holds true. FIG. 21 is a graph illustrating an example of the resource efficiency achieved according to the new IM and the existing modulation methods when m=8 holds true. In these graphs, the resource efficiency achieved according to the new IM is added as Proposal (G=2) in the graphs illustrated in FIGS. 5 to 9, respectively. Regarding the parameters of the new IM illustrated in these graphs; G=2, $K_1=K$, and $K_2=N-K1$ holds true. The horizontal axis represents the ratio of K to N (K/N), and the vertical axis represents the resource efficiency (the spectral efficiency).

With reference to FIGS. 17 to 21, it can be seen that, regardless of the ratio of K to N, higher resource efficiency is constantly achieved according to the new IM in comparison to the conventional IM and the typical modulation method of the past. Moreover, with reference to FIGS. 17 to 21, it can be seen that the resource efficiency achieved according to the new IM is the highest when the ratio of K to N is equal to 0.5. Moreover, these features are not dependent on the value of the modulation level m.

From these facts, as a general rule, regarding at least one of G number of complex signal point sets, it can be said that the value of $K_g$ is desirably equal to or greater than the value of the quotient obtained when N is the dividend and G is the divisor, particularly from the perspective of the resource efficiency achieved without using the OFF resource elements. That is, it can be said that the relationship given in the following equation is desirably established.

$$K_g \geq \text{floor}\left(\frac{N}{G}\right) \quad (10)$$

3.2. Complex Signal Point Set (1) Features of Plurality of Complex Signal Point Sets Given below is the detailed explanation of a plurality of complex signal point sets used in the new IM.

From among a plurality of complex signal point sets to be used in the modulation, at least one complex signal point set includes, as elements, complex signal points expressed using at least either one of $2^m$ FSK, $2^m$ ASK, $2^m$ PSK, and $2^m$ QAM; where m represents an integer equal to or greater than zero. Moreover, from among a plurality of complex signal point sets to be used in the modulation, it is desirable that at least one complex signal point set has the number of elements to be equal to $2^m$ or $1+2^m$. When the number of elements in a complex signal point set is equal to $1+2^m$, that complex signal point set includes zero (0+0j) as an element.

Furthermore, from among a plurality of complex signal point sets to be used in the modulation, at least one complex signal point set can have the number of elements equal to be equal to one. When the number of elements in a complex signal point set is equal to one, that complex signal point set includes zero (0+0j) as the element.

The complex signal point sets to be used in the modulation have mutually different features. Based on these features, the receiving device 200 becomes able to identify which complex signal point included in the received complex signal point sequence belongs to which complex signal point set. Given below is the explanation about the features of a plurality of complex signal point sets to be used in the modulation.

No Overlapping Elements

It is desirable that the complex signal point sets to be used in the modulation do not have any mutually overlapping elements. For example, when the complex signal point sets g1 and g2 are used in the modulation, it is desirable that an arbitrary complex signal point $s_{g1,a}$ belonging to the complex signal point set g1 does not overlap with an arbitrary complex signal point $s_{g2,b}$ belonging to the complex signal point set g2. That is, it is desirable that the relationship given in the following equation is established.

$$s_{g1,a} \neq s_{g2,b}, \text{ if } g_1 \neq g_2, \forall a, \forall b \quad (11)$$

However, when a complex signal point set includes zero (s=0+j0) as a complex signal point, it is possible to have overlapping of that zero among different complex signal point sets.

Expressible by Arithmetic Operations

Regarding arbitrary two complex signal point sets from among a plurality of complex signal point sets used in a complex signal point sequence, it is desirable that the elements of one complex signal point set are expressible by performing predetermined arithmetic operations with respect to the elements of the other complex signal point set. Moreover, regarding arbitrary two complex signal point sets from among a plurality of complex signal point sets used in a complex signal point sequence, it is desirable that all elements included in one complex signal point set are expressible by performing predetermined common arithmetic operations with respect to the elements of the other complex signal point set. More particularly, of a plurality of complex signal point sets used in a complex signal point sequence, it is desirable that each complex signal point set has a linear relationship with each other complex signal point set. That is, regarding arbitrary two complex signal point sets included in a plurality of complex signal point sets used in a complex signal point sequence, it is desirable that the elements of one complex signal point set are expressible by performing linear operations with respect to the elements of the other complex signal point set. Herein, predetermined arithmetic operations can include at least one of amplitude changing, phase rotation, linear shifting, and substitution.

Same Bit Count

It is desirable that the complex signal point sets used in a complex signal point sequence either have the same element count or have the difference of no more than one in the element count.

(2) Examples of Characterization of Plurality of Complex Signal Point Sets

First Example

FIG. 22 is a diagram illustrating an example of a plurality of complex signal point sets used in the new IM. In FIG. 22 are illustrated the complex signal point sets g1 to g4 that are provided with different phase rotation amounts based on the BPSK (Binary Phase Shift Keying). Since the BPSK serves as the basis, m=1 holds true. Regarding arbitrary two complex signal point sets from among the complex signal point sets g1 to g4, the elements of one complex signal point set are expressible by applying phase rotation to the elements of the other complex signal point set. For example, with reference to the complex signal point sets g1 and g2, the element $s_{g1,\,a}$ of the complex signal point set g1 is defined using the element $s_{g2,\,b}$ of the complex signal set point g2, as given in the following equation.

$$s_{g1,a} = \exp(j\theta_{g1,g2})s_{g2,b} \qquad (12)$$

Herein, $\theta_{g1,\,g2}$ is a real number and represents the difference in the phase rotation amounts applied to the complex signal point sets g1 and g2. In other words, $\theta_{g1,\,g2}$ represents the phase difference between the complex signal points $S_{g1,\,a}$ and $S_{g2,\,b}$. The value of $\theta_{g1,\,g2}$ can be same for all elements included in the complex signal point sets g1 and g2.

In order to characterize G number of complex signal point sets according to the phase difference θ from the base BPSK; it is desirable that, regarding the value of the phase difference θ of each complex signal point set g from the base BPSK, it is desirable that the relationship of θ=π*(g−1)/G is established. Herein, g=1, . . . , G holds true. Meanwhile, this relationship is established in the example illustrated in FIG. 22.

Second Example

FIG. 23 is a diagram illustrating an example of the characterization of a plurality of complex signal point sets used in the new IM. In FIG. 23 are illustrated the complex signal point sets g1 to g4 that are provided with at least either different phase rotation amounts or different amplitude change amounts based on the BPSK (Binary Phase Shift Keying). Since the BPSK serves as the basis, m=1 holds true. Regarding arbitrary two complex signal point sets from among the complex signal point sets g1 to g4, the elements of one complex signal point set are expressible by applying at least either phase rotation or amplitude changing to the elements of the other complex signal point set. For example, with reference to the complex signal point sets g1 and g2, the element $s_{g1,\,a}$ of the complex signal point set g1 is defined using the element $s_{g2,\,b}$ of the complex signal set point g2, as given in the following equation.

$$s_{g1,a} = |Z_{g1,g2}|\exp(j\theta_{g1,g2})s_{g2,b} \qquad (13)$$

Herein, $\theta_{g1,\,g2}$ is a real number and represents the difference in the phase rotation amounts applied to the complex signal point sets g1 and g2. In other words, $\theta_{g1,\,g2}$ represents the phase difference between the complex signal points $S_{g1,\,a}$ and $S_{g2,\,b}$. Moreover, $Z_{g1,\,g2}$ is either a complex number, or a real number, or a pure imaginary number; and represents the difference in the amplitude change amounts applied to the complex signal point sets g1 and g2. In other words, $Z_{g1,\,g2}$ represents the amplitude difference between the complex signal points $S_{g1,\,a}$ and $S_{g2,\,b}$. Herein, the value of $\theta_{g1,\,g2}$ and the value of $Z_{g1,\,g2}$ can be same for all elements included in the complex signal point sets g1 and g2.

In order to characterize G number of complex signal point sets according to the phase difference and the amplitude difference from the base BPSK, when Gp number of features are set for the phase difference and when Ga number of features are set for the amplitude difference, it is desirable that the relationship of G=Gp*Ga is established. Meanwhile, with reference to FIG. 23, Gp=2 and Ga=2 holds true. Moreover, regarding the value of the phase difference θ of each complex signal point set g from the base BPSK, it is desirable that the relationship of θ=π*(g−1)/Gp is established. Herein, g=1, . . . , Gp holds true. Meanwhile, this relationship is established in the example illustrated in FIG. 23.

Third Example

FIG. 24 is a diagram illustrating an example of the characterization of a plurality of complex signal point sets used in the new IM. In FIG. 24 are illustrated the complex signal point sets g1 to g4 that are provided with at least either different phase rotation amounts or different amplitude change amounts based on the QPSK (Quadrature Phase Shift Keying). Since the QPSK serves as the basis, m=2 holds true. Regarding arbitrary two complex signal point sets from among the complex signal point sets g1 to g4, the elements of one complex signal point set are expressible by applying at least either phase rotation or amplitude changing to the elements of the other complex signal point set.

In order to characterize G number of complex signal point sets according to the phase difference and the amplitude difference from the base QPSK, when Gp number of features are set for the phase difference and when Ga number of features are set for the amplitude difference, it is desirable that the relationship of G=Gp*Ga is established. Meanwhile, with reference to FIG. 24, Gp=2 and Ga=2 holds true. Moreover, regarding the value of the phase difference θ of each complex signal point set g from the base QPSK, it is desirable that the relationship of θ=π*(g−1)/2Gp is established. Herein, g=1, . . . , Gp holds true. Meanwhile, this relationship is established in the example illustrated in FIG. 24.

Fourth Example

FIG. 25 is a diagram illustrating an example of the characterization of a plurality of complex signal point sets used in the new IM. In FIG. 25 are illustrated the complex signal point sets g1 to g4 that are provided with different linear shifts based on the 16QAM (Quadrature Amplitude Modulation). Since the 16QAM serves as the basis, m=4 holds true. Regarding arbitrary two complex signal point sets from among the complex signal point sets g1 to g4, the elements of one complex signal point set are expressible by applying linear shifting to the elements of the other complex signal point set. For example, with reference to the complex signal point sets g1 and g2, the element $s_{g1,\,a}$ of the complex signal point set g1 is defined using the element $s_{g2,\,b}$ of the complex signal set point g2, as given in the following equation.

$$s_{g1,a} = s_{g2,b} + C_{g1,g2} \qquad (14)$$

Herein, $C_{g1,\,g2}$ is a either complex number, or a real number, or a pure imaginary number; and represents the difference in the linear shifts applied to the complex signal point sets g1 and g2. The value of $C_{g1,\,g2}$ can be same for all elements included in the complex signal point sets g1 and g2.

Generalization

Regarding the characterization of a plurality of complex signal point sets as explained above, generalization is done as follows. From among a plurality of complex signal point sets to be used in the modulation, it is desirable that the elements of a particular complex signal point sets are definable by applying amplitude changing, phase rotation, and/or linear shifting with respect to the elements of some other complex signal point set. For example, with reference to arbitrary two complex signal point sets g1 and g2 from among a plurality of complex signal point sets to be used in the modulation, the element $s_{g1,\,a}$ of the complex signal point set g1 is defined using the element $s_{g2,\,b}$ of the complex signal point set g2, as given in the following equation.

$$s_{g1,a} = |Z_{g1,g2}|\exp(j\theta_{g1,g2})s_{g2,b} + C_{g1,g2} \quad (15)$$

Regarding the values of amplitude changing, phase rotation, and linear shifting; it is desirable that the relationships given in the following equation are established as far as arbitrary two complex signal point sets g1 and g2 are concerned from among a plurality of complex signal point sets to be used in the modulation.

$$\theta_{g1,g2} = -\theta_{g2,g1}$$

$$|Z_{g1,g2}| = |Z_{g2,g1}|^{-1}$$

$$C_{g1,g2} = -C_{g2,g1} \quad (16)$$

(3) Other Examples of Characterization of Plurality of Complex Signal Point Sets The method for generating a plurality of complex signal point sets to be used in the modulation is not limited to the methods explained above. For example, using the FSK/ASK/PSK/QAM as the base, two or more arbitrary complex signal points can be extracted therefrom, and a plurality of complex signal point sets to be used in the modulation can be generated. The related specific examples are explained below with reference to FIGS. 26 to 29.

Figure 27:
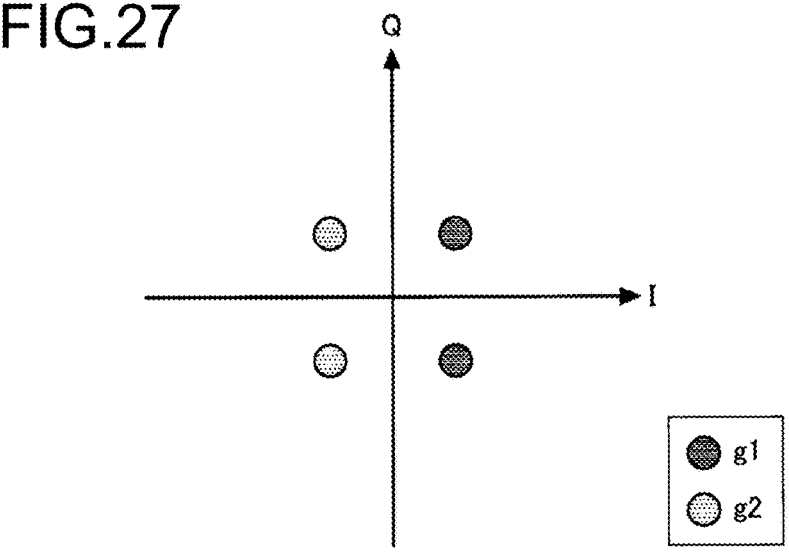
FIG. 27 is a diagram illustrating another example of the characterization of a plurality of complex signal point sets used in the new IM.
Figure 28:
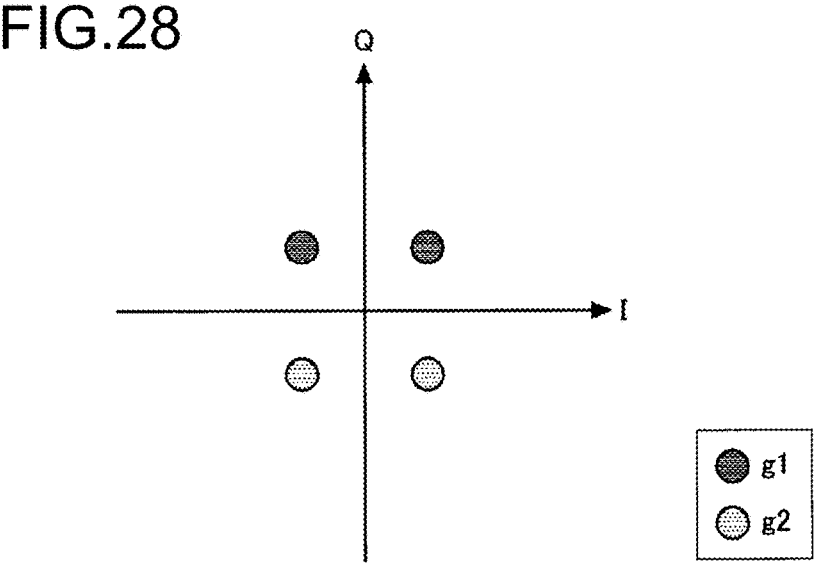
FIG. 28 is a diagram illustrating another example of the characterization of a plurality of complex signal point sets used in the new IM.
Figure 29:
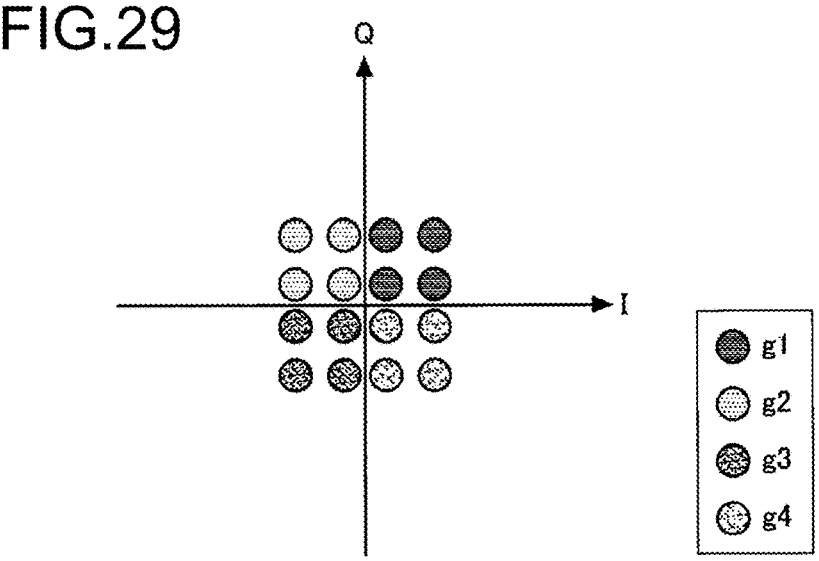
FIG. 29 is a diagram illustrating another example of the characterization of a plurality of complex signal point sets used in the new IM.

FIGS. 26 to 29 are diagrams illustrating other examples of the characterization of a plurality of complex signal point sets to be used in the modulation. In FIGS. 26 to 28 are illustrated examples in which: the QPSK is used as the base; two of the four complex signal points of the QPSK are extracted as elements of the complex signal point set g1; and the remaining two complex signal points are extracted as elements of the complex signal point set g2. In FIG. 29 is illustrated an example in which the 16QAM is used as the base; and, from 16 complex signal points of the 16QAM, four complex signal points are extracted as elements of each of the complex signal point sets g1 to g4.

In this way, even in the case of generating a plurality of complex signal point sets to be used in the modulation, it is desirable that the elements of a particular complex signal point set are definable by applying amplitude changing, phase rotation, and/or linear shifting with respect to the elements of some other complex signal point set. That is, it is desirable that the relationships given earlier in Equation (15) and Equation (16) are established.

3.3. Specific Signal Processing

The transmission device 100 according to the present embodiment performs signal processing identical to the signal processing explained earlier with reference to FIG. 1. However, the constellation mapping block 13 performs operations meant for implementing the proposed technology. The constellation mapping block 13 is equivalent to a converting unit that converts a bit sequence into a complex signal point sequence. Given below is the detailed explanation of specific examples of the signal processing performed by the constellation mapping block 13.

A bit sequence input to the constellation mapping block 13 is made of a first-type bit sequence and a second-type bit sequence explained earlier, and includes L number of bits.

3.3.1. First Example

In a first example, a complex signal point sequence is generated by converting the second-type bit sequence into a provisional complex signal point sequence using a predetermined complex signal point set, and then applying arithmetic processing corresponding to the first-type bit sequence to the provisional complex signal point sequence.

(1) Configuration Example

Figure 30:
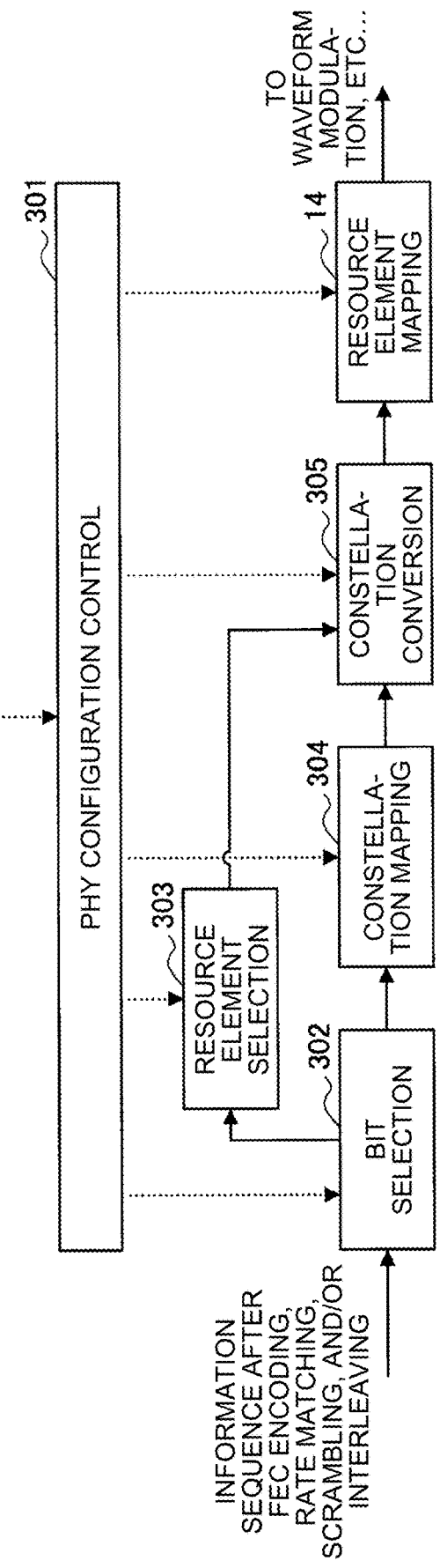
FIG. 30 is a block diagram for explaining a first example of the signal processing performed by the transmission device according to the present embodiment.

FIG. 30 is a block diagram for explaining a first example of the signal processing performed by the transmission device 100 according to the present embodiment. Of the signal processing illustrated in FIG. 1, a specific example of the signal processing performed by the constellation mapping block 13 is illustrated in detail in FIG. 30. The signal processing illustrated in FIG. 30 includes a physical layer configuration control block 301, a bit selection block 302, a resource element selection block 303, a constellation mapping block 304, a constellation conversion block 305, and the resource element mapping block 14. With reference to FIG. 30, a bit sequence that has been subjected to FEC encoding, rate matching, scrambling and/or interleaving is input; is subjected to signal processing illustrated in FIG. 30; and is then subjected to waveform modulation and the like.

Physical Layer Configuration Control Block 301

The physical layer configuration control block 301 controls the operations of each block according to control information notified from the physical layer, the upper layers, the base station to which the transmission device 100 is connected, and the receiving device 200; and according to the information determined in advance based on the standards. Examples of the notified control information include control information signaling and RRC (Radio Resource Control) signaling. Examples of the information determined in advance based on the standards include information determined in advance based on pre-configuration and standard specifications.

Bit Selection Block 302

The bit selection block 302 divides the input bit sequence into a first-type bit sequence and a second-type bit sequence. Then, the bit selection block 302 outputs the first-type bit sequence to the resource element selection block 303, and outputs the second-type bit sequence to the constellation mapping block 304.

For example, from the input bit sequence, the bit selection block 302 selects the first-type bit sequence, and treats the remaining bit sequence as the second-type bit sequence. If $N_{B,\,RES}$ represents the bit count selected as the first-type bit sequence, then $N_{B,\,RES}$ is expressed as given in the following equation.

$$N_{B,RES} = \mathrm{floor}\left[\log_2\left\{\prod_{g=1}^{G}\left(\frac{N - \sum_{g'=0}^{g-1} K_{g'}}{K_g}\right)\right\}\right] \quad (17)$$

Herein, if $G \leq 2$ is satisfied and if the relationship given below in Equation (18) is satisfied, then $N_{B,\,RES}$ is expressed as given below in Equation (19).

$$\sum_g K_g = N \tag{18}$$

$$N_{B,RES} = \text{floor}\left[\sum_{g=1}^{G} \log_2\left\{\binom{N}{K_1}\right\}\right] \tag{19}$$

Alternatively, $N_{B,\,RES}$ can be expressed according to any one of the following equations.

$$N_{B,RES} = \sum_{g=1}^{G} \text{floor}\left[\log_2\left\{\binom{N - \sum_{g'=0}^{g-1} K_{g'}}{K_g}\right\}\right] \tag{20}$$

$$N_{B,RES} = \text{floor}\left[\sum_{g=1}^{G} \log_2\left\{\binom{N - \sum_{g'=0}^{g-1} K_{g'}}{K_g}\right\}\right]$$

Herein, if $G \leq 2$ is satisfied and if the relationship given above in Equation (18) is satisfied, then Equation (19) becomes identical to each equation given in Equation (20).

Resource Element Selection Block 303

According to the first-type bit sequence selected by the bit selection block 302, the resource element selection block 303 decides on what arithmetic processing is to be applied with respect to which complex signal points of which resource element from among the N number of resource elements. That is equivalent to selecting the elements of the complex signal point sets for each resource element from among the N number of resource elements. Herein, the arithmetic processing includes at least one of amplitude changing, phase rotation, linear shifting, and substitution performed with respect to the complex signal points.

For example, when $N=4$, $G=2$, $K_1=1$, and $K_2=3$ is defined, and when two types of phase rotation amounts ($\theta_1$ and $\theta_1$) corresponding to $G=2$ are defined as the arithmetic processing to be applied; the arithmetic processing corresponding to the first-type bit sequence is defined, for example, according to an arithmetic processing definition table illustrated below in Table 1. This arithmetic processing definition table can be specified by the physical layer configuration control block 301.

TABLE 1

Example of arithmetic processing definition table (N = 4, G = 2, $K_1$ = 1, and $K_2$ = 3; applied arithmetic processing: phase rotation)

| First-type bit sequence | | Arithmetic processing applied to complex signal points placed in resource elements #1 to #4 | | | | |
|---|---|---|---|---|---|---|
| bit 1 | bit 2 | #1 | #2 | #3 | #4 | Remarks |
| 0 | 0 | exp (j$\theta_1$) | exp (j$\theta_2$) | exp (j$\theta_2$) | exp (j$\theta_2$) | — |
| 0 | 1 | exp (j$\theta_2$) | exp (j$\theta_1$) | exp (j$\theta_2$) | exp (j$\theta_2$) | — |
| 1 | 0 | exp (j$\theta_2$) | exp (j$\theta_2$) | exp (j$\theta_1$) | exp (j$\theta_2$) | — |
| 1 | 1 | exp (j$\theta_2$) | exp (j$\theta_2$) | exp (j$\theta_2$) | exp (j$\theta_1$) | — |

As another example, when $N=4$, $G=2$, $K_1=2$, and $K_2=2$ is defined, and when two types of phase rotation amounts ($\theta_1$ and $\theta_1$) corresponding to $G=2$ are considered as the arithmetic processing to be applied; the arithmetic processing corresponding to the first-type bit sequence is defined, for example, according to an arithmetic processing definition table illustrated below in Table 2. This arithmetic processing definition table can be specified by the physical layer configuration control block 301.

TABLE 2

Example of arithmetic processing definition table (N = 4, G = 2, $K_1$ = 2, and $K_2$ = 2; applied arithmetic processing: phase rotation)

| First-type bit sequence | | Arithmetic processing applied to complex signal points placed in resource elements #1 to #4 | | | | |
|---|---|---|---|---|---|---|
| bit 1 | bit 2 | #1 | #2 | #3 | #4 | Remarks |
| 0 | 0 | exp (j$\theta_1$) | exp (j$\theta_1$) | exp (j$\theta_2$) | exp (j$\theta_2$) | — |
| 0 | 1 | exp (j$\theta_1$) | exp (j$\theta_2$) | exp (j$\theta_1$) | exp (j$\theta_2$) | — |
| 1 | 0 | exp (j$\theta_1$) | exp (j$\theta_2$) | exp (j$\theta_2$) | exp (j$\theta_1$) | — |
| 1 | 1 | exp (j$\theta_2$) | exp (j$\theta_1$) | exp (j$\theta_2$) | exp (j$\theta_1$) | — |
| N/A | N/A | exp (j$\theta_2$) | exp (j$\theta_1$) | exp (j$\theta_1$) | exp (j$\theta_2$) | — |
| N/A | N/A | exp (j$\theta_2$) | exp (j$\theta_2$) | exp (j$\theta_1$) | exp (j$\theta_1$) | Since not used in practice, need not be defined |

As still another example, when $N=4$, $G=2$, $K_1=2$, and $K_2=1$ is defined, and when two types of phase rotation amounts ($\theta_1$ and $\theta_1$) corresponding to $G=2$ are considered as the arithmetic processing to be applied; the arithmetic processing corresponding to the first-type bit sequence is defined, for example, according to an arithmetic processing definition table illustrated below in Table 3. Herein, multiplication by zero (*(0+j0)) is performed with respect to the OFF resource elements. This arithmetic processing definition table can be specified by the physical layer configuration control block 301.

TABLE 3

Example of arithmetic processing definition table (N = 4, G = 2, $K_1$ = 2, $K_2$ = 1; applied arithmetic processing: phase rotation)

| First-type bit sequence | | | Arithmetic processing applied to complex signal points placed in resource elements #1 to #4 | | | | |
|---|---|---|---|---|---|---|---|
| bit 1 | bit 2 | bit 3 | #1 | #2 | #3 | #4 | Remarks |
| 0 | 0 | 0 | exp (j$\theta_1$) | exp (j$\theta_1$) | exp (j$\theta_2$) | *(0 + j0) | |
| 0 | 0 | 1 | exp (j$\theta_1$) | exp (j$\theta_1$) | *(0 + j0) | exp (j$\theta_2$) | |

TABLE 3-continued

Example of arithmetic processing definition table (N = 4, G = 2, $K_1$ = 2, $K_2$ = 1; applied arithmetic processing: phase rotation)

| First-type bit sequence | | | Arithmetic processing applied to complex signal points placed in resource elements #1 to #4 | | | | |
|---|---|---|---|---|---|---|---|
| bit 1 | bit 2 | bit 3 | #1 | #2 | #3 | #4 | Remarks |
| 0 | 1 | 0 | exp (j$\theta_1$) | exp (j$\theta_2$) | exp (j$\theta_1$) | *(0 + j0) | |
| 0 | 1 | 1 | exp (j$\theta_1$) | *(0 + j0) | exp (j$\theta_1$) | exp (j$\theta_2$) | |
| 1 | 0 | 0 | exp (j$\theta_2$) | exp (j$\theta_2$) | *(0 + j0) | exp (j$\theta_1$) | |
| 1 | 0 | 1 | exp (j$\theta_1$) | *(0 + j0) | exp (j$\theta_2$) | exp (j$\theta_1$) | |
| 1 | 1 | 0 | exp (j$\theta_2$) | exp (j$\theta_1$) | *(0 + j0) | exp (j$\theta_1$) | |
| 1 | 1 | 1 | *(0 + j0) | exp (j$\theta_1$) | exp (j$\theta_2$) | exp (j$\theta_1$) | |
| N/A | N/A | N/A | exp (j$\theta_2$) | exp (j$\theta_1$) | exp (j$\theta_1$) | *(0 + j0) | Since not |
| N/A | N/A | N/A | *(0 + j0) | exp (j$\theta_1$) | exp (j$\theta_1$) | exp (j$\theta_2$) | used in |
| N/A | N/A | N/A | exp (j$\theta_2$) | *(0 + j0) | exp (j$\theta_1$) | exp (j$\theta_1$) | practice, |
| N/A | N/A | N/A | *(0 + j0) | exp (j$\theta_2$) | exp (j$\theta_1$) | exp (j$\theta_1$) | need not be defined |

With reference to Table 1 to Table 3, although the explanation is given about the phase rotation, arithmetic processing definition tables can be used also for the amplitude changing and the linear shifting. Such arithmetic processing definition tables can be specified by the physical layer configuration control block 301.

Constellation Mapping Block 304

The constellation mapping block 304 converts the two-bit sequence into a provisional complex signal point sequence based on a predetermined complex signal point set serving as the base. The predetermined complex signal point set serving as the base includes complex signal points expressed using at least one of $2^m$ FSK, $2^m$ ASK, $2^m$ PSK, and $2^m$ QAM; where m represents an integer equal to or greater than zero. In this case, the second-type bit sequence is partitioned after every m number of bits, and each m-bit partial sequence is converted into a complex signal point. In other words, conversion to a complex signal point is performed at the position of each resource element. As a result of performing the signal processing illustrated in FIG. 30, eventually a complex signal point sequence having N number of complex signal points is generated. The number of complex signal points output from the constellation mapping block 304 is expressed as given in the following expression.

$$\sum_g K_g \quad (21)$$

Moreover, a bit count $N_{B,CM}$ of the information to be loaded on the complex signal points is expressed as given in the following equation.

$$N_{B,CM} = \sum_g K_g m_g \quad (22)$$

Given below are exemplary conversion tables that indicate the correspondence relationship between the second-type bit sequence and the complex signal points (an I-axis and a Q-axis) in the case of the BPSK (m=1), the QPSK (m=2), the 16QAM (m=4), the 64QAM (m=6), and the 256QAM (m=8).

TABLE 4

Example of conversion table for BPSK (m = 1)

| b (i) | I | Q |
|---|---|---|
| 0 | $1/\sqrt{2}$ | $1/\sqrt{2}$ |
| 1 | $-1/\sqrt{2}$ | $-1/\sqrt{2}$ |

TABLE 5

Example of conversion table for QPSK (m = 2)

| b (i), b (i + 1) | I | Q |
|---|---|---|
| 00 | $1/\sqrt{2}$ | $1/\sqrt{2}$ |
| 01 | $1/\sqrt{2}$ | $-1/\sqrt{2}$ |
| 10 | $-1/\sqrt{2}$ | $1/\sqrt{2}$ |
| 11 | $-1/\sqrt{2}$ | $-1/\sqrt{2}$ |

TABLE 6

Example of conversion table for 16QAM (m = 4)

| b (i), b (i + 1), b (i + 2), b (i + 3) | I | Q |
|---|---|---|
| 0000 | $1/\sqrt{10}$ | $1/\sqrt{10}$ |
| 0001 | $1/\sqrt{10}$ | $3/\sqrt{10}$ |
| 0010 | $3/\sqrt{10}$ | $1/\sqrt{10}$ |
| 0011 | $3/\sqrt{10}$ | $3/\sqrt{10}$ |
| 0100 | $1/\sqrt{10}$ | $-1/\sqrt{10}$ |
| 0101 | $1/\sqrt{10}$ | $-3/\sqrt{10}$ |
| 0110 | $3/\sqrt{10}$ | $-1/\sqrt{10}$ |
| 0111 | $3/\sqrt{10}$ | $-3/\sqrt{10}$ |
| 1000 | $-1/\sqrt{10}$ | $1/\sqrt{10}$ |
| 1001 | $-1/\sqrt{10}$ | $3/\sqrt{10}$ |
| 1010 | $-3/\sqrt{10}$ | $1/\sqrt{10}$ |
| 1011 | $-3/\sqrt{10}$ | $3/\sqrt{10}$ |
| 1100 | $-1/\sqrt{10}$ | $-1/\sqrt{10}$ |
| 1101 | $-1/\sqrt{10}$ | $-3/\sqrt{10}$ |
| 1110 | $-3/\sqrt{10}$ | $-1/\sqrt{10}$ |
| 1111 | $-3/\sqrt{10}$ | $-3/\sqrt{10}$ |

TABLE 7

Example of conversion table for 64QAM (m = 6)

| b(i), b(i+1), b(i+2), b(i+3), b(i+4), b(i+5) | I | Q | b(i), b(i+1), b(i+2), b(i+3), b(i+4), b(i+5) | I | Q |
|---|---|---|---|---|---|
| 000000 | $3/\sqrt{42}$ | $3/\sqrt{42}$ | 100000 | $-3/\sqrt{42}$ | $3/\sqrt{42}$ |
| 000001 | $3/\sqrt{42}$ | $1/\sqrt{42}$ | 100001 | $-3/\sqrt{42}$ | $1/\sqrt{42}$ |
| 000010 | $1/\sqrt{42}$ | $3/\sqrt{42}$ | 100010 | $-1/\sqrt{42}$ | $3/\sqrt{42}$ |
| 000011 | $1/\sqrt{42}$ | $1/\sqrt{42}$ | 100011 | $-1/\sqrt{42}$ | $1/\sqrt{42}$ |
| 000100 | $3/\sqrt{42}$ | $5/\sqrt{42}$ | 100100 | $-3/\sqrt{42}$ | $5/\sqrt{42}$ |
| 000101 | $3/\sqrt{42}$ | $7/\sqrt{42}$ | 100101 | $-3/\sqrt{42}$ | $7/\sqrt{42}$ |
| 000110 | $1/\sqrt{42}$ | $5/\sqrt{42}$ | 100110 | $-1/\sqrt{42}$ | $5/\sqrt{42}$ |
| 000111 | $1/\sqrt{42}$ | $7/\sqrt{42}$ | 100111 | $-1/\sqrt{42}$ | $7/\sqrt{42}$ |
| 001000 | $5/\sqrt{42}$ | $3/\sqrt{42}$ | 101000 | $-5/\sqrt{42}$ | $3/\sqrt{42}$ |
| 001001 | $5/\sqrt{42}$ | $1/\sqrt{42}$ | 101001 | $-5/\sqrt{42}$ | $1/\sqrt{42}$ |
| 001010 | $7/\sqrt{42}$ | $3/\sqrt{42}$ | 101010 | $-7/\sqrt{42}$ | $3/\sqrt{42}$ |
| 001011 | $7/\sqrt{42}$ | $1/\sqrt{42}$ | 101011 | $-7/\sqrt{42}$ | $1/\sqrt{42}$ |
| 001100 | $5/\sqrt{42}$ | $5/\sqrt{42}$ | 101100 | $-5/\sqrt{42}$ | $5/\sqrt{42}$ |
| 001101 | $5/\sqrt{42}$ | $7/\sqrt{42}$ | 101101 | $-5/\sqrt{42}$ | $7/\sqrt{42}$ |
| 001110 | $7/\sqrt{42}$ | $5/\sqrt{42}$ | 101110 | $-7/\sqrt{42}$ | $5/\sqrt{42}$ |
| 001111 | $7/\sqrt{42}$ | $7/\sqrt{42}$ | 101111 | $-7/\sqrt{42}$ | $7/\sqrt{42}$ |
| 010000 | $3/\sqrt{42}$ | $-3/\sqrt{42}$ | 110000 | $-3/\sqrt{42}$ | $-3/\sqrt{42}$ |
| 010001 | $3/\sqrt{42}$ | $-1/\sqrt{42}$ | 110001 | $-3/\sqrt{42}$ | $-1/\sqrt{42}$ |
| 010010 | $1/\sqrt{42}$ | $-3/\sqrt{42}$ | 110010 | $-1/\sqrt{42}$ | $-3/\sqrt{42}$ |
| 010011 | $1/\sqrt{42}$ | $-1/\sqrt{42}$ | 110011 | $-1/\sqrt{42}$ | $-1/\sqrt{42}$ |
| 010100 | $3/\sqrt{42}$ | $-5/\sqrt{42}$ | 110100 | $-3/\sqrt{42}$ | $-5/\sqrt{42}$ |
| 010101 | $3/\sqrt{42}$ | $-7/\sqrt{42}$ | 110101 | $-3/\sqrt{42}$ | $-7/\sqrt{42}$ |
| 010110 | $1/\sqrt{42}$ | $-5/\sqrt{42}$ | 110110 | $-1/\sqrt{42}$ | $-5/\sqrt{42}$ |
| 010111 | $1/\sqrt{42}$ | $-7/\sqrt{42}$ | 110111 | $-1/\sqrt{42}$ | $-7/\sqrt{42}$ |
| 011000 | $5/\sqrt{42}$ | $-3/\sqrt{42}$ | 111000 | $-5/\sqrt{42}$ | $-3/\sqrt{42}$ |
| 011001 | $5/\sqrt{42}$ | $-1/\sqrt{42}$ | 111001 | $-5/\sqrt{42}$ | $-1/\sqrt{42}$ |
| 011010 | $7/\sqrt{42}$ | $-3/\sqrt{42}$ | 111010 | $-7/\sqrt{42}$ | $-3/\sqrt{42}$ |
| 011011 | $7/\sqrt{42}$ | $-1/\sqrt{42}$ | 111011 | $-7/\sqrt{42}$ | $-1/\sqrt{42}$ |
| 011100 | $5/\sqrt{42}$ | $-5/\sqrt{42}$ | 111100 | $-5/\sqrt{42}$ | $-5/\sqrt{42}$ |
| 011101 | $5/\sqrt{42}$ | $-7/\sqrt{42}$ | 111101 | $-5/\sqrt{42}$ | $-7/\sqrt{42}$ |
| 011110 | $7/\sqrt{42}$ | $-5/\sqrt{42}$ | 111110 | $-7/\sqrt{42}$ | $-5/\sqrt{42}$ |
| 011111 | $7/\sqrt{42}$ | $-7/\sqrt{42}$ | 111111 | $-7/\sqrt{42}$ | $-7/\sqrt{42}$ |

TABLE 8

Example of conversion table for 256QAM (m = 8) (The actual complex signal points are assumed to be equal to (I + jQ)/sqrt(170))

| b(i),...,b(i+7) | I | Q | b(i),...,b(i+7) | I | Q | b(i),...,b(i+7) | I | Q | b(i),...,b(i+7) | I | Q |
|---|---|---|---|---|---|---|---|---|---|---|---|
| 00000000 | 5 | 5 | 01000000 | 5 | −5 | 10000000 | −5 | 5 | 11000000 | −5 | −5 |
| 00000001 | 5 | 7 | 01000001 | 5 | −7 | 10000001 | −5 | 7 | 11000001 | −5 | −7 |
| 00000010 | 7 | 5 | 01000010 | 7 | −5 | 10000010 | −7 | 5 | 11000010 | −7 | −5 |
| 00000011 | 7 | 7 | 01000011 | 7 | −7 | 10000011 | −7 | 7 | 11000011 | −7 | −7 |
| 00000100 | 5 | 3 | 01000100 | 5 | −3 | 10000100 | −5 | 3 | 11000100 | −5 | −3 |
| 00000101 | 5 | 1 | 01000101 | 5 | −1 | 10000101 | −5 | 1 | 11000101 | −5 | −1 |
| 00000110 | 7 | 3 | 01000110 | 7 | −3 | 10000110 | −7 | 3 | 11000110 | −7 | −3 |
| 00000111 | 7 | 1 | 01000111 | 7 | −1 | 10000111 | −7 | 1 | 11000111 | −7 | −1 |
| 00001000 | 3 | 5 | 01001000 | 3 | −5 | 10001000 | −3 | 5 | 11001000 | −3 | −5 |
| 00001001 | 3 | 7 | 01001001 | 3 | −7 | 10001001 | −3 | 7 | 11001001 | −3 | −7 |
| 00001010 | 1 | 5 | 01001010 | 1 | −5 | 10001010 | −1 | 5 | 11001010 | −1 | −5 |
| 00001011 | 1 | 7 | 01001011 | 1 | −7 | 10001011 | −1 | 7 | 11001011 | −1 | −7 |
| 00001100 | 3 | 3 | 01001100 | 3 | −3 | 10001100 | −3 | 3 | 11001100 | −3 | −3 |
| 00001101 | 3 | 1 | 01001101 | 3 | −1 | 10001101 | −3 | 1 | 11001101 | −3 | −1 |
| 00001110 | 1 | 3 | 01001110 | 1 | −3 | 10001110 | −1 | 3 | 11001110 | −1 | −3 |
| 00001111 | 1 | 1 | 01001111 | 1 | −1 | 10001111 | −1 | 1 | 11001111 | −1 | −1 |
| 00010000 | 5 | 11 | 01010000 | 5 | −11 | 10010000 | −5 | 11 | 11010000 | −5 | −11 |
| 00010001 | 5 | 9 | 01010001 | 5 | −9 | 10010001 | −5 | 9 | 11010001 | −5 | −9 |
| 00010010 | 7 | 11 | 01010010 | 7 | −11 | 10010010 | −7 | 11 | 11010010 | −7 | −11 |
| 00010011 | 7 | 9 | 01010011 | 7 | −9 | 10010011 | −7 | 9 | 11010011 | −7 | −9 |
| 00010100 | 5 | 13 | 01010100 | 5 | −13 | 10010100 | −5 | 13 | 11010100 | −5 | −13 |
| 00010101 | 5 | 15 | 01010101 | 5 | −15 | 10010101 | −5 | 15 | 11010101 | −5 | −15 |
| 00010110 | 7 | 13 | 01010110 | 7 | −13 | 10010110 | −7 | 13 | 11010110 | −7 | −13 |
| 00010111 | 7 | 15 | 01010111 | 7 | −15 | 10010111 | −7 | 15 | 11010111 | −7 | −15 |
| 00011000 | 3 | 11 | 01011000 | 3 | −11 | 10011000 | −3 | 11 | 11011000 | −3 | −11 |
| 00011001 | 3 | 9 | 01011001 | 3 | −9 | 10011001 | −3 | 9 | 11011001 | −3 | −9 |
| 00011010 | 1 | 11 | 01011010 | 1 | −11 | 10011010 | −1 | 11 | 11011010 | −1 | −11 |
| 00011011 | 1 | 9 | 01011011 | 1 | −9 | 10011011 | −1 | 9 | 11011011 | −1 | −9 |
| 00011100 | 3 | 13 | 01011100 | 3 | −13 | 10011100 | −3 | 13 | 11011100 | −3 | −13 |
| 00011101 | 3 | 15 | 01011101 | 3 | −15 | 10011101 | −3 | 15 | 11011101 | −3 | −15 |
| 00011110 | 1 | 13 | 01011110 | 1 | −13 | 10011110 | −1 | 13 | 11011110 | −1 | −13 |
| 00011111 | 1 | 15 | 01011111 | 1 | −15 | 10011111 | −1 | 15 | 11011111 | −1 | −15 |
| 00100000 | 11 | 5 | 01100000 | 11 | −5 | 10100000 | −11 | 5 | 11100000 | −11 | −5 |
| 00100001 | 11 | 7 | 01100001 | 11 | −7 | 10100001 | −11 | 7 | 11100001 | −11 | −7 |
| 00100010 | 9 | 5 | 01100010 | 9 | −5 | 10100010 | −9 | 5 | 11100010 | −9 | −5 |
| 00100011 | 9 | 7 | 01100011 | 9 | −7 | 10100011 | −9 | 7 | 11100011 | −9 | −7 |
| 00100100 | 11 | 3 | 01100100 | 11 | −3 | 10100100 | −11 | 3 | 11100100 | −11 | −3 |
| 00100101 | 11 | 1 | 01100101 | 11 | −1 | 10100101 | −11 | 1 | 11100101 | −11 | −1 |
| 00100110 | 9 | 3 | 01100110 | 9 | −3 | 10100110 | −9 | 3 | 11100110 | −9 | −3 |
| 00100111 | 9 | 1 | 01100111 | 9 | −1 | 10100111 | −9 | 1 | 11100111 | −9 | −1 |
| 00101000 | 13 | 5 | 01101000 | 13 | −5 | 10101000 | −13 | 5 | 11101000 | −13 | −5 |
| 00101001 | 13 | 7 | 01101001 | 13 | −7 | 10101001 | −13 | 7 | 11101001 | −13 | −7 |
| 00101010 | 15 | 5 | 01101010 | 15 | −5 | 10101010 | −15 | 5 | 11101010 | −15 | −5 |
| 00101011 | 15 | 7 | 01101011 | 15 | −7 | 10101011 | −15 | 7 | 11101011 | −15 | −7 |
| 00101100 | 13 | 3 | 01101100 | 13 | −3 | 10101100 | −13 | 3 | 11101100 | −13 | −3 |
| 00101101 | 13 | 1 | 01101101 | 13 | −1 | 10101101 | −13 | 1 | 11101101 | −13 | −1 |

TABLE 8-continued

Example of conversion table for 256QAM (m = 8) (The actual complex
signal points are assumed to be equal to (I + jQ)/sqrt(170))

| b (i), ..., b (i + 7) | I | Q | b (i), ..., b (i + 7) | I | Q | b (i), ..., b (i + 7) | I | Q | b (i), ..., b (i + 7) | I | Q |
|---|---|---|---|---|---|---|---|---|---|---|---|
| 00101110 | 15 | 3 | 01101110 | 15 | −3 | 10101110 | −15 | 3 | 11101110 | −15 | −3 |
| 00101111 | 15 | 1 | 01101111 | 15 | −1 | 10101111 | −15 | 1 | 11101111 | −15 | −1 |
| 00110000 | 11 | 11 | 01110000 | 11 | −11 | 10110000 | −11 | 11 | 11110000 | −11 | −11 |
| 00110001 | 11 | 9 | 01110001 | 11 | −9 | 10110001 | −11 | 9 | 11110001 | −11 | −9 |
| 00110010 | 9 | 11 | 01110010 | 9 | −11 | 10110010 | −9 | 11 | 11110010 | −9 | −11 |
| 00110011 | 9 | 9 | 01110011 | 9 | −9 | 10110011 | −9 | 9 | 11110011 | −9 | −9 |
| 00110100 | 11 | 13 | 01110100 | 11 | −13 | 10110100 | −11 | 13 | 11110100 | −11 | −13 |
| 00110101 | 11 | 15 | 01110101 | 11 | −15 | 10110101 | −11 | 15 | 11110101 | −11 | −15 |
| 00110110 | 9 | 13 | 01110110 | 9 | −13 | 10110110 | −9 | 13 | 11110110 | −9 | −13 |
| 00110111 | 9 | 15 | 01110111 | 9 | −15 | 10110111 | −9 | 15 | 11110111 | −9 | −15 |
| 00111000 | 13 | 11 | 01111000 | 13 | −11 | 10111000 | −13 | 11 | 11111000 | −13 | −11 |
| 00111001 | 13 | 9 | 01111001 | 13 | −9 | 10111001 | −13 | 9 | 11111001 | −13 | −9 |
| 00111010 | 15 | 11 | 01111010 | 15 | −11 | 10111010 | −15 | 11 | 11111010 | −15 | −11 |
| 00111011 | 15 | 9 | 01111011 | 15 | −9 | 10111011 | −15 | 9 | 11111011 | −15 | −9 |
| 00111100 | 13 | 13 | 01111100 | 13 | −13 | 10111100 | −13 | 13 | 11111100 | −13 | −13 |
| 00111101 | 13 | 15 | 01111101 | 13 | −15 | 10111101 | −13 | 15 | 11111101 | −13 | −15 |
| 00111110 | 15 | 13 | 01111110 | 15 | −13 | 10111110 | −15 | 13 | 11111110 | −15 | −13 |
| 00111111 | 15 | 15 | 01111111 | 15 | −15 | 10111111 | −15 | 15 | 11111111 | −15 | −15 |

Constellation Conversion Block 305

The constellation conversion block 305 performs the arithmetic processing, which is based on the first-type bit sequence, with respect to each of a plurality of complex signal points included in the provisional complex signal point sequence that is generated based on the second-type bit sequence; and generates a definitive complex signal point sequence. More specifically, the constellation conversion block performs the arithmetic processing, which is selected by the resource element selection block 303, with respect to each complex signal point included in the complex signal point sequence that is output from the constellation mapping block 304. After the arithmetic processing has been performed by the constellation conversion block 305, a complex signal point $s_n$ placed at a position n of a resource element is expressed as given in the following equation.

$$s_n = |Z_n| s'_n \exp(j\theta_n) + C_n \quad (23)$$

Herein, $s'_n$ represents a complex signal point output from the constellation mapping block 304, and includes a complex signal point placed in an OFF resource element. Moreover, $Z_n$, $\theta_n$, and $C_n$ represent the coefficients used in the arithmetic processing selected by the resource element selection block 303 and applied at the position n of the resource element.

In the constellation conversion block 305, it is also possible to perform operations other than the arithmetic processing selected by the resource element selection block 303.

Power Allocation

For example, the constellation conversion block 305 can perform power allocation with respect to the resource elements as given in the following equation.

$$s_n = \sqrt{p_n} |Z_n| s'_n \exp(j\theta_n) + C_n \quad (24)$$

Herein, $p_n$ represents power allocation with respect to the position n of a resource element. As an example, when the power allocation is performed by taking into account the ratio of the ON resource elements and the OFF resource elements, $p_n$ can be expressed as given in the following equation.

$$p_n = \frac{N}{\sum_g K_g} \quad (25)$$

In the case of performing power allocation based on Equation (25) given above, it becomes possible to have uniform overall electrical power and uniform average electrical power in the entire resource element block. That enables achieving improvement in the error rate per resource element.

On the other hand, if the electrical power equivalent to the OFF resource elements needs to be saved, then it is possible to adopt the power allocation $p_n$ expressed in the following equation.

$$p_n = 1 \quad (26)$$

Alternatively, it is possible to adopt the power allocation $p_n$ expressed in the following equation.

$$p_n = P \quad (27)$$

Herein, P represents a constant number not dependent on N and K.

Other Operations

The constellation conversion block 305 can further perform the following operations: constellation conversion attributed to the MIMO channel characteristics; MIMO precoding; beam formation; transmission-side channel equalization attributed to the radio propagation characteristics; and/or transmission-side power allocation.

Resource Element Mapping Block 14

The resource element mapping block 14 maps the complex signal point sequence, which is output from the constellation conversion block 305, onto physical resources (i.e., resource elements).

(2) Observations

As a result of performing the signal processing as explained above, regarding a bit count $N_B$ that is carriable in a single complex signal point sequence placed in a resource element block made of N number of resource elements, the bit count $N_B$ is expressed as given in the following equation.

$$N_B = N_{B,CM} + N_{B,RES} \quad (28)$$

This bit count $N_B$ is equivalent to the bit count of the bit sequence input to the bit selection block 302.

Herein, regarding the bit count $m_g$ representing the carriable bit count per complex signal point belonging to the complex signal point set g, the value of the bit count $m_g$ can be either same or different among the G number of complex signal point sets. The value of the bit count $m_g$ affects the value of the bit count $N_{B,\ CM}$.

For example, in the case of taking into account the signaling overhead of the control information, it is desirable that the value of the bit count $m_g$ is same among the G number of complex signal point sets. On the other hand, upon taking into account the radio propagation environment too, in the situation in which the bit count $m_g$ (and the modulation level) needs to be controlled according to the eventually-mapped physical resources, it is desirable that the value of the bit count $m_g$ is allowed to be different among the G number of complex signal point sets. The latter case can be implemented also as part of the setting/notification of the MCS (Modulation and Coding Set) based on link adaptation.

Meanwhile, in the present example, G can also be regarded as the number of types of the arithmetic processing. It is desirable that the type count G of the arithmetic processing is equal to or smaller than the count N representing the number of complex signal points included in the complex signal point sequence (equivalent to the number of resource elements included in a resource element block). Particularly, it is desirable that the type count G of the arithmetic processing is equal to one, two, or three.

(3) Flow of Processing

Figure 31:
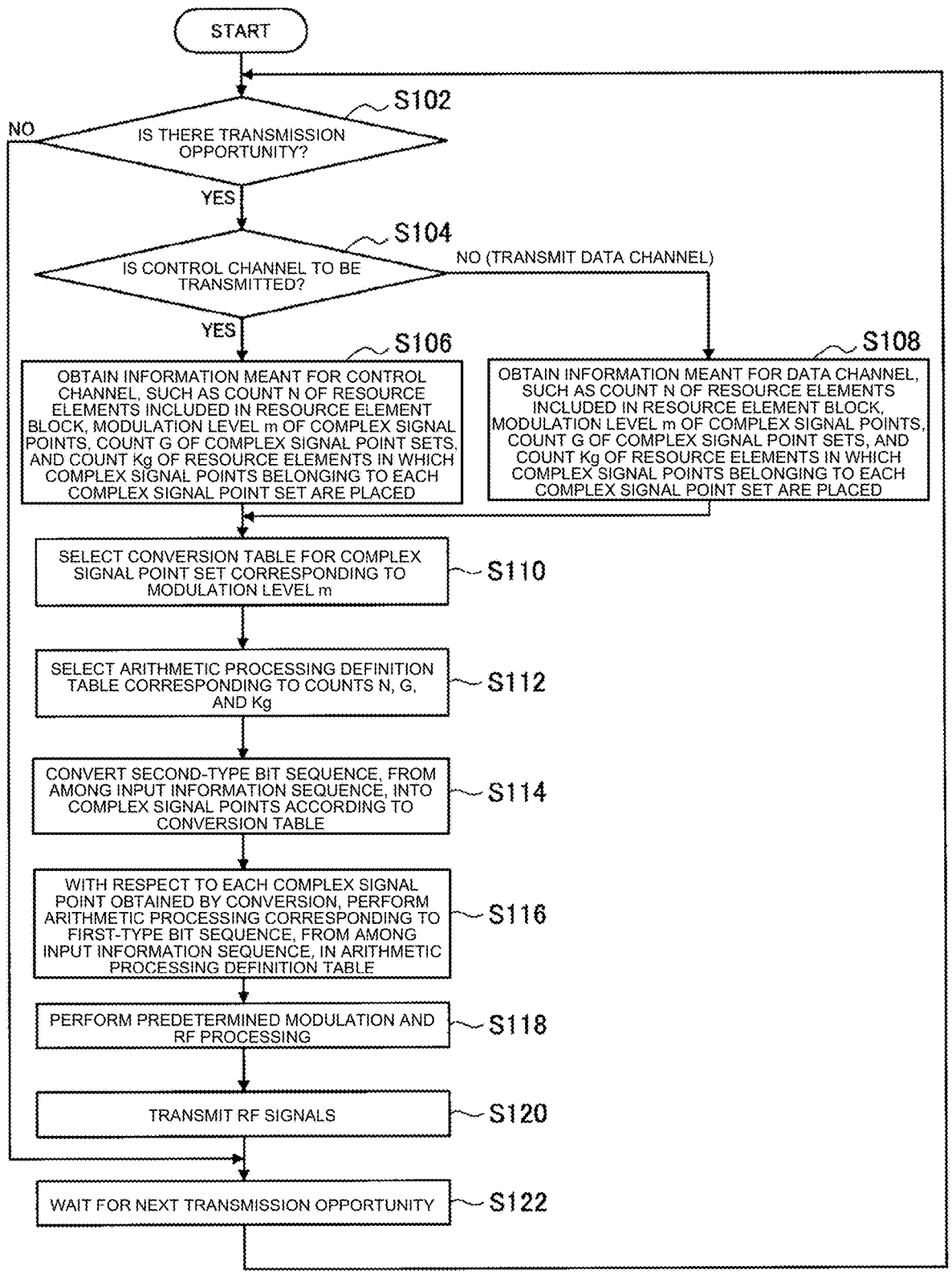
FIG. 31 is a flowchart for explaining the flow of the first example of the signal processing performed by the transmission device according to the present embodiment.

Explained below with reference to FIG. 31 is a flow of the signal processing performed in the present example explained above.

FIG. 31 is a flowchart for explaining the flow of the first example of the signal processing performed by the transmission device 100 according to the present embodiment. As illustrated in FIG. 31, firstly, the transmission device 100 determines whether or not there is a transmission opportunity (Step S102). If it is determined that there is a transmission opportunity (YES at Step S102), then the system control proceeds to Step S104. On the other hand, if it is determined that there is no transmission opportunity (No at Step S102), then the system control proceeds to Step S122.

At Step S104, the transmission device 100 determines whether or not to transmit the control channel. If it is determined to transmit the control channel (Yes at Step S104); then the system control proceeds to Step S106. On the other hand, if it is determined not to transmit the data channel (NO at Step S104); then the system control proceeds to Step S108.

At Step S106, the transmission device 100 obtains the following information meant for the control channel: the count N of the resource elements included in the resource element block; the modulation level m of the complex signal points; the count G of the complex signal point sets; and the count $K_g$ of the resource elements in which the complex signal points belonging to each complex signal point set are placed. Then, the system control proceeds to Step S110.

At Step S108, the transmission device 100 obtains the following information meant for the data channel: the count N of the resource elements included in the resource element block; the modulation level m of the complex signal points; the count G of the complex signal point sets; and the count $K_g$ of the resource elements in which the complex signal points belonging to each complex signal point set are placed. Then, the system control proceeds to Step S110.

At Step S110, the transmission device 100 selects the conversion table for the complex signal point set corresponding to the modulation level m. Then, the transmission device 100 selects the arithmetic processing definition table corresponding to the counts N, G, and $K_g$ (Step S112). Subsequently, the transmission device 100 converts the second-type bit sequence, from among the input information sequence, into complex signal points according to the conversion table selected at Step S110 (Step S114). Then, the transmission device 100 performs, with respect to each complex signal point obtained by conversion, the arithmetic processing corresponding to the first-type bit sequence, from among the input information sequence, in the arithmetic processing definition table selected at Step S112 (Step S116). Meanwhile, either before performing the arithmetic processing or after performing the arithmetic processing, the complex signal point sequence is mapped onto the resource elements.

Subsequently, the transmission device 100 performs predetermined modulation and RF processing (Step S118). Then, the transmission device 100 transmits RF signals (Step S120). Subsequently, the transmission device 100 waits for the next transmission opportunity (Step S122).

3.3.2. Second Example

In a second example, the second-type bit sequence is converted into complex signal points using the complex signal point sets corresponding to the first-type bit sequence.

(1) Configuration Example

Figure 32:
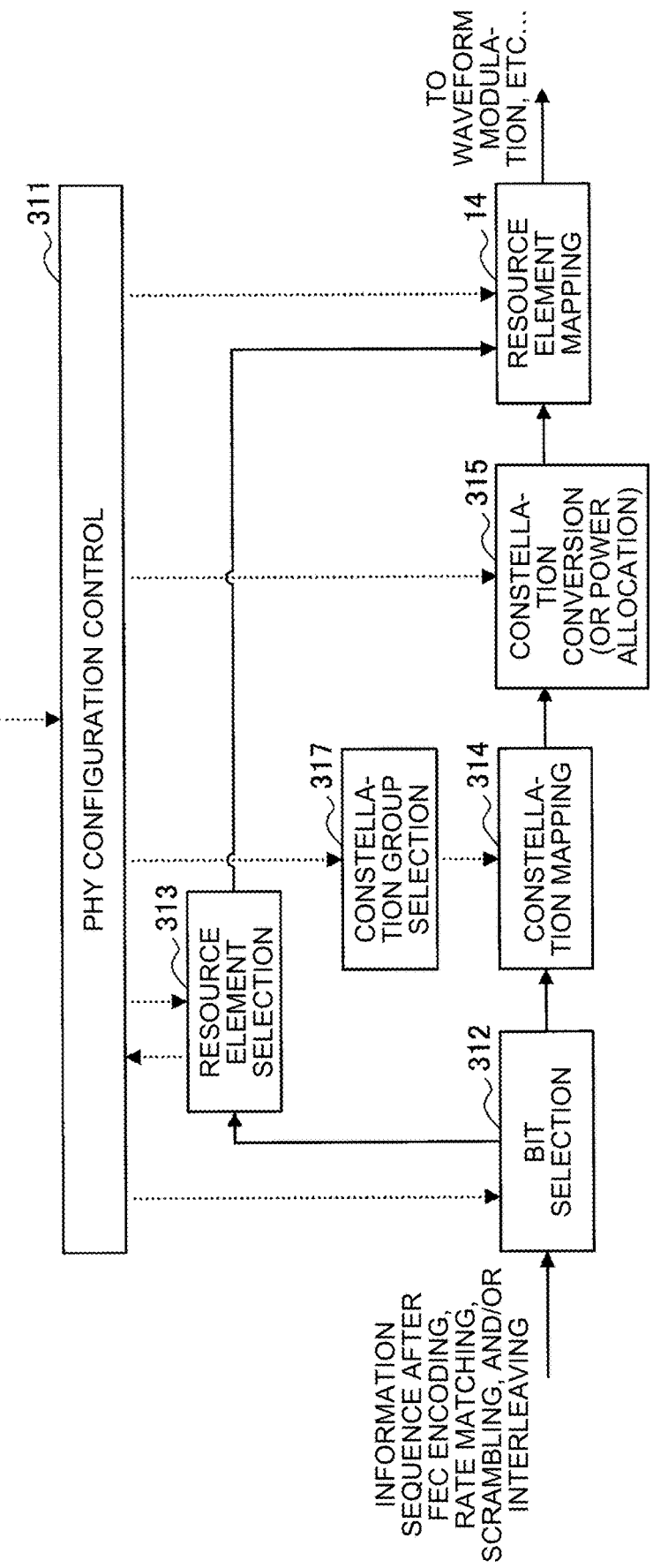
FIG. 32 is a block diagram for explaining a second example of the signal processing performed by the transmission device according to the present embodiment.

FIG. 32 is a block diagram for explaining a second example of the signal processing performed by the transmission device 100 according to the present embodiment. Of the signal processing illustrated in FIG. 1, a specific example of the signal processing performed by the constellation mapping block 13 is illustrated in detail in FIG. 32. The signal processing illustrated in FIG. 32 includes a physical layer configuration control block 311, a bit selection block 312, a resource element selection block 313, a constellation mapping block 314, a constellation conversion block 315, a constellation group selection block 317, and the resource element mapping block 14. With reference to FIG. 32, a bit sequence that has been subjected to FEC encoding, rate matching, scrambling and/or interleaving is input; is subjected to signal processing illustrated in FIG. 32; and is then subjected to waveform modulation and the like.

Physical Layer Configuration Control Block 311

The physical layer configuration control block 311 has identical functions to the physical layer configuration control block 301 explained in the first example.

Bit Selection Block 312

The bit selection block 312 has identical functions to the bit selection block 302 explained in the first example.

Resource Element Selection Block 313

The resource element selection block 313 selects, according to the first-type sequence selected by the bit selection block 312, the applicable pattern in a complex signal point sequence including a plurality of complex signal point sets. That is equivalent to specifying each complex signal point set used in the conversion from the second-type bit sequence into the complex signal points placed in the N number of resource elements. Meanwhile, the complex signal point sets that are actually used in the conversion are selected (generated) by the constellation group selection block 317 (described later).

For example, when N=4, G=2, $K_1$=1, and $K_2$=3 holds true, the relationship between the first-type bit sequence and the complex signal point sets applied with respect to the second-type bit sequence is defined according to, for example, a complex signal point set specification table given below in Table 9. This complex signal point set specification table can be specified by the physical layer configuration control block 311.

TABLE 9

Example of complex signal point set specification table
($N = 4, G = 2, K_1 = 1,$ and $K_2 = 3$)

| First-type bit sequence | | Complex signal point set used in conversion into complex signal points placed in resource elements #1 to #4 | | | | |
|---|---|---|---|---|---|---|
| bit 1 | bit 2 | #1 | #2 | #3 | #4 | Remarks |
| 0 | 0 | complex signal point set g1 | complex signal point set g2 | complex signal point set g2 | complex signal point set g2 | — |
| 0 | 1 | complex signal point set g2 | complex signal point set g1 | complex signal point set g2 | complex signal point set g2 | — |
| 1 | 0 | complex signal point set g2 | complex signal point set g2 | complex signal point set g1 | complex signal point set g2 | — |
| 1 | 1 | complex signal point set g2 | complex signal point set g2 | complex signal point set g2 | complex signal point set g1 | — |

As another example, when $N=4$, $G=2$, $K_1=2$, and $K_2=2$ holds true, the relationship between the first-type bit sequence and the complex signal point sets applied with respect to the second-type bit sequence is defined according to, for example, a complex signal point set specification table given below in Table 10. This complex signal point set specification table can be specified by the physical layer configuration control block 311.

TABLE 10

Example of complex signal point set specification table
($N = 4, G = 2, K_1 = 2,$ and $K_2 = 2$)

| First-type bit sequence | | Complex signal point set used in conversion into complex signal points placed in resource elements #1 to #4 | | | | |
|---|---|---|---|---|---|---|
| bit 1 | bit 2 | #1 | #2 | #3 | #4 | Remarks |
| 0 | 0 | complex signal point set g1 | complex signal point set g2 | complex signal point set g2 | complex signal point set g2 | — |
| 0 | 1 | complex signal point set g1 | complex signal point set g2 | complex signal point set g1 | complex signal point set g2 | — |
| 1 | 0 | complex signal point set g1 | complex signal point set g2 | complex signal point set g2 | complex signal point set g1 | — |
| 1 | 1 | complex signal point set g2 | complex signal point set g1 | complex signal point set g2 | complex signal point set g1 | — |
| N/A | N/A | complex signal point set g2 | complex signal point set g1 | complex signal point set g1 | complex signal point set g2 | Since not used in practice, need not be defined |
| N/A | N/A | complex signal point set g2 | complex signal point set g2 | complex signal point set g1 | complex signal point set g1 | |

As still another example, when $N=4$, $G=2$, $K_1=2$, and $K_2=1$ holds true, the relationship between the first-type bit sequence and the complex signal point sets applied with respect to the second-type bit sequence is defined according to, for example, a complex signal point set specification table given below in Table 11. Herein, the OFF resource elements can be obtained by applying a complex signal point set having only zero (0+j0) as the element (for example, equivalent to a complex signal point set g0, where m=0 holds true). This complex signal point set specification table can be specified by the physical layer configuration control block 311.

TABLE 11

Example of complex signal point set specification table
($N = 4, G = 2, K_1 = 2,$ and $K_2 = 1$)

| First-type bit sequence | | | Arithmetic processing applied to complex signal points placed in resource elements #1 to #4 | | | | |
|---|---|---|---|---|---|---|---|
| bit 1 | bit 2 | bit 3 | #1 | #2 | #3 | #4 | Remarks |
| 0 | 0 | 0 | complex signal point set g1 | complex signal point set g1 | complex signal point set g2 | complex signal point set g0 | — |
| 0 | 0 | 1 | complex signal point set g1 | complex signal point set g1 | complex signal point set g0 | complex signal point set g2 | — |
| 0 | 1 | 0 | complex signal point set g1 | complex signal point set g2 | complex signal point set g1 | complex signal point set g0 | — |
| 0 | 1 | 1 | complex signal point set g1 | complex signal point set g0 | complex signal point set g1 | complex signal point set g2 | — |

TABLE 11-continued

Example of complex signal point set specification table
(N = 4, G = 2, $K_1$ = 2, and $K_2$ = 1)

| First-type bit sequence | | | Arithmetic processing applied to complex signal points placed in | | | | |
|---|---|---|---|---|---|---|---|
| bit 1 | bit 2 | bit 3 | #1 | #2 | #3 | #4 | Remarks |
| 1 | 0 | 0 | complex signal point set g1 | complex signal point set g2 | complex signal point set g0 | complex signal point set g1 | |
| 1 | 0 | 1 | complex signal point set g1 | complex signal point set g0 | complex signal point set g2 | complex signal point set g1 | |
| 1 | 1 | 0 | complex signal point set g2 | complex signal point set g1 | complex signal point set g0 | complex signal point set g1 | — |
| 1 | 1 | 1 | complex signal point set g0 | complex signal point set g1 | complex signal point set g2 | complex signal point set g1 | — |
| N/A | N/A | N/A | complex signal point set g2 | complex signal point set g1 | complex signal point set g1 | complex signal point set g0 | Since not used in practice, need not be defined |
| N/A | N/A | N/A | complex signal point set g0 | complex signal point set g1 | complex signal point set g1 | complex signal point set g2 | |
| N/A | N/A | N/A | complex signal point set g2 | complex signal point set g0 | complex signal point set g1 | complex signal point set g1 | |
| N/A | N/A | N/A | complex signal point set g0 | complex signal point set g2 | complex signal point set g1 | complex signal point set g1 | |

Constellation Group Selection Block 317

The constellation group selection block 317 generates or selects a plurality of complex signal point sets selected by the resource element selection block 313, and outputs the complex signal point sets to the constellation mapping block 314.

In the case of generating complex signal point sets, the constellation group selection block 317 can generate a plurality of complex signal point sets by performing the same arithmetic processing with respect to each element of the complex signal point set serving as the base. The arithmetic processing can include amplitude changing, phase rotation, and/or linear shifting as explained in the first example. In a complex signal point set g generated by the constellation group selection block 317, an element $s_{g,a}$ is expressed using an element $s_{b,a}$ of the base complex signal point, as given in the following equation.

$$s_{g,a} = |Z_{g,b}| s_{b,a} \exp(j\theta_{g,b}) + C_{g,b}$$

$$a = 1, K, 2^{m_g} \quad (29)$$

The values of Z, θ, and C represent the conversion amount of the amplitude, the phase, and the linear shift, respectively, from the elements of the base complex signal point set. These values can be, for example, defined as a change-amount specification table given below in Table 12, and can be used by the constellation group selection block 317. The change-amount specification table can be defined for the count G of the complex signal point sets used in the modulation and for each type of the complex signal point set serving as the base (for example, defined according to FSK/ASK/PSK/QAM/ and the value of m). As the base complex signal point set, for example, a complex signal point set having the modulation method as illustrated in Table 4 to Table 8 can be used, or a subset of that complex signal point set can be used.

TABLE 12

Change-amount specification table

| | Complex signal point set g1 | Complex signal point set g2 | Complex signal point set g3 | Complex signal point set g4 |
|---|---|---|---|---|
| Amplitude | $Z_{g1,b}$ | $Z_{g2,b}$ | $Z_{g3,b}$ | $Z_{g4,b}$ |
| Phase | $\theta_{g1,b}$ | $\theta_{g2,b}$ | $\theta_{g3,b}$ | $\theta_{g4,b}$ |
| Linear shift | $C_{g1,b}$ | $C_{g2,b}$ | $C_{g3,b}$ | $C_{g4,b}$ |

Herein, in the case of attempting to generate G number of complex signal point sets (where G>1 holds true) by performing characterization based on the phase change amount, it is desirable that the difference in the values of arbitrary two different θ in the change-amount specification table is an integral multiple of π/G radian. For example, if G=2 holds true, then it is desirable that the difference in the values of θ is an integral multiple of π/2 radian. Similarly, if G=4 holds true, then it is desirable that the difference in the values of θ is an integral multiple of π/4 radian.

In the case of attempting to generate G number of complex signal point sets (where G>1 holds true) by performing characterization based on the linear shift amount, and when the count G is an even number; it is desirable that a predetermined condition regarding the linear shift C is satisfied in the change-amount specification table. More particularly, in the change-amount specification table, it is desirable that at least one of the following is satisfied: there are two linear shifts C having the relationship in which the plus and minus signs of only the real part are different; there are two linear shifts C having the relationship in which the plus and minus signs of only the imaginary part are different (i.e., a conjugate relation); and there are two linear shifts having the relationship in which the plus and minus signs of the real part and the imaginary part are different (i.e., the relationship of minus one times).

Constellation Mapping Block 314

Based on the applicable patterns of a plurality of complex signal point sets selected based on the first-type bit sequence, the constellation mapping block 314 converts the second-type bit sequence into a complex signal point sequence including complex signal points selected from each of a plurality of complex signal point sets. More particularly, based on a plurality of complex signal point sets generated or selected by the constellation group selection block 317, the constellation mapping block 314 converts the second-type bit sequence into complex signal points, and generates a complex signal point sequence. The second bit sequence is converted into a complex signal point after each m-bit partial sequence, that is, at the position of each resource element. At that time, after each m-bit partial sequence, the constellation mapping block 314 performs conversion into a complex signal point using the complex signal point sets specified by the resource element selection block 313 from among a plurality of complex signal point sets generated or selected by the constellation group selection block 317.

Constellation Conversion Block 315

Unlike the constellation conversion block 305 according to the first example, the constellation conversion block 315 does not perform arithmetic processing for characterizing a plurality of complex signal point sets. That is because characterization is already performed during the modulation performed by the constellation mapping block 314.

On the other hand, the constellation conversion block 315 can perform power allocation with respect to the resource elements. Moreover, the constellation conversion block 315 can further perform the following operations: constellation conversion attributed to the MIMO channel characteristics; MIMO precoding; beam formation; transmission-side channel equalization attributed to the radio propagation characteristics; and/or transmission-side power allocation.

Resource Element Mapping Block 14

The resource element mapping block 14 maps the complex signal point sequence, which is output from the constellation conversion block 315, onto physical resources (i.e., resource elements).

(2) Observations

As a result of performing the signal processing as explained above, regarding the bit count $N_B$ that is carriable in the complex signal point sequence placed in N number of resource elements, the bit count $N_B$ is expressed as given in the following equation.

$$N_B = N_{B,CM} + N_{B,RES} \quad (30)$$

This bit count $N_B$ is equivalent to the bit count of the bit sequence input to the bit selection block 312.

Herein, regarding the bit count $m_g$ representing the carriable bit count per complex signal point belonging to the complex signal point set g, the value of the bit count $m_g$ can be either same or different among the G number of complex signal point sets. The value of the bit count $m_g$ affects the value of the bit count $N_{B,\,CM}$.

For example, in the case of taking into account the signaling overhead of the control information, it is desirable that the value of the bit count $m_g$ is same among a plurality of complex signal point sets used in the modulation. On the other hand, upon taking into account the radio propagation environment too, in the situation in which the bit count $m_g$ (and the modulation level) needs to be controlled according to the eventually-mapped physical resources, it is desirable that the value of the bit count $m_g$ is allowed to be different among a plurality of complex signal point sets used in the modulation. The latter case can be implemented also as part of the setting/notification of the MCS (Modulation and Coding Set) based on link adaptation.

(3) Flow of Processing

Figure 33:
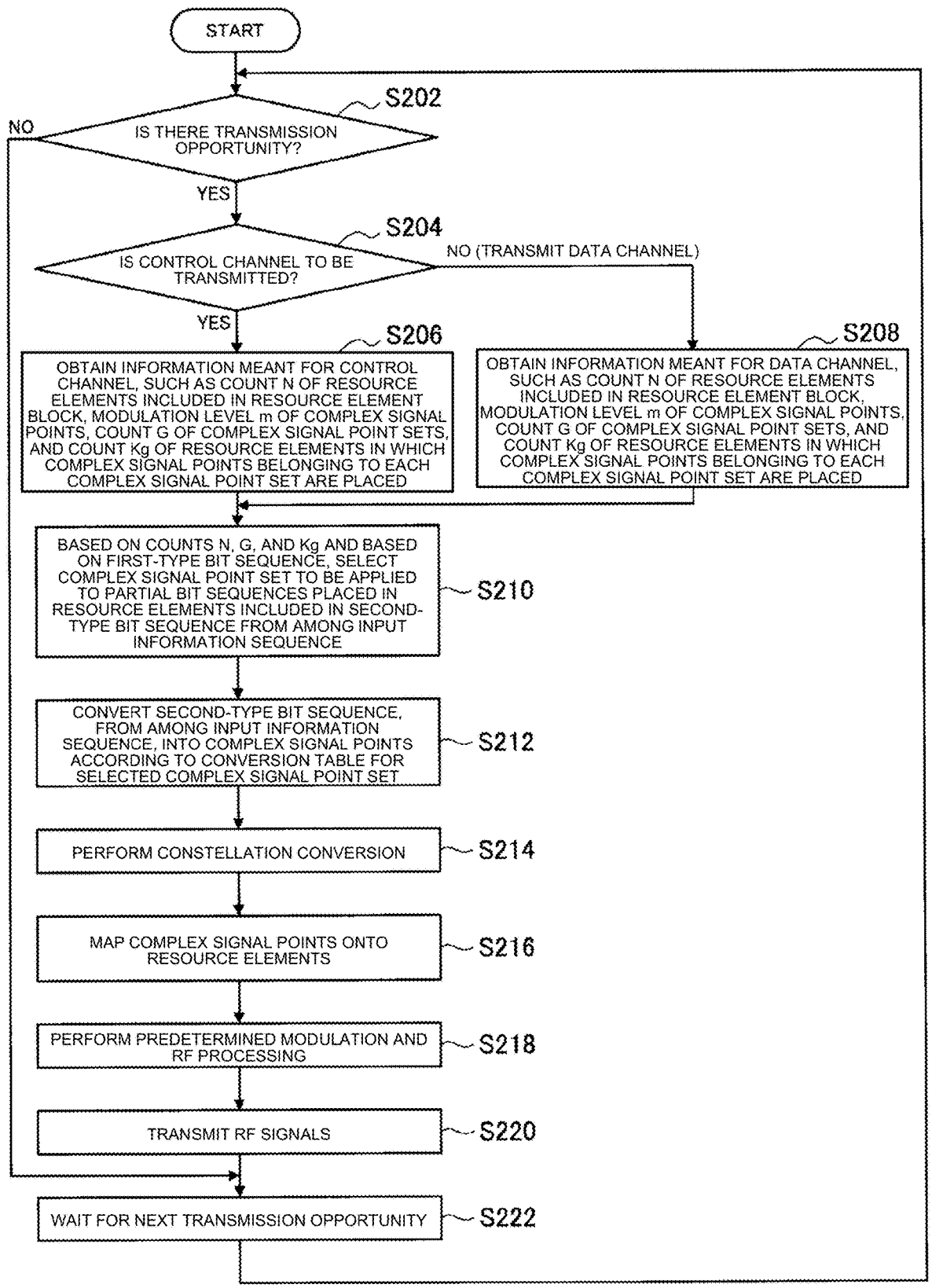
FIG. 33 is a flowchart for explaining the flow of the second example of the signal processing performed by the transmission device according to the present embodiment.

Explained below with reference to FIG. 33 is a flow of the signal processing performed in the second example explained above.

FIG. 33 is a flowchart for explaining the flow of the second example of the signal processing performed by the transmission device 100 according to the present embodiment. Herein, the operations from Step S202 to Step S208 are identical to the operations from Step S102 to Step S108, respectively, illustrated in FIG. 31.

At Step S210, based on the counts N, G, and $K_g$ and based on the first-type bit sequence, the transmission device 100 selects the complex signal point set to be applied to the partial bit sequences placed in the resource elements included in the second-type bit sequence from among the input information sequence. Then, the transmission device 100 converts the second-type bit sequence, from among the input information sequence, into complex signal points according to the conversion table for the complex signal point set selected at Step S210 (Step S212). Subsequently, the transmission device 100 performs constellation conversion (Step S214). Then, the transmission device 100 maps the post-constellation-mapping complex signal points onto the resource elements (Step S216).

Subsequently, the transmission device 100 performs predetermined modulation and RF processing (Step S218). Then, the transmission device 100 transmits RF signals (Step S220). Subsequently, the transmission device 100 waits for the next transmission opportunity (Step S222).

3.3.3. Third Example

In a third example, the correspondence relationship of the candidates for the input information sequence (the first-type bit sequence and the second-type bit sequence) with the candidates for the complex signal point sequence is defined in advance, and the input information sequences are converted into complex signal point sequence by referring to that correspondence relationship. That is, in the third example, the characterization of the complex signal point sets and the conversion into the complex signal points is performed at one go.

Configuration Example

Figure 34:
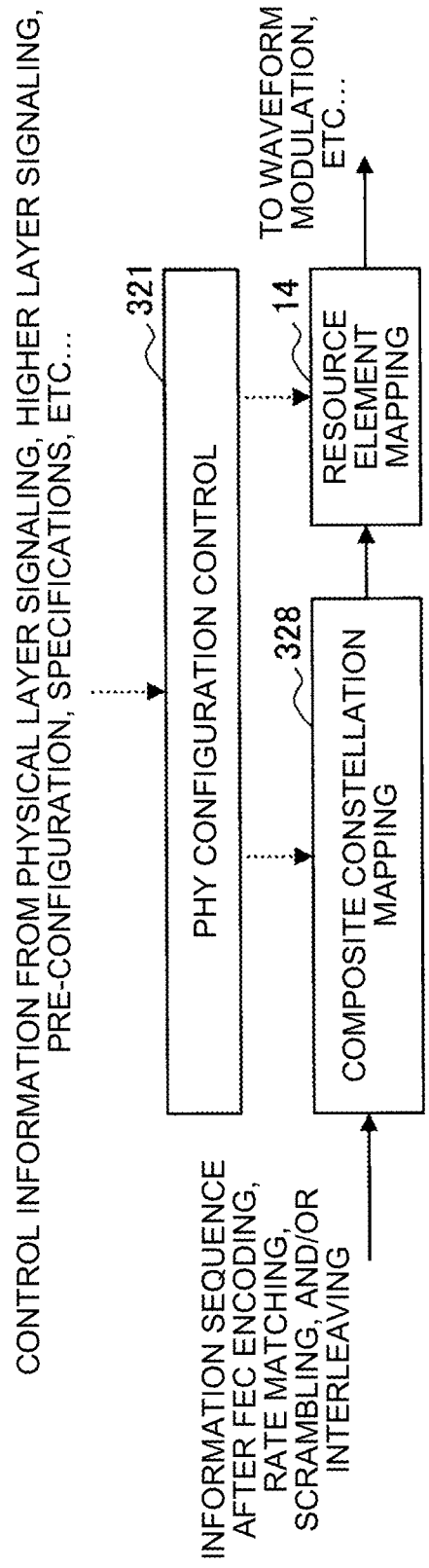
FIG. 34 is a block diagram for explaining a third example of the signal processing performed by the transmission device according to the present embodiment.

FIG. 34 is a block diagram for explaining a third example of the signal processing performed by the transmission device 100 according to the present embodiment. In FIG. 34, from among the signal processing illustrated in FIG. 1, a specific example of the signal processing performed by the constellation mapping block 13 is illustrated in detail. The signal processing illustrated in FIG. 34 includes a physical layer configuration control block 321, a composite constellation mapping block 328, and the resource element mapping block 14. With reference to FIG. 34, a bit sequence that has been subjected to FEC encoding, rate matching, scrambling and/or interleaving is input; is subjected to signal processing illustrated in FIG. 34; and is then subjected to waveform modulation and the like.

Physical Layer Configuration Control Block 321

The physical layer configuration control block 321 has identical functions to the physical layer configuration control block 301 explained in the first example.

Particularly, the physical layer configuration control block 321 outputs, to the composite constellation mapping block 328, a conversion table which corresponds to the parameters such as N, G, K, and m and in which the correspondence relationship of the candidates for the input information sequence and the candidates for the complex signal sequence is defined. For example, from a plurality of conversion tables stored in advance, the physical layer configuration control block 321 selects the conversion table corresponding to the parameters such as N, G, K, and m; and outputs that conversion table. In the conversion table, the relationship between the input information sequence input to the composite constellation mapping block 328 and the complex signal point sequence output from the composite constellation mapping block 328 is defined.

It is desirable that the contents of a conversion table include the features such as the characterization of the complex signal point sets in an identical manner to the first example and the second example. Moreover, it is desirable that the conversion table includes the following three features. The first feature is that, when the conversion table is seen row by row, either the candidates for the complex signal sequence in the conversion table do not include the zeroes or the number of zeroes is equal to or smaller than the number of non-zeroes. The second feature is that, when the conversion table is seen row by row (i.e., seen for each output with respect to the input information sequence), the candidates for the complex signal sequence either include a combination of different values of at least two or more types or include a combination of different non-zero values of at least two or more types. The third feature is that, when the conversion table is seen column by column (i.e., seen for each resource element), either the occurrence probabilities of the complex signal points are unequal or the occurrence probabilities of the non-zeroes are unequal.

Explained below with reference to Table 13 to Table 15 are examples of the conversion table.

Firstly, in Table 13 is illustrated an example of the conversion table meant for converting a 6-bit input information sequence into a complex signal point sequence that includes four complex signal points s1 to s4 placed in four resource elements. In Table 13, the complex signal point set g1 has {+1, −1} as the elements, and the complex signal point set g2 has {+j, −j} as the elements.

TABLE 13

Example of conversion table (N = 4, G = 2, $K_1$ = 1, $K_2$ = 3, $m_1$ = 1, and $m_2$ = 1)

| Input Bits | | | | | | Output complex values | | | | | | | |
|---|---|---|---|---|---|---|---|---|---|---|---|---|---|
| | | | | | | 1 | | 2 | | 3 | | 4 | |
| 1 | 2 | 3 | 4 | 5 | 6 | Complex Value s1 | (Group Index) | Complex Value s2 | (Group Index) | Complex Value s3 | (Group Index) | Complex Value s4 | (Group Index) |
| 0 | 0 | 0 | 0 | 0 | 0 | −1 | g1 | −j | g2 | −j | g2 | −j | g2 |
| 0 | 0 | 0 | 0 | 0 | 1 | −1 | g1 | −j | g2 | −j | g2 | +j | g2 |
| 0 | 0 | 0 | 0 | 1 | 0 | −1 | g1 | −j | g2 | +j | g2 | −j | g2 |
| 0 | 0 | 0 | 0 | 1 | 1 | −1 | g1 | −j | g2 | +j | g2 | +j | g2 |
| 0 | 0 | 0 | 1 | 0 | 0 | −1 | g1 | +j | g2 | −j | g2 | −j | g2 |
| 0 | 0 | 0 | 1 | 0 | 1 | −1 | g1 | +j | g2 | −j | g2 | +j | g2 |
| 0 | 0 | 0 | 1 | 1 | 0 | −1 | g1 | +j | g2 | +j | g2 | −j | g2 |
| 0 | 0 | 0 | 1 | 1 | 1 | −1 | g1 | +j | g2 | +j | g2 | +j | g2 |
| 0 | 0 | 1 | 0 | 0 | 0 | +1 | g1 | −j | g2 | −j | g2 | −j | g2 |
| 0 | 0 | 1 | 0 | 0 | 1 | +1 | g1 | −j | g2 | −j | g2 | +j | g2 |
| 0 | 0 | 1 | 0 | 1 | 0 | +1 | g1 | −j | g2 | +j | g2 | −j | g2 |
| 0 | 0 | 1 | 0 | 1 | 1 | +1 | g1 | −j | g2 | +j | g2 | +j | g2 |
| 0 | 0 | 1 | 1 | 0 | 0 | +1 | g1 | +j | g2 | −j | g2 | −j | g2 |
| 0 | 0 | 1 | 1 | 0 | 1 | +1 | g1 | +j | g2 | −j | g2 | +j | g2 |
| 0 | 0 | 1 | 1 | 1 | 0 | +1 | g1 | +j | g2 | +j | g2 | −j | g2 |
| 0 | 0 | 1 | 1 | 1 | 1 | +1 | g1 | +j | g2 | +j | g2 | +j | g2 |
| 0 | 1 | 0 | 0 | 0 | 0 | −j | g2 | −1 | g1 | −j | g2 | −j | g2 |
| 0 | 1 | 0 | 0 | 0 | 1 | −j | g2 | −1 | g1 | −j | g2 | +j | g2 |
| 0 | 1 | 0 | 0 | 1 | 0 | −j | g2 | −1 | g1 | +j | g2 | −j | g2 |
| 0 | 1 | 0 | 0 | 1 | 1 | −j | g2 | −1 | g1 | +j | g2 | +j | g2 |
| 0 | 1 | 0 | 1 | 0 | 0 | −j | g2 | +1 | g1 | −j | g2 | −j | g2 |
| 0 | 1 | 0 | 1 | 0 | 1 | −j | g2 | +1 | g1 | −j | g2 | +j | g2 |
| 0 | 1 | 0 | 1 | 1 | 0 | −j | g2 | +1 | g1 | +j | g2 | −j | g2 |
| 0 | 1 | 0 | 1 | 1 | 1 | −j | g2 | +1 | g1 | +j | g2 | +j | g2 |
| 0 | 1 | 1 | 0 | 0 | 0 | +j | g2 | −1 | g1 | −j | g2 | −j | g2 |
| 0 | 1 | 1 | 0 | 0 | 1 | +j | g2 | −1 | g1 | −j | g2 | +j | g2 |
| 0 | 1 | 1 | 0 | 1 | 0 | +j | g2 | −1 | g1 | +j | g2 | −j | g2 |
| 0 | 1 | 1 | 0 | 1 | 1 | +j | g2 | −1 | g1 | +j | g2 | +j | g2 |
| 0 | 1 | 1 | 1 | 0 | 0 | +j | g2 | +1 | g1 | −j | g2 | −j | g2 |
| 0 | 1 | 1 | 1 | 0 | 1 | +j | g2 | +1 | g1 | −j | g2 | +j | g2 |
| 0 | 1 | 1 | 1 | 1 | 0 | +j | g2 | +1 | g1 | +j | g2 | −j | g2 |

TABLE 13-continued

Example of conversion table (N = 4, G = 2, $K_1$ = 1, $K_2$ = 3, $m_1$ = 1, and $m_2$ = 1)

| Input Bits | | | | | | Output complex values | | | | | | | |
|---|---|---|---|---|---|---|---|---|---|---|---|---|---|
| | | | | | | 1 | | 2 | | 3 | | 4 | |
| 1 | 2 | 3 | 4 | 5 | 6 | Complex Value s1 | (Group Index) | Complex Value s2 | (Group Index) | Complex Value s3 | (Group Index) | Complex Value s4 | (Group Index) |
| 0 | 1 | 1 | 1 | 1 | 1 | +j | g2 | +1 | g1 | +j | g2 | +j | g2 |
| 1 | 0 | 0 | 0 | 0 | 0 | −j | g2 | −j | g2 | −1 | g1 | −j | g2 |
| 1 | 0 | 0 | 0 | 0 | 1 | −j | g2 | −j | g2 | −1 | g1 | +j | g2 |
| 1 | 0 | 0 | 0 | 1 | 0 | −j | g2 | −j | g2 | +1 | g1 | −j | g2 |
| 1 | 0 | 0 | 0 | 1 | 1 | −j | g2 | −j | g2 | +1 | g1 | +j | g2 |
| 1 | 0 | 0 | 1 | 0 | 0 | −j | g2 | +j | g2 | −1 | g1 | −j | g2 |
| 1 | 0 | 0 | 1 | 0 | 1 | −j | g2 | +j | g2 | −1 | g1 | +j | g2 |
| 1 | 0 | 0 | 1 | 1 | 0 | −j | g2 | +j | g2 | +1 | g1 | −j | g2 |
| 1 | 0 | 0 | 1 | 1 | 1 | −j | g2 | +j | g2 | +1 | g1 | +j | g2 |
| 1 | 0 | 1 | 0 | 0 | 0 | +j | g2 | −j | g2 | −1 | g1 | −j | g2 |
| 1 | 0 | 1 | 0 | 0 | 1 | +j | g2 | −j | g2 | −1 | g1 | +j | g2 |
| 1 | 0 | 1 | 0 | 1 | 0 | +j | g2 | −j | g2 | +1 | g1 | −j | g2 |
| 1 | 0 | 1 | 0 | 1 | 1 | +j | g2 | −j | g2 | +1 | g1 | +j | g2 |
| 1 | 0 | 1 | 1 | 0 | 0 | +j | g2 | +j | g2 | −1 | g1 | −j | g2 |
| 1 | 0 | 1 | 1 | 0 | 1 | +j | g2 | +j | g2 | −1 | g1 | +j | g2 |
| 1 | 0 | 1 | 1 | 1 | 0 | +j | g2 | +j | g2 | +1 | g1 | −j | g2 |
| 1 | 0 | 1 | 1 | 1 | 1 | +j | g2 | +j | g2 | +1 | g1 | +j | g2 |
| 1 | 1 | 0 | 0 | 0 | 0 | −j | g2 | −j | g2 | −j | g2 | −1 | g1 |
| 1 | 1 | 0 | 0 | 0 | 1 | −j | g2 | −j | g2 | −j | g2 | +1 | g1 |
| 1 | 1 | 0 | 0 | 1 | 0 | −j | g2 | −j | g2 | +j | g2 | −1 | g1 |
| 1 | 1 | 0 | 0 | 1 | 1 | −j | g2 | −j | g2 | +j | g2 | +1 | g1 |
| 1 | 1 | 0 | 1 | 0 | 0 | −j | g2 | +j | g2 | −j | g2 | −1 | g1 |
| 1 | 1 | 0 | 1 | 0 | 1 | −j | g2 | +j | g2 | −j | g2 | +1 | g1 |
| 1 | 1 | 0 | 1 | 1 | 0 | −j | g2 | +j | g2 | +j | g2 | −1 | g1 |
| 1 | 1 | 0 | 1 | 1 | 1 | −j | g2 | +j | g2 | +j | g2 | +1 | g1 |
| 1 | 1 | 1 | 0 | 0 | 0 | +j | g2 | −j | g2 | −j | g2 | −1 | g1 |
| 1 | 1 | 1 | 0 | 0 | 1 | +j | g2 | −j | g2 | −j | g2 | +1 | g1 |
| 1 | 1 | 1 | 0 | 1 | 0 | +j | g2 | −j | g2 | +j | g2 | −1 | g1 |
| 1 | 1 | 1 | 0 | 1 | 1 | +j | g2 | −j | g2 | +j | g2 | +1 | g1 |
| 1 | 1 | 1 | 1 | 0 | 0 | +j | g2 | +j | g2 | −j | g2 | −1 | g1 |
| 1 | 1 | 1 | 1 | 0 | 1 | +j | g2 | +j | g2 | −j | g2 | +1 | g1 |
| 1 | 1 | 1 | 1 | 1 | 0 | +j | g2 | +j | g2 | +j | g2 | −1 | g1 |
| 1 | 1 | 1 | 1 | 1 | 1 | +j | g2 | +j | g2 | +j | g2 | +1 | g1 |

In Table 13, the "(Group Index)" columns about the indexes (g1 and g2) of the complex signal point sets are given just for reference, and the conversion table need not include those columns. Moreover, in Table 13, the columns of the values of the complex signal points (such as the "Complex Value s1" column) can be written by dividing them into the real part (I-axis) and the imaginary part (Q-axis). For example, "+1" can also be written as "I=+1" and "Q=0"; while "−j" can also be written as "I=0" and "Q=−1".

With reference to Table 13, the first two bits of the input information sequence (i.e., the columns of "1" and "2" of "Input Bits") represent first-type bits. For that reason, the first two bits of the input information sequence correspond to the applicable pattern, in the complex signal sequence, of a plurality of complex signal point sets used in the modulation. More specifically, if the first two bits of the input information sequence are "00"; then g1, g2, g2, g2 represents the applicable pattern. If the first two bits of the input information sequence are "01"; then g2, g1, g2, g2 represents the applicable pattern. If the first two bits of the input information sequence are "10"; then g2, g2, g1, g2 represents the applicable pattern. If the first two bits of the input information sequence are "11"; then g2, g2, g2, g1 represents the applicable pattern.

With reference to FIG. 13, the remaining four bits of the input information sequence (i.e., the columns of "3", "4", "5", and "6" of "Input Bits") represent second-type bits. More specifically, the third bit of the input information sequence is converted into the first complex signal point of the complex signal point sequence. The fourth bit of the input information sequence is converted into the second complex signal point of the complex signal point sequence. The fifth bit of the input information sequence is converted into the third complex signal point of the complex signal point sequence. The sixth bit of the input information sequence is converted into the fourth complex signal point of the complex signal point sequence.

In the conversion table illustrated in Table 13, since no row includes zeroes, the conversion table has the first feature explained earlier. Moreover, in the conversion table illustrated in Table 13, since each row includes a combination of different values of two types, such as {+1, +j}, {+1, −j}, {−1, +j}, or {−1, −j}; the conversion table has the second feature explained earlier. Furthermore, in the conversion table illustrated in Table 13, since the occurrence probability of {+1, −1} is lower than the occurrence probability of {+j, −j} in each column; the conversion table has the third feature explained earlier.

In Table 14 is illustrated an example of the conversion table meant for converting a 6-bit input information sequence into a complex signal point sequence that includes four complex signal points s1 to s4 placed in four resource elements. In Table 14 too, the complex signal point set g1 has {+1, −1} as the elements, and the complex signal point set g2 has {+j, −j} as the elements.

TABLE 14

Example of conversion table (N = 4, G = 2, $K_1$ = 1, $K_2$ = 2, $m_1$ = 1, and $m_2$ = 1)

| Input Bits | | | | | | Output Complex Values | | | | | | | |
|---|---|---|---|---|---|---|---|---|---|---|---|---|---|
| | | | | | | 1 | | 2 | | 3 | | 4 | |
| 1 | 2 | 3 | 4 | 5 | 6 | Complex Value s1 | (Group Index) | Complex Value s2 | (Group Index) | Complex Value s3 | (Group Index) | Complex Value s4 | (Group Index) |
| 0 | 0 | 0 | 0 | 0 | 0 | −1 | g1 | −1 | g1 | −j | g2 | −j | g2 |
| 0 | 0 | 0 | 0 | 0 | 1 | −1 | g1 | −1 | g1 | −j | g2 | +j | g2 |
| 0 | 0 | 0 | 0 | 1 | 0 | −1 | g1 | −1 | g1 | +j | g2 | −j | g2 |
| 0 | 0 | 0 | 0 | 1 | 1 | −1 | g1 | −1 | g1 | +j | g2 | +j | g2 |
| 0 | 0 | 0 | 1 | 0 | 0 | −1 | g1 | +1 | g1 | −j | g2 | −j | g2 |
| 0 | 0 | 0 | 1 | 0 | 1 | −1 | g1 | +1 | g1 | −j | g2 | +j | g2 |
| 0 | 0 | 0 | 1 | 1 | 0 | −1 | g1 | +1 | g1 | +j | g2 | −j | g2 |
| 0 | 0 | 0 | 1 | 1 | 1 | −1 | g1 | +1 | g1 | +j | g2 | +j | g2 |
| 0 | 0 | 1 | 0 | 0 | 0 | +1 | g1 | −1 | g1 | −j | g2 | −j | g2 |
| 0 | 0 | 1 | 0 | 0 | 1 | +1 | g1 | −1 | g1 | −j | g2 | +j | g2 |
| 0 | 0 | 1 | 0 | 1 | 0 | +1 | g1 | −1 | g1 | +j | g2 | −j | g2 |
| 0 | 0 | 1 | 0 | 1 | 1 | +1 | g1 | −1 | g1 | +j | g2 | +j | g2 |
| 0 | 0 | 1 | 1 | 0 | 0 | +1 | g1 | +1 | g1 | −j | g2 | −j | g2 |
| 0 | 0 | 1 | 1 | 0 | 1 | +1 | g1 | +1 | g1 | −j | g2 | +j | g2 |
| 0 | 0 | 1 | 1 | 1 | 0 | +1 | g1 | +1 | g1 | +j | g2 | −j | g2 |
| 0 | 0 | 1 | 1 | 1 | 1 | +1 | g1 | +1 | g1 | +j | g2 | +j | g2 |
| 0 | 1 | 0 | 0 | 0 | 0 | −j | g2 | −1 | g1 | −1 | g1 | −j | g2 |
| 0 | 1 | 0 | 0 | 0 | 1 | −j | g2 | −1 | g1 | −1 | g1 | +j | g2 |
| 0 | 1 | 0 | 0 | 1 | 0 | −j | g2 | −1 | g1 | +1 | g1 | −j | g2 |
| 0 | 1 | 0 | 0 | 1 | 1 | −j | g2 | −1 | g1 | +1 | g1 | +j | g2 |
| 0 | 1 | 0 | 1 | 0 | 0 | −j | g2 | +1 | g1 | −1 | g1 | −j | g2 |
| 0 | 1 | 0 | 1 | 0 | 1 | −j | g2 | +1 | g1 | −1 | g1 | +j | g2 |
| 0 | 1 | 0 | 1 | 1 | 0 | −j | g2 | +1 | g1 | +1 | g1 | −j | g2 |
| 0 | 1 | 0 | 1 | 1 | 1 | −j | g2 | +1 | g1 | +1 | g1 | +j | g2 |
| 0 | 1 | 1 | 0 | 0 | 0 | +j | g2 | −1 | g1 | −1 | g1 | −j | g2 |
| 0 | 1 | 1 | 0 | 0 | 1 | +j | g2 | −1 | g1 | −1 | g1 | +j | g2 |
| 0 | 1 | 1 | 0 | 1 | 0 | +j | g2 | −1 | g1 | +1 | g1 | −j | g2 |
| 0 | 1 | 1 | 0 | 1 | 1 | +j | g2 | −1 | g1 | +1 | g1 | +j | g2 |
| 0 | 1 | 1 | 1 | 0 | 0 | +j | g2 | +1 | g1 | −1 | g1 | −j | g2 |
| 0 | 1 | 1 | 1 | 0 | 1 | +j | g2 | +1 | g1 | −1 | g1 | +j | g2 |
| 0 | 1 | 1 | 1 | 1 | 0 | +j | g2 | +1 | g1 | +1 | g1 | −j | g2 |
| 0 | 1 | 1 | 1 | 1 | 1 | +j | g2 | +1 | g1 | +1 | g1 | +j | g2 |
| 1 | 0 | 0 | 0 | 0 | 0 | −1 | g1 | −j | g2 | −1 | g1 | −j | g2 |
| 1 | 0 | 0 | 0 | 0 | 1 | −1 | g1 | −j | g2 | −1 | g1 | +j | g2 |
| 1 | 0 | 0 | 0 | 1 | 0 | −1 | g1 | −j | g2 | +1 | g1 | −j | g2 |
| 1 | 0 | 0 | 0 | 1 | 1 | −1 | g1 | −j | g2 | +1 | g1 | +j | g2 |
| 1 | 0 | 0 | 1 | 0 | 0 | −1 | g1 | +j | g2 | −1 | g1 | −j | g2 |
| 1 | 0 | 0 | 1 | 0 | 1 | −1 | g1 | +j | g2 | −1 | g1 | +j | g2 |
| 1 | 0 | 0 | 1 | 1 | 0 | −1 | g1 | +j | g2 | +1 | g1 | −j | g2 |
| 1 | 0 | 0 | 1 | 1 | 1 | −1 | g1 | +j | g2 | +1 | g1 | +j | g2 |
| 1 | 0 | 1 | 0 | 0 | 0 | +1 | g1 | −j | g2 | −1 | g1 | −j | g2 |
| 1 | 0 | 1 | 0 | 0 | 1 | +1 | g1 | −j | g2 | −1 | g1 | +j | g2 |
| 1 | 0 | 1 | 0 | 1 | 0 | +1 | g1 | −j | g2 | +1 | g1 | −j | g2 |
| 1 | 0 | 1 | 0 | 1 | 1 | +1 | g1 | −j | g2 | +1 | g1 | +j | g2 |
| 1 | 0 | 1 | 1 | 0 | 0 | +1 | g1 | +j | g2 | −1 | g1 | −j | g2 |
| 1 | 0 | 1 | 1 | 0 | 1 | +1 | g1 | +j | g2 | −1 | g1 | +j | g2 |
| 1 | 0 | 1 | 1 | 1 | 0 | +1 | g1 | +j | g2 | +1 | g1 | −j | g2 |
| 1 | 0 | 1 | 1 | 1 | 1 | +1 | g1 | +j | g2 | +1 | g1 | +j | g2 |
| 1 | 1 | 0 | 0 | 0 | 0 | −1 | g1 | −j | g2 | −j | g2 | −1 | g1 |
| 1 | 1 | 0 | 0 | 0 | 1 | −1 | g1 | −j | g2 | −j | g2 | +1 | g1 |
| 1 | 1 | 0 | 0 | 1 | 0 | −1 | g1 | −j | g2 | +j | g2 | −1 | g1 |
| 1 | 1 | 0 | 0 | 1 | 1 | −1 | g1 | −j | g2 | +j | g2 | +1 | g1 |
| 1 | 1 | 0 | 1 | 0 | 0 | −1 | g1 | +j | g2 | −j | g2 | −1 | g1 |
| 1 | 1 | 0 | 1 | 0 | 1 | −1 | g1 | +j | g2 | −j | g2 | +1 | g1 |
| 1 | 1 | 0 | 1 | 1 | 0 | −1 | g1 | +j | g2 | +j | g2 | −1 | g1 |
| 1 | 1 | 0 | 1 | 1 | 1 | −1 | g1 | +j | g2 | +j | g2 | +1 | g1 |
| 1 | 1 | 1 | 0 | 0 | 0 | +1 | g1 | −j | g2 | −j | g2 | −1 | g1 |
| 1 | 1 | 1 | 0 | 0 | 1 | +1 | g1 | −j | g2 | −j | g2 | +1 | g1 |
| 1 | 1 | 1 | 0 | 1 | 0 | +1 | g1 | −j | g2 | +j | g2 | −1 | g1 |
| 1 | 1 | 1 | 0 | 1 | 1 | +1 | g1 | −j | g2 | +j | g2 | +1 | g1 |
| 1 | 1 | 1 | 1 | 0 | 0 | +1 | g1 | +j | g2 | −j | g2 | −1 | g1 |
| 1 | 1 | 1 | 1 | 0 | 1 | +1 | g1 | +j | g2 | −j | g2 | +1 | g1 |
| 1 | 1 | 1 | 1 | 1 | 0 | +1 | g1 | +j | g2 | +j | g2 | −1 | g1 |
| 1 | 1 | 1 | 1 | 1 | 1 | +1 | g1 | +j | g2 | +j | g2 | +1 | g1 |

In Table 15 is illustrated an example of the conversion table meant for converting a 5-bit input information sequence into a complex signal point sequence that includes four complex signal points s1 to s4 placed in four resource elements. In Table 15, the complex signal point set g1 has $\{+1, -1\}$ as the elements, the complex signal point set g2 has $\{+j, -j\}$ as the elements, and the complex signal point set g3 has $\{0\}$ as the element.

TABLE 15

Example of conversion table (N = 4, G = 3, $K_1$ = 1, $K_2$ = 1, $K_3$ = 2, $m_1$ = 1, $m_2$ = 1, and $m_3$ = 0)

| Input Bits | | | | | Output Complex Values | | | | | | | |
|---|---|---|---|---|---|---|---|---|---|---|---|---|
| | | | | | 1 | | 2 | | 3 | | 4 | |
| 1 | 2 | 3 | 4 | 5 | Complex Value s1 | (Group Index) | Complex Value s2 | (Group Index) | Complex Value s3 | (Group Index) | Complex Value s4 | (Group Index) |
| 0 | 0 | 0 | 0 | 0 | −1 | g1 | 0 | g3 | 0 | g3 | −j | g2 |
| 0 | 0 | 0 | 0 | 1 | −1 | g1 | 0 | g3 | 0 | g3 | +j | g2 |
| 0 | 0 | 0 | 1 | 0 | +1 | g1 | 0 | g3 | 0 | g3 | −j | g2 |
| 0 | 0 | 0 | 1 | 1 | +1 | g1 | 0 | g3 | 0 | g3 | +j | g2 |
| 0 | 0 | 1 | 0 | 0 | −1 | g1 | 0 | g3 | −j | g2 | 0 | g3 |
| 0 | 0 | 1 | 0 | 1 | −1 | g1 | 0 | g3 | +j | g2 | 0 | g3 |
| 0 | 0 | 1 | 1 | 0 | +1 | g1 | 0 | g3 | −j | g2 | 0 | g3 |
| 0 | 0 | 1 | 1 | 1 | +1 | g1 | 0 | g3 | +j | g2 | 0 | g3 |
| 0 | 1 | 0 | 0 | 0 | −1 | g1 | −j | g2 | 0 | g3 | 0 | g3 |
| 0 | 1 | 0 | 0 | 1 | −1 | g1 | +j | g2 | 0 | g3 | 0 | g3 |
| 0 | 1 | 0 | 1 | 0 | +1 | g1 | −j | g2 | 0 | g3 | 0 | g3 |
| 0 | 1 | 0 | 1 | 1 | +1 | g1 | +j | g2 | 0 | g3 | 0 | g3 |
| 0 | 1 | 1 | 0 | 0 | 0 | g3 | −1 | g1 | 0 | g3 | −j | g2 |
| 0 | 1 | 1 | 0 | 1 | 0 | g3 | −1 | g1 | 0 | g3 | +j | g2 |
| 0 | 1 | 1 | 1 | 0 | 0 | g3 | +1 | g1 | 0 | g3 | −j | g2 |
| 0 | 1 | 1 | 1 | 1 | 0 | g3 | +1 | g1 | 0 | g3 | +j | g2 |
| 1 | 0 | 0 | 0 | 0 | 0 | g3 | −1 | g1 | −j | g2 | 0 | g3 |
| 1 | 0 | 0 | 0 | 1 | 0 | g3 | −1 | g1 | +j | g2 | 0 | g3 |
| 1 | 0 | 0 | 1 | 0 | 0 | g3 | +1 | g1 | −j | g2 | 0 | g3 |
| 1 | 0 | 0 | 1 | 1 | 0 | g3 | +1 | g1 | +j | g2 | 0 | g3 |
| 1 | 0 | 1 | 0 | 0 | −j | g2 | −1 | g1 | 0 | g3 | 0 | g3 |
| 1 | 0 | 1 | 0 | 1 | +j | g2 | −1 | g1 | 0 | g3 | 0 | g3 |
| 1 | 0 | 1 | 1 | 0 | −j | g2 | +1 | g1 | 0 | g3 | 0 | g3 |
| 1 | 0 | 1 | 1 | 1 | +j | g2 | +1 | g1 | 0 | g3 | 0 | g3 |
| 1 | 1 | 0 | 0 | 0 | 0 | g3 | 0 | g3 | −1 | g1 | −j | g2 |
| 1 | 1 | 0 | 0 | 1 | 0 | g3 | 0 | g3 | −1 | g1 | +j | g2 |
| 1 | 1 | 0 | 1 | 0 | 0 | g3 | 0 | g3 | +1 | g1 | −j | g2 |
| 1 | 1 | 0 | 1 | 1 | 0 | g3 | 0 | g3 | +1 | g1 | +j | g2 |
| 1 | 1 | 1 | 0 | 0 | 0 | g3 | −j | g2 | 0 | g3 | −1 | g1 |
| 1 | 1 | 1 | 0 | 1 | 0 | g3 | +j | g2 | 0 | g3 | −1 | g1 |
| 1 | 1 | 1 | 1 | 0 | 0 | g3 | −j | g2 | 0 | g3 | +1 | g1 |
| 1 | 1 | 1 | 1 | 1 | 0 | g3 | +j | g2 | 0 | g3 | +1 | g1 |

In the conversion table illustrated in Table 15, since each row has two non-zeroes and two zeroes, the conversion table has the first feature explained earlier. Moreover, in the conversion table illustrated in Table 15, since each row includes a combination of different values of two types, such as $\{+1, +j\}$, $\{+1, -j\}$, $\{-1, +j\}$, or $\{-1, -j\}$; the conversion table has the second feature explained earlier. Furthermore, in the conversion table illustrated in Table 15, since the occurrence probabilities of the values are unequal in each column; the conversion table has the third feature explained earlier.

Composite Constellation Mapping Block 328

The composite constellation mapping block 328 converts an input information sequence into a complex signal sequence based on a conversion table obtained from the physical layer configuration control block 321.

Resource Element Mapping Block 14

The resource element mapping block 14 maps the complex signal point sequence, which is output from the composite constellation mapping block 328, onto the physical resources (i.e., the resource elements).

(2) Flow of Processing

Figure 35:
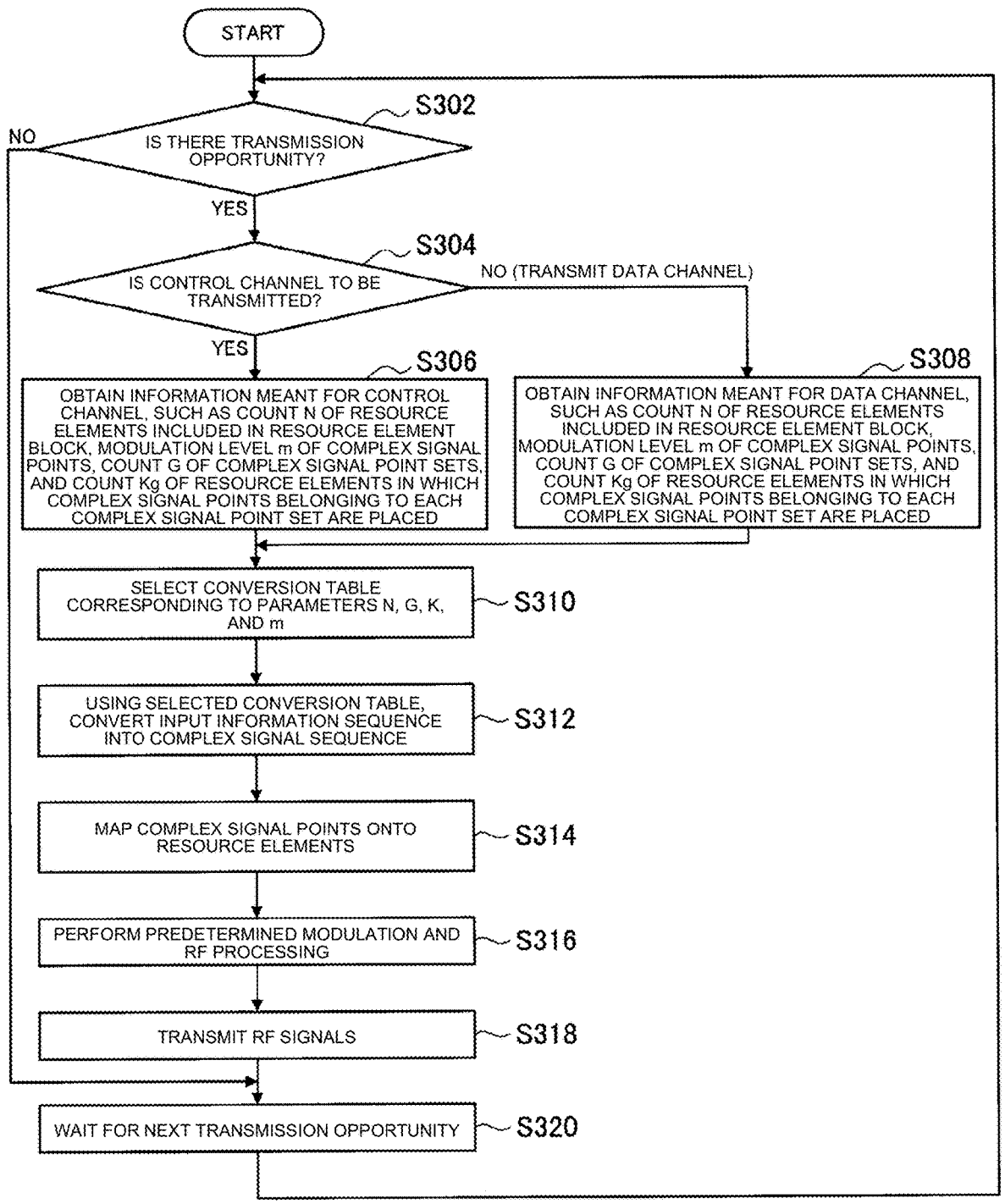
FIG. 35 is a flowchart for explaining the flow of the third example of the signal processing performed by the transmission device according to the present embodiment.

Explained below with reference to FIG. 35 is a flow of the signal processing performed in the present example explained above.

FIG. 35 is a flowchart for explaining the flow of the third example of the signal processing performed by the transmission device 100 according to the present embodiment. Herein, the operations from Step S302 to Step S308 are identical to the operations from Step S102 to Step S108 illustrated in FIG. 31.

At Step S310, the transmission device 100 selects the conversion table corresponding to the parameters N, G, K, and m. Then, using the conversion table selected at Step S310, the transmission device 100 converts the input information sequence into a complex signal sequence (Step S312). Subsequently, the transmission device 100 maps the complex signal points onto the resource elements (Step S314).

Then, the transmission device 100 performs predetermined modulation and RF processing (Step S316). Subsequently, the transmission device 100 transmits RF signals (Step S318). Then, the transmission device 100 waits for the next transmission opportunity (Step S320).

Meanwhile, regardless of whether the parameters N, G, K, and m are the same; if a different type of physical channel is used for signal transmission, then a different conversion table can be referred to. That is, at Step S310, the transmission device 100 can select the conversion table further based on the type of the channel for transmission. For example, for a physical channel of the control channel type and a physical channel of the data channel (shared channel) type, different conversion tables can be referred to. Examples of the physical channel of the control channel type include the physical downlink control channel, the physical uplink control channel, the physical sidelink control channel, the preamble field in packets, the signal field in packets, the physical broadcast channel, and the physical random access channel. Examples of the physical channel of the data channel type include the physical downlink data channel, the physical uplink data channel, the physical sidelink data channel, the physical downlink shared channel, the physical uplink shared channel, the physical sidelink channel, and the payload field in packets.

Regarding the control channel type, although the required data rate is not very high, it is desirable that the transmission quality has high reliability. Thus, as compared to the data channel type, it is desirable that the control channel type has relatively smaller values of G and m. Moreover, in the control channel type, by setting the parameter N to be greater than the parameter K, the ratio of zeroes can be increased as compared to the data channel type.

3.4. Combinations with Various Types of Waveforms (1) Overview

The proposed technology can be combined with arbitrary waveforms, such as waveforms of multi-carrier modulation or single-carrier modulation. In that case, the details of the operations performed in the waveform modulation block 15 illustrated in FIG. 1 differ according to the differences in the waveforms. Examples of multi-carrier modulation include OFDM (Orthogonal Frequency Division Multiplexing), GFDM (Generalized Frequency Division Multiplexing), F-OFDM (Filtered OFDM), UF-OFDM (Universal Filtered OFDM), and FBMC (Filter Bank Multi-Carrier). Examples of single-carrier modulation include SC-FDE (Single-Carrier Modulation with Frequency Domain Equalization), SC-FDMA (Single-Carrier Frequency Division Multiple Access), and DFT-S-OFDM (Discrete Fourier Transform Spread OFDM).

It is desirable that the count N of the resource elements included in a resource element block is appropriately set according to the physical parameters of the waveforms. The setting of the count N is performed by, for example, a resource element mapping block (i.e., the resource element mapping block 14 illustrated in FIGS. 1, 30, 32, and 34).

As a first example of appropriate setting of the count N, for each unit resource allocation in the frequency direction, the number of available subcarriers for transmission such as resource blocks (equivalent to the number of resource elements) can be divided evenly by the count N. As a second example of appropriate setting of the count N, for each unit resource allocation in the time direction, the number of available subcarriers for transmission such as sub-frames or slots (equivalent to the number of resource elements) can be divided evenly by the count N. As a third example of appropriate setting of the count N, for each unit resource allocation including frequency and time, the number of available resource elements for transmission can be divided evenly by the count N.

Herein, it is assumed that the number of available resource elements for transmission does not include the number of signals such as reference signals that are not mainly aimed at carrying information (data of the upper layers, control information, and system information), and does not include the number of resource elements used by other users.

(2) Exception Handling of First Category

As explained above, it is desirable that the number of available resource elements for transmission are divisible evenly by the count N of the resource elements included in a resource element block. That is, it is desirable that the number of available resource elements for transmission is an integral multiple of the count N.

Of course, the number of available resource elements for transmission is allowed not to be an integral multiple of the count N.

Figure 36:
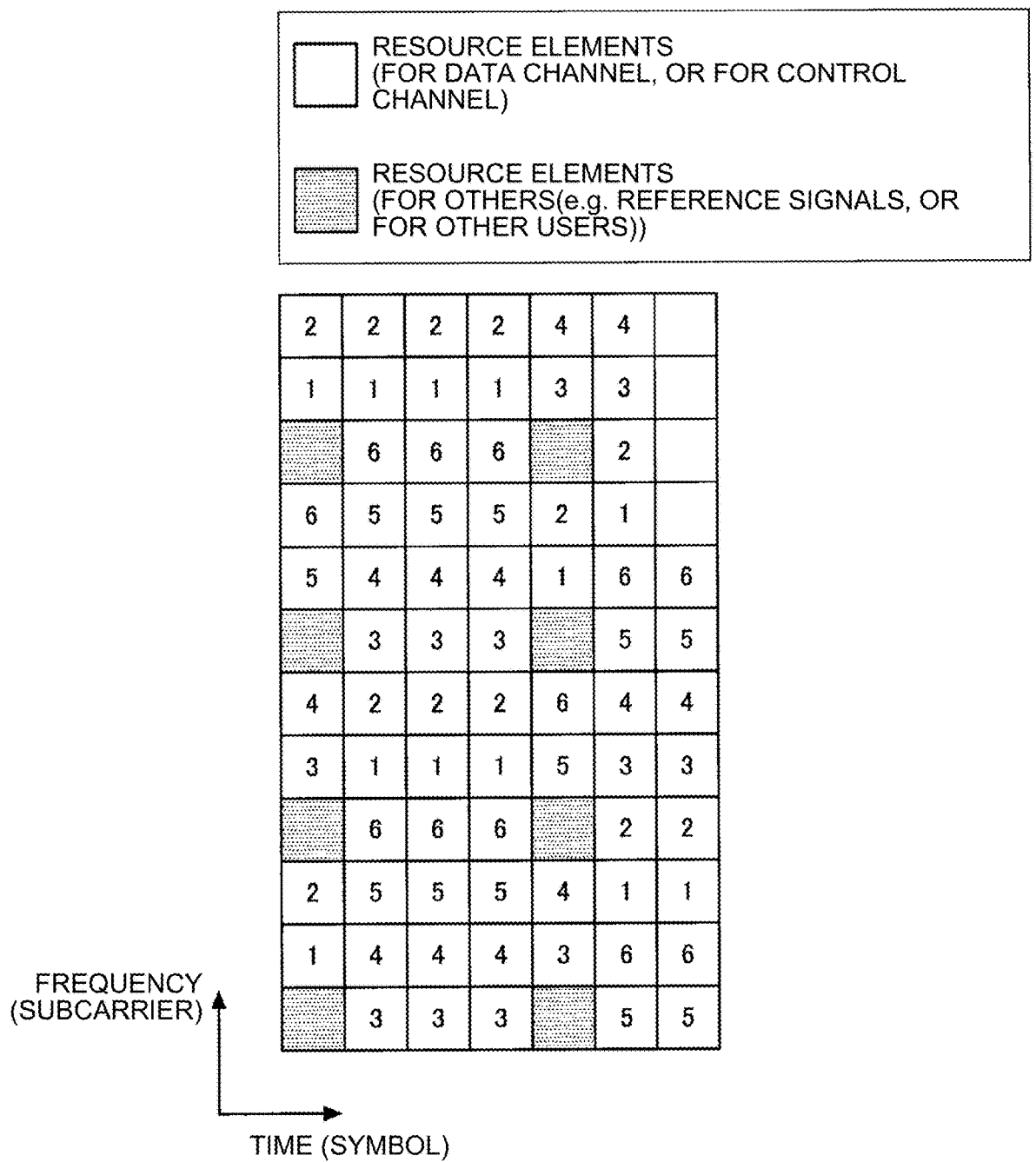
FIG. 36 is a diagram illustrating an exemplary case in which the number of available resource elements for transmission is not an integral multiple of a count N.

FIG. 36 is a diagram illustrating an exemplary case in which the number of available resource elements for transmission is not an integral multiple of the count N. Herein, the horizontal axis represents time, and the vertical axis represents frequency. In FIG. 36 is illustrated an OFDM resource block including seven symbols and 12 sub-carriers, and each cell represents a resource element. The resource elements meant for the data channel or the control channel are equivalent to the available resource elements for transmission. With reference to FIG. 36, N=6 holds true, and the digits assigned to the available resource elements for transmission represent the indexes from 1 to N. That is, the resource elements having an index assigned thereto represent the resource elements that can be divided evenly by the count N. As illustrated in FIG. 36, the number of available resource elements for transmission is not an integral multiple of the count N, and there is a remainder of four resource elements. From among the available resource elements for transmission, the resource elements not having an index assigned thereto represent the remainder resource elements.

Regarding the remainder resource elements, it is desirable that exception handling is performed and the remainder resource elements are buried by arbitrary complex signal points. Given below is the explanation of the examples of exception handling.

First-Type Exception Handling

Herein, first-type exception handling is the operation of inserting dummy complex signal points.

Figure 37:
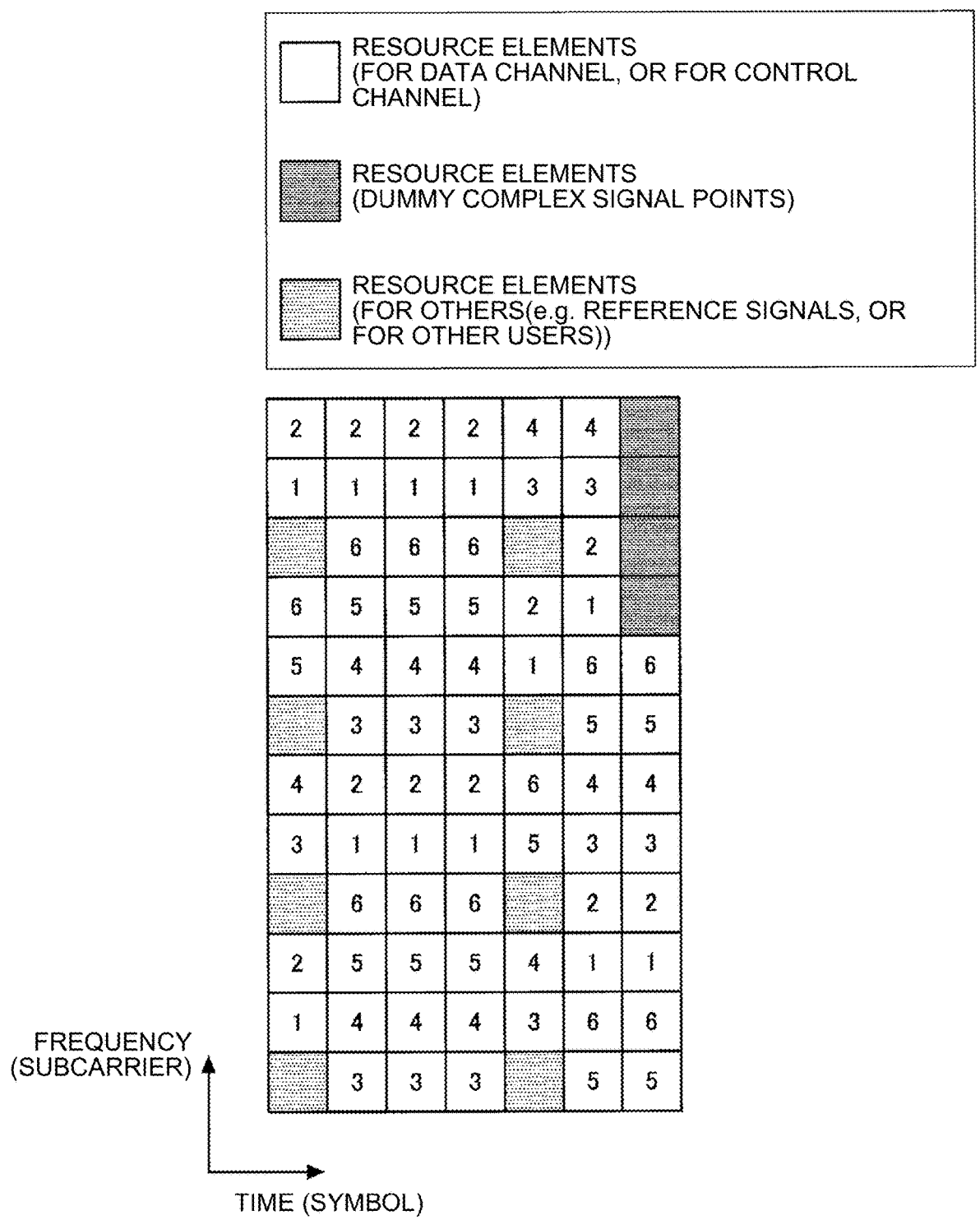
FIG. 37 is a diagram for explaining an example of first-type exception handling according to the present embodiment.

FIG. 37 is a diagram for explaining an example of the first-type exception handling according to the present embodiment. As illustrated in FIG. 37, dummy complex signal points are inserted in the remainder resource elements illustrated in FIG. 36. As the dummy complex signal points, zero (null, 0+0j) can be used. However, in order to hold down the swing and the fluctuation in the signal power, it is desirable to use non-zero complex signal points as dummy complex signal points.

Figure 38:
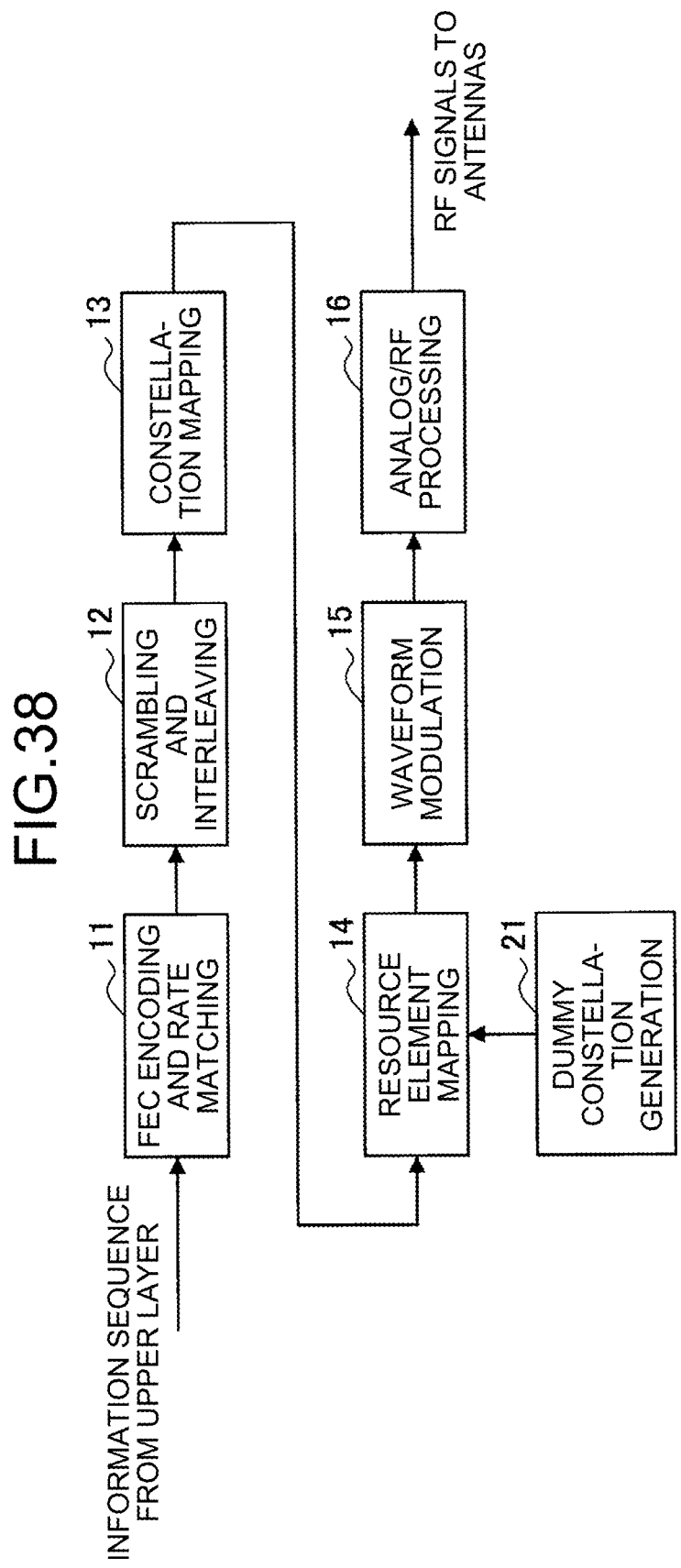
FIG. 38 is a block diagram for explaining an example of the signal processing meant for the first-type exception handling according to the present embodiment.

FIG. 38 is a block diagram for explaining an example of the signal processing meant for the first-type exception handling according to the present embodiment. The signal processing illustrated in FIG. 38 includes, in addition to the signal processing explained with reference to FIG. 1, a dummy constellation generation block 21. The dummy constellation generation block 21 maps dummy complex signal points onto the remainder resource elements.

If $N_{RE, TX}$ represents the number of available resource elements for transmission, then $N_{RE, DUMMY}$ representing the number of dummy complex signal points that should be generated is expressed using the following equation.

$$N_{RE,DUMMY} = N_{RE,TX} \bmod N \qquad (31)$$

Alternatively, the count $N_{RE, DUMMY}$ is expressed using the following equation.

$$N_{RE,DUMMY} = N_{RE,TX} - \text{floor}\left(\frac{N_{RE,TX}}{N}\right) N \qquad (32)$$

The dummy complex signal points to be generated are desirably generated using the same complex signal point sets as the complex signal point sets used in the modulation of the input information sequence. Alternatively, it is desirable that the modulation level of the dummy complex signal points is equal to the modulation level m of the complex signal point sets used in the modulation of the input information sequence. As another method, in order to generate dummy complex signal points, predetermined complex signal point sets (and a predetermined modulation level) can be used regardless of the complex signal points used in the modulation of the input information sequence.

It is desirable that the values of the dummy complex signal points are already known to the transmission device 100 and the receiving device 200. For example, all of the $N_{RE, DUMMY}$ number of dummy complex signal points can be identical.

Figure 39:
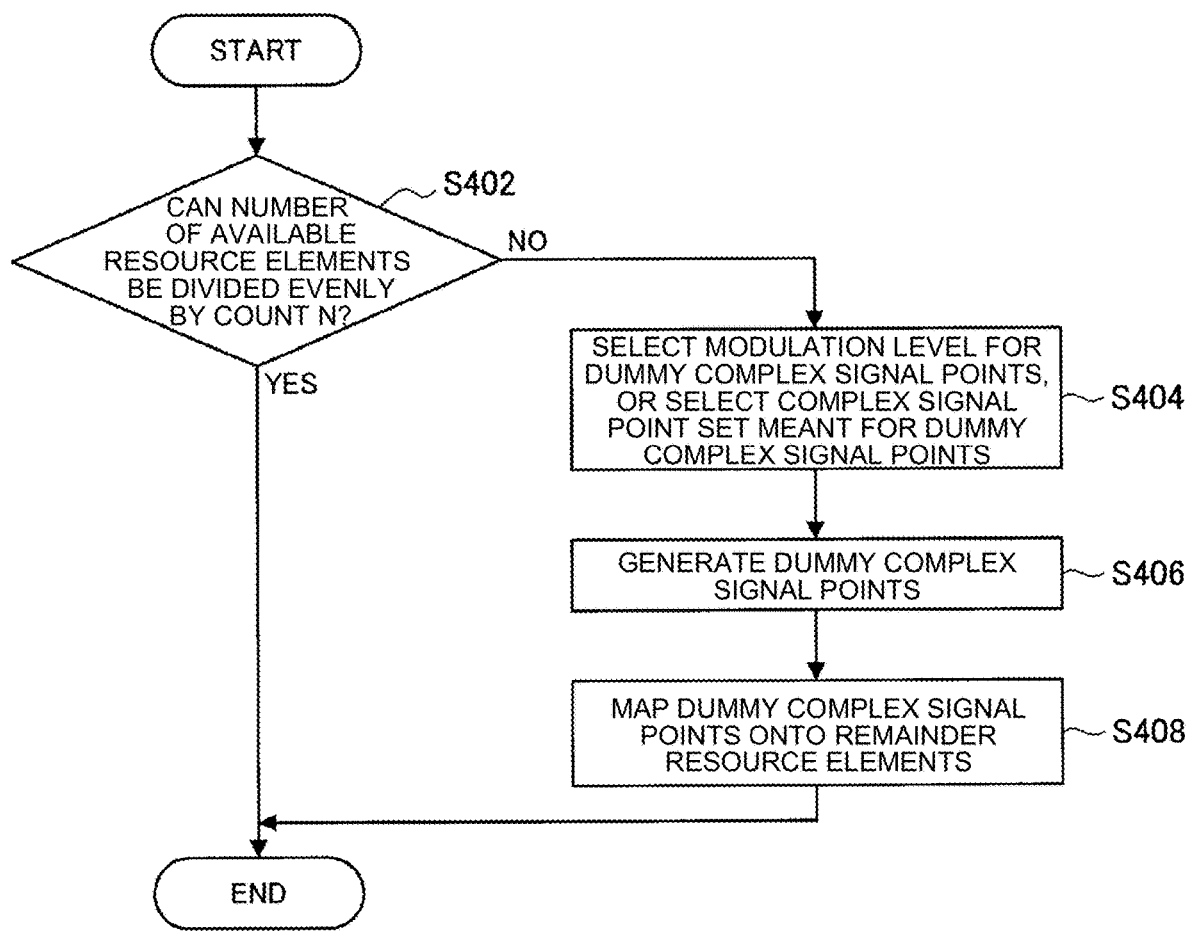
FIG. 39 is a flowchart for explaining an exemplary flow of the first-type exception handling performed in the transmission device according to the present embodiment.

Explained below with reference to FIG. 39 is an exemplary flow of the first-type exception handling.

FIG. 39 is a flowchart for explaining an exemplary flow of the first-type exception handling performed in the transmission device 100 according to the present embodiment. As illustrated in FIG. 39, firstly, the transmission device 100 determines whether or not the number of available resource elements for transmission can be divided evenly by the count N (Step S402). If it is determined that the number of available resource elements for transmission can be divided evenly by the count N (YES at Step S402), the transmission device 100 performs no particular processing because there are no remainder resource elements. On the other hand, if it is determined that the number of available resource elements for transmission cannot be divided evenly by the count N (NO at Step S402), then the transmission device 100 selects the modulation level for dummy complex signal points or selects a complex signal point set meant for dummy complex signal points (Step S404). Then, the transmission device 100 generates dummy complex signal points (Step S406). Subsequently, the transmission device 100 maps the dummy complex signal points onto the remainder resource elements (Step S408).

Second-Type Exception Handling

Herein, second-type exception handling is the operation of inserting dummy bits into the input information sequence.

Figure 40:
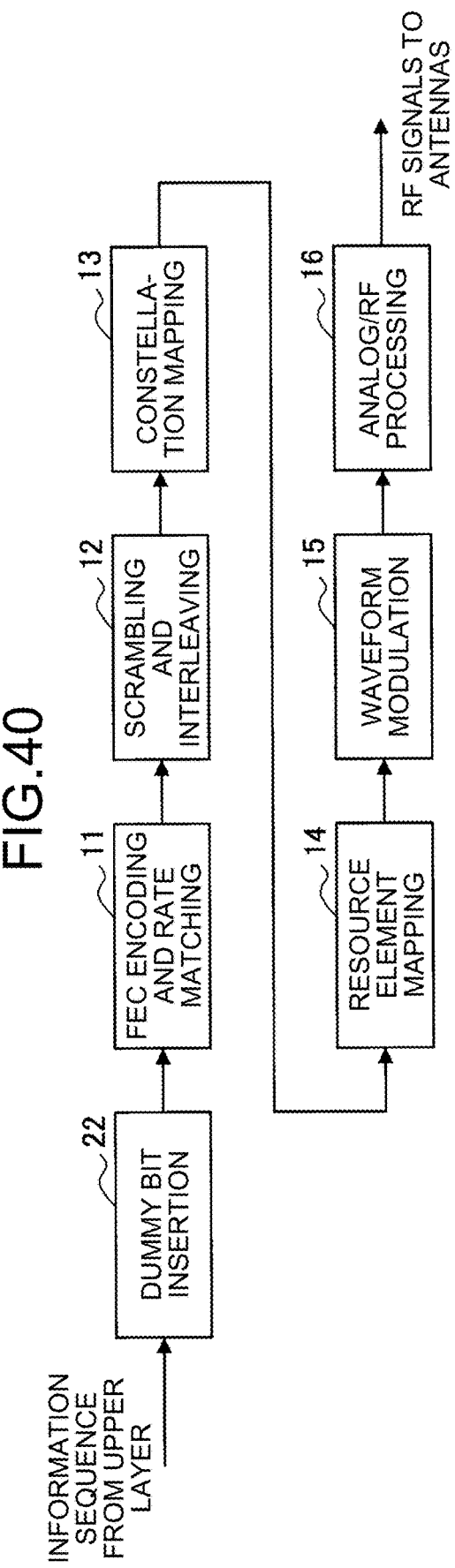
FIG. 40 is a block diagram for explaining an example of second-type exception handling according to the present embodiment.

FIG. 40 is a block diagram for explaining an example of the second-type exception handling according to the present embodiment. The signal processing illustrated in FIG. 40 includes, in addition to the signal processing explained with reference to FIG. 1, a dummy bit insertion block 22. The dummy bit insertion block 22 inserts dummy bits into the input information sequence.

In the second-type exception handling, unlike in the first-type exception handling, information about which complex signal points are mapped as dummy points on which resource elements needs to be fixed on one-to-one basis.

Regarding the information of the upper layer (i.e., the input information sequence) carriable in all available resource elements for transmission, a bit count $N_{B, TOT}$ is expressed using the following equation.

$$N_{B,TOT} = RN_B \text{floor}\left(\frac{N_{RE,TX}}{N}\right) \qquad (33)$$

Herein, $N_{RE, TX}$ represents the number of available resource elements for transmission. Moreover, $N_B$ represents the carriable bit count per resource element block. Furthermore, R represents the code rate of the error correction code, and $0 < R \le 1$ holds true.

A unit $N_{B, TBS}$ for actually transmitting the information bits of the upper layer (for example, the packet data unit size or the transport block size) is desirably equal to or smaller than the bit count $N_{B, TOT}$. That is, it is desirable that $0 < N_{B, TBS} \le N_{B, TOT}$ holds true. Particularly, it is desirable that $N_{B, TBS} = N_{B, TOT}$ holds true. However, when $N_{B, TBS} \ne N_{B, TOT}$ holds true, the transmission device 100 performs rate matching and adjusts the effective code rate R and the post-encoding bit sequence length.

On the other hand, in order to exhaustively map the complex signal points onto the available resource elements for transmission, the transmission operation is performed with respect to the bit count obtained by adding a dummy bit count $N_{B, DUMMY}$ to the unit $N_{B, TBS}$. The dummy bit count $N_{B, DUMMY}$ that should be inserted is expressed using the following equation.

$$N_{B,DUMMY} = m'R\left\{N_{RE,TX} - \text{floor}\left(\frac{N_{RB,TX}}{N}\right)N\right\} \qquad (34)$$

Alternatively, the dummy bit count $N_{B, DUMMY}$ that should be inserted is expressed using the following equation.

$$N_{B,DUMMY} = m'R(N_{RE,TX} \bmod N) \qquad (35)$$

Herein, m' represents the modulation level applied to the remainder resource elements obtained when the count $N_{RE, TX}$ is divided by the count N. In an identical manner to the first-type exception handling, the modulation level m' is desirably identical to the modulation level m, but can be a predetermined value regardless of the modulation level m.

Meanwhile, the unit $N_{B, TBS}$ can include, in addition to including the information bit count of the actual upper layer, the CRC (Cyclic Redundancy Check). Meanwhile, it is desirable that the dummy bits are inserted before performing the FEC encoding operation.

Figure 41:
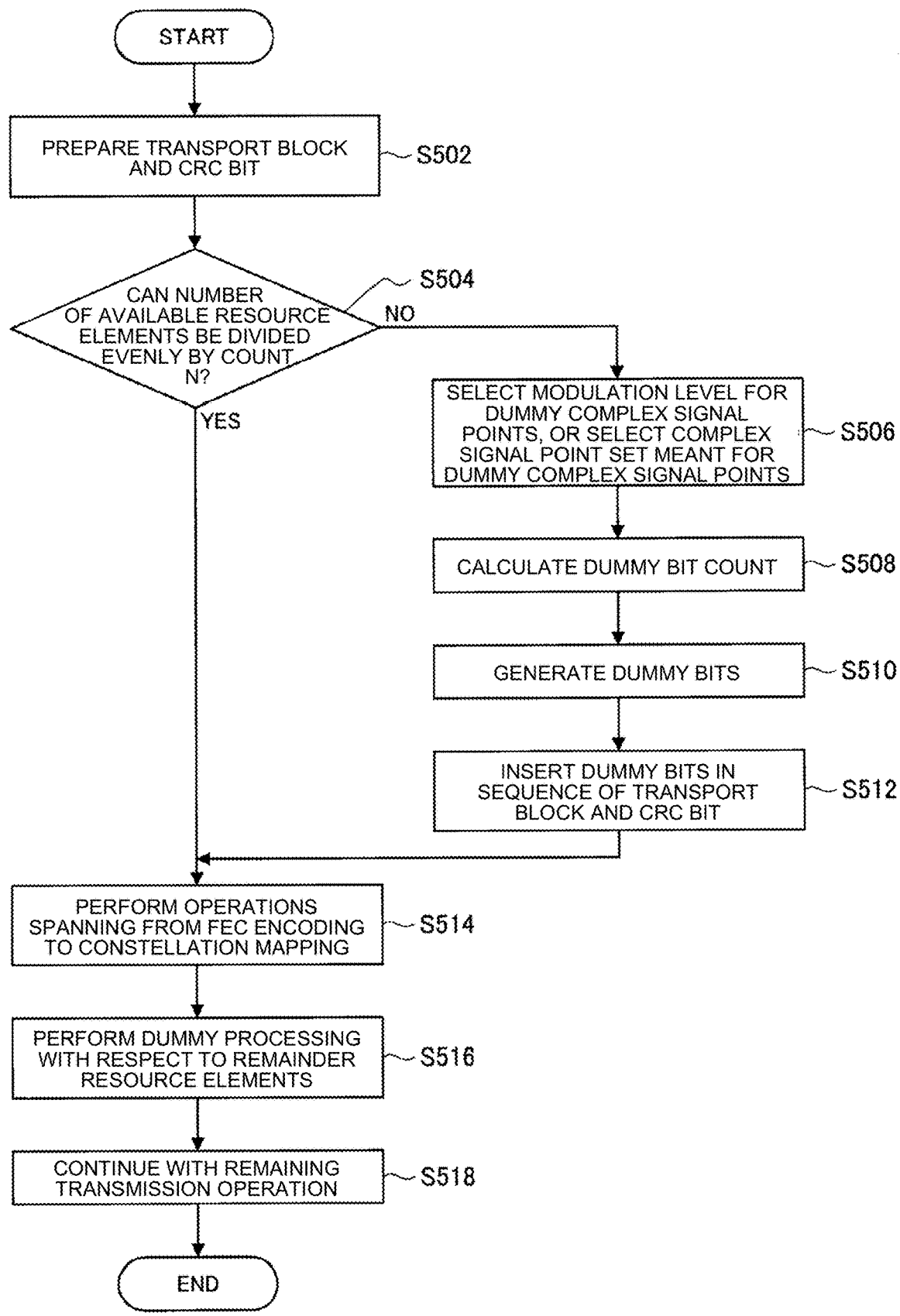
FIG. 41 is a flowchart for explaining an exemplary flow of the second-type exception handling performed in the transmission device according to the present embodiment.
Figure 42:
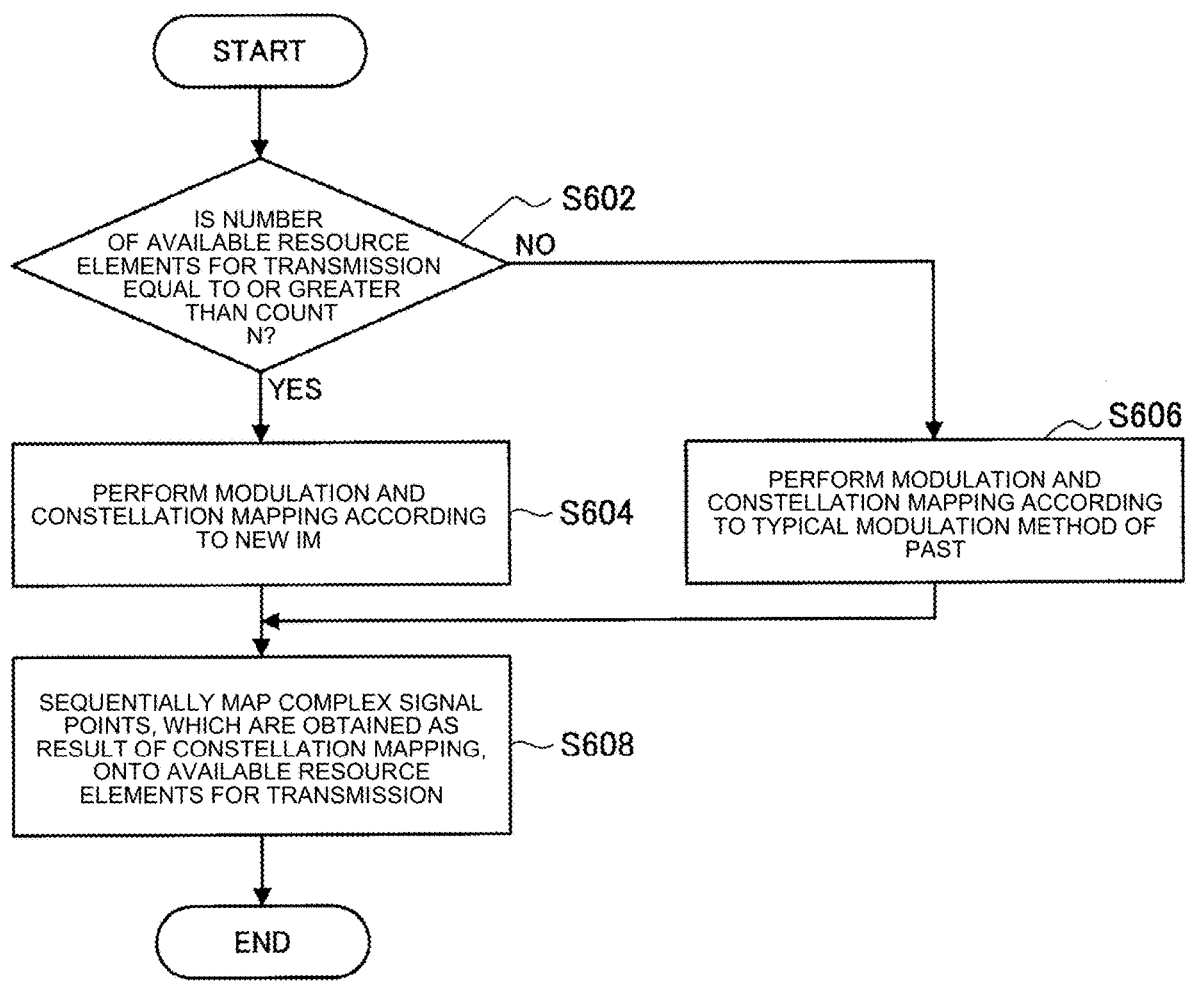
FIG. 42 is a flowchart for explaining an exemplary flow of the detailed operations performed at Steps S514 and S516 illustrated in FIG. 41.

Explained below with reference to FIGS. 41 and 42 is an exemplary flow of the second-type exception handling.

FIG. 41 is a flowchart for explaining an exemplary flow of the second-type exception handling performed in the transmission device 100 according to the present embodiment. As illustrated in FIG. 41, firstly, the transmission device 100 prepares the transport block and the CRC bit (Step S502). Then, the transmission device 100 determines whether the number of available resource elements for transmission can be divided evenly by the count N (Step S504). If it is determined that the number of available resource elements for transmission can be divided evenly by the count N (YES at Step S504), then the system control proceeds to Step S514. On the other hand, if it is determined that the number of available resource elements for transmission cannot be divided evenly by the count N (NO at Step S504), then the system control proceeds to Step S506.

At Step S506, the transmission device 100 selects the modulation level for dummy complex signal points or selects a complex signal point set meant for dummy complex signal points (Step S506). Then, the transmission device 100 calculates the dummy bit count (Step S508). Subsequently, the transmission device 100 generates dummy bits equal in number to the dummy bit count (Step S510). Then, the transmission device 100 inserts the dummy bits in the sequence of the transport block and the CRC bit (Step S512). Subsequently, the system control proceeds to Step S514.

At Step S514, the transmission device 100 performs operations spanning from FEC encoding to constellation mapping. Then, the transmission device 100 performs dummy processing with respect to the remainder resource elements (Step S516). Subsequently, the transmission device 100 continues with the remaining transmission operation (Step S518).

FIG. 42 is a flowchart for explaining an exemplary flow of the detailed operations performed at Steps S514 and S516 illustrated in FIG. 41. As illustrated in FIG. 42, firstly, the transmission device 100 determines whether or not the number of available resource elements for transmission is equal to or greater than the count N (Step S602). If it is determined that the number of available resource elements for transmission is equal to or greater than the count N (YES at Step S602), then the transmission device 100 performs modulation and constellation mapping according to the new IM (Step S604). On the other hand, if it is determined that the number of available resource elements for transmission is not equal to or greater than the count N (NO at Step S602), then the transmission device 100 performs modulation and constellation mapping according to the typical modulation method of the past (Step S606). Then, the transmission device 100 sequentially maps the complex signal points, which are obtained as a result of constellation mapping, onto the available resource elements for transmission (Step S608). For example, the transmission device 100 puts the complex signal points in the resource elements in the order of indexes illustrated in FIG. 37.

Meanwhile, in the typical modulation method of the past as performed at Step S606, the modulation parameters can be, for example, N=1, K=1, and G=1. Alternatively, as the modulation according to the typical modulation method of the past as performed at Step S606, for example, the conversion illustrated in Table 4 to Table 8 can be performed for each resource element.

Third-Type Exception Handling

Herein, third-type exception handling is the operation of performing adjustment using rate matching.

In the rate matching, the transmission device 100 adjusts the bit count. In other words, the transmission device 100 adjusts the effective code rate R including FEC encoding and rate matching.

Herein, $N_{B,FEC}$ represents the encoding bit count of FEC encoding with respect to the unit $N_{B,TBS}$ for actually transmitting the information bits of the upper layer (for example, the packet data unit size or the transport block size). The encoding bit count $N_{B,FEC}$ is obtained by calculating $N_{B,TBS}/R$. The effective code rate R is expressed using the following equation.

$$R = \frac{N_{B,TBS}}{N_B floor\left(\frac{N_{RE,TX}}{N}\right) + m'\left\{N_{RE,TX} - floor\left(\frac{N_{RE,TX}}{N}\right)N\right\}} \quad (36)$$

Alternatively, the effective code rate R is expressed using the following equation.

$$R = \frac{N_{B,TBS}}{N_B floor\left(\frac{N_{RE,TX}}{N}\right) + m'\{N_{RE,TX} \bmod N\}} \quad (37)$$

Such adjustment of the code rate R can be implemented by performing, as the rate matching, puncturing and bit repetition using a circular buffer. For example, if R' represents the code rate of simplicial FEC encoding (for example, R'=⅓); then the transmission device 100 performs puncturing when R<R' holds true, and performs bit repetition when R>R' holds true.

Figure 43:
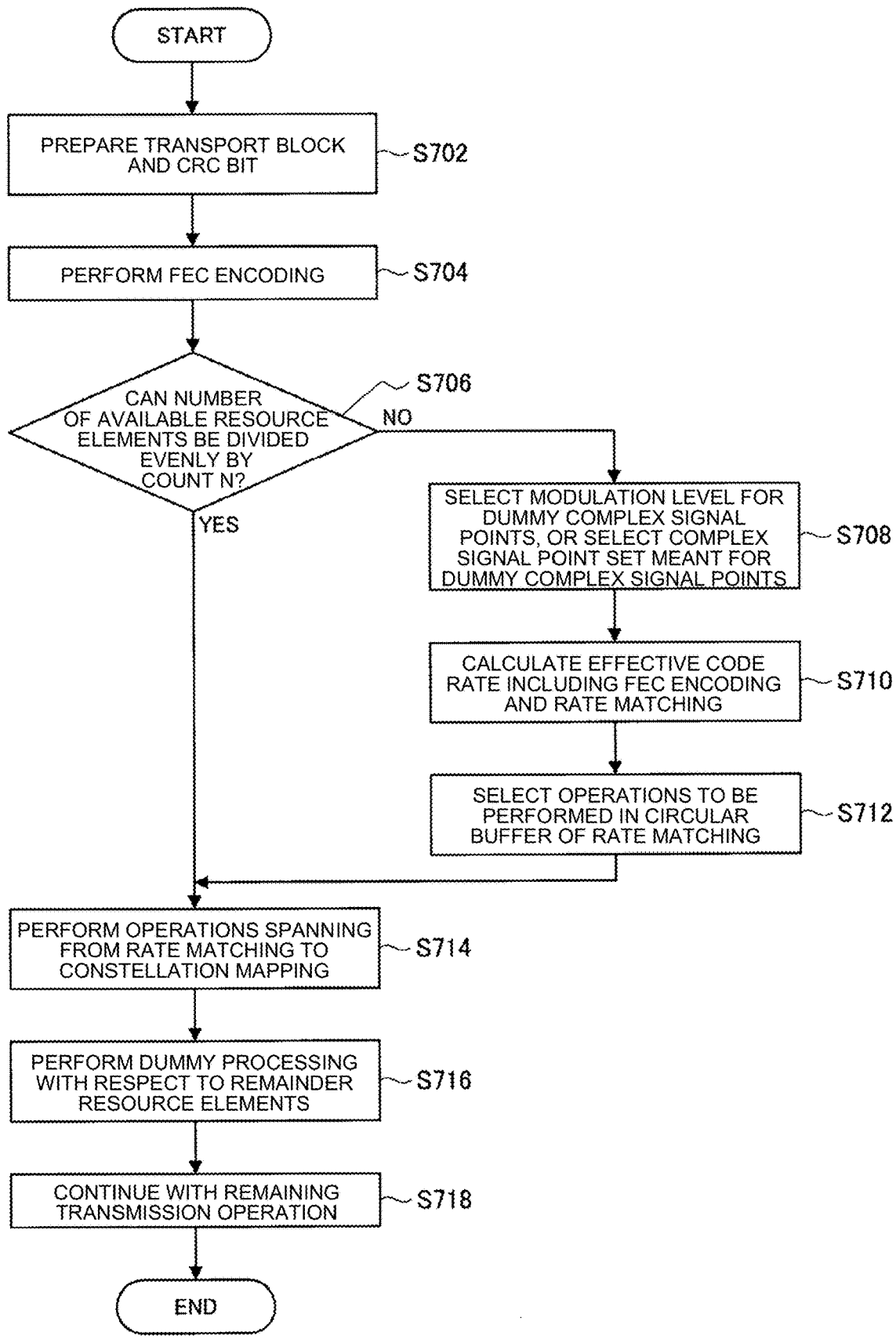
FIG. 43 is a flowchart for explaining an example of third-type exception handling performed in the transmission device according to the present embodiment.

Explained below with reference to FIG. 43 is an exemplary flow of the third-type exception handling.

FIG. 43 is a flowchart for explaining an example of the third-type exception handling performed in the transmission device 100 according to the present embodiment. As illustrated in FIG. 43, firstly, the transmission device 100 prepares the transport block and the CRC bit (Step S702). Then, the transmission device 100 performs FEC encoding (Step S704). Subsequently, the transmission device 100 determines whether the number of available resource elements for transmission can be divided evenly by the count N (Step S706). If it is determined that the number of available resource elements for transmission can be divided evenly by the count N (YES at Step S706), then the system control proceeds to Step S714. On the other hand, if it is determined that the number of available resource elements for transmission cannot be divided evenly by the count N (NO at Step S706), then the system control proceeds to Step S708.

At Step S708, the transmission device 100 selects the modulation level for dummy complex signal points or selects a complex signal point set meant for dummy complex signal points. Then, the transmission device 100 calculates the effective code rate including FEC encoding and rate matching (Step S710). Subsequently, the transmission device 100 selects the operations to be performed in the circular buffer of rate matching (Step S712). Then, the system control proceeds to Step S714.

At Step S714, the transmission device 100 performs operations spanning from rate matching to constellation mapping. Then, the transmission device 100 performs dummy processing with respect to the remainder resource elements (Step S716). Subsequently, the transmission device 100 continues with the remaining transmission operation (Step S718).

Fourth-Type Exception Handling

Herein, fourth-type exception handling is the operation of mixing a plurality of types of the count N.

Figure 44:
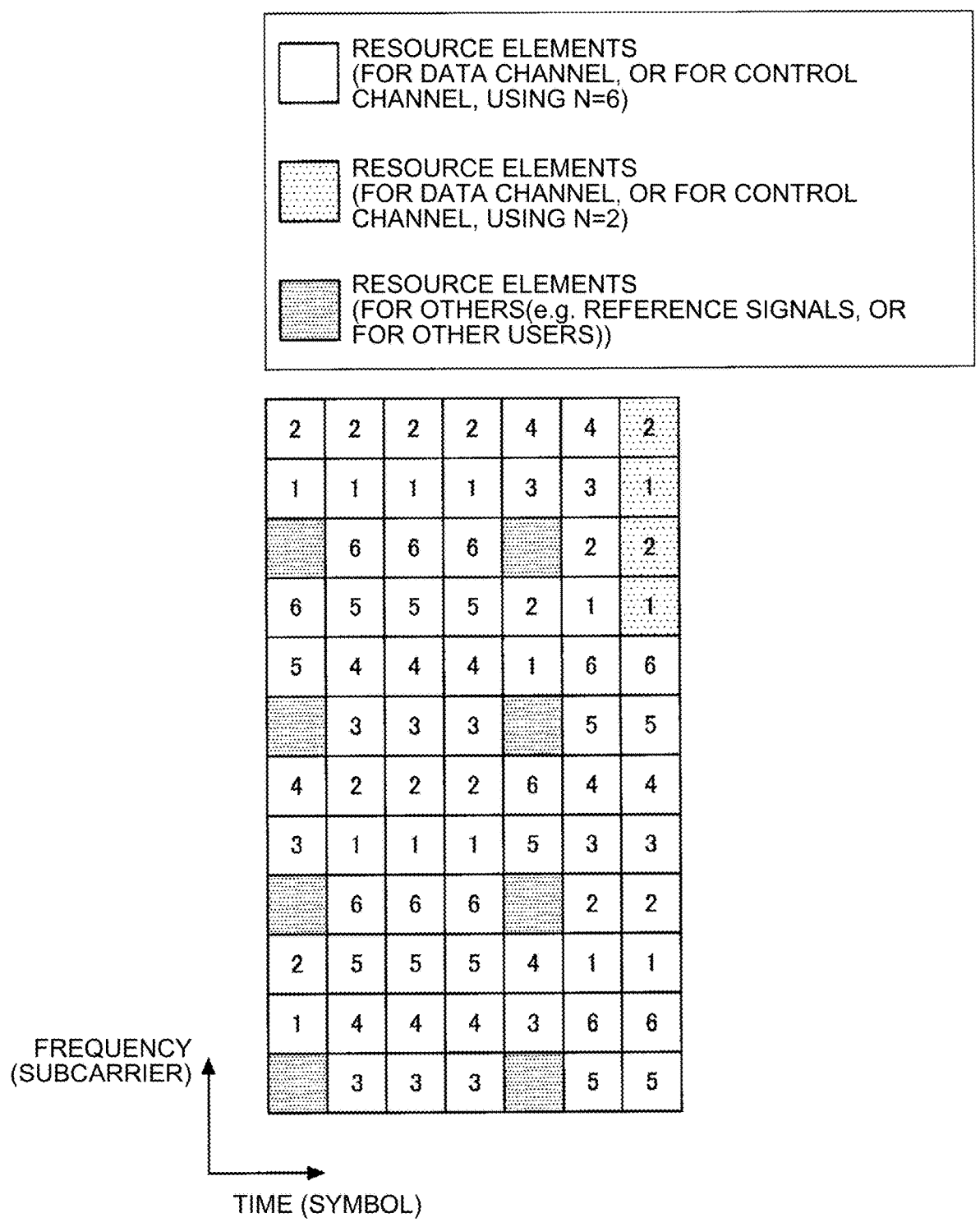
FIG. 44 is a diagram for explaining an overview of fourth-type exception handling according to the present embodiment.

FIG. 44 is a diagram for explaining an overview of the fourth-type exception handling according to the present embodiment. The horizontal axis represents time, and the vertical axis represents frequency. In FIG. 44 is illustrated an OFDM resource block including seven symbols and 12 sub-carriers, and each cell represents a resource element. The resource elements meant for the data channel or the control channel are equivalent to the available resource elements for transmission. With reference to FIG. 44, there is a mixture of the bit count N=6 and the bit count N=2, and the digits assigned to the available resource elements for transmission represent the indexes from 1 to N. As illustrated in FIG. 44, from among the available resource elements for transmission, regarding the four remainder resource elements obtained due to the fact that the number of available resource elements for transmission cannot be divided evenly by the count N=6, the four remainder resource elements can be divided evenly by the count N=2. For that reason, as a result of mixing the new-IM-based modulation when the count N=6 holds true and the new-IM-based modulation when the count N=2 holds true, the transmission device 100 puts complex signal points in the available resource elements for transmission.

If $N_{TYPE}$ represents the types of the count N to be mixed, then the bit count $N_{B, TOT}$ of the information of the upper layer (i.e., the input information sequence) that is transmittable in the case of performing the fourth-type exception handling is expressed using the following equation.

$$N_{B,TOT} = R \sum_{n_t=1}^{N_{TYPE}} \frac{N_{B,n} N_{RE,n}}{N_{n_f}} \tag{38}$$

In Equation (38), the value of the $n_t$-th bit count N is expressed as the variable given in the following expression.

$$N_{n_t} \tag{39}$$

Moreover, in Equation (38), the bit count that is carriable in a resource block made of the $n_t$-th N number of resource elements is expressed as the variable given in the following expression.

$$N_{B,n_t} \tag{40}$$

Furthermore, in Equation (38), the total resource element count representing the share of the resource element block, which is made of the $n_t$-th N number of resource elements, in the overall available resources is expressed as the variable given in the following expression.

$$N_{RE,n_t} \tag{41}$$

Herein, it is desirable that the abovementioned variables satisfy the following conditions.

$$N_{RE,n}, \bmod N_{n_t} = 0 \tag{42}$$

$$\sum_{n_t=1}^{N_{TYPE}} N_{n_t} N_{RE,n_t} = N_{RE,TX}$$

Moreover, it is desirable that the unit $N_{B, TBS}$ for actually transmitting the information bits of the upper layer (for example, the packet data unit size or the transport block size) is desirably equal to or smaller than the bit count $N_{B, TOT}$ that is calculated according to Equation (38) given earlier. That is, it is desirable that $0 < N_{B, TBS} \leq N_{B, TOT}$ holds true. Particularly, it is desirable that $N_{B, TBS} = N_{B, TOT}$ holds true. However, when $N_{B, TBS} \neq N_{B, TOT}$ holds true, the transmission device 100 performs rate matching and adjusts the effective code rate R and the post-encoding bit sequence length.

Meanwhile, regarding the types of the count N to be mixed, by taking into account the complexity of the transmission-reception operation, it is desirable that at the most two types of the count N are set as illustrated in FIG. 44. That is, it is desirable that $N_{TYPE}=2$ holds true. If $N_1$ and $N_2$ represent the two types of the count N to be mixed and if the relationship of $N_2 \leq N_1$ is established; then, in order to fill the remainder resource elements in a flexible manner when $n_t=2$ holds true, it is desirable that either $N_2=1$ is selected or $N_2=2$ is selected.

Figure 45:
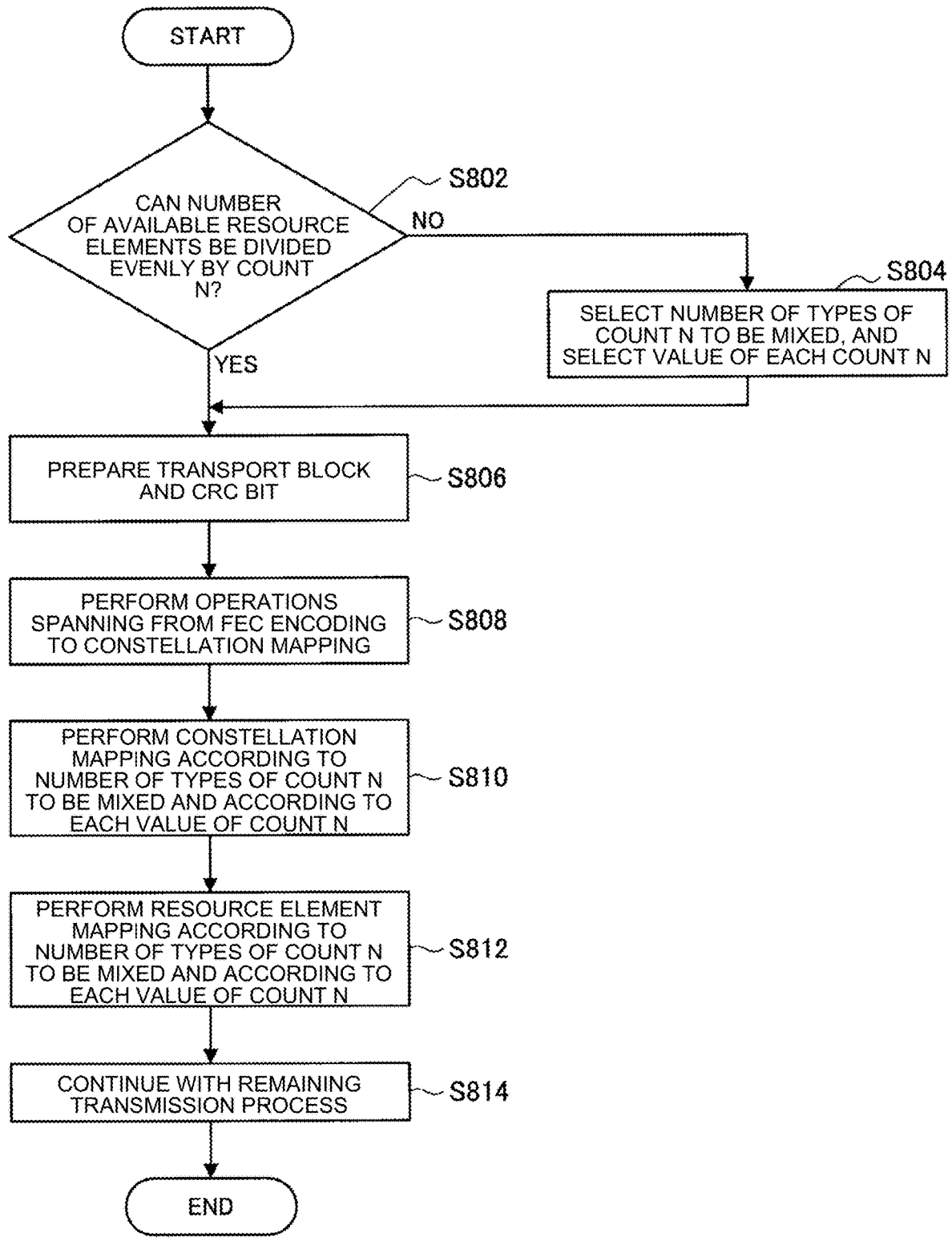
FIG. 45 is a flowchart for explaining an exemplary flow of the third-type exception handling performed in the transmission device according to the present embodiment.

Explained below with reference to FIG. 45 is an exemplary flow of the fourth-type exception handling.

FIG. 45 is a flowchart for explaining an exemplary flow of the third-type exception handling performed in the transmission device 100 according to the present embodiment. As illustrated in FIG. 45, firstly, the transmission device 100 determines whether or not the number of available resource elements for transmission can be divided evenly by the count N (Step S802). If it is determined that the number of available resource elements for transmission can be divided evenly by the count N (YES at Step S802), then the system control proceeds to Step S806. On the other hand, if it is determined that the number of available resource elements for transmission cannot be divided evenly by the count N (NO at Step S802), then the system control proceeds to Step S804.

At Step S804, the transmission device selects the number of types of the count N to be mixed, and selects the value of each count N. Herein, the selected values of the counts N are different than the value of the count N used at Step S802. Then, the system control proceeds to Step S806.

At Step S806, the transmission device 100 prepares the transport block and the CRC bit. Then, the transmission device 100 performs operations spanning from FEC encoding to constellation mapping (Step S808). Subsequently, the transmission device 100 performs constellation mapping according to the number of types of the count N to be mixed and according to each value of the count N (Step S810). Then, the transmission device 100 performs resource element mapping according to the number of types of the count N to be mixed and according to each value of the count N (Step S812). Subsequently, the transmission device 100 continues with the remaining transmission operation (Step S814).

(3) Exception Handling of Second Category

It is desirable that the bit count of the input information sequence to be transmitted can be divided evenly by the bit count $N_B$ that is carriable in each resource element block. That is, it is desirable that the unit $N_{B, TBS}$ is an integral multiple of the count $N_B$.

Of course, the unit $N_{B, TBS}$ is allowed not to be an integral multiple of the count $N_B$. In that case, it is desirable that the exception handling explained below is performed.

For example, in an identical manner to the second-type exception handling explained earlier, the transmission device 100 can adjust the bit sequence length by inserting dummy bits (i.e., can perform bit padding). Alternatively, in an identical manner to the third-type exception handling explained earlier, the transmission device 100 can adjust the effective code rate, and adjust the post-FEC-encoding and post-rate-matching bit sequence length. Thus, the flow of operations is identical to FIG. 41 or FIG. 43.

In the case of inserting dummy bits, the dummy bit count $N_{B, DUMMY}$ can be calculated as given in the following equation.

$$N_{B,DUMMY} = R N_B N - N_{B,TBS} \tag{43}$$

In the case of adjusting the effective code rate, the code rate R is calculated as given in the following equation.

$$R = \frac{N_{B,TBS}}{N_B N} \tag{44}$$

Meanwhile, in an identical manner to the third-type exception handling explained earlier, the adjustment of the effective code rate can be implemented by performing rate matching using a circular buffer.

3.5. Reception Operation (1) Signal Processing

The receiving device 200 recognizes which complex signal point included in the received complex signal point sequence belongs to which complex signal point set from among a plurality of complex signal point sets used in the modulation. As a result, the receiving device 200 obtains the first-type bit sequence from the received complex signal point sequence. Moreover, the receiving device 200 demodulates each complex signal point included in the received complex signal point sequence, and obtains the second-type bit sequence. In this way, the receiving device 200 obtains the first-type bit sequence and the second-type bit sequence. Explained below with reference to FIG. 46 is a specific example of the signal processing performed by the receiving device 200.

Figure 46:
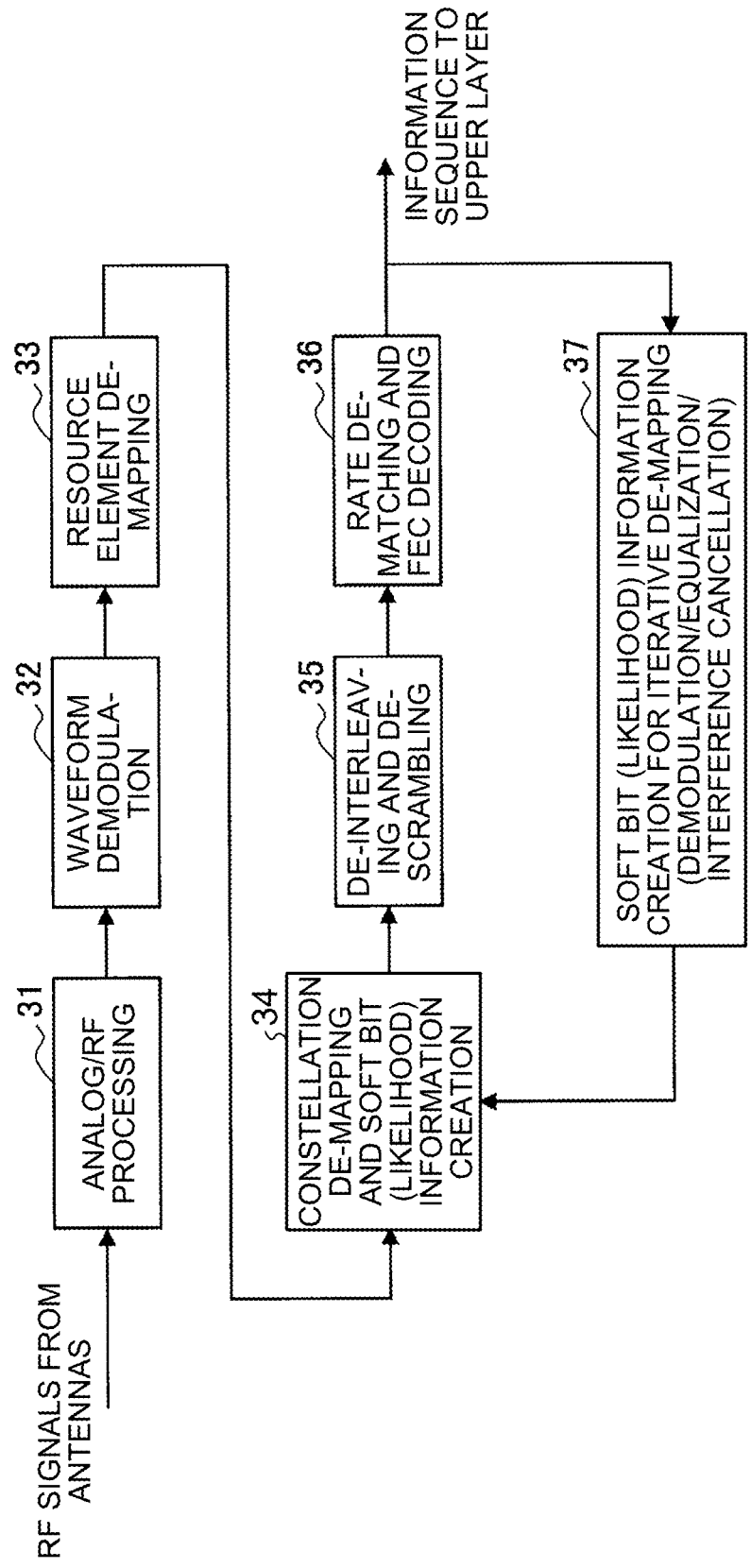
FIG. 46 is a block diagram that schematically illustrates an example of the signal processing performed by the receiving device according to the embodiment of the application concerned.

FIG. 46 is a block diagram that schematically illustrates an example of the signal processing performed by the receiving device 200 according to the embodiment of the application concerned. As illustrated in FIG. 46, the signal processing performed by the receiving device according to the present embodiment includes an analog/RF processing block 31, a waveform demodulation block 32, a resource element de-mapping block 33, a constellation de-mapping and soft bit information creation block 34, a de-interleaving and de-scrambling block 35, a rate de-matching and FEC decoding block 36, and a soft bit information creation block 37 for iterative de-mapping. With reference to FIG. 46, RF signals from antennas are processed and an information sequence (for example, a bit sequence) of the upper layer is output.

Analog/RF Processing Block 31

The analog/RF processing block 31 performs analog processing, frequency conversion, and analog-to-digital conversion with respect to the RF signals; and converts the analog signals into digital signals.

Waveform Demodulation Block 32

The waveform demodulation block 32 performs demodulation according to the used waveforms. For example, the waveform demodulation block 32 applies discrete Fourier transform (DFT) and fast Fourier transform (FFT) with respect to input signals.

Resource Element De-Mapping Block 33

The resource element de-mapping block 33 performs the operation of retrieving resource elements of the target signals for demodulation/decoding according to the physical channel configuration, the reference signal configuration, and the user-by-user allocation of resource elements.

Constellation De-Mapping and Soft Bit Information Creation Block 34

The constellation de-mapping and soft bit information creation block 34 performs reception/demodulation/decoding according to the transmission process based on the proposed technology explained above. The constellation de-mapping and soft bit information creation block 34 outputs a hard decision value or a soft decision value of the post-encoding bit sequence (or the transmission bit sequence) representing the target. The hard decision value (hard decision) represents a sequence in which discrete values of the binary value of {0, 1} (or {−1, 1}) are taken. The soft decision value is a sequence also called soft decision, soft information, or LLR (log likelihood ratio) in which continuous values are taken. The constellation de-mapping and soft bit information creation block 34 can implement linear filtering such as ZF (Zero Forcing) and MMSE (Minimum Mean Square Error), or can implement a non-linear algorithm such as ML (Maximum Likelihood) detection and ML estimation.

De-Interleaving and De-Scrambling Block 35

The de-interleaving and de-scrambling block 35 performs de-interleaving and/or de-scrambling according to the interleaving and/or scrambling performed at the transmission side.

Rate De-Matching and FEC Decoding Block 36

The rate de-matching and FEC decoding block 36 performs rate matching and FEC decoding according to the operations performed in the transmission device 100, and decodes the information sequence of the upper layer.

Soft Bit Information Creation Block 37 for Iterative De-Mapping

The soft bit information creation block 37 for iterative de-mapping recreates a transmission signal replica (for example, a soft replica or a soft interference replica) from the once-decoded information sequence of the upper layer, and feeds the transmission signal replica back to the constellation de-mapping and soft bit information creation block 34. Based on the information received as feedback, the constellation de-mapping and soft bit information creation block 34 performs iterative decoding (iterative/turbo de-mapping, iterative/turbo equalization, iterative/turbo decoding, or iterative/turbo cancellation). As a result of performing such iterative operations, it is expected to achieve enhancement in the reception performance.

(2) Sharing of Parameters

The parameters used in the transmission operation performed in the transmission device 100 are desirably shared between the transmission device 100 and the receiving device 200.

Examples of the parameters that should be shared include the parameters N, G, $K_g$, and $m_g$. Other than that, information indicating the complex signal point sets used in the modulation can also be shared.

The parameters can be notified during the communication performed between the transmission device 100 and the receiving device 200. For example, the parameters can be notified as system information, RRC signaling, or control information.

Sharing of Parameters for Uplink Communication and Downlink Communication

Figure 47:
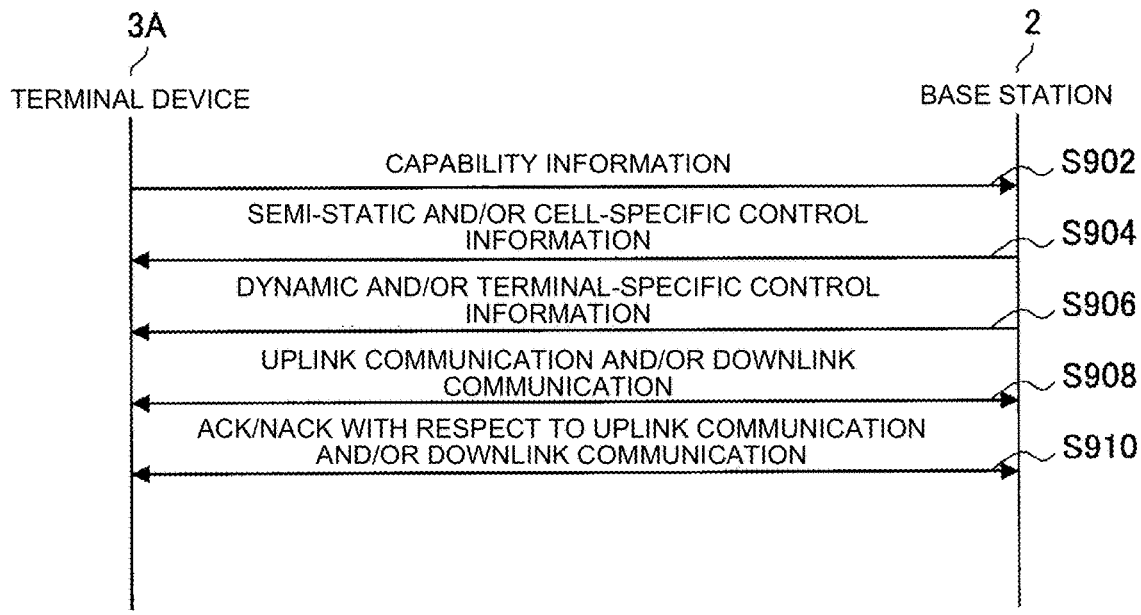
FIG. 47 is a sequence diagram illustrating an exemplary flow of an information sharing operation performed in the system according to the present embodiment.

Explained with reference to FIG. 47 is the operation of sharing parameters during uplink communication or downlink communication. FIG. 47 is a sequence diagram illustrating an exemplary flow of an information sharing operation performed in the system 1 according to the present embodiment. In the present sequence, the base station 2 and the terminal device 3A illustrated in FIG. 10 are involved.

As illustrated in FIG. 47, firstly, the terminal device 3A notifies the base station 2 about capability information (Step S902). The capability information contains information indicating compatibility or no compatibility to the transmission operation and/or the reception operation according to the proposed technology.

Then, the base station 2 notifies the terminal device 3A about semi-static and/or cell-specific control information (Step S904). Subsequently, the base station 2 notifies the terminal device 3A about dynamic and/or terminal-specific (UE-specific and/or UE-group-specific) control information (Step S906). The abovementioned parameters are included in at least some of the abovementioned control information.

Herein, in the case in which the proposed technology is performed using the physical control channel (PDCCH (Physical Downlink Control Channel) and PUCCH (Physical Uplink Control Channel)), it is desirable that the parameters are included in the semi-static and/or cell-specific control information. For example, it is desirable that the parameters are notified as system information and RRC signaling, using the physical communication channel (PBCH (Physical Broadcast Channel)) or the downlink shared channel (PDSCH (Physical Downlink Shared Channel)).

On the other hand, in the case in which the proposed technology is performed using the physical shared channels (PDSCH and PUSCH (Physical Uplink Shared Channel)), it is desirable that the parameters are included in the dynamic and/or terminal-specific control information. For example, it is desirable that the parameters are notified as downlink control information (DCI) using the physical control channel (PDCCH).

The dynamic and/or terminal-specific control information can contain information indicating the wireless resources (frequency (resource blocks and component carriers), time (sub-frames, slots, and mini slots), and space (MIMO layer (spatial layers and spatial streams) count)) that should be used by the terminal device 3A.

Returning to the explanation with reference to the sequence, after Step S906, the base station 2 and the terminal device 3A perform uplink communication and/or downlink communication (Step S908). For example, in the uplink communication, the terminal device 3A performs transmission operation according to the proposed technology using the parameters notified at Step S904 or Step S906. Then, the base station 2 performs the reception operation according to the proposed technology. On the other hand, in the downlink communication, the base station 2 performs the transmission operation according to the proposed technology. Then, the terminal device 3A performs the reception operation according to the proposed technology using the parameters notified at Step S904 or Step S906. Meanwhile, if the base station 2 or the terminal device 3A is not compatible to the transmission operation or the reception operation according to the proposed technology, the communication at Step S908 is performed using the typical communication method of the past (for example, the OFDMA method or the DFT-Spread-OFDMA method).

Then, an ACK/NACK is sent with respect to the uplink communication and/or downlink communication performed at Step S908 (Step S910).

Sharing of Parameters for Sidelink Communication

Figure 48:
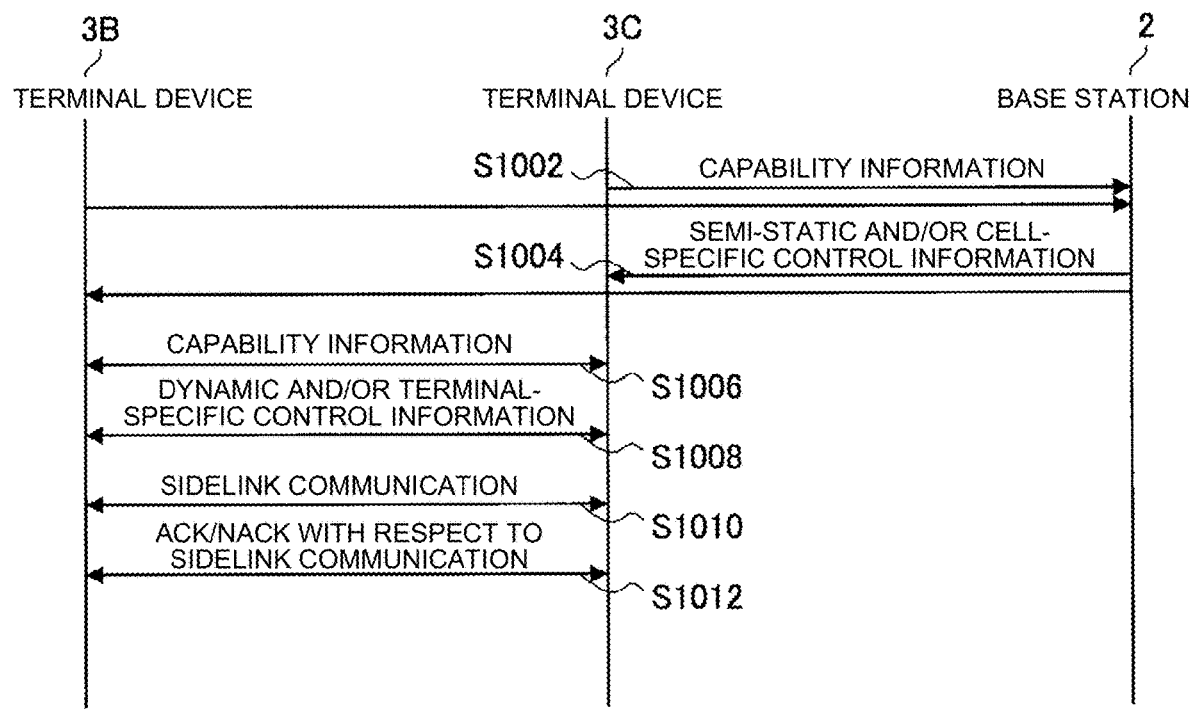
FIG. 48 is a sequence diagram illustrating an exemplary flow of the information sharing operation performed in the system according to the present embodiment.

Explained below with reference to FIG. 48 is an operation of sharing parameters in sidelink communication. FIG. 48 is a sequence diagram illustrating an exemplary flow of the information sharing operation performed in the system 1 according to the present embodiment. In the present sequence, the base station 2 and the terminal devices 3B and 3C illustrated in FIG. 10 are involved.

As illustrated in FIG. 48, firstly, the terminal devices 3B and 3C notify the base station 2 about capability information (Step S1002). The capability information contains information indicating compatibility or no compatibility to the transmission operation and/or the reception operation according to the proposed technology.

Then, the base station 2 notifies the terminal devices 3B and 3C about semi-static and/or cell-specific control information (Step S1004). The semi-static and/or cell-specific control information contains information indicating the radio resource pool specified using the time and the frequency. Moreover, the semi-static and/or cell-specific control information can also contain the parameters that should be used in the case of performing, within the wireless resources, the transmission-reception operation according to the proposed technology.

Subsequently, between the terminal devices 3B and 3C, the capability information is notified either mutually or from one terminal device to the other terminal (Step S1006). The capability information contains information indicating compatibility or no compatibility to the transmission operation and/or the reception operation according to the proposed technology in the radio resources specified from the base station 2.

Then, between the terminal devices 3B and 3C, the dynamic and/or terminal-specific (UE-specific and/or UE-group-specific) control information is notified either mutually or from one terminal device to the other terminal (Step S1008). The control information can also contain the parameters to be used by the terminal devices 3B and 3C at the time of performing the transmission operation and the reception operation according to the proposed technology. For example, the parameters can be notified as sidelink control information (SCI) using the sidelink control channel (Physical Sidelink Control Channel (PSCCH)).

Subsequently, the terminal devices 3B and 3C perform sidelink communication (Step S1010). For example, in the sidelink control channel (Physical Sidelink Control Channel (PSCCH), the terminal devices 3B and 3C perform the transmission operation and the reception operation according to the proposed technology using the parameters notified at Step S1004. Moreover, for example, in the sidelink shared channel (Physical Sidelink Shared Channel (PSSCH)), the terminal devices 3B and 3C perform the transmission operation and the reception operation according to the proposed technology using the parameters shared at Step S1008. Meanwhile, if the terminal device 3B or the terminal device 3C is not compatible to the transmission operation or the reception operation according to the proposed technology, then the communication at Step S1010 is performed using the typical communication method of the past.

Then, an ACK/NACK is sent with respect to the sidelink communication performed at Step S1010 (Step S1012).

Sharing of Parameters in Fixed Manner

The transmission device 100 and the receiving device 200 can set the parameters in a fixed manner, and share them. For example, predetermined parameters can be stored in advance in the transmission device 100 and the receiving device 200.

For example, in the communication channel (PBCH) used in the transmission of initial system information from the base station 2 to the terminal device 3, the predetermined parameters are used in the case of performing the transmission operation and the reception operation according to the proposed technology. That is because transmission-reception of the parameters is difficult to perform before performing transmission-reception of the communication channel.

3.6. Modification Examples

3.6.1. First Modification Example

In "3.3.1. First example" explained earlier, the constellation conversion block 305 performs linear conversion, which is given in Equation (23), as the arithmetic processing. However, the present technology is not limited to that example. Alternatively, the constellation conversion block 305 can perform nonlinear conversion as the arithmetic processing. Examples of the nonlinear conversion include differential conversion and recursive conversion. Given below is the detailed explanation of the arithmetic processing based on differential conversion (also called differential arithmetic processing) and the arithmetic processing based on recursive conversion (also called recursive arithmetic processing).

Differential Arithmetic Processing

In the differential arithmetic processing, the operations with respect to the position n of a particular resource element are decided according to the operations with respect to the position n' of another resource element or according to the value of the complex signal point at the position n' of another resource element. The differential arithmetic processing can be expressed as given in the following equation.

$$s_n = f_D(s'_n, s_{n'}, s'_{n'}, n, n') \tag{45}$$

Herein, $f_D$ represents the function of the differential arithmetic operation. Moreover, $s_n$ represents the post-operation complex signal point at the position n of the resource element. Furthermore, $s'_n$ represents the pre-operation complex signal point at the position n of the resource element. Moreover, $s_{n'}$ represents the post-operation complex signal point at the position n' of another resource element. Furthermore, $s'_{n'}$ represents the pre-operation complex signal point at the position n' of the other resource element. In the function $f_D$, at least one of the parameters $s'_n$, $s_{n'}$, $s'_{n'}$, n, and n' can serve as the argument.

As a further specific example, the differential arithmetic processing can be expressed using the following equation.

$$s_n = f_D(s'_n, s_{n'}, s'_{n'}, n, n') \tag{46}$$
$$= |Z_{D,n}|s'_n \exp(j\theta_{D,n}) + C_{D,n}$$
$$Z_{D,n} = Z_{D,n'} + Z_n$$
$$\theta_{D,n} = \theta_{D,n'} + \theta_n$$
$$C_{D,n} = C_{D,n'} + C_n$$

In Equation (46), although the processing itself is similar to a linear operation, it implies that the amplitude, the phase, and the linear shift are decided in a dependent manner on the amplitude, the phase, and the linear shift at the position n' of the other resource element.

It is desirable that the position n' of the other resource element is separated by a predetermined distance $N_{NL}$ from the position n of the concerned resource element. That is, it is desirable that either $n'=n+N_{NL}$ holds true or $n'=n-N_{NL}$ holds true. Particularly, it is desirable that $N_{NL}=1$ holds true.

In the case of the differential arithmetic processing, the initial values of the parameters used in the operations are set. For example, in the case of setting the initial values with respect to the position n=0 of the concerned resource element, the operations are performed as given in the following equation.

$$s_n = f_D(s'_n, s_{n'}, s'_{n'}, n, n') \tag{47}$$
$$= |Z_{D,n}|s'_n \exp(j\theta_{D,n}) + C_{D,n}$$
$$Z_{D,n} = Z_{D,n'} + Z_n, (n > 0)$$
$$\theta_{D,n} = \theta_{D,n'} + \theta_n, (n > 0)$$
$$C_{D,n} = C_{D,n'} + C_n, (n > 0)$$

-continued
$$Z_{D,n} = Z_{Init}, (n = 0)$$
$$\theta_{D,n} = \theta_{Init}, (n = 0)$$
$$C_{D,n} = C_{Init}, (n = 0)$$

Recursive Arithmetic Processing

In the recursive arithmetic processing, the operations with respect to the resource element at the position n are performed in an iterative manner for a plurality of number of times (for example, $N_{R,n}$ number of times). That is, the recursive arithmetic processing can be expressed as given in the following equation.

$$s_n = f_{R,n_R} = (s'_n, n) \tag{48}$$

Herein, $$f_{R,n_R} \tag{49}$$

represents the function of the $n_{R,n}$-th recursive arithmetic processing.

As a further specific example, the recursive arithmetic processing can be expressed as given in the following equation.

$$s'_{n,0} = s'_n$$
$$s'_{n,n_R} = f_R(s'_{n,n_R-1}, n)$$
$$s_n = s'_{n,N_{R,n}}$$
$$f_R(s'_n, n) = |Z_n|s'_n \exp(j\theta_n) + C_n \tag{50}$$

Herein, the iteration count $N_{R,n}$ of the recursive arithmetic processing can be a fixed value regardless of the position of the concerned resource element (that is, $N_{R,n} = N_R$ holds true), or can be a different value depending on the position of the resource element.

Other Operation

As another example of nonlinear arithmetic processing, a modulo operation (i.e., an operation for obtaining the divisional remainder) can be used.

3.6.2. Second Modification Example

In the examples of the combinations of the candidates for the first-type bit sequence and the applicable patterns as illustrated in FIGS. 13 to 16, the number of zeroes (0+0j) included in the applicable patterns is constant in regard to all candidates for the first-type bit sequence. For example, in the examples illustrated in FIGS. 13, 14, and 16; the number of zeroes (0+0j) included in the applicable patterns is zero in regard to all candidates for the first-type bit sequence. On the other hand, in the example illustrated in FIG. 15, the number of zeroes (0+0j) included in the applicable patterns is one in regard to all candidates for the first-type bit sequence.

In contrast, the number of zeroes (0+0j) included in the applicable patterns need not be constant in regard to all candidates for the first-type bit sequence. For example, the application pattern corresponding to the first candidate for the first-type bit sequence can include a different number of zeroes (0+0j) than the number of zeroes (0+0j) included in the application pattern corresponding to the second candidate for the first-type bit sequence. Regarding that point, the detailed explanation is given below.

First Method

In a first method, two-bit information is loaded on the usages of two resource elements. Regarding the first method, the detailed explanation is given below with reference to FIG. 49.

Figure 49:
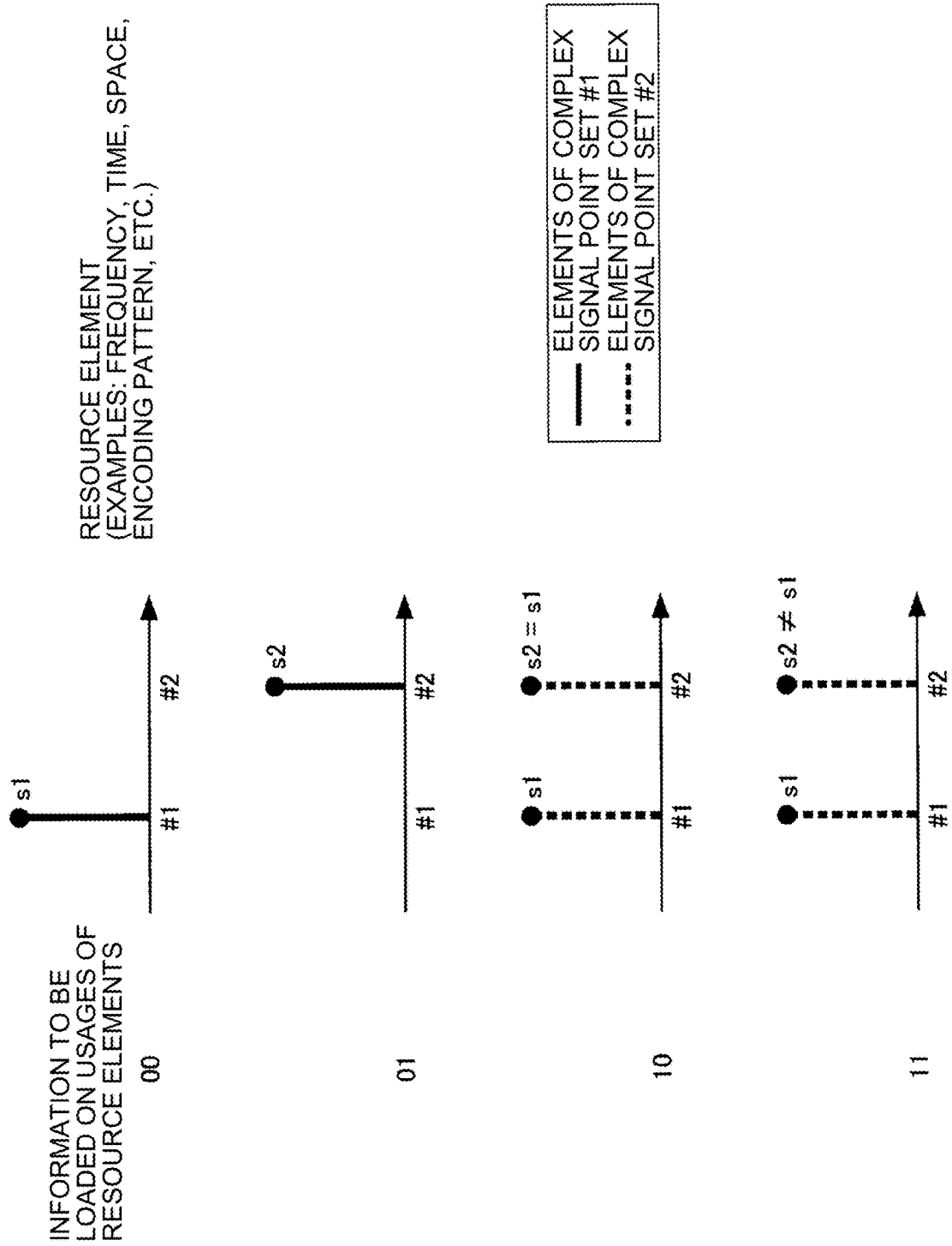
FIG. 49 is a diagram illustrating an example of the combinations of the candidates for the first-type bit sequence and the applicable patterns according to a second modification example.

FIG. 49 is a diagram illustrating an example of the combinations of the candidates for the first-type bit sequence and the applicable patterns according to the second modification example. The horizontal axis represents arbitrary resource elements. A complex signal point si represents the complex signal point placed in the i-th resource element. The difference in the line styles of the complex signal point si indicates the difference in the complex signal point sets to which the complex signal point si belongs. In the example illustrated in FIG. 49, the two resource elements #1 and #2 constituting a resource element block either have the complex signal points belonging to the complex signal point set g1 placed therein or have the complex signal points belonging to the complex signal point set g2 placed therein. In the present example, information is loaded on the fact about whether or not zero (0+0j) is included the complex signal point sequence and loaded on the fact about whether or not predetermined two complex signal points included in the complex signal point sequence are identical. More particularly, as a result of placing the complex signal point s1 belonging to the complex signal point set g1 in the resource element #1 and placing zero (0+0j) in the resource element #2, information "00" is expressed. Moreover, as a result of placing zero (0+0j) in the resource element #1 and placing the complex signal point s2 belonging to the complex signal point set g1 in the resource element #2, information "01" is expressed. Furthermore, as a result of placing identical complex signal points belonging to the complex signal point set g2 (i.e., s1=s2 holding true) in the resource elements #1 and #2, information "10" is expressed. Moreover, as a result of placing different complex signal points belonging to the complex signal point set g2 (i.e., s1≠s2 holding true) in the resource elements #1 and #2, information "11" is expressed.

In Table 16 given below is illustrated an example of the correspondence relationship between the input information sequence and the complex signal point sequence in the example illustrated in FIG. 49. In Table 16, an example is illustrated in which a 4-bit input information sequence is modulated into two complex signal points s1 and s2 placed in the two resource elements #1 and #2. Herein, bits #1 and #2 are equivalent to the first-type bit sequence, and bits #3 and #4 are equivalent to the second-type bit sequence. In the present example, since the second-type bit sequence has two bits, complex signal point sets based on the QPSK are used in the modulation. In Table 16, "sqrt( )" implies square root.

TABLE 16

Example of correspondence relationship between input information sequence and complex signal point sequence

| First-type bit sequence | | Second-type bit sequence | | Complex signal points placed in each resource element | |
|---|---|---|---|---|---|
| bit #1 | bit #2 | bit #3 | bit #4 | s1 | s2 |
| 0 | 0 | 0 | 0 | sqrt (2) * (1 + 1j) | 0 + 0j |
| 0 | 0 | 0 | 1 | sqrt (2) * (-1 + 1j) | 0 + 0j |
| 0 | 0 | 1 | 0 | sqrt (2) * (-1 - 1j) | 0 + 0j |
| 0 | 0 | 1 | 1 | sqrt (2) * (1 - 1j) | 0 + 0j |
| 0 | 1 | 0 | 0 | 0 + 0j | sqrt (2) * (1 + 1j) |
| 0 | 1 | 0 | 1 | 0 + 0j | sqrt (2) * (-1 + 1j) |

TABLE 16-continued

Example of correspondence relationship between input information sequence and complex signal point sequence

| First-type bit sequence | | Second-type bit sequence | | Complex signal points placed in each resource element | |
|---|---|---|---|---|---|
| bit #1 | bit #2 | bit #3 | bit #4 | s1 | s2 |
| 0 | 1 | 1 | 0 | 0 + 0j | sqrt (2) * (-1 - 1j) |
| 0 | 1 | 1 | 1 | 0 + 0j | Sqrt (2) * (1 - 1j) |
| 1 | 0 | 0 | 0 | sqrt (2) * (1 + 0j) | sqrt (2) * (1 + 0j) |
| 1 | 0 | 0 | 1 | sqrt (2) * (0 + 1j) | sqrt (2) * (0 + 1j) |
| 1 | 0 | 1 | 0 | sqrt (2) * (-1 + 0j) | sqrt (2) * (-1 + 0j) |
| 1 | 0 | 1 | 1 | sqrt (2) * (0 - 1j) | sqrt (2) * (0 - 1j) |
| 1 | 1 | 0 | 0 | sqrt (2) * (1 + 0j) | sqrt (2) * (-1 + 0j) |
| 1 | 1 | 0 | 1 | sqrt (2) * (0 + 1j) | sqrt (2) * (0 - 1j) |
| 1 | 1 | 1 | 0 | sqrt (2) * (-1 + 0j) | sqrt (2) * (1 + 0j) |
| 1 | 1 | 1 | 1 | sqrt (2) * (0 - 1j) | sqrt (2) * (0 + 1j) |

The first-type bit sequence includes a first-type bit indicating whether or not zero (0+0j) is included in the complex signal point sequence. In Table 16, the bit #1 serves as the first-type bit. When the bit #1 is equal to "0", zero (0+0j) is included in the complex signal point sequence. When the bit #1 is equal to "1", zero (0+0j) is not included in the complex signal point sequence.

When zero (0+0j) is included in the complex signal point sequence, the first-type bit sequence includes a second-type bit indicating the position of zero (0+0j) in the complex signal point sequence. In other words, when zero (0+0j) is included in the complex signal point sequence, the first-type bit sequence includes a second-type bit for indicating the position of the non-zero complex signal point in the complex signal point sequence. In Table 16, the bit #2 serves as the second-type bit. When the bit #1 is equal to "0" and when the bit #2 is equal to "0", the complex signal point s2 placed in the resource element #2 is equal to zero (0+0j). When the bit #1 is equal to "0" and when the bit #2 is equal to "1", the complex signal point s1 placed in the resource element #1 is equal to zero (0+0j).

When zero (0+0j) is not included in the complex signal point sequence, the first-type bit sequence includes a third-type bit indicating whether or not identical complex signal points are included in the complex signal point sequence. In Table 16, the bit #2 serves as the third-type bit. When the bit #1 is equal to "1" and when the bit #2 is equal to "0", the complex signal points s1 and s2 are identical. On the other hand, when the bit #1 is equal to "1" and when the bit #2 is equal to "1", the complex signal points s1 and s2 are different from each other. When the complex signal points s1 and s2 are different from each other, it is desirable that they have a predetermined relationship. Moreover, it is desirable that the relationship is expressible using linear conversion. As the predetermined relationship, it is possible to think of a predetermined phase difference, a predetermined amplitude difference, or a combination thereof. For example, in the example illustrated in Table 16, the predetermined relationship is the phase difference of π radian (i.e., 180°). More particularly, with reference to the row in which the bit #1 is equal to "1" and the bit #2 is equal to "1" in Table 16, if the phase rotation of 7c radian is applied to the complex signal point s1, it becomes equal to the complex signal point s2.

The first-type bit sequence includes a fourth-type bit indicating the type of the complex signal point set used in the modulation of the second-type bit sequence. In Table 16, the bit #1 serves as the fourth-type bit. When the bit #1 is equal to "0", the modulation of the bits #3 and #4 is performed using the complex signal point set g1 illustrated in Table 17 given below. When the bit #1 is equal to "1", the modulation of the bits #3 and #4 is performed using the complex signal point set g2 illustrated in Table 18 given below. Herein, it is desirable that the complex signal point sets g0 and g1 have a predetermined relationship. Moreover, it is desirable that the predetermined relationship is expressible using linear conversion. As the predetermined relationship, it is possible to think of a predetermined phase difference, a predetermined amplitude difference, or a combination thereof. For example, the predetermined relationship between the complex signal point set g1 illustrated in Table 17 and the complex signal point set g2 illustrated in Table 18 is the phase difference of $\pi/4$ radian (i.e., 45°).

TABLE 17

Complex signal point set g1 used when bit #1 is equal to "0" in Table 16

| bit #3 | bit #4 | Complex signal point |
|---|---|---|
| 0 | 0 | sqrt (2) * (1 + 1j) |
| 0 | 1 | sqrt (2) * (−1 + 1j) |
| 1 | 0 | sqrt (2) * (−1 − 1j) |
| 1 | 1 | sqrt (2) * (1 − 1j) |

TABLE 18

Complex signal point set g2 used when bit #1 is equal to "1" in Table 16

| bit #3 | bit #4 | Complex signal point |
|---|---|---|
| 0 | 0 | sqrt (2) * (1 + 0j) |
| 0 | 1 | sqrt (2) * (0 + 1j) |
| 1 | 0 | sqrt (2) * (−1 + 0j) |
| 1 | 1 | sqrt (2) * (0 − 1j) |

Second Method

In a second method, three-bit information is loaded on the usages of two resource elements. In the second method, the complex signal point sets used in the modulation of a plurality of non-zero complex signal points are identical. Regarding the second method, the detailed explanation is given below with reference to FIG. 50.

Figure 50:
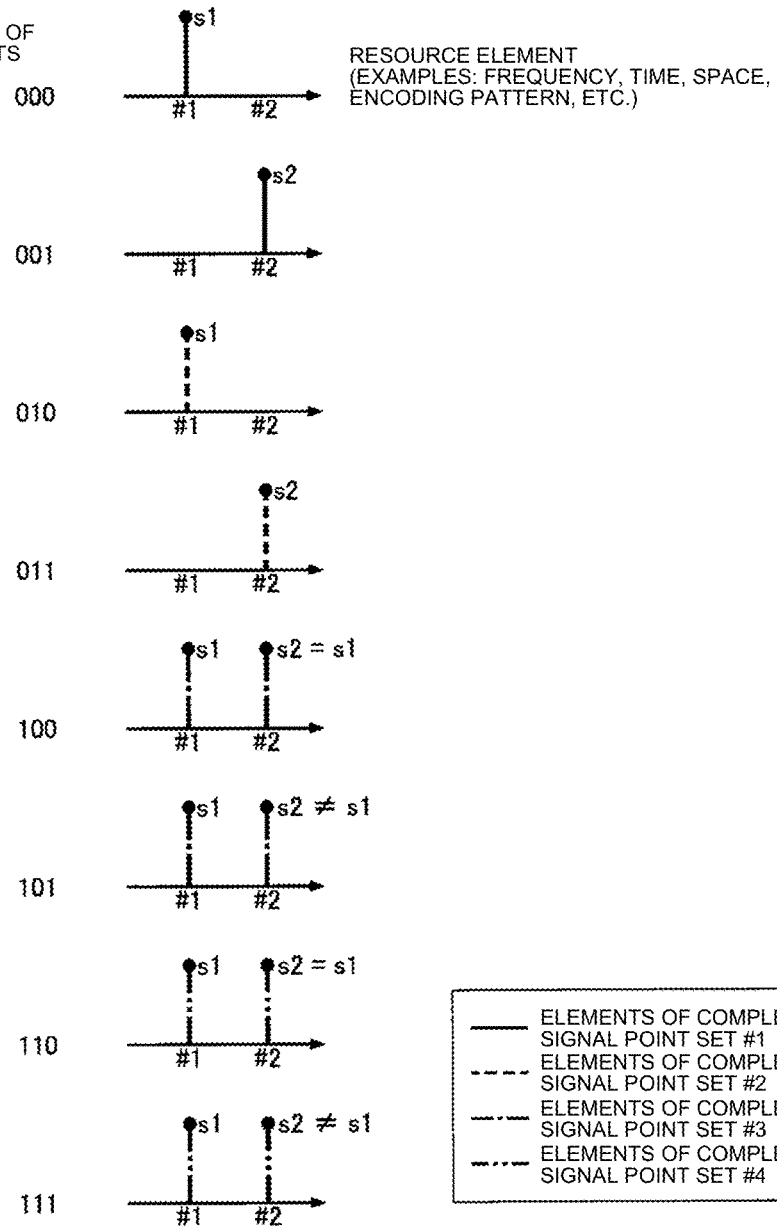
FIG. 50 is a diagram illustrating an example of the combinations of the candidates for the first-type bit sequence and the applicable patterns according to the second modification example.

FIG. 50 is a diagram illustrating an example of the combinations of the candidates for the first-type bit sequence and the applicable patterns according to the second modification example. The horizontal axis represents arbitrary resource elements. A complex signal point si represents the complex signal point placed in the i-th resource element. The difference in the line styles of the complex signal point si indicates the difference in the complex signal point sets to which the complex signal point si belongs. In the example illustrated in FIG. 50, the two resource elements #1 and #2 constituting a resource element block have the complex signal points belonging to either one of the complex signal point sets g1 to g4 placed therein. In the present example, information is loaded on the fact about whether or not zero (0+0j) is included the complex signal point sequence, loaded on the fact about whether or not two predetermined complex signal points included in the complex signal point sequence are identical, and loaded on the complex signal point sets used in the modulation. More particularly, as a result of placing the complex signal point s1 belonging to the complex signal point set g1 in the resource element #1 and placing zero (0+0j) in the resource element #2, information "000" is expressed. Moreover, as a result of placing zero (0+0j) in the resource element #1 and placing the complex signal point s2 belonging to the complex signal point set g1 in the resource element #2, information "001" is expressed. Furthermore, as a result of placing the complex signal point s1 belonging to the complex signal point set g2 in the resource element #1 and placing zero (0+0j) in the resource element #2, information "010" is expressed. Moreover, as a result of placing zero (0+0j) in the resource element #1 and placing the complex signal point s2 belonging to the complex signal point set g2 in the resource element #2, information "011" is expressed. Furthermore, as a result of placing identical complex signal points belonging to the complex signal point set g3 (i.e., s1=s2 holding true) in the resource elements #1 and #2, information "100" is expressed. Moreover, as a result of placing different complex signal points belonging to the complex signal point set g3 (i.e., s1≠s2 holding true) in the resource elements #1 and #2, information "101" is expressed. Furthermore, as a result of placing identical complex signal points belonging to the complex signal point set g4 (i.e., s1=s2 holding true) in the resource elements #1 and #2, information "110" is expressed. Moreover, as a result of placing different complex signal points belonging to the complex signal point set g4 (i.e., s1≠s2 holding true) in the resource elements #1 and #2, information "111" is expressed.

In Table 19 given below is illustrated an example of the correspondence relationship between the input information sequence and the complex signal point sequence in the example illustrated in FIG. 50. In Table 19, an example is illustrated in which a 5-bit input information sequence is modulated into two complex signal points s1 and s2 placed in the two resource elements #1 and #2. Herein, the bits #1 to #3 are equivalent to the first-type bit sequence, and the bits #4 and #5 are equivalent to the second-type bit sequence. In the present example, since the second-type bit sequence has two bits, complex signal point sets based on the QPSK are used in the modulation.

TABLE 19

Example of correspondence relationship between input information sequence and complex signal point sequence

| Information to be loaded | | | | | Complex signal point placed in each resource element | |
|---|---|---|---|---|---|---|
| First-type bit sequence | | | Second-type bit sequence | | | |
| bit #1 | bit #2 | bit #3 | bit #4 | bit #5 | s1 | s2 |
| 0 | 0 | 0 | 0 | 0 | sqrt(2)*(1 + 1j) | 0 + 0j |
| 0 | 0 | 0 | 0 | 1 | sqrt(2)*(−1 + 1j) | 0 + 0j |
| 0 | 0 | 0 | 1 | 0 | sqrt(2)*(−1 − 1j) | 0 + 0j |
| 0 | 0 | 0 | 1 | 1 | sqrt(2)*(1 − 1j) | 0 + 0j |
| 0 | 0 | 1 | 0 | 0 | 0 + 0j | sqrt(2)*(1 + 1j) |
| 0 | 0 | 1 | 0 | 1 | 0 + 0j | sqrt(2)*(−1 + 1j) |
| 0 | 0 | 1 | 1 | 0 | 0 + 0j | sqrt(2)*(−1 − 1j) |
| 0 | 0 | 1 | 1 | 1 | 0 + 0j | sqrt(2)*(1 − 1j) |
| 0 | 1 | 0 | 0 | 0 | 2*(1 + 0j) | 0 + 0j |
| 0 | 1 | 0 | 0 | 1 | 2*(0 + 1j) | 0 + 0j |
| 0 | 1 | 0 | 1 | 0 | 2*(−1 + 0j) | 0 + 0j |
| 0 | 1 | 0 | 1 | 1 | 2*(0 − 1j) | 0 + 0j |
| 0 | 1 | 1 | 0 | 0 | 0 + 0j | 2*(1 + 0j) |
| 0 | 1 | 1 | 0 | 1 | 0 + 0j | 2*(0 + 1j) |
| 0 | 1 | 1 | 1 | 0 | 0 + 0j | 2*(−1 + 0j) |
| 0 | 1 | 1 | 1 | 1 | 0 + 0j | 2*(0 − 1j) |
| 1 | 0 | 0 | 0 | 0 | sqrt(2)*(1 + 0j) | sqrt(2)*(1 + 0j) |
| 1 | 0 | 0 | 0 | 1 | sqrt(2)*(0 + 1j) | sqrt(2)*(0 + 1j) |
| 1 | 0 | 0 | 1 | 0 | sqrt(2)*(−1 + 0j) | sqrt(2)*(−1 + 0j) |
| 1 | 0 | 0 | 1 | 1 | sqrt(2)*(0 − 1j) | sqrt(2)*(0 − 1j) |

TABLE 19-continued

Example of correspondence relationship between input information sequence and complex signal point sequence

| Information to be loaded | | | | | Complex signal point placed in each resource element | |
|---|---|---|---|---|---|---|
| First-type bit sequence | | Second-type bit sequence | | | | |
| bit #1 | bit #2 | bit #3 | bit #4 | bit #5 | s1 | s2 |
| 1 | 0 | 1 | 0 | 0 | sqrt(2)*(1 + 0j) | sqrt(2)*(−1 + 0j) |
| 1 | 0 | 1 | 0 | 1 | sqrt(2)*(0 + 1j) | sqrt(2)*(0 − 1j) |
| 1 | 0 | 1 | 1 | 0 | sqrt(2)*(−1 + 0j) | sqrt(2)*(1 + 0j) |
| 1 | 0 | 1 | 1 | 1 | sqrt(2)*(0 − 1j) | sqrt(2)*(0 + 1j) |
| 1 | 1 | 0 | 0 | 0 | (1 + 1j) | (1 + 1j) |
| 1 | 1 | 0 | 0 | 1 | (−1 + 1j) | (−1 + 1j) |
| 1 | 1 | 0 | 1 | 0 | (−1 − 1j) | (−1 − 1j) |
| 1 | 1 | 0 | 1 | 1 | (1 − 1j) | (1 − 1j) |
| 1 | 1 | 1 | 0 | 0 | (1 + 1j) | (−1 − 1j) |
| 1 | 1 | 1 | 0 | 1 | (−1 + 1j) | (1 − 1j) |
| 1 | 1 | 1 | 1 | 0 | (−1 − 1j) | (1 + 1j) |
| 1 | 1 | 1 | 1 | 1 | (1 − 1j) | (−1 + 1j) |

The first-type bit sequence includes the first-type bit indicating whether or not zero (0+0j) is included in the complex signal point sequence. In Table 19, the bit #1 represents the first-type bit. When the bit #1 is equal to "0", zero (0+0j) is included in the complex signal point sequence. When the bit #1 is equal to "1", zero (0+0j) is not included in the complex signal point sequence.

When zero (0+0j) is included in the complex signal point sequence, the first-type bit sequence includes the second-type bit indicating the position of zero (0+0j) in the complex signal point sequence. In other words, when zero (0+0j) is included in the complex signal point sequence, the first-type bit sequence includes the second-type bit indicating the positions of the non-zero elements in the complex signal point sequence. In Table 19, the bit #3 serves as the second-type bit. When the bit #1 is equal to "0" and when the bit #3 is equal to "0", the complex signal point s2 placed in the resource element #2 is equal to zero (0+0j). On the other hand, when the bit #1 is equal to "0" and when the bit #3 is equal to "1", the complex signal point s1 placed in the resource element #1 is equal to zero (0+0j).

When zero (0+0j) is not included in the complex signal point sequence, the first-type bit sequence includes the third-type bit indicating whether or not identical complex signal points are included in the complex signal point sequence. In Table 19, the bit #3 serves as the third-type bit. When the bit #1 is equal to "1" and when the bit #3 is equal to "0", the complex signal points s1 and s2 are identical. On the other hand, when the bit #1 is equal to "1" and when the bit #3 is equal to "1", the complex signal points s1 and s2 are different from each other. When the complex signal points s1 and s2 are different from each other, it is desirable that they have a predetermined relationship. Moreover, it is desirable that the relationship is expressible using linear conversion. As the predetermined relationship, it is possible to think of a predetermined phase difference, a predetermined amplitude difference, or a combination thereof. For example, in the example illustrated in Table 19, the predetermined relationship is the phase difference of π radian (i.e., 180°). More particularly, with reference to the row in which the bit #1 is equal to "1" and the bit #3 is equal to "1" in Table 19, if the phase rotation of 7c radian is applied to the complex signal point s1, it becomes equal to the complex signal point s2.

The first-type bit sequence includes fourth-type bits indicating the type of the complex signal point sets used in the modulation of the second-type bit sequence. In Table 19, the bits #1 and #2 serve as the fourth-type bits. When the bit #1 is equal to "0" and the bit #2 is equal to "0", the modulation of the bits #3 and #4 is performed using the complex signal point set g1 illustrated in Table 20 given below. When the bit #1 is equal to "0" and the bit #2 is equal to "1", the modulation of the bits #3 and #4 is performed using the complex signal point set g2 illustrated in Table 21 given below. When the bit #1 is equal to "1" and the bit #2 is equal to "0", the modulation of the bits #3 and #4 is performed using the complex signal point set g3 illustrated in Table 22 given below. When the bit #1 is equal to "1" and the bit #2 is equal to "1", the modulation of the bits #3 and #4 is performed using the complex signal point set g4 illustrated in Table 23 given below. Herein, it is desirable that the complex signal point sets g0 to g4 have a predetermined relationship. Moreover, it is desirable that the predetermined relationship is expressible using linear conversion. As the predetermined relationship, it is possible to think of a predetermined phase difference, a predetermined amplitude difference, or a combination thereof.

TABLE 20

Complex signal point set g1 used when bit #1 is equal to "0" and bit #2 is equal to "0" in Table 19

| bit #4 | bit #5 | Complex signal point |
|---|---|---|
| 0 | 0 | sqrt (2) * (1 + 1j) |
| 0 | 1 | sqrt (2) * (−1 + 1j) |
| 1 | 0 | sqrt (2) * (−1 − 1j) |
| 1 | 1 | sqrt (2) * (1 − 1j) |

TABLE 21

Complex signal point set g2 used when bit #1 is equal to "0" and bit #2 is equal to "1" in Table 1

| bit #4 | bit #5 | Complex signal point |
|---|---|---|
| 0 | 0 | 2 * (1 + 0j) |
| 0 | 1 | 2 * (0 + 1j) |
| 1 | 0 | 2 * (−1 + 0j) |
| 1 | 1 | 2 * (0 − 1j) |

TABLE 22

Complex signal point set g3 used when bit #1 is equal to "1" and bit #2 is equal to "0" in Table 19

| bit #4 | bit #5 | Complex signal point |
|---|---|---|
| 0 | 0 | sqrt (2) * (1 + 0j) |
| 0 | 1 | sqrt (2) * (0 + 1j) |
| 1 | 0 | sqrt (2) * (−1 + 0j) |
| 1 | 1 | sqrt (2) * (0 − 1j) |

TABLE 23

Complex signal point set g4 used when bit #1 is equal to "1" and bit #2 is equal to "1" in Table 19

| bit #4 | bit #5 | Complex signal point |
|---|---|---|
| 0 | 0 | (1 + 1j) |
| 0 | 1 | (−1 + 1j) |
| 1 | 0 | (−1 − 1j) |
| 1 | 1 | (1 − 1j) |

Effects of First Method and Second Method

Figure 51:
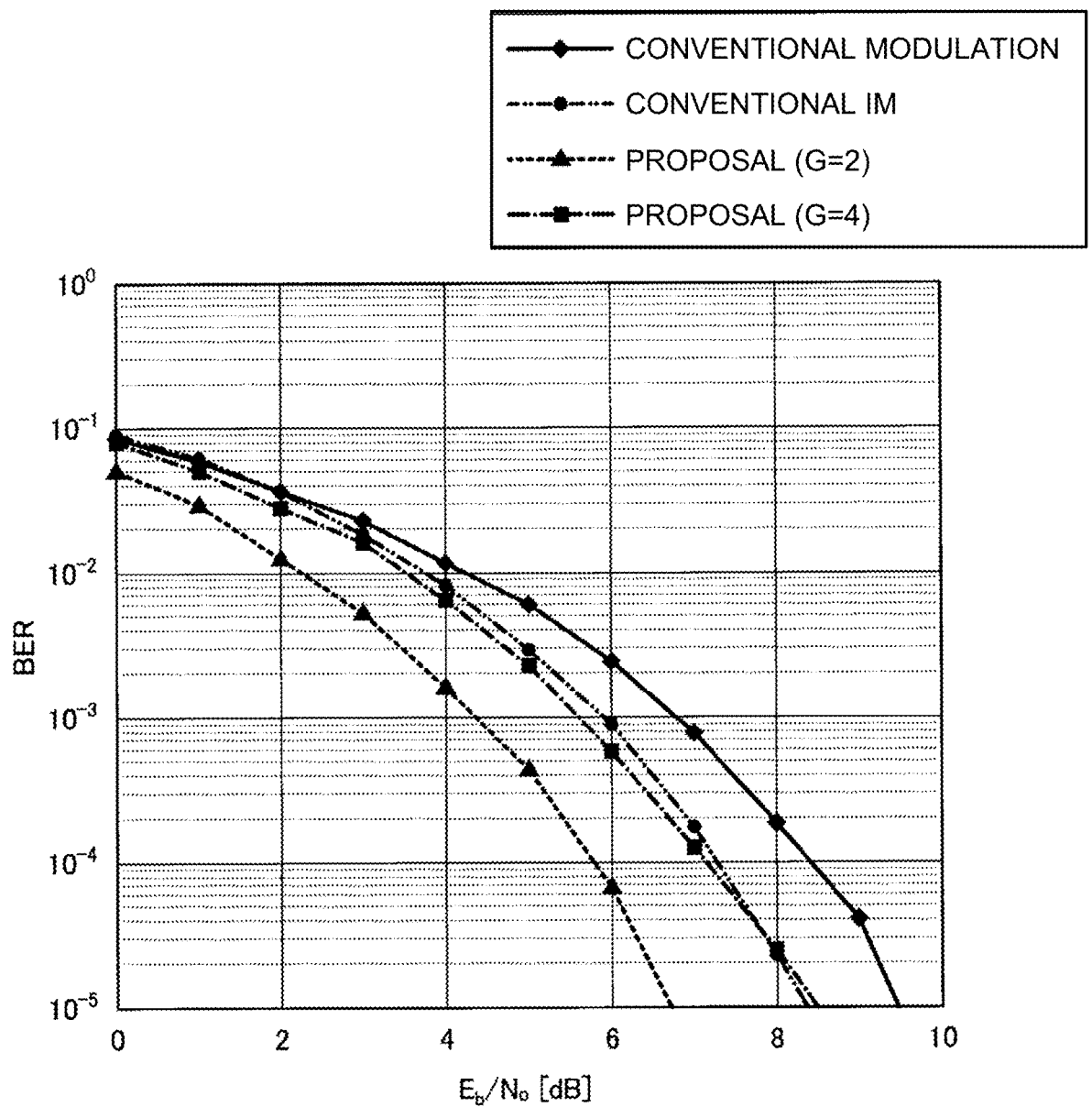
FIG. 51 is a graph indicating the comparison of the bit energy to noise density ratio with the bit error rate among the modulation method according to the second modification example and the existing modulation methods.

FIG. 51 is a graph indicating the comparison of the bit energy to noise density ratio (Eb/N0) with the bit error rate (BER) among the modulation method according to the second modification example and the existing modulation methods. In FIG. 51 is illustrated the bit error rate in the case of using various modulation methods in the additive white Gaussian noise (AWGN) channel. In each modulation method, it is assumed that modulation into complex signal points is performed using the QPSK in common. The "Conventional Modulation" corresponds to the bit error rate in the case of using the normal OFDM as the modulation method. In this modulation method, 2-bit information is loadable in each resource element. The "Conventional IM" corresponds to the bit error rate in the case of using the conventional IM as the modulation method. In this modulation method, 2-bit information is loadable in each resource element. The "Proposal (G=2)" corresponds to the error bit rate in the case of using the first method according to the second modification example as the modulation method. In this modulation method, 2-bit information is loadable in each resource element. The "Proposal (G=4)" corresponds to the error bit rate in the case of using the second method according to the second modification example as the modulation method. In this modulation method, 2.5-bit information is loadable in each resource element.

With reference to FIG. 51, firstly, in the first method, at BER=10^-5, it is seen that the required Eb/N0 can be improved by approximately 2.5 dB as compared to the modulation method using the conventional OFDM. Moreover, in the second method, at BER=10^-5, it is seen that the required Eb/N0 can be improved by approximately 1 dB as compared to the modulation method using the conventional OFDM, and that the required Eb/N0 of a comparable level to the modulation method using the conventional IM is achieved. In this way, in the second modification example, it becomes possible to implement communication having high power efficiency.

Third Method

In a third method, 3-bit information is loadable on the usages of two resource elements. In the third method, complex signal point sets used in the modulation of a plurality of non-zero complex signal points are mutually different. Regarding the third method, the detailed explanation is given below with reference to FIG. 52.

Figure 52:
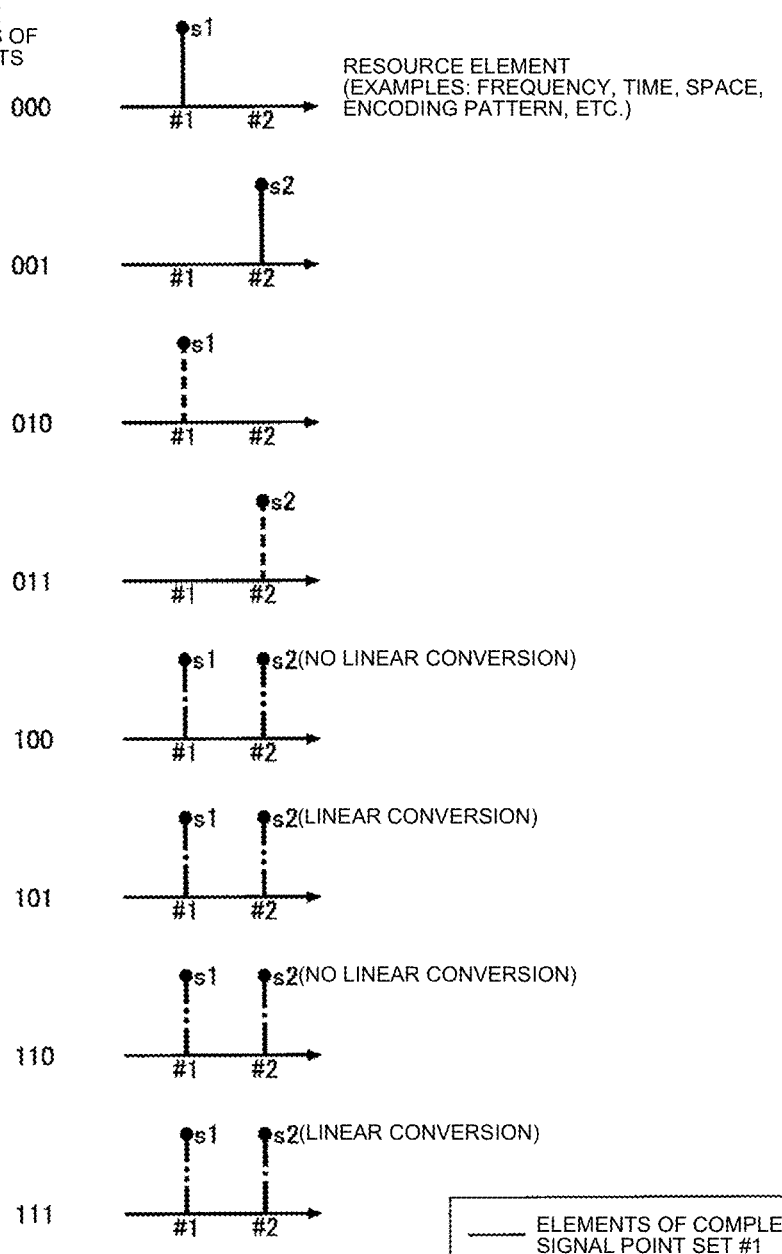
FIG. 52 is a diagram illustrating an example of the combinations of the candidates for the first-type bit sequence and the applicable patterns according to the second modification example.

FIG. 52 is a diagram illustrating an example of the combinations of the candidates for the first-type bit sequence and the applicable patterns according to the second modification example. The horizontal axis represents arbitrary resource elements. A complex signal point si represents the complex signal point placed in the i-th resource element. The difference in the line styles of the complex signal point si indicates the difference in the complex signal point sets to which the complex signal point si belongs. In the example illustrated in FIG. 52, the two resource elements #1 and #2 constituting a resource element block have the complex signal points belonging to either one of the complex signal point sets g1 to g4 placed therein. In the present example, information is loaded on the fact about whether or not zero (0+0j) is included the complex signal point sequence, loaded on the fact about whether or not predetermined linear conversion is performed with respect to the complex signal points, and loaded on the complex signal point sets used in the modulation. More particularly, as a result of placing the complex signal point s1 belonging to the complex signal point set g1 in the resource element #1 and placing zero (0+0j) in the resource element #2, information "000" is expressed. Moreover, as a result of placing zero (0+0j) in the resource element #1 and placing the complex signal point s2 belonging to the complex signal point set g1 in the resource element #2, information "001" is expressed. Furthermore, as a result of placing the complex signal point s1 belonging to the complex signal point set g2 in the resource element #1 and placing zero (0+0j) in the resource element #2, information "010" is expressed. Moreover, as a result of placing zero (0+0j) in the resource element #1 and placing the complex signal point s2 belonging to the complex signal point set g2 in the resource element #2, information "011" is expressed. Furthermore, as a result of placing the complex signal point s1 belonging to the complex signal point set g3 in the resource element #1, placing the complex signal point s2 belonging to the complex signal point set g4 in the resource element #2, and not performing predetermined linear conversion with respect to the complex signal point s2; information "100" is expressed. Moreover, as a result of placing the complex signal point s1 belonging to the complex signal point set g3 in the resource element #1, placing the complex signal point s2 belonging to the complex signal point set g4 in the resource element #2, and performing predetermined linear conversion with respect to the complex signal point s2; information "101" is expressed. Furthermore, as a result of placing the complex signal point s1 belonging to the complex signal point set g4 in the resource element #1, placing the complex signal point s2 belonging to the complex signal point set g3 in the resource element #2, and not performing predetermined linear conversion with respect to the complex signal point s2; information "110" is expressed. Moreover, as a result of placing the complex signal point s1 belonging to the complex signal point set g4 in the resource element #1, placing the complex signal point s2 belonging to the complex signal point set g3 in the resource element #2, and performing predetermined linear conversion with respect to the complex signal point s2; information "111" is expressed.

In Table 24 given below is illustrated an example of the correspondence relationship between the input information sequence and the complex signal point sequence in the example illustrated in FIG. 52. In Table 24, an example is illustrated in which a 5-bit input information sequence is modulated into two complex signal points s1 and s2 placed in the two resource elements #1 and #2. Herein, the bits #1 to #3 are equivalent to the first-type bit sequence, and the bits #4 and #5 are equivalent to the second-type bit sequence. In the present example, since the second-type bit sequence has two bits, complex signal point sets based on the QPSK are used in the modulation.

TABLE 24

Example of correspondence relationship between input information sequence and complex signal point sequence

| Information to be loaded | | | | | Complex signal point placed in each resource element | |
|---|---|---|---|---|---|---|
| First-type bit sequence | | | Second-type bit sequence | | | |
| bit #1 | bit #2 | bit #3 | bit #4 | bit #5 | s1 | s2 |
| 0 | 0 | 0 | 0 | 0 | sqrt(2)*(1 + 1j) | 0 + 0j |
| 0 | 0 | 0 | 0 | 1 | sqrt(2)*(-1 + 1j) | 0 + 0j |
| 0 | 0 | 0 | 1 | 0 | sqrt(2)*(-1 - 1j) | 0 + 0j |
| 0 | 0 | 0 | 1 | 1 | sqrt(2)*(1 - 1j) | 0 + 0j |
| 0 | 0 | 1 | 0 | 0 | 0 + 0j | sqrt(2)*(1 + 1j) |
| 0 | 0 | 1 | 0 | 1 | 0 + 0j | sqrt(2)*(-1 + 1j) |
| 0 | 0 | 1 | 1 | 0 | 0 + 0j | sqrt(2)*(-1 - 1j) |

TABLE 24-continued

Example of correspondence relationship between input information sequence and complex signal point sequence

| Information to be loaded | | | | | Complex signal point placed in each resource element | |
|---|---|---|---|---|---|---|
| First-type bit sequence | | | Second-type bit sequence | | | |
| bit #1 | bit #2 | bit #3 | bit #4 | bit #5 | s1 | s2 |
| 0 | 0 | 1 | 1 | 1 | 0 + 0j | Sqrt(2)*(1 − 1j) |
| 0 | 1 | 0 | 0 | 0 | 2*(1 + 0j) | 0 + 0j |
| 0 | 1 | 0 | 0 | 1 | 2*(0 + 1j) | 0 + 0j |
| 0 | 1 | 0 | 1 | 0 | 2*(−1 + 0j) | 0 + 0j |
| 0 | 1 | 0 | 1 | 1 | 2*(0 − 1j) | 0 + 0j |
| 0 | 1 | 1 | 0 | 0 | 0 + 0j | 2*(1 + 0j) |
| 0 | 1 | 1 | 0 | 1 | 0 + 0j | 2*(0 + 1j) |
| 0 | 1 | 1 | 1 | 0 | 0 + 0j | 2*(−1 + 0j) |
| 0 | 1 | 1 | 1 | 1 | 0 + 0j | 2*(0 − 1j) |
| 1 | 0 | 0 | 0 | 0 | sqrt(2)*(1 + 0j) | (1 + 1j) |
| 1 | 0 | 0 | 0 | 1 | sqrt(2)*(0 + 1j) | (−1 + 1j) |
| 1 | 0 | 0 | 1 | 0 | sqrt(2)*(−1 + 0j) | (−1 − 1j) |
| 1 | 0 | 0 | 1 | 1 | sqrt(2)*(0 − 1j) | (1 − 1j) |
| 1 | 0 | 1 | 0 | 0 | sqrt(2)*(1 + 0j) | (−1 − 1j) |
| 1 | 0 | 1 | 0 | 1 | sqrt(2)*(0 + 1j) | (1 − 1j) |
| 1 | 0 | 1 | 1 | 0 | sqrt(2)*(−1 + 0j) | (1 + 1j) |
| 1 | 0 | 1 | 1 | 1 | sqrt(2)*(0 − 1j) | (−1 + 1j) |
| 1 | 1 | 0 | 0 | 0 | (1 + 1j) | sqrt(2)*(1 + 0j) |
| 1 | 1 | 0 | 0 | 1 | (−1 + 1j) | sqrt(2)*(0 + 1j) |
| 1 | 1 | 0 | 1 | 0 | (−1 − 1j) | sqrt(2)*(−1 + 0j) |
| 1 | 1 | 0 | 1 | 1 | (1 − 1j) | sqrt(2)*(0 − 1j) |
| 1 | 1 | 1 | 0 | 0 | (1 + 1j) | sqrt(2)*(−1 + 0j) |
| 1 | 1 | 1 | 0 | 1 | (−1 + 1j) | sqrt(2)*(0 − 1j) |
| 1 | 1 | 1 | 1 | 0 | (−1 − 1j) | sqrt(2)*(1 + 0j) |
| 1 | 1 | 1 | 1 | 1 | (1 − 1j) | sqrt(2)*(0 + 1j) |

The first-type bit sequence includes the first-type bit indicating whether or not zero (0+0j) is included in the complex signal point sequence. In Table 24, the bit #1 represents the first-type bit. When the bit #1 is equal to "0", zero (0+0j) is included in the complex signal point sequence. When the bit #1 is equal to "1", zero (0+0j) is not included in the complex signal point sequence.

When zero (0+0j) is included in the complex signal point sequence, the first-type bit sequence includes the second-type bit indicating the position of zero (0+0j) in the complex signal point sequence. In other words, when zero (0+0j) is included in the complex signal point sequence, the first-type bit sequence includes the second-type bit indicating the positions of the non-zero elements in the complex signal point sequence. In Table 24, the bit #3 serves as the second-type bit. When the bit #1 is equal to "0" and when the bit #3 is equal to "0", the complex signal point s2 placed in the resource element #2 is equal to zero (0+0j). On the other hand, when the bit #1 is equal to "0" and when the bit #3 is equal to "1", the complex signal point s1 placed in the resource element #1 is equal to zero (0+0j).

The first-type bit sequence includes fourth-type bits indicating the type of the complex signal point sets used in the modulation of the second-type bit sequence. In Table 24, the bits #1 and #2 serve as the fourth-type bits. When the bit #1 is equal to "0" and the bit #2 is equal to "0", the modulation of the bits #3 and #4 is performed using the complex signal point set g1 illustrated in Table 20 given earlier. When the bit #1 is equal to "0" and the bit #2 is equal to "1", the modulation of the bits #3 and #4 is performed using the complex signal point set g2 illustrated in Table 21 given earlier. When the bit #1 is equal to "1" and the bit #2 is equal to "0", the modulation of the bits #3 and #4 is performed using the complex signal point set g3 illustrated in Table 22 given earlier. When the bit #1 is equal to "1" and the bit #2 is equal to "1", the modulation of the bits #3 and #4 is performed using the complex signal point set g4 illustrated in Table 23 given earlier. Herein, it is desirable that the complex signal point sets g0 to g4 have a predetermined relationship. Moreover, it is desirable that the predetermined relationship is expressible using linear conversion. As the predetermined relationship, it is possible to think of a predetermined phase difference, a predetermined amplitude difference, or a combination thereof.

When zero (0+0j) is not included in the complex signal point sequence, the first-type bit sequence includes a fifth-type bit indicating application or no application of predetermined linear conversion with respect to the complex signal points. In Table 24, the bit #3 serves as the fifth-type bit. When the bit #1 is equal to "1" and the bit #3 is equal to "0", predetermined linear conversion is not performed with respect to the complex signal point s2. On the other hand, when the bit #1 is equal to "1" and the bit #3 is equal to "1", predetermined linear conversion is performed with respect to the complex signal point s2. As the predetermined linear conversion, it is possible to think of predetermined phase rotation, predetermined amplitude increase-decrease, or a combination thereof. For example, in the example illustrated in Table 24, the predetermined linear conversion implies the phase rotation of π radian (i.e., 180°). For example, regarding the complex signal point s2 in the case of the input information sequence (1, 0, 0, 0, 0) and the complex signal point s2 in the case of the input information sequence (1, 0, 1, 0, 0), there is a phase difference of π radian between the two complex signal points s2. With such a configuration, it can be expected to extend the Euclidean distance of the signal point obtained by synthesizing the complex signal points s1 and s2.

Supplementary Explanation

In the first to third methods explained above, it is desirable that the predetermined relationship among the complex signal point sets is expressible using linear conversion. However, it is alternatively possible to think in a different way. As an example, the predetermined relationship among the complex signal point sets can be regarded as the relationship in which the real part and the imaginary part in the complex signal point sets have different manners of allocation. For example, in the complex signal point set g1 illustrated in Table 17 given earlier, the signal component is allocated to the real part as well as the imaginary part. However, in the complex signal point set g2 illustrated in Table 18 given earlier, the signal component is allocated to only either the real part or the imaginary part.

Regarding Euclidean Distance Among Complex Signal Point Sequences

In Table 16, Table 19, and Table 24 are illustrated examples of the correspondence relationship between the input information sequence and the complex signal point sequence according to the respective methods. In any of those methods, it is desirable that the Euclidean distance or the minimum Euclidean distance among a plurality of complex signal point sequences that may get generated is equal to or greater than a predetermined threshold value. That is because, in the conventional modulation method (for example, the QPSK), the minimum Euclidean distance between a particular single complex signal point (i.e., a complex scalar) and another single complex signal point is taken into account (i.e., is treated as important).

Assume that D number of complex vectors having L number of elements are defined (i.e., D number of complex signal point sequences are defined). For example, with reference to Table 16, L=2 and D=16 holds true. With reference to Table 19 and Table 24, L=2 and D=32 holds true. In that case, Euclidean distance $E_{m,n}$ between two different complex vectors $s_m$ and $s_n$ is defined as given in the following equation.

$$E_{m,n} = \sqrt{\sum_{l=1}^{L} |s_{m,l} - s_{n,l}|^2} \qquad (51)$$

Herein, $s_{m,l}$ and $s_{n,l}$ represent the l-th element of the complex vectors $s_m$ and $s_n$, respectively. Regarding each pair of complex vectors, it is desirable that the Euclidean distance $E_{m,n}$ is equal to or greater than a predetermined threshold value $E_{th}$. That is, it is desirable that the following equation is established.

$$E_{m,n} \geq E_{th}, \text{ where } 1 \leq m, n \leq L, m \neq n \qquad (52)$$

Alternatively, it is desirable that a minimum Euclidean distance $E_{min}$ from among the Euclidean distances $E_{m,n}$ in all pairs of complex vectors is equal to or greater than the predetermined threshold value $E_{th}$. That is, it is desirable that the following equation is established.

$$E_{min} \geq E_{th} \qquad (53)$$
$$\text{where } E_{min} = \min_{1 \leq m,n \leq L, m \neq n} E_{m,n}$$

Herein, as the predetermined threshold value $E_{th}$, for example, it is possible to use a minimum Euclidean distance $E_{min, g}$ between the complex signal points (i.e., complex scalars) in a particular complex signal point set g from among the complex signal point sets used at the time of defining the target complex vectors. Alternatively, a value $\delta E_{min, g}$ obtained by applying a coefficient $\delta$ ($\geq 0$) to the minimum Euclidean distance $E_{min, g}$ can be used as the predetermined threshold value $E_{th}$.

4. Application Examples

The technology disclosed in the application concerned can be applied in various products. For example, the transmission device 100 or the receiving device 200 can be implemented as an eNB (evolved Node B) of either the macro eNB type or the small eNB type. A small eNB, such as a pico eNB, or a micro eNB, or a home (femto) eNB, can be an eNB covering smaller cells than macro cells. Alternatively, the transmission device 100 or the receiving device 200 can be implemented as a base station of some other type such as NodeB or BTS (Base Transceiver Station). The transmission device 100 or the receiving device 200 can include the main body (base station device) that controls the wireless communication, and include one or more RRHs (Remote Radio Heads) placed at different locations than the main body. Still alternatively, various types of terminals (described later) can be configured to execute, temporarily or permanently, the base station function, and operate as the transmission device 100 or the receiving device 200.

Meanwhile, for example, the transmission device 100 or the receiving device 200 can be implemented as a mobile device such as a smartphone, a tablet PC (Personal Computer), a note PC, a portable game terminal, a portable-type/dongle-type mobile router, or a digital camera; or can be implemented as an in-vehicle terminal such as a car navigation device. Alternatively, the transmission device 100 or the receiving device 200 can be implemented as a terminal performing M2M (Machine To Machine) communication (also called an MTC (Machine Type Communication) terminal). Still alternatively, the transmission device 100 or the receiving device 200 can be a wireless communication module (for example, an integrated circuit module configured using a single die) installed on such terminals.

4.1. Application Example Related to Base Station

First Application Example

Figure 53:
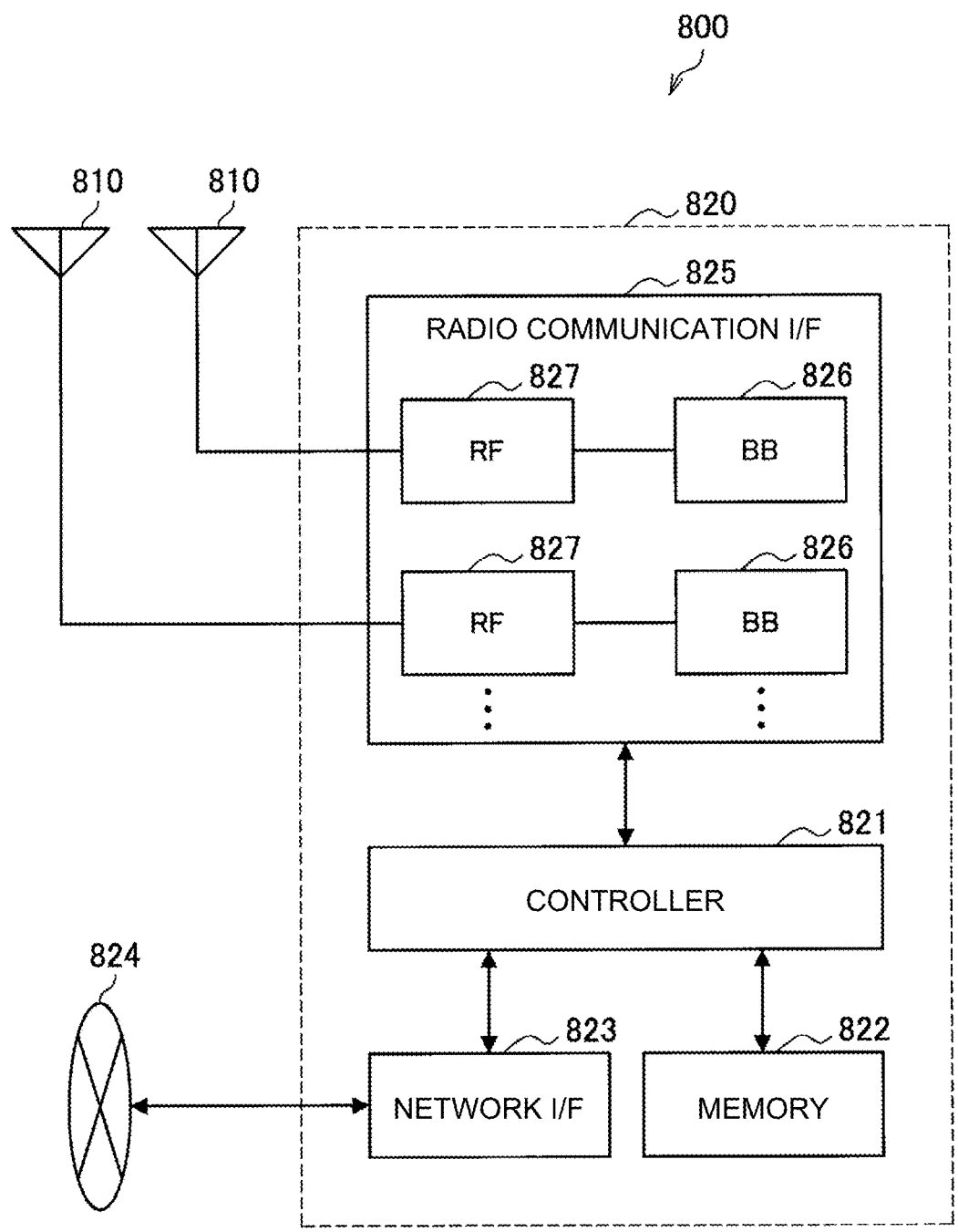
FIG. 53 is a block diagram illustrating a first example of a schematic configuration of an eNB.

FIG. 53 is a block diagram illustrating a first example of a schematic configuration of the eNB in which the technology disclosed in the application concerned is applicable. An eNB 800 includes one or more antennas 810 and a base station device 820. The antennas 810 can be connected to the base station device 820 by RF cables.

Each antenna 810 includes one or more antenna elements (for example, a plurality of antenna elements constituting a MIMO antenna), and is used by the base station device 820 in transmitting and receiving radio signals. The eNB 800 includes a plurality of antennas 810 as illustrated in FIG. 53, and each antenna 810 corresponds to, for example, one of a plurality of frequency bands used by the eNB 800. Meanwhile, in the example illustrated in FIG. 53, although the eNB 800 includes a plurality of antennas 810, it can alternatively include only a single antenna 810.

The base station device 820 includes a controller 821, a memory 822, a network interface 823, and a wireless communication interface 825.

The controller 821 can be, for example, a CPU or a DSP, and implements various functions of the upper layer of the base station device 820. For example, the controller 821 generates data packets from the data present in the signals processed by the wireless communication interface 825, and transfers the generated data packets via the network interface 823. Moreover, the controller 821 can generate bundled packets by bundling the data received from a plurality of baseband processors, and transfer the bundled packets. Furthermore, the controller 821 can have logical functions for performing control such as radio resource control, radio bearer control, mobility management, admission control, and scheduling. That control can be performed in coordination with the surrounding eNBs or core network nodes. The memory 822 includes a RAM and a ROM, and is used to store programs executed by the controller 821 and to store a variety of control data (such as a terminal list, transmission power data, and scheduling data).

The network interface 823 is a communication interface for connecting the base station device 820 to a core network 824. The controller 821 can communicate with core network nodes and the other eNBs via the network interface 823. In that case, the eNB 800 can be connected to the core network nodes and the other eNBs by a logical interface (such as an S1 interface or an X2 interface). The network interface 823 can be a wired communication interface, or can be a wireless communication interface for radio backhauling. When the network interface 823 is a wireless communication interface, it can perform wireless communication using higher frequency bands than the frequency bands used by the wireless communication interface 825.

The wireless communication interface 825 supports any one cellular communication method such as the LTE (Long Term Evolution) or the LTE-Advanced, and provides wireless connection via the antennas 810 to the terminals located inside the cell of the eNB 800. Typically, the wireless communication interface 825 can include a baseband (BB)

processor 826 and an RF circuit 827. The BB processor 826 can perform, for example, encoding/decoding, modulation/demodulation, and multiplexing/inverse multiplexing; and performs a variety of signal processing for each layer (for example, L1, MAC (Medium Access Control), RLC (Radio Link Control), and PDCP (Packet Data Convergence Protocol)). The BB processor 826 can include, in place of the controller 821, some or all of the logical functions mentioned earlier. The BB processor 826 can be a module including a memory for storing a communication control program, a processor for executing that program, and related circuits; and the functions of the BB processor 826 can be changed by updating the communication control program. Alternatively, the module can be a card or a blade that is inserted in a slot of the base station device 820, or can be a chip installed on the card or the blade. The RF circuit 827 can include a mixer, a filter, and an amplifier; and transmits and receives radio signals via the antennas 810.

The wireless communication interface 825 includes a plurality of BB processors 826 as illustrated in FIG. 53, and each BB processor 826 can correspond to, for example, one of a plurality of frequency bands used by the eNB 800. Moreover, the wireless communication interface 825 includes a plurality of RF circuits 827 as illustrated in FIG. 53, and each RF circuit 827 can correspond to, for example, one of a plurality of antenna elements. In FIG. 53 is illustrated the example in which the wireless communication interface 825 includes a plurality of BB processors 826 and a plurality of RF circuits 827. However, alternatively, the wireless communication interface 825 can include only a single BB processor 826 or only a single RF circuit 827.

In the eNB 800 illustrated in FIG. 53, one or more constituent elements of the control unit 140 explained with reference to FIG. 11 (i.e., the information sharing unit and/or the transmission signal processing unit 143) and/or one or more constituent elements of the control unit 240 explained with reference to FIG. 12 (i.e., the information sharing unit 241 and/or the received-signal processing unit 243) can be implemented in the wireless communication interface 825. Alternatively, at least some of the constituent elements can be installed in the controller 821. As an example, in the eNB 800, a module including either some part of the wireless communication interface 825 (for example, the BB processor 826) or the entire wireless communication interface 825 and/or the controller 821 can be installed, and the above-mentioned one or more constituent elements can be implemented in that module. In that case, the module can store therein a program meant for making the processor function as the abovementioned one or more constituent elements (in other words, a program meant for executing the operations of the abovementioned one or more constituent elements in the processor), and can execute that program. As another example, the program meant for making a processor function as the abovementioned one or more constituent elements can be installed in the eNB 800, and the wireless communication interface 825 (for example, the BB processor 826) and/or the controller 821 can execute that program. As described above, the eNB 800, or the base station device 820, or the abovementioned module can be provided as a device including the abovementioned one or more constituent elements; or a program meant for making a processor function as the abovementioned one or more constituent elements can be provided. Alternatively, a readable recording medium in which the program is recorded can be provided.

Moreover, in the eNB 800 illustrated in FIG. 53, the wireless communication unit 120 explained with reference to FIG. 11 and/or the wireless communication unit 220 explained with reference to FIG. 12 can be implemented in the wireless communication interface 825 (for example, the RF circuit 827). Furthermore, the antenna unit 110 and/or the antenna unit 210 can be implemented in the antenna 810. Moreover, the memory unit 130 and/or the memory unit 230 can be implemented in the memory 822.

Second Application Example

Figure 54:
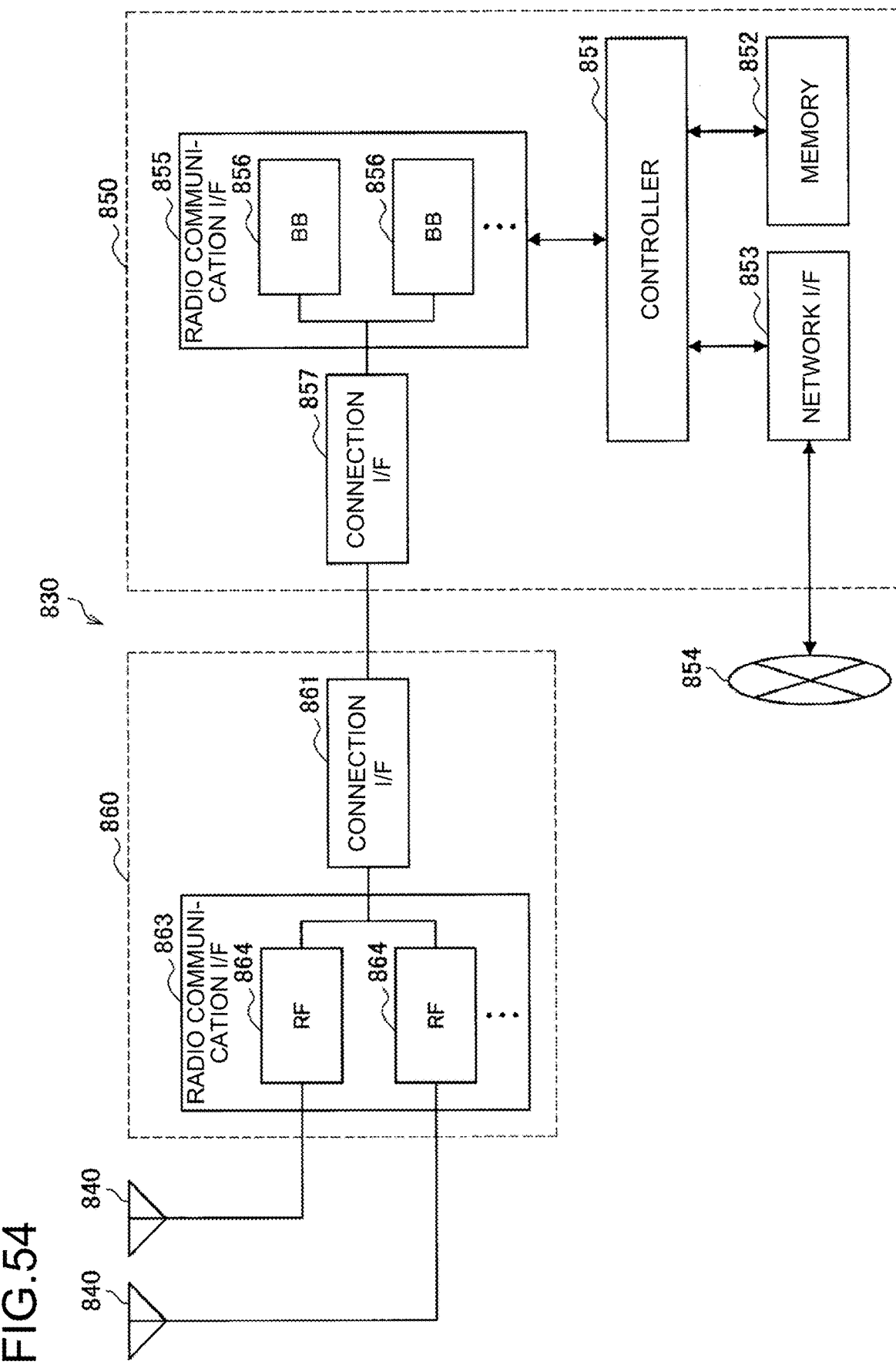
FIG. 54 is a block diagram illustrating a second example of a schematic configuration of the eNB.

FIG. 54 is a block diagram illustrating a second example of a schematic configuration of the eNB in which the technology disclosed in the application concerned is applicable. An eNB 830 includes one or more antennas 840, a base station device 850, and an RRH 860. Each antenna 840 is connected to the RRH 860 by an RF cable. Moreover, the base station device 850 and the RRH 860 can be connected to each other by a high-speed line such as an optical fiber cable.

Each antenna 840 includes one or more antenna elements (for example, a plurality of antenna elements constituting a MIMO antenna), and is used by the RRH 860 in transmitting and receiving radio signals. The eNB 830 includes a plurality of antennas 840 as illustrated in FIG. 54, and each antenna 840 corresponds to, for example, one of a plurality of frequency bands used by the eNB 830. Meanwhile, in the example illustrated in FIG. 54, although the eNB 830 includes a plurality of antennas 840, it can alternatively include only a single antenna 840.

The base station device 850 includes a controller 851, a memory 852, a network interface 853, a wireless communication interface 855, and a connection interface 857. The controller 851, the memory 852, and the network interface 853 are identical to the controller 821, the memory 822, and the network interface 823, respectively, explained with reference to FIG. 53.

The wireless communication interface 855 supports any one cellular communication method such as the LTE or the LTE-Advanced, and provides wireless connection via the RRH 860 and the antennas 840 to the terminals located inside the sector corresponding to the RRH 860. Typically, the wireless communication interface 855 can include a BB processor 856. The BB processor 856 is identical to the BB processor 826 explained with reference to FIG. 53, except for the fact that the BB processor 856 is connected to an RF circuit 864 of the RRH 860 via the connection interface 857. The wireless communication interface 855 includes a plurality of BB processors 856 as illustrated in FIG. 54, and each BB processor 856 can correspond to, for example, one of a plurality of frequency bands used by the eNB 830. Meanwhile, in the example illustrated in FIG. 54, although the wireless communication interface 855 includes a plurality of BB processors 856, it can alternatively include only a single BB processor 856.

The connection interface 857 is meant for connecting the base station device 850 (the wireless communication interface 855) to the RRH 860. The connection interface 857 can be a communication module for enabling communication in the abovementioned high-speed line connecting the base station device 850 (the wireless communication interface 855) and the RRH 860.

The RRH 860 includes a connection interface 861 and a wireless communication interface 863.

The connection interface 861 is an interface for connecting the RRH 860 (the wireless communication interface 863) to the base station device 850. The connection interface 861 can be a communication module enabling communication in the high-speed line.

The wireless communication interface 863 transmits and receives radio signals via the antenna 840. Typically, the wireless communication interface 863 can include the RF circuit 864. The RF circuit 864 can include a mixer, a filter, and an amplifier; and transmits and receives radio signals via the antennas 840. The wireless communication interface 863 includes a plurality of RF circuits 864 as illustrated in FIG. 54, and each RF circuit 864 can correspond to, for example, one of a plurality of antenna elements. Meanwhile, in the example illustrated in FIG. 54, although the wireless communication interface 863 includes a plurality of RF circuits 864, it can alternatively include only a single RF circuit 864.

In the eNB 830 illustrated in FIG. 54, one or more constituent elements included in the control unit 140 explained with reference to FIG. 11 (i.e., the information sharing unit 141 and/or the transmission signal processing unit 143) and/or one or more constituent elements included in the control unit 240 explained with reference to FIG. 12 (i.e., the information sharing unit 241 and/or the received-signal processing unit 243) can be implemented in the wireless communication interface 855 and/or the wireless communication interface 863. Alternatively, at least some of the constituent elements can be installed in the controller 851. As an example, in the eNB 830, a module including either some part of the wireless communication interface 855 (for example, the BB processor 856) or the entire wireless communication interface 855 and/or the controller 851 can be installed, and the abovementioned one or more constituent elements can be implemented in that module. In that case, the module can store therein a program meant for making the processor function as the abovementioned one or more constituent elements (in other words, a program meant for executing the operations of the abovementioned one or more constituent elements in the processor), and can execute that program. As another example, the program meant for making a processor function as the abovementioned one or more constituent elements can be installed in the eNB 830, and the wireless communication interface 855 (for example, the BB processor 856) and/or the controller 851 can execute that program. As described above, the eNB 830, the base station device 850, or the abovementioned module can be provided as a device including the abovementioned one or more constituent elements; or a program meant for making a processor function as the abovementioned one or more constituent elements can be provided. Alternatively, a readable recording medium in which the program is recorded can be provided.

Moreover, in the eNB 830 illustrated in FIG. 54, the wireless communication unit 120 explained with reference to FIG. 11 and/or the wireless communication unit 220 explained with reference to FIG. 12 can be implemented in the wireless communication interface 863 (for example, the RF circuit 864). Furthermore, the antenna unit 110 and/or the antenna unit 210 can be implemented in the antenna 840. Moreover, the memory unit 130 and/or the memory unit 230 can be implemented in the memory 852.

4.2. Application Examples Related to Terminal Device

First Application Example

Figure 55:
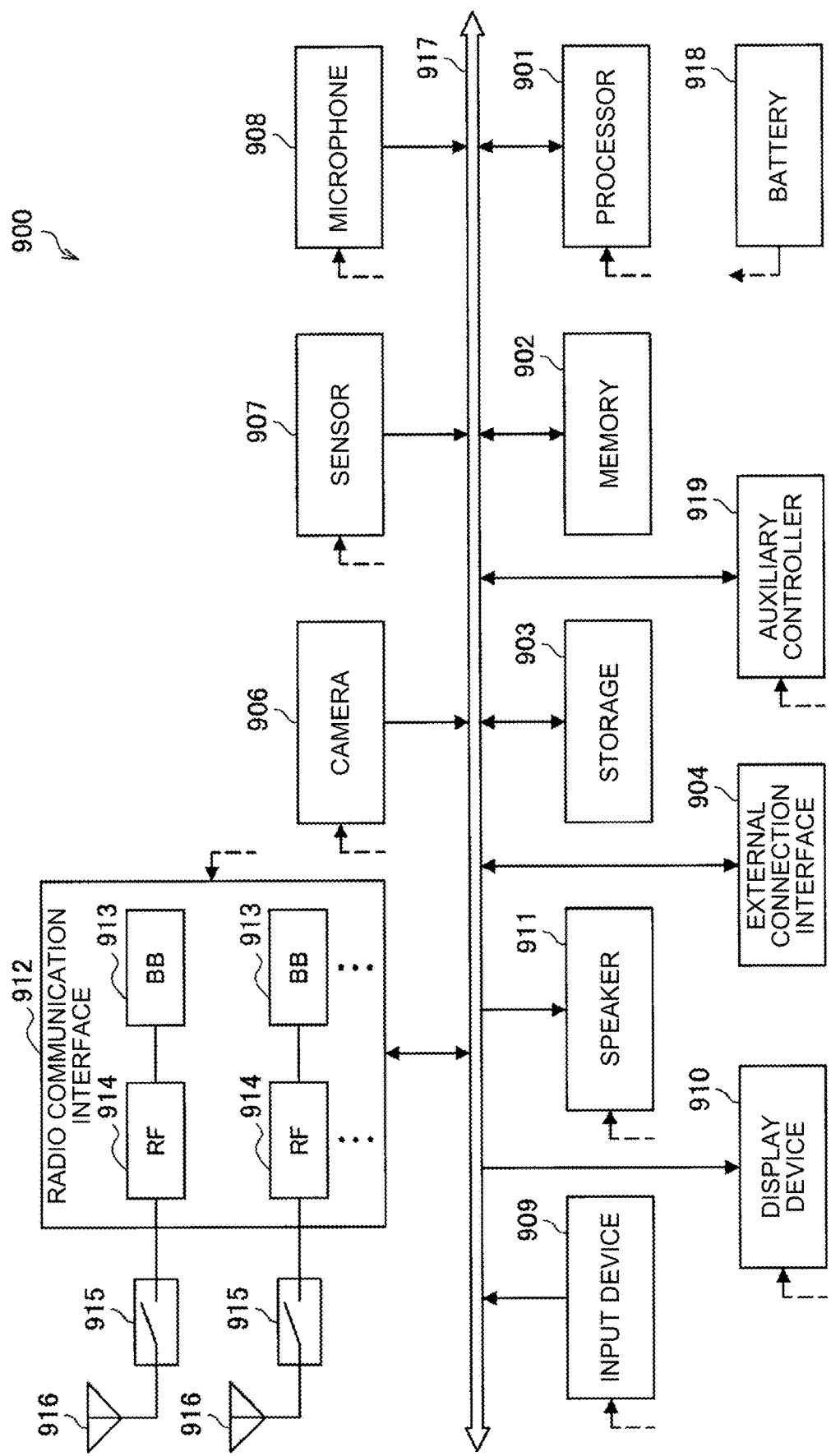
FIG. 55 is a block diagram illustrating an example of a schematic configuration of a smartphone.

FIG. 55 is a block diagram illustrating an example of a schematic configuration of a smartphone 900 in which the technology disclosed in the application concerned is applicable. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 can be, for example, a CPU or an SoC (System on Chip), and controls the functions of the application layer and the other layers of the smartphone 900. The memory 902 includes a RAM and a ROM, and is used to store the programs executed by the processor 901 and to store data. The storage 903 can include a memory medium such as a semiconductor memory or a hard disk. The external connection interface 904 is an interface for connecting an external device, such as a memory card or a USB (Universal Serial Bus) device, to the smartphone 900.

The camera 906 includes an imaging device such as a CCD (Charge Coupled Device) or a CMOS (Complementary Metal Oxide Semiconductor), and generates captured images. The sensor 907 can include a group of sensors such as a positioning sensor, a gyro sensor, a geomagnetic sensor, and an acceleration sensor. The microphone 908 converts the sound input to the smartphone 900 into sound signals. The input device 909 includes, for example, a touch sensor for detecting a touch on the screen of the display device 910, or includes a keypad, or includes a keyboard, or includes buttons or switches; and receives operations and information input from the user. The display device 910 has a screen such as a liquid crystal display (LCD) or an organic light emitting diode (OLED) display, and displays output images of the smartphone 900. The speaker 911 converts the sound signals, which are output from the smartphone 900, into sound.

The wireless communication interface 912 supports any one cellular communication method such as the LTE or the LTE-Advanced, and implements wireless communication. Typically, the wireless communication interface 912 can include a BB processor 913 and an RF circuit 914. The BB processor 913 can perform, for example, encoding/decoding, modulation/demodulation, and multiplexing/inverse multiplexing; and performs a variety of signal processing for wireless communication. The RF circuit 914 can include a mixer, a filter, and an amplifier; and transmits and receives radio signals via the antennas 916. Meanwhile, the wireless communication interface 912 can be a one-chip module in which the BB processor 913 and the RF circuit 914 are integrated. Moreover, the wireless communication interface 912 can include a plurality of BB processors 913 and a plurality of RF circuits 914 as illustrated in FIG. 55. Meanwhile, in the example illustrated in FIG. 55, although the wireless communication interface 912 includes a plurality of BB processors 913 and a plurality of RF circuits 914, it can alternatively include only a single BB processor 913 or only a single RF circuit 914.

Moreover, in addition to supporting the cellular communication method, the wireless communication interface 912 can also support other types of wireless communication methods such as the near field communication method, the proximity wireless communication method, and the wireless LAN (Local Area Network) method. In that case, the wireless communication interface 912 can include the BB processors 913 and the RF circuits 914 separately for each wireless communication method.

Each antenna switch 915 switches the connection destinations of the antennas 916 among a plurality of circuits included in the wireless communication interface 912 (for example, the circuits meant for different wireless communication methods).

Each antenna 916 includes one or more antenna elements (for example, a plurality of antenna elements constituting a MIMO antenna), and is used by the wireless communication interface 912 in transmitting and receiving radio signals. The smartphone 900 can include a plurality of antennas 916 as illustrated in FIG. 55. Meanwhile, in the example illustrated in FIG. 55, although the smartphone 900 includes a plurality of antennas 916, it can alternatively include only a single antenna 916.

Moreover, the smartphone 900 can include the antennas 916 separately for each wireless communication method. In that case, the antenna switch 915 can be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electrical power to each block of the smartphone 900, which is illustrated in FIG. 55, via a power supply line that is partially illustrated in FIG. 55 using dashed lines. The auxiliary controller 919 implements the minimum required functions of the smartphone 900 in, for example, the sleep mode.

In the smartphone 900 illustrated in FIG. 55, one or more constituent elements included in the control unit 140 explained with reference to FIG. 11 (i.e., the information sharing unit 141 and/or the transmission signal processing unit 143) and/or one or more constituent elements included in the control unit 240 explained with reference to FIG. 12 (i.e., the information sharing unit 241 and/or the received-signal processing unit 243) can be implemented in the wireless communication interface 912. Alternatively, at least some of the constituent elements can be installed in the processor 901 or the auxiliary controller 919. As an example, in the smartphone 900, a module including either some part of the wireless communication interface 912 (for example, the BB processor 913) or the entire wireless communication interface 912, the processor 901, and/or the auxiliary controller 919 can be installed; and the abovementioned one or more constituent elements can be implemented in that module. In that case, the module can store therein a program meant for making a processor function as the abovementioned one or more constituent elements (in other words, a program meant for executing the operations of the abovementioned one or more constituent elements in a processor), and can execute that program. As another example, the program meant for making a processor function as the abovementioned one or more constituent elements can be installed in the smartphone 900; and the wireless communication interface 912 (for example, the BB processor 913), the processor 901, and/or the auxiliary controller 919 can execute that program. As described above, the smartphone 900 or the abovementioned module can be provided as a device including the abovementioned one or more constituent elements; or a program meant for making a processor function as the abovementioned one or more constituent elements can be provided. Alternatively, a readable recording medium in which the program is recorded can be provided.

Moreover, in the smartphone 900 illustrated in FIG. 55, the wireless communication unit 120 explained with reference to FIG. 11 and/or the wireless communication unit 220 explained with reference to FIG. 12 can be implemented in the wireless communication interface 912 (for example, the RF circuit 914). Furthermore, the antenna unit 110 and/or the antenna unit 210 can be implemented in the antenna 916. Moreover, the memory unit 130 and/or the memory unit 230 can be implemented in the memory 902.

Second Application Example

Figure 56:
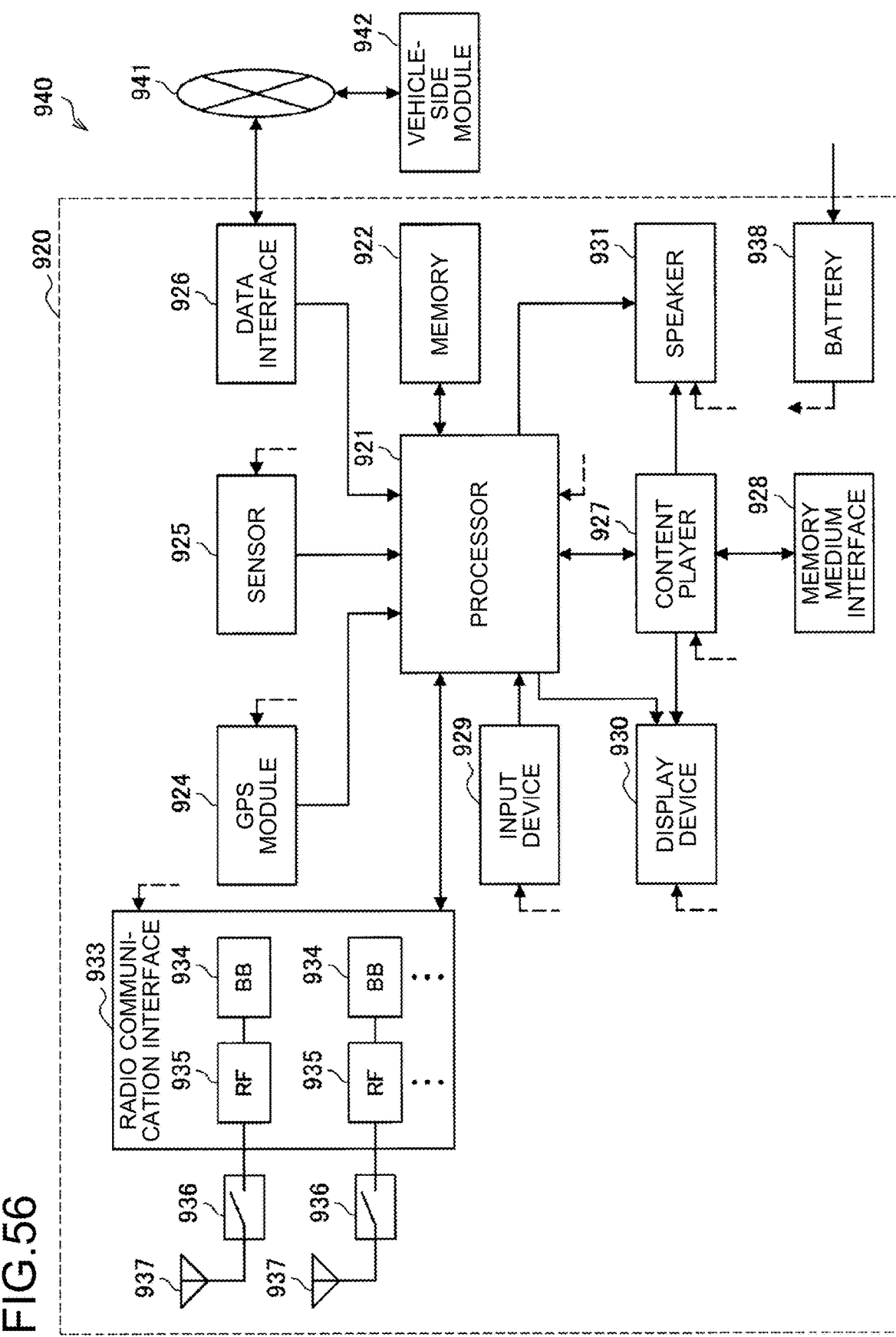
FIG. 56 is a block diagram illustrating an example of a schematic configuration of a car navigation device.

FIG. 56 is a block diagram illustrating an example of a schematic configuration of a car navigation device 920 in which the technology disclosed in the application concerned is applicable. The car navigation device 920 includes a processor 921, a memory 922, a GPS (Global Positioning System) module 924, a sensor 925, a data interface 926, a content player 927, a memory medium interface 928, an input device 929, a display device 930, a speaker 931, a wireless communication interface 933, one or more antenna switches 936, one or more antennas 937, and a battery 938.

The processor 921 can be, for example, a CPU or an SoC, and controls the navigation function and the other functions of the car navigation device 920. The memory 922 includes a RAM and a ROM, and is used to store the programs executed by the processor 921 and to store data.

The GPS module 924 uses GPS signals received from GPS satellites, and measures the location (for example, the latitude, the longitude, and the altitude) of the car navigation device 920. The sensor 925 can include a group of sensors such as a gyro sensor, a geomagnetic sensor, and a pressure sensor. The data interface 926 is connected to, for example, an in-vehicle network 941 via a terminal (not illustrated), and obtains data such as vehicle speed data generated in the vehicle.

The content player 927 reproduces the contents stored in a memory medium (such as a CD or a DVD) that is inserted in the memory medium interface 928. The input device 929 includes a touch sensor for detecting a touch on the screen of the display device 930, or includes buttons, or includes switches; and receives operations and information input from the user. The display device 930 has a screen such as an LCD or an OLED display, and displays the navigation functions or images of the reproduced contents. The speaker 931 outputs the sounds of the navigation functions or the sounds of the reproduced contents.

The wireless communication interface 933 supports any one cellular communication method such as the LTE or the LTE-Advanced, and implements wireless communication. Typically, the wireless communication interface 933 can include a BB processor 934 and an RF circuit 935. The BB processor 934 can perform, for example, encoding/decoding, modulation/demodulation, and multiplexing/inverse multiplexing; and performs a variety of signal processing for wireless communication. The RF circuit 935 can include a mixer, a filter, and an amplifier; and transmits and receives radio signals via the antennas 937. Meanwhile, the wireless communication interface 933 can be a one-chip module in which the BB processor 934 and the RF circuit 935 are integrated. Moreover, the wireless communication interface 933 can include a plurality of BB processors 934 and a plurality of RF circuits 935 as illustrated in FIG. 56. Meanwhile, in the example illustrated in FIG. 56, although the wireless communication interface 933 includes a plurality of BB processors 934 and a plurality of RF circuits 935, it can alternatively include only a single BB processor 934 or only a single RF circuit 935.

Moreover, in addition to supporting the cellular communication method, the wireless communication interface 933 can also support other types of wireless communication methods such as the near field communication method, the proximity wireless communication method, and the wireless LAN method. In that case, the wireless communication interface 933 can include the BB processors 934 and the RF circuits 935 separately for each wireless communication method.

Each antenna switch 936 switches the connection destinations of the antennas 937 among a plurality of circuits included in the wireless communication interface 933 (for example, the circuits meant for different wireless communication methods).

Each antenna 937 includes one or more antenna elements (for example, a plurality of antenna elements constituting a MIMO antenna), and is used by the wireless communication interface 933 in transmitting and receiving radio signals. The car navigation device 920 can include a plurality of antennas 937 as illustrated in FIG. 56. Meanwhile, in the example illustrated in FIG. 56, although the car navigation device 920 includes a plurality of antennas 937, it can alternatively include only a single antenna 937.

Moreover, the car navigation device 920 can include the antennas 937 separately for each wireless communication method. In that case, the antenna switch 936 can be omitted from the configuration of the car navigation device 920.

The battery 938 supplies electrical power to each block of the car navigation device 920, which is illustrated in FIG. 56, via a power supply line that is partially illustrated in FIG. 56 using dashed lines. Moreover, the battery 938 stores the electrical power supplied from the vehicle.

In the car navigation device 920 illustrated in FIG. 56, one or more constituent elements included in the control unit 140 explained with reference to FIG. 11 (i.e., the information sharing unit 141 and/or the transmission signal processing unit 143) and/or one or more constituent elements included in the control unit 240 explained with reference to FIG. 12 (i.e., the information sharing unit 241 and/or the received-signal processing unit 243) can be implemented in the wireless communication interface 933. Alternatively, at least some of the constituent elements can be installed in the processor 921. As an example, in the car navigation device 920, a module including either some part of the wireless communication interface 933 (for example, the BB processor 934) or the entire wireless communication interface 933 and/or the processor 921 can be installed; and the above-mentioned one or more constituent elements can be implemented in that module. In that case, the module can store therein a program meant for making a processor function as the abovementioned one or more constituent elements (in other words, a program meant for executing the operations of the abovementioned one or more constituent elements in a processor), and can execute that program. As another example, the program meant for making a processor function as the abovementioned one or more constituent elements can be installed in the car navigation device 920; and the wireless communication interface 933 (for example, the BB processor 934) and/or the processor 921 can execute that program. As described above, the car navigation device 920 or the abovementioned module can be provided as a device including the abovementioned one or more constituent elements; or a program meant for making a processor function as the abovementioned one or more constituent elements can be provided. Alternatively, a readable recording medium in which the program is recorded can be provided.

Moreover, in the car navigation device 920 illustrated in FIG. 56, the wireless communication unit 120 explained with reference to FIG. 11 and/or the wireless communication unit 220 explained with reference to FIG. 12 can be implemented in the wireless communication interface 933 (for example, the RF circuit 935). Furthermore, the antenna unit 110 and/or the antenna unit 210 can be implemented in the antenna 937. Moreover, the memory unit 130 and/or the memory unit 230 can be implemented in the memory 922.

Meanwhile, the technology disclosed in the application concerned can be implemented as an in-vehicle system (or a vehicle) 940 that includes one or more blocks of the car navigation device 920; the in-vehicle network 941; and a vehicle-side module 942. The vehicle-side module 942 generates vehicle data such as the vehicle speed, the engine rotation count, and breakdown information; and outputs the generated data to the in-vehicle network 941.

5. Summary

Regarding the embodiment of the application concerned, the detailed explanation is given above with reference to FIGS. 1 to 56. As explained above, the transmission device 100 according to the present embodiment applies modulation according to the new IM with respect to a first-type bit sequence and a second-type bit sequence, and converts the first-type bit sequence and the second-type bit sequence into a complex signal point sequence. Each of a plurality of complex signal points, which is included in the complex signal point sequence generated as a result of performing modulation according to the new IM, represents an element of any one of a plurality complex signal point sets. Moreover, in the complex signal point sequence, the applicable patterns of a plurality of complex signal point sets correspond to the first-type bit sequence in a plurality of predetermined combinations of the candidates for the first-type bit sequence and the applicable patterns; while each complex signal point included in the complex signal point sequence corresponds to the second-type bit sequence.

In the new IM, since a plurality of complex signal point sets is used, there is an increase in the types of usages (equivalent to applicable patterns) of the resource elements as compared to the conventional IM in which only a single complex signal point set is used. Accordingly, as compared to the conventional IM, the new IM enables achieving an increase in the volume of information loadable in the usages of the resource elements, thereby enabling achieving enhancement in the resource efficiency. Moreover, according to the new IM, complex signal points can be placed in such resource elements in which complex signal points do not get placed in the conventional IM. Hence, as compared to the conventional IM, the new IM enables achieving an increase in the number of complex signal points placed in each resource element block, thereby enabling achieving enhancement in the resource efficiency.

In the conventional IM, as explained earlier with reference to FIGS. 5 to 9, when a high modulation level such as the modulation level m of four or more is adopted, it becomes difficult to achieve higher resource efficiency in comparison to the typical modulation method of the past. In contrast, in the new IM according to the proposed technology, as explained earlier with reference to FIGS. 17 to 21, regardless of the value of the modulation level m, that is, even when a high modulation level is adopted; higher resource efficiency can be achieved in comparison to the typical modulation method of the past and the conventional IM. Thus, it can be said that the new IM is suitable to a communication system requiring a high data rate and a high throughput.

Although the application concerned is described above in detail in the form of an embodiment with reference to the accompanying drawings; the technical scope of the application concerned is not limited to the embodiment described above. That is, the application concerned is to be construed as embodying all modifications such as other embodiments, additions, alternative constructions, and deletions that may occur to one skilled in the art that fairly fall within the basic teaching herein set forth. In any form thereof, as long as the functions/effects of the application concerned are achieved, the modifications are included in the scope of the application concerned.

Meanwhile, the operations explained with reference to the flowcharts and the sequence diagrams in the present written description need not necessarily be performed in the order illustrated in drawings. That is, some of the operation steps can be performed in parallel. Moreover, additional operation steps can be included, and some of the operation steps can be omitted.

The effects described in the present written description are only explanatory and exemplary, and are not limited in scope. That is, in addition to or in place of the effects described above, the technology disclosed in the application concerned enables achieving other effects that may occur to one skilled in the art.

Meanwhile, a configuration as explained below also falls within the technical scope of the application concerned.

(1)

A transmission device comprising a converting unit that converts a first-type bit sequence and a second-type bit sequence into a complex signal point sequence, wherein each of a plurality of complex signal points included in the complex signal point sequence represents an element of one of a plurality of complex signal point sets, in the complex signal point sequence, applicable pattern of the plurality of complex signal point sets corresponds to the first-type bit sequence in a plurality of predetermined combinations of candidates for the first-type bit sequence and the applicable pattern, and each complex signal point included in the complex signal point sequence corresponds to the second-type bit sequence.

(2)

The transmission device according to (1), wherein each of the plurality of complex signal point sets has linear relationship with each other.

(3)

The transmission device according to (1) or (2), wherein, among the plurality of complex signal point sets, either number of elements is identical to each other or there is a difference of one in number of elements.

(4)

The transmission device according to any one of (1) to (3), wherein the converting unit selects the applicable pattern based on the first-type bit sequence, and based on the applicable pattern, converts the second-type bit sequence into the complex signal point sequence that includes complex signal points selected from each of the plurality of complex signal point sets.

(5)

The transmission device according to (4), wherein, regarding any one of the plurality of complex signal point sets, number of elements in the complex signal point sequence is equal to or greater than value of quotient obtained when number of complex signal points included in the complex signal point sequence represents dividend and number of the plurality of complex signal point sets represents divisor.

(6)

The transmission device according to (5), wherein the first-type bit sequence as well as the second-type bit sequence is a partial sequence of a bit sequence input to the converting unit.

(7)

The transmission device according to any one of (4) to (6), wherein the plurality of complex signal point sets do not have mutually overlapping elements.

(8)

The transmission device according to (7), wherein, regarding arbitrary two complex signal point sets from among the plurality of complex signal point sets, elements of one complex signal point set are expressed using at least either amplitude changing, or phase rotation, or linear shifting, or substitution of elements of other complex signal point set.

(9)

The transmission device according to any one of (1) to (8), further comprising a mapping unit that maps each of a plurality of complex signal points included in the complex signal point sequence onto at least one resource from among frequency resource, temporal resource, and spatial resource.

(10)

The transmission device according to (9), wherein the mapping unit maps a plurality of complex signal points, which is included in the complex signal point sequence, onto two or more resources.

(11)

The transmission device according to any one of (4) to (10), wherein total bit length of the first-type bit sequence and the second-type bit sequence is greater than product of number of complex signal points included in the complex signal point sequence and bit count expressed using complex signal points of the plurality of complex signal point sets.

(12)

The transmission device according to any one of (4) to (11), wherein the plurality of complex signal point sets include, as elements, complex signal points expressed using at least either $2^m$ FSK (Frequency Shift Keying), or $2^m$ ASK (Amplitude Shift Keying), or $2^m$ PSK (Phase Shift Keying), or $2^m$ QAM (Quadrature Amplitude Modulation), where m is an integer equal to or greater than zero.

(13)

The transmission device according to any one of (4) to (12), wherein, regarding any one of the plurality of complex signal point sets, number of elements is either equal to $2^m$ or equal to $1+2^m$, where m is an integer equal to or greater than zero.

(14)

The transmission device according to (13), wherein, when number of elements of the complex signal point set is equal to $1+2^m$, the complex signal point set includes zero (0+0j) as element.

(15)

The transmission device according to any one of (4) to (13), wherein one of the plurality of complex signal point sets has number of elements equal to one.

(16)

The transmission device according to (15), wherein, when having number of elements equal to one, the complex signal point set includes zero (0+0j) as element.

(17)

The transmission device according to any one of (1) to (3), wherein the converting unit converts the second-type bit sequence into provisional complex signal point sequence based on predetermined complex signal point set, performs arithmetic processing, which is based on the first-type bit sequence, with respect to each of a plurality of complex signal points included in the provisional complex signal point sequence, and generates the complex signal point sequence.

(18)

The transmission device according to (17), wherein the predetermined complex signal point set includes, as elements, complex signal points expressed using at least either 2^m FSK, or 2^m ASK, or 2^m PSK, or 2^m QAM, where m is an integer equal to or greater than zero.

(19)

The transmission device according to (17) or (18), wherein the arithmetic processing represents at least either amplitude changing, or phase rotation, or linear shifting, or substitution with respect to complex signal points.

(20)

The transmission device according to (19), wherein number of types of the arithmetic processing is equal to or smaller than number of complex signal points included in the complex signal point sequence.

(21)

The transmission device according to (20), wherein number of types of the arithmetic processing is equal to one, two, or three.

(22)

The transmission device according to any one of (1) to (21), wherein the first-type bit sequence includes a bit indicating whether or not zero (0+0j) is included in the complex signal point sequence.

(23)

The transmission device according to (22), wherein the first-type bit sequence includes a bit indicating position of zero (0+0j) in the complex signal point sequence.

(24)

The transmission device according to (22), wherein the first-type bit sequence includes a bit either indicating whether or not identical complex signal points are included in the complex signal point sequence or indicating applicability or no applicability of predetermined linear conversion with respect to complex signal points.

(25)

A method implemented in a processor, comprising converting a first-type bit sequence and a second-type bit sequence into a complex signal point sequence, wherein each of a plurality of complex signal points included in the complex signal point sequence represents an element of one of a plurality of complex signal point sets, in the complex signal point sequence, applicable pattern of the plurality of complex signal point sets corresponds to the first-type bit sequence in a plurality of predetermined combinations of candidates for the first-type bit sequence and the applicable pattern, and each complex signal point included in the complex signal point sequence corresponds to the second-type bit sequence.

(26)

A recording medium having a program recorded therein for causing a computer to function as a converting unit that converts a first-type bit sequence and a second-type bit sequence into a complex signal point sequence, wherein each of a plurality of complex signal points included in the complex signal point sequence represents an element of one of a plurality of complex signal point sets, in the complex signal point sequence, applicable pattern of the plurality of complex signal point sets corresponds to the first-type bit sequence in a plurality of predetermined combinations of candidates for the first-type bit sequence and the applicable pattern, and each complex signal point included in the complex signal point sequence corresponds to the second-type bit sequence.

REFERENCE SIGNS LIST 1 system
2 base station
3 terminal device
4 cell
100 transmission device
110 antenna unit
120 wireless communication unit
130 memory unit
140 control unit
141 information sharing unit
143 transmission signal processing unit
200 receiving device
210 antenna unit
220 wireless communication unit
230 memory unit
240 control unit
241 information sharing unit
243 received-signal processing unit

The invention claimed is:

1. A transmission device comprising:
   a transmitter having circuitry that converts a first-type bit sequence and a second-type bit sequence into a complex signal point sequence and transmits the complex signal point sequence, wherein
   each of a plurality of complex signal points included in the complex signal point sequence represents an element of one of a plurality of complex signal point sets,
   in the complex signal point sequence, an applicable pattern of the plurality of complex signal point sets corresponds to the first-type bit sequence in a plurality of predetermined combinations of candidates for the first-type bit sequence and the applicable pattern, and
   each complex signal point included in the complex signal point sequence corresponds to the second-type bit sequence.

2. The transmission device according to claim 1, wherein each of the plurality of complex signal point sets has a linear relationship with each other.

3. The transmission device according to claim 1, wherein, among the plurality of complex signal point sets, either a number of elements is identical to each other or there is a difference of one in the number of elements.

4. The transmission device according to claim 1, wherein the circuitry of the transmitter is further configured to
   select the applicable pattern based on the first-type bit sequence, and
   based on the applicable pattern, convert the second-type bit sequence into the complex signal point sequence that includes complex signal points selected from each of the plurality of complex signal point sets.

5. The transmission device according to claim 4, wherein, regarding any one of the plurality of complex signal point sets, a number of elements in the complex signal point sequence is equal to or greater than a value of a quotient obtained when number of complex signal points included in the complex signal point sequence represents a dividend and a number of the plurality of complex signal point sets represents divisor.

6. The transmission device according to claim 5, wherein the first-type bit sequence as well as the second-type bit sequence is a partial sequence of a bit sequence input to the circuitry of the transmitter.

7. The transmission device according to claim 4, wherein the plurality of complex signal point sets do not have mutually overlapping elements.

8. The transmission device according to claim 7, wherein, regarding arbitrary two complex signal point sets from among the plurality of complex signal point sets, elements of one complex signal point set are expressed using at least either amplitude changing, or phase rotation, or linear shifting, or substitution of elements of other complex signal point set.

9. The transmission device according to claim 1, wherein the circuitry of the transmitter is further configured to map each of a plurality of complex signal points included in the complex signal point sequence onto at least one resource from among frequency resource, temporal resource, and spatial resource.

10. The transmission device according to claim 9, wherein the circuitry of the transmitter is further configured to map a plurality of complex signal points, which is included in the complex signal point sequence, onto two or more resources.

11. The transmission device according to claim 4, wherein a total bit length of the first-type bit sequence and the second-type bit sequence is greater than product of a number of complex signal points included in the complex signal point sequence and a bit count expressed using complex signal points of the plurality of complex signal point sets.

12. The transmission device according to claim 4, wherein the plurality of complex signal point sets include, as elements, complex signal points expressed using at least either $2^m$ FSK (Frequency Shift Keying), or $2^m$ ASK (Amplitude Shift Keying), or $2^m$ PSK (Phase Shift Keying), or $2^m$ QAM (Quadrature Amplitude Modulation), where m is an integer equal to or greater than zero.

13. The transmission device according to claim 4, wherein, regarding any one of the plurality of complex signal point sets, number of elements is either equal to $2^m$ or equal to $1+2^m$, where m is an integer equal to or greater than zero.

14. The transmission device according to claim 13, wherein, when a number of elements of the complex signal point set is equal to $1+2^m$, the complex signal point set includes zero (0+0j) as an element.

15. The transmission device according to claim 4, wherein one of the plurality of complex signal point sets has a number of elements equal to one.

16. The transmission device according to claim 15, wherein, under a condition that a number of elements is equal to one, the complex signal point set includes zero (0+0j) as an element.

17. The transmission device according to claim 1, wherein the circuitry of the transmitter is further configured to
convert the second-type bit sequence into a provisional complex signal point sequence based on a predetermined complex signal point set,
perform arithmetic processing, which is based on the first-type bit sequence, with respect to each of a plurality of complex signal points included in the provisional complex signal point sequence, and
generate the complex signal point sequence.

18. The transmission device according to claim 17, wherein the predetermined complex signal point set includes, as elements, complex signal points expressed using at least either $2^m$ FSK, or $2^m$ ASK, or $2^m$ PSK, or $2^m$ QAM, where m is an integer equal to or greater than zero.

19. The transmission device according to claim 17, wherein the arithmetic processing includes at least either amplitude changing, or phase rotation, or linear shifting, or substitution with respect to the complex signal points.

20. The transmission device according to claim 19, wherein a number of types of the arithmetic processing is equal to or smaller than a number of complex signal points included in the complex signal point sequence.

21. The transmission device according to claim 20, wherein the number of types of the arithmetic processing is equal to one, two, or three.

22. The transmission device according to claim 1, wherein the first-type bit sequence includes a bit indicating whether or not zero (0+0j) is included in the complex signal point sequence.

23. The transmission device according to claim 22, wherein the first-type bit sequence includes a bit indicating position of zero (0+0j) in the complex signal point sequence.

24. The transmission device according to claim 22, wherein the first-type bit sequence includes a bit either indicating whether or not identical complex signal points are included in the complex signal point sequence or indicating applicability or no applicability of predetermined linear conversion with respect to complex signal points.

25. A method implemented in a processor, comprising:
converting a first-type bit sequence and a second-type bit sequence into a complex signal point sequence and transmitting the complex sequence, wherein
each of a plurality of complex signal points included in the complex signal point sequence represents an element of one of a plurality of complex signal point sets,
in the complex signal point sequence, an applicable pattern of the plurality of complex signal point sets corresponds to the first-type bit sequence in a plurality of predetermined combinations of candidates for the first-type bit sequence and the applicable pattern, and
each complex signal point included in the complex signal point sequence corresponds to the second-type bit sequence.

26. A non-transitory recording medium having a program of computer readable instructions recorded therein that cause a computer to function as a circuitry of a transmitter that converts a first-type bit sequence and a second-type bit sequence into a complex signal point sequence and controls a transmission of the complex signal point sequence from the transmitter, wherein
each of a plurality of complex signal points included in the complex signal point sequence represents an element of one of a plurality of complex signal point sets,
in the complex signal point sequence, applicable pattern of the plurality of complex signal point sets corresponds to the first-type bit sequence in a plurality of predetermined combinations of candidates for the first-type bit sequence and the applicable pattern, and
each complex signal point included in the complex signal point sequence corresponds to the second-type bit sequence.

* * * * *